INVENTORS H. H. ABBOTT
R. D. FRACASSI
E. G. HUGHES
C. W. LONNQUIST

BY Patrick J. Roche
ATTORNEY

Nov. 29, 1966 H. H. ABBOTT ET AL 3,288,919

DATA TRANSMISSION SYSTEM

Filed Dec. 10, 1962 42 Sheets-Sheet 2

INVERTER

POWER INVERTER

MONOPULSER

Nov. 29, 1966 H. H. ABBOTT ET AL 3,288,919

DATA TRANSMISSION SYSTEM

Filed Dec. 10, 1962 42 Sheets-Sheet 8

Nov. 29, 1966 H. H. ABBOTT ET AL 3,288,919

DATA TRANSMISSION SYSTEM

Filed Dec. 10, 1962 42 Sheets-Sheet 10

Nov. 29, 1966 H. H. ABBOTT ET AL 3,288,919

DATA TRANSMISSION SYSTEM

Filed Dec. 10, 1962 42 Sheets-Sheet 11

Nov. 29, 1966 H. H. ABBOTT ET AL 3,288,919

DATA TRANSMISSION SYSTEM

Filed Dec. 10, 1962 42 Sheets-Sheet 13

Nov. 29, 1966 H. H. ABBOTT ET AL 3,288,919

DATA TRANSMISSION SYSTEM

Filed Dec. 10, 1962 42 Sheets-Sheet 1

DATA TRANSMISSION SYSTEM

Nov. 29, 1966 H. H. ABBOTT ET AL 3,288,919

DATA TRANSMISSION SYSTEM

Filed Dec. 10, 1962 43 Sheets-Sheet 19

DATA TRANSMISSION SYSTEM

Nov. 29, 1966 H. H. ABBOTT ET AL 3,288,919

DATA TRANSMISSION SYSTEM

Filed Dec. 10, 1962 42 Sheets-Sheet 25

Nov. 29, 1966 H. H. ABBOTT ET AL 3,288,919

DATA TRANSMISSION SYSTEM

Filed Dec. 10, 1962 42 Sheets-Sheet 26

DATA TRANSMISSION SYSTEM

Nov. 29, 1966 H. H. ABBOTT ET AL 3,288,919

DATA TRANSMISSION SYSTEM

Filed Dec. 10, 1962 43 Sheets-Sheet

Nov. 29, 1966 H. H. ABBOTT ET AL 3,288,919

DATA TRANSMISSION SYSTEM

Filed Dec. 10, 1962 42 Sheets-Sheet 3

Nov. 29, 1966 H. H. ABBOTT ET AL 3,288,919

DATA TRANSMISSION SYSTEM

Filed Dec. 10, 1962 42 Sheets-Sheet 34

Nov. 29, 1966 H. H. ABBOTT ET AL 3,288,919

DATA TRANSMISSION SYSTEM

Filed Dec. 10, 1962 42 Sheets-Sheet 31

Nov. 29, 1966 H. H. ABBOTT ET AL 3,288,919

DATA TRANSMISSION SYSTEM

Filed Dec. 10, 1962 42 Sheets-Sheet 39

LOGIC SEQUENCE TIME DIAGRAM FOR MAIN DATA TERMINAL TO NO. 1 DATA TERMINAL TRANSFER

DATA TRANSMISSION SYSTEM

LOGIC SEQUENCE TIME DIAGRAM FOR NO. 1 DATA TERMINAL TO MAIN DATA TERMINAL TRANSFER

LOGIC SEQUENCE TIME DIAGRAM FOR MAIN DATA TERMINAL TO NO. 1 DATA TERMINAL TEST MESSAGE

LOGIC SEQUENCE TIME DIAGRAM FOR NO. 1 DATA TERMINAL DISCARD MODE

United States Patent Office 3,288,919

Patented Nov. 29, 1966

3,288,919

DATA TRANSMISSION SYSTEM

Henry H. Abbott and Renato D. Fracassi, Middletown, Edward G. Hughes, Leonardo, and Chester W. Lonnquist, Eatontown, N.J., assignors to Bell Telephone Laboratories, Incorporated, New York, N.Y., a corporation of New York Filed Dec. 10, 1962, Ser. No. 243,668

25 Claims. (Cl. 178—3)

This invention relates to a communication system, and more specifically to such system for transmitting and/or receiving in parallel at one time the digital data constituting each entire message.

It is well known in the computer art that messages comprising digital data are processed at microsecond rates at the transmitting and receiving terminals. In one instance, the discrete digital data of such messages are transmitted between terminals one datum at a time at a high speed on a single transmission circuit on a time division basis. In another instance, it may be desirable to transmit the digital data of such messages on transmission circuits extending between the terminals and adaptable for transmitting messages in other than digital form on other occasions, but not suitable for handling the digital data messages at the high speed. Therefore, the present invention contemplates facilities for simultaneously transmitting in parallel all digital data constituting an entire message between geographically spaced data processing terminals at a speed below the speed at which the digital data are processed in the respective terminals.

It is the main object of the present invention to transmit all digital data constituting a single message at one time on a plurality of discrete transmission circuits on the basis of one datum for each circuit.

It is another object to transfer all digital data forming a complete message on a plurality of transmission circuits connecting two data processing terminals at a speed below the speed at which the digital data are processed in the respective terminals.

It is a further object to use the same transmission circuits for transmitting digital data messages in opposite directions between two geographically spaced data processing terminals.

In association with a plurality of geographically spaced terminals for processing digital data in the form of binary digits or bits at a high speed, a specific embodiment of the present invention comprises transistor resistor logic facilities at each terminal for gating in parallel at a microsecond rate a plurality of bits constituting a complete message and received at one time from one of the terminals, each facility gating one bit, a plurality of electromagnetic relays at each of the terminals for recording the complete message at one time on the basis of each relay recording one bit under control of one logic facility, a plurality of transmission circuits connecting the terminals, each circuit having one end connectable to each relay at each terminal, and supervisory control apparatus for connecting the circuits between two preselected terminals in such operative relation that the bits of the complete message at one of the preselected terminals are recorded in parallel at one time in the plurality of relays associated therewith and thereafter the bits of the completely recorded message are transferred in parallel at one time to the other terminal of the two preselected terminals at a speed below the high speed of the bit processing at the terminals on the basis of one bit per circuit for recording in parallel at one time in the plurality of relays associated with the other terminal. The supervisory apparatus restores the system to the idle condition upon the completion of the transfer of the message from the one to the other of the two preselected terminals.

In addition to the above-noted connection for interterminal communication, the supervisory apparatus provides connections for intraterminal communication at certain terminals as an aid to trouble shooting thereat, as well as permitting local communication therein.

Transistor resistor logic enables each data processing terminal to record the plurality of bits of each message in parallel at a microsecond speed in the plurality of flip-flops associated therewith. The plurality of bits are thereafter recorded in the plurality of relays at each terminal and then transferred in parallel at a millisecond speed to the plurality of relays associated with the data processing terminal to which the message is to be transferred.

In one aspect, the invention contemplates a main data terminal for transmitting and/or receiving data bits, and two distinct terminals for transmitting and/or receiving data bits. An interface associated with the main terminal controls the connections therefrom to each of the two distant terminals in such manner that the main terminal is connectable only to one of the two distant terminals at a given time for the purpose of transmitting messages in opposite directions through the interface at that time. Thus, two communication channels are provided from the interface to the distant terminal, one channel from the interface to each distant terminal. Each channel includes a control logic and bit terminal at the interface, and a control logic and bit terminal at each of the distant terminals.

The transmission of a "1" bit in the form of ground from the interface is represented by a current flow in the corresponding data transmission circuit to a preselected distant control logic and bit terminal whereat such current serves to interrupt another ground. This alters a predetermined electrical condition at the associated distant data terminal whereby the "1" bit is registered therein. The transmission of a "0" bit in the form of a negative voltage from the interface is represented by no current flow on the corresponding data transmission circuit to the preselected distant control logic and bit terminal whereat such no current flow fails to alter the ground status at such terminal. This is reflected as no change in the predetermined electrical condition at the associated distant data terminal whereby the "0" bit is registered therein.

The transmission of a "1" bit in the form of a ground from a preselected distant terminal is represented by a current flow in the corresponding data transmission circuit to the control logic and bit terminal associated with the interface for providing a ground in the latter terminal. This ground alters a predetermined electrical condition in the interface whereby the "1" bit is registered therein. The transmission of a "0" bit in the form of no electrical change in the preselected distant data terminal is represented by no current flow on the corresponding data transmission circuit. This is reflected as no change in the predetermined electrical condition in the interface whereby the "0" bit is registered therein. In due course the "1" and "0" bits registered in the interface are transmited to the main data terminal.

The supervisory apparatus selects one of two communicator channels, A or B, on a random basis in response to two different clock pulses for transmitting a given message from the main data terminal; and it will always select an idle channel. Assuming both channels A and B are idle at a given moment, the clock phases provide a priority to the selection of channel A. In the event that both channels A and B should attempt to initiate transmission from their respectively associated data terminals, a choice between the two channels is made by two different clock pulses. Once a channel is selected for data transmission, the other channel is inhibited. Obviously, the clock phases may be arranged to provide an equal opportunity of selection between the two channels.

In the event of transmission failure involving an incomplete or incorrect supervisory control, a Time Out circuit records time from the start to the finish of each message so that if a message is not completed within a prescribed time, it informs the Automatic and Clear circuit. This circuit clears and restores the system to the idle state, and at the same time records one time out. If this occurs a second time in succession for a given channel, the Time Out circuit directs the Off Line Control circuit to remove a particular faulty channel from service, without impairing transmission on the remaining channel. Another transmission failure involves the incorrect receipt of a message. These failures are counted in a Parity Counter which activates the Off Line Control circuit to remove the faulty channel from service for trouble shooting, upon the completion of the accumulation of a predetermined number of successive bad parities.

Control of the initiation of messages is divided between the interface which controls data transmission from the main data terminal and the Busy Idle circuit which controls data transmission from each of the distant data terminals.

A Supervisory Control apparatus monitors the progress of a message transfer through the system. It responds to appropriate sequential input signals to produce appropriate output signals and to advance from state to state so that specific operations are sequentially executed to control message transfer within the time allotted to each message transfer.

A Time Out circuit initiates a time count at the start of each message on a given channel and continues it until the message is completed. If the message is not completed within a predetermined time interval, the message is treated as lost and the system is returned to the idle state. Bad parity is, however, indicated so that the terminal may repeat the faulty message at a later time. This precludes the system from becoming jammed because of a faulty exchange of supervisory signals, or a temporary (one time out) trouble condition.

A Parity Counter records the receipt of incorrect messages for each of the two opposite directions of message transfers so that, upon the attainment of a predetermined number of recordings for either transfer direction, the faulty channel is removed from service for the purpose of trouble shooting.

An Automatic Clear circuit clears and restores the entire system to an idle condition, under control of the Time Out circuit.

An Off Line circuit removes a faulty channel from service without impairing the operation of the operative channel, thereby enabling trouble shooting on the faulty channel.

A Manual Clear and Test circuit enables the testing of a faulty channel in regard to the supervisory control circuits and the data transmission circuits, each independent of the other.

Alarms provide visual indications of faulty data transmission circuits via appropriate lamp circuits.

The invention will be readily understood from the following description when taken together with the accompanying drawing in which.

Figure 1:
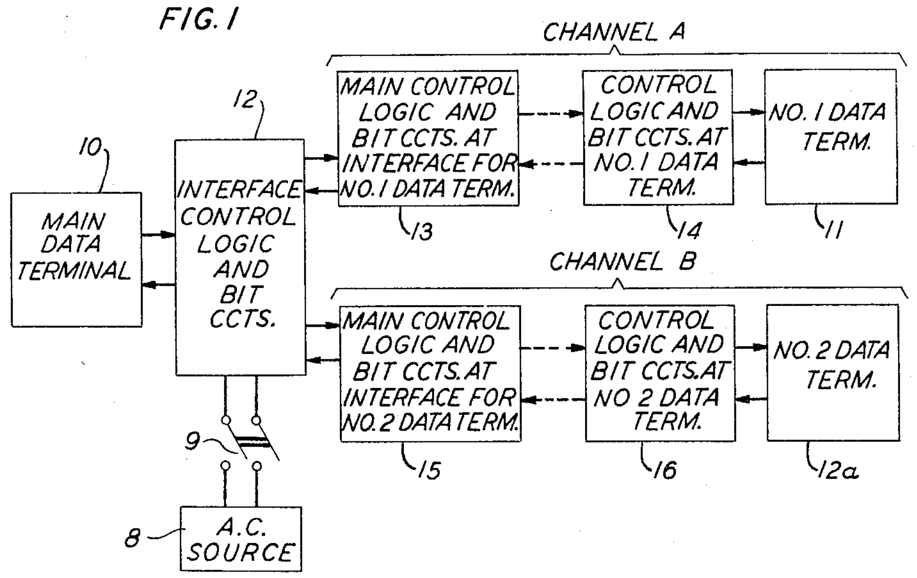
FIG. 1 is a box diagram of a specific embodiment of the invention.
Figure 3:
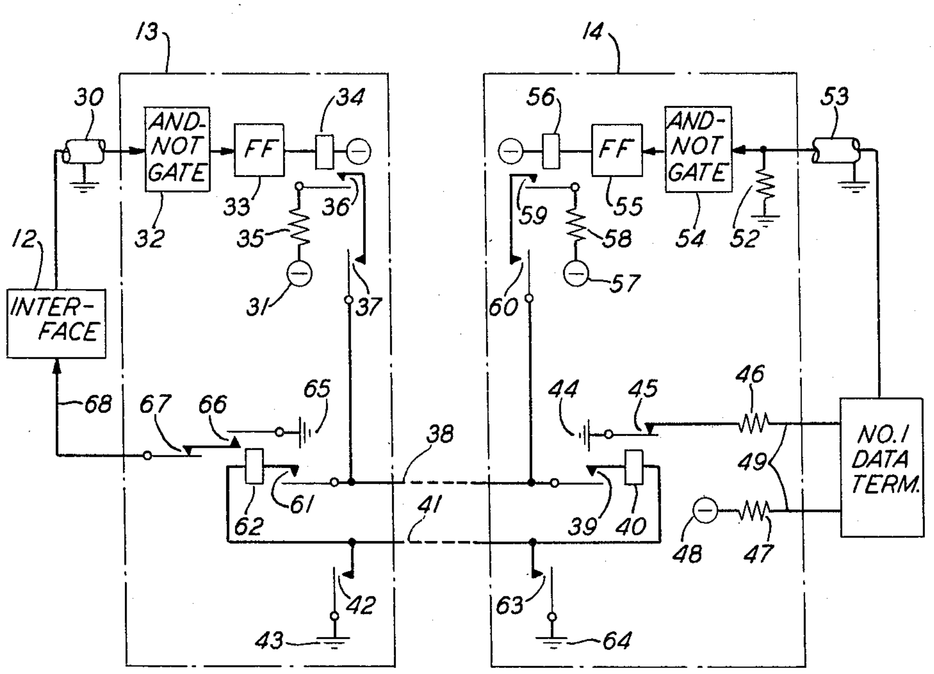
FIG. 3 is a schematic circuit showing the operation of a portion of FIG. 1.
Figure 2:
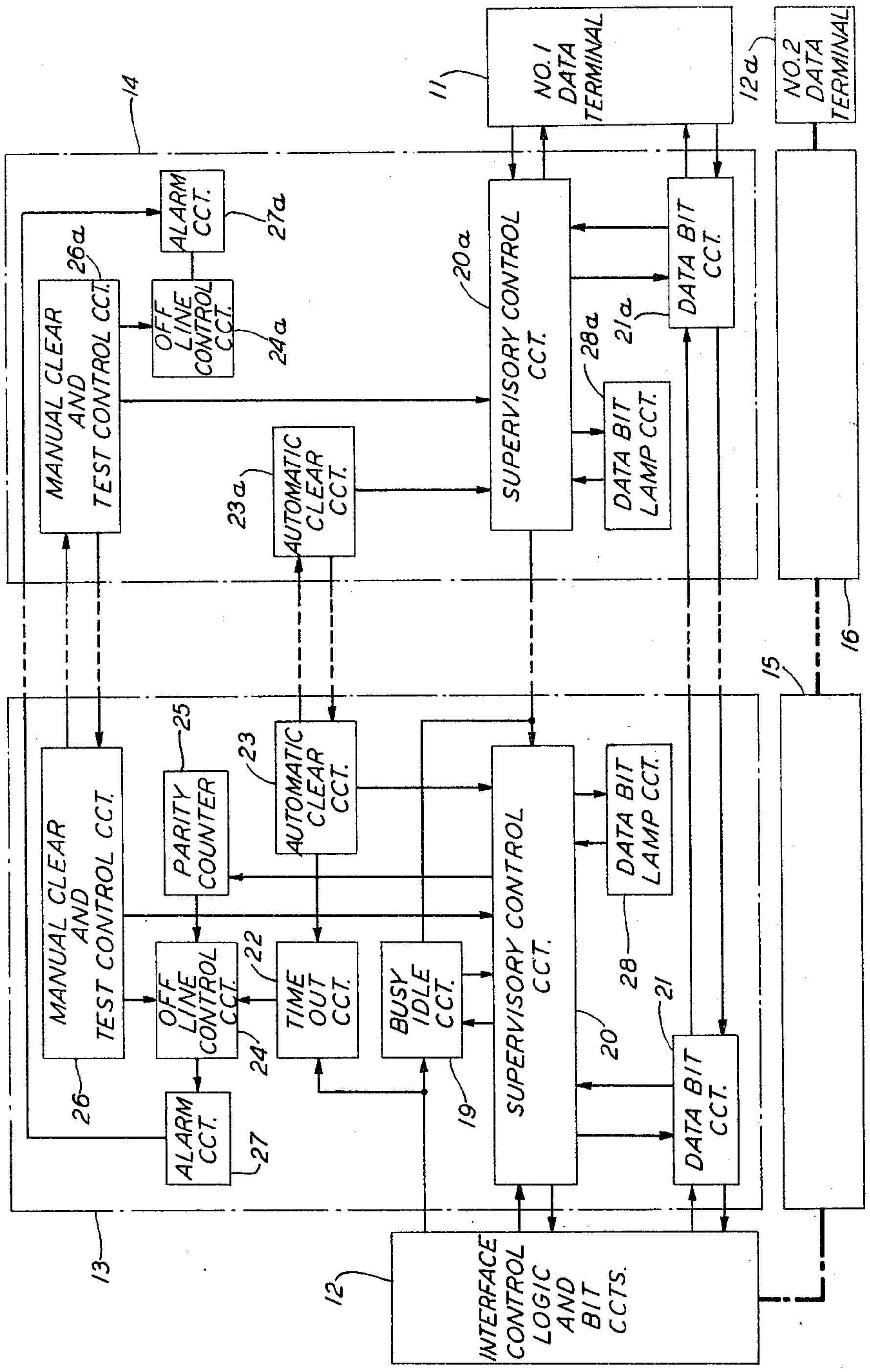
FIG. 2 is a box diagram illustrating the operation of a portion of FIG. 1.
Figure 32:
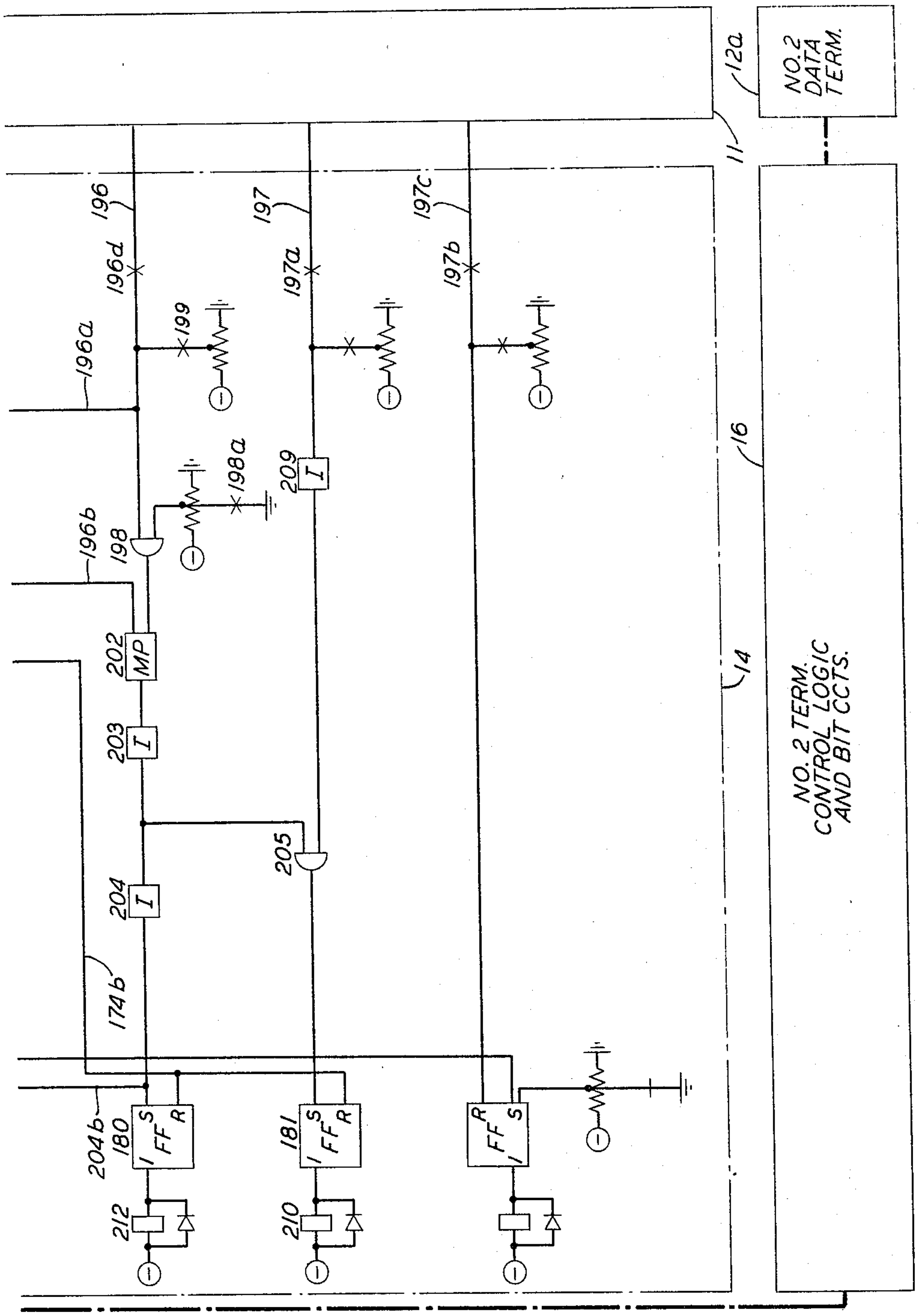
Figure 33:
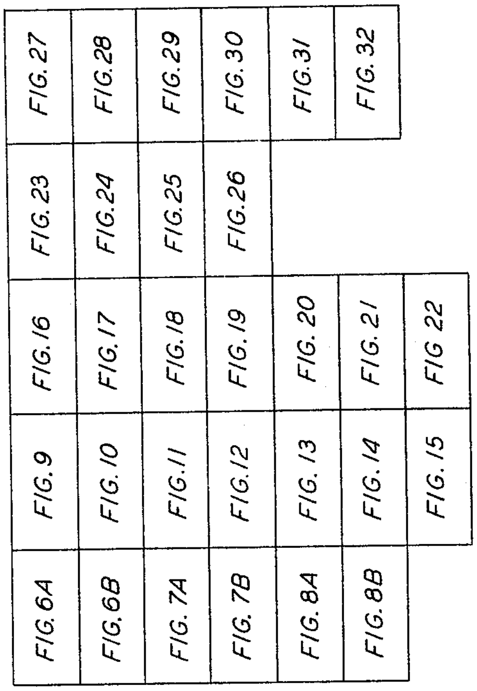

FIGS. 6A, 6B, 7A, 7B, 8A, 8B and 9 through 32 are schematic circuits illustrating the embodiments shown in FIGS. 1, 2 and 3;

FIG. 33 is a box diagram illustrating the manner in which the schematic circuits shown in FIGS. 6A through 32 are to be assembled in operative relation; and FIGS. 34 through 37 are timing diagrams of the action obtainable in FIGS. 6A through 32.

FIG. 1 illustrates generally a data communication system comprising a main data terminal 10 and remote No. 1 and No. 2 data terminals 11 and 12*a*, respectively. An interface 12 connected to the main terminal provides two way signal communication therewith. Channel A including main control logic and bit circuits 13 for the No. 1 terminal and No. 1 control logic and bit circuits 14 interconnects the interface and No. 1 terminal for two way signal communication therebetween. Channel B including main control logic and bit circuits 15 for the No. 2 terminal and No. 2 control logic and bit circuits 16 interconnects the interface and No. 2 terminal for two way signal communication therebetween. Preferably, the interface and main No. 1 and No. 2 control logic and bit circuits 13 and 15, respectively, are located in proximity of the main terminal while the No. 1 and No. 2 control logic and bit circuits 14 and 16 are located in proximity of the No. 1 and No. 2 terminals, respectively.

Obvously, either one or both of the No. 1 and No. 2 terminals may be operatively connected to the main terminal 10 at a given time. Although the interface can transmit messages in opposite directions simultaneously, it cannot handle two messages destined for the same direction simultaneously. In other words messages originating in the main terminal may be transmitted via channel A to the No. 1 terminal or via channel B to the No. 2 terminal, but not via both channels at the same time, and vice versa. As the main terminal may transmit to or receive from either the No. 1 or No. 2 terminal a message comprising a large number of bits simultaneously in either direction say, for example, 120 bits, the traffic of such messages is controlled in a manner that will be described hereinafter. FIG. 2 delineates in box diagram form an arrangement for controlling the message traffic provided only in channel A as shown in FIG. 1. In this connection, it will be understood that since the traffic control between the main terminal and either the No. 1 or No. 2 terminal, that is, via either channel A or B, is essentially identical, such control as illustrated in FIG. 2 is limited to message transfer between the main terminal and the No. 1 terminal thereby constituting effectively one channel for the purpose of this description. It will be further understood in FIG. 2 that since the traffic control for message transfer between the main terminal and the No. 2 terminal is substantially identical with that described for the message transfer between the main and No. 1 data terminals, the description of the traffic control between the main and No. 2 data terminals is omitted in the interest of simplification.

Referring to FIGS. 1 and 2, initiation of a message in the main data terminal or in the No. 1 data terminal is controlled by a busy idle circuit 19 which selects the direction of message transfer and activates supervisory control circuit 20 for controlling message transfer from the main terminal 10 to the data bit circuits 21. Supervisory control circuit 20*a* governs the operation of data bit circuit 21*a* and exchanges command signals with the main control logic circuits 13 during message transfer. The supervisory control circuit 20 informs the busy idle circuit of the completion of a message transfer and returns the latter circuit to the idle state. Lamp circuits 28 and 28*a* provide appropriate lamp illumination or nonillumination for indicating the operativity or nonoperativity of the respective data bit transmission circuits per se.

Once a message transfer has been initiated in either direction in channel A, two failures in transmission may be encountered. When the first failure, for example, an incomplete or incorrect transmission of supervisory control signals occurs, a time out circuit 22 is operated to record time, from the start to the end of each message transfer. If a message transfer is not completed within a prescribed period of time, the time out circuit activates an automatic clear circuit 23 which thereupon clears channel A and restores it to the idle condition. The time out circuit further activates off line control circuit 24 to remove faulty channel A from service. This, however, will permit the operative channel B to continue message transfer without interference. An automatic clear circuit 23*a* and an off line control circuit 24*a*, which are duplicates of the off line control circuits 23 and 24, respectively, are included in the No. 1 control logic terminal.

When the second failure occurs, for example, the incorrect reception of a message transfer, parity counter 25 records such incorrect message and at the same time activates the off line control circuit which thereafter proceeds to remove the faulty channel A from service as aforementioned. If, for example, the faulty channel had been removed because the message in question included bad parity (odd number of 1's whereas an even number of 1's is required for good parity), action is then taken to determine the cause of the fault. This is achieved by a manual clear and test control circuit 26 included in the main control logic terminal and an identical manual clear and test control circuit 26*a* included in the No. 1 control logic terminal. As a consequence, the faulty channel may be cleared and removed from service with either the main control logic terminal 13 or the No. 1 control logic terminal 14, or both.

Busy Idle Circuit: Control of the initiation of messages is divided between the interface for the main terminal and the busy idle circuit for the No. 1 or No. 2 terminal as aforestated. At the start of message transfer in either direction, the busy idle circuit advances to the busy condition and remains therein until the supervisory control circuit 20 or 20*a* is reset following the completion of the transfer. Return of the busy idle circuit to the idle state is accomplished in such manner that short term preference is given to the message transfer originating at the main terminal. This preference is achieved by inhibiting message transfer from the No. 1 terminal for two microseconds following the return of the busy idle circuit to the idle state via preselected clock signals in a manner that will be subsequently explained.

Supervisory Control Circuit: The progress of a message transfer is regulated by an asynchronous and sequential control circuit 20 at the main logic terminal and an identical control logic circuit 20*a* at the No. 1 or No. 2 terminal. This circuit at a particular terminal is activated by various input signals to advance to such state that a specific operation may be executed within the message transfer sequence. A given state may control the operation of relays, gating of data to the data register, or returning the terminal to the idle condition, or the like, as hereinafter mentioned.

Time Out Circuit: This precludes the No. 1 or No. 2 terminal from becoming jammed due to a faulty exchange of supervisory signals. At the start of a message transfer, a counter is activated and advanced by timing signals which occur every 125 milliseconds and reset by the message termination. The longest possible message transfer will be completed within 120 milliseconds. If the counter advanced three counts (250–375 milliseconds) on a specific message before channel A or channel B went idle, that message would be considered to have been lost. In such case a signal is sent to the automatic clear circuit whereupon the channel at fault is returned to the idle condition. At this moment the time out circuit stores the fact that one transmission failure had occurred. A successful completion of the transfer of the next succeeding message, which is sent in the same direction as that of the previous lost message, resets the time out circuit. That is, the first recording of a fault is canceled. If, however, a second consecutive failure occurs in the same transmission direction as that in which the first mentioned fault happened, then the time out circuit is activated to send a signal to the off line control circuit. This circuit thereupon responds to such signal by removing from service the particular channel responsible for the two consecutive fault occurrences therein. The disparity in time (250–375 milliseconds) as aforementioned is due to the fact that messages are iniated independently of timing signals. As a consequence, the counting of three timing pulses could correspond to two or three of the 125 millisecond timing intervals.

Parity Counter: This determines continuously whether a particular first or second transmission path was properly operative by registering incoming messages. This counter comprises two discrete counting circuits in each of the transmission channels, one for each direction of transmission therein. This counter counts and records the number of bad parities as above identified. If and when a full count of four consecutive bad parities is reached in either one of the two counting circuits for one transmission direction, such one circuit sends a signal to the off line control circuit. This circuit will then respond to such signal by removing from service the particular transmission channel involved in the four consecutive fault occurrences. This is not to be construed, however, that such channel is directly at fault because it may have happened that the message was initiated incorrectly by the main terminal or by either one of the No. 1 or No. 2 terminals, or read incorrectly by the particular one of the latter terminals receiving the faulty message as recorded by the parity counter. It does obviously indicate the existence of a troublesome condition somewhere in the transmission system involved in the fault recording.

Due to the possibility of intermittent errors, occurring in the system say, for example, by "hits" arising from extraneous voltages, a parity count greater than one is required. Any count less than four will be erased by the receipt of a subsequently good parity count in the proper path and direction. A parity count of three errors, for example, at either the No. 1 or No. 2 terminal has been selected to activate the alarm circuit 27*a* thereat and a parity count of sixteen, for example, at the main terminal activates alarm circuit 27 thereat in a manner and for a purpose that will be mentioned subsequently herein. The parity count of sixteen was selected for the main terminal because it shares parity counter 25 with three other circuits; and hence a cumulative count of sixteen consecutively bad parities is required to indicate a troublesome condition at the main terminal.

Automatic Clear Circuit: This serves to clear either the No. 1 or No. 2 terminal following a single time out in either direction of message transmission. This clearance returns the supervisory control circuit at either the main terminal or the No. 1 or No. 2 teminal to its normal condition depending, of course, on which a particular terminal was involved in the time out, and thereafter restores the busy idle circuit to its idle state. Before the particular channel involved in the time out just mentioned becomes idle, signals are supplied to the main terminal and No. 1 and No. 2 terminal, depending on which one of the latter was involved, to indicate a termination of the message transfer which was then taking place. These signals serve to return the respective terminals to the idle state.

When a time out occurs and the system is cleared in the manner aforesaid, the last-mentioned message transfer is lost. Since an appropriate supervisory signal is not available for indicating the occurrence of a lost message, a bad parity signal is transmitted to the main terminal for alerting the latter of the fact that the message transfer in question, if initiated therein, was not properly effected. This will allow the main terminal to retransmit the message if desired. A second chance option of this character is not available to either the No. 1 or No. 2 terminal, if the message transfer in question were initiated therein, because the results of the parity check are not returned to these terminals. All messages originating in either the No. 1 or No. 2 terminal undergo an intraterminal transmission before they are sent out onto the associated channel. Both of these terminals are accordingly provided with built in checks for ascertaining message correctness before it is sent out onto the associated channel. In such event, the use of a parity check signal at either the No. 1 or No. 2 terminal would be superfluous.

Off Line Control Circuit: As the interface control logic and bit circuit 12 located adjacent to the main terminal as shown in FIG. 1 is connectable to both channels A and B, and since both channels feed into and out of such interface, it is possible that a troublesome condition arising in either one of the channels may adversely affect the operation of the other path. To obviate such possibility, each of the channels is provided with an off line control circuit whose function is to remove the faulty channel from service, and at the same time to send a permanent busy signal to the main terminal. This inhibits the main terminal from selecting the faulty channel until the latter has been cleared for normal message transfer. The off line control circuit at the main terminal may be activated by the associated time out circuit, parity counter, manual clear and test control circuit on a test error signal received from the No. 1 or No. 2 terminal in a manner that will be later discussed. Such test error signal serves to indicate at the main terminal an incorrect intraterminal message transmission at the particular No. 1 or No. 2 terminal. If a troublesome condition occurs at either the No. 1 or No. 2 terminal and maintenance work is to be performed thereat, then the manual clear and test control circuit *26a* thereat is employed to activate the off line control circuit *24a* associated therewith to disconnect channel A or channel B from the corresponding terminal as desired. When the faulty channel is so removed from service, an output signal from off line control circuit *24a* is sent to the alarm circuit *27a* which in turn notifies the proper maintenance monitor center of such removal.

Manual Clear and Test Control: This allows the respective first and second channels to be cleared and tested on a manual basis, particularly the supervisory control circuits and data bit circuits at the main terminal and the No. 1 and No. 2 terminals. The testing of the supervisory control circuits is made when the associated channel is transferred to the off line state. Appropriate signals are provided at the respective data terminals to simulate command signals exchanged normally between the interface and No. 1 and No. 2 terminals. This requires coordination between the terminals so that lamps, when used, are illuminated or nonilluminated to indicate the results of such tests, as well as to determine the transmission status of a particular channel in the event of a failure of a test operation in a supervisory control circuit.

Also, appropriate signals are provided to test the operativeness of data bit circuits 21 and *21a* at the main terminal and No. 1 and No. 2 terminals, respectively. This test is performed in two parts, viz: (1) testing of the odd numbered bits, and (2) testing of the even numbered bits. This enables the location of faulty circuit elements and the isolation of possible crosstalk problems. A lamp associated with each bit circuit at the respective terminals is illuminated or nonilluminated to provide an indication of the proper operation of the corresponding circuits.

Alarm Circuits: These serve to provide at a maintenance monitor center suitable lamp and audible indications of the operation of the main terminal, the No. 1 and No. 2 terminals, and the other circuit components hereinbefore mentioned.

Referring now to FIG. 3, there is shown in a skeltonized form one typical discrete data bit transmission circuit suitable for two way signal transmission in either channel A or B of the data transmission circuit shown in FIGS. 1 and 2. Each channel of the system contemplates handling, for example, messages, each comprising 120 discrete bits, each bit being transmitted in the discrete circuit shown in FIG. 3 whereby 120 bit transmission circuits are involved. Hence, the circuit shown in FIG. 3 illustrates one of the 120 bit circuits constituting each of the data transmission channels A and B shown in FIGS. 1 and 2. The operation of the single bit circuit shown in FIG. 3 and as further illustrated in FIGS. 4 and 5, for operation in both directions of transmission, will now be briefly described; and it will be understood that the operation of each of the 120 bit circuits included in each of channels A and B in the system shown in FIG. 1 operates in a manner that is presently explained. As indicated in FIG. 3, a signal circuit outgoing from the interface comprises a coaxial conductor cable 30 terminated in the main control logic and bit circuit 13 for the No. 1 data terminal and in the latter circuits an outgoing signal circuit including AND-NOT gate 32, data register flip-flop 33, and the operating winding of data register relay 34. This signaling circuit further includes battery 31, resistor 35, make contacts 36 and 37, transmission lead 38, make relay contact 39, operating winding of relay 40, transmission lead 41, make contact 42 and ground 43. At the No. 1 terminal, the aforenoted signaling circuit outgoing from the interface further includes ground 44, break contact 45 of relay 40, series resistor 46, No. 1 data terminal, series resistor 47, and battery 48, the resistors being connected by a twisted conductor pair 49 to the No. 1 terminal. It will be understood that leads 38 and 41 are a part of a multiconductor cable.

In FIG. 3, a signal circuit outgoing from the No. 1 terminal comprises a coaxial conductor cable 53 terminated at at one end in the latter terminal and at the opposite end in resistor 52 disposed in the control logic and bit circuit 14 for the No. 1 data terminal. The latter circuit includes AND-NOT gate 54, data register flip-flop 55, and the operating winding of data register relay 56. This outgoing signal circuit also includes battery 57, resistor 58, make relay contacts 59 and 60, lead 38, relay contact 61, operating winding of relay 62, lead 41, make relay contact 63 and ground 64. At the main control logic and bit circuit 13, this outgoing signaling circuit further includes ground 65, make relay contact 66, break relay contact 67 and lead 68 terminating in the interface.

In the transmission of a signal outgoing from the interface to the No. 1 terminal in FIG. 3, it is initially assumed that an exchange of appropriate supervisory signals therebetween as initiated by the interface serves to close make relay contacts 37, 39 and 42 in a manner that will be subsequently explained. Now, a data bit assumed in the form of a ground and representing a "1," for example, is transmitted through gate 32 and stored in data register relay 34 in a predetermined microsecond interval in the sense that the latter is thereby operated to close its make contact 36. A negative voltage is now effective in a series circuit including battery 31, resistor 35, make relay contacts 36 and 37 (both made), lead 38, make relay contact 39 (made), operating winding of relay 40, lead 41, make relay contact 42 (made) and ground 43. This voltage operates relay 40.

In due course, the "bit" ground is removed at the interface whereupon relay 34 is released to terminate the voltage effective in the aforetraced circuit. As a consequence of the operation and release of relay 34, a negative voltage pulse is applied to the operating winding of relay 40 which is thereby caused to operate. This interrupts break contact 45 which thereupon disconnects ground 44 from the No. 1 data terminal, and promptly thereafter relay 40 is released to re-establish the connection of ground 44 via break contact 45. Before the operation of relay 40, a voltage was effective in a series circuit including battery 48, resistor 47, lead 49, No. 1 data terminal, lead 49, resistor 46, break contact 45 and ground 44. Upon the operation of relay 40, this voltage circuit was interrupted. As a consequence of such operation and release of relay 40, a change was made in the condition of an electric current effective in the No. 1 data terminal to indicate the receipt thereat of a "1" bit in a manner and for a purpose that will be subsequently described. Thus, a "1" bit initiated in the interface is translated into a negative voltage which is transmitted on a predetermined millisecond time interval from the main control logic and bit circuits at the interface to the control logic and bit circuit at the No. 1 data terminal. Thereafter, the circuit of FIG. 3 is returned to normal.

When a "0" bit is to be transferred from the interface to the No. 1 terminal, then no current is effective on the coaxial cable 30 in FIG. 3 whereupon relay 34 remains unoperated. As a consequence, no current is transmitted on the coaxial cable 38, 41 and relay 40 remains unoperated. Hence no change is reflected in the condition of the current effective in the No. 1 data terminal in a manner and for a purpose that will be later explained herein. Thus, a "0" bit initiated at the interface is transmitted on a predetermined millisecond time interval from the main control logic and bit circuit 13 at the interface to the control logic and bit circuit 14 at the No. 1 data terminal. Thereafter, the circuit of FIG. 3 is again returned to normal.

On the other hand, in the transmission of a signal outgoing from the No. 1 data terminal to the interface in FIG. 3, it is now initially assumed that an exchange of supervisory signals therebetween as initiated by the No. 1 data terminal effects the closing of make contacts 60, 61 and 63 in a manner that will be pointed out in detail hereinafter. Now a data bit assumed in the form of ground and representing a "1" bit is effectively transmitted through gate 54 and stored in data register relay 56 in a predetermined microsecond interval in the sense that the latter is operated to close its make contact 59. This ground provides essentially a change in the magnitude of the current available to the operating winding of relay 56. A negative voltage is now effective in a series circuit including battery 57, resistor 58, make contacts 59 and 60 (both closed), lead 38, make relay contact 61 (closed), operating winding of relay 62, lead 41, make relay contact 63 (closed), and ground 64. This voltage operates relay 62.

In due course, the "1" bit ground is removed from the No. 1 data terminal whereupon relay 56 is released to terminate the voltage effective in the aforetraced circuit. As a consequence of the operation and release of relay 56, a negative voltage pulse is applied to the operating winding of relay 62 which is thereby caused to operate. This closes contact 66 to apply ground 65 via contact 67 and lead 68 to the interface, and promptly thereafter relay 62 is released to interrupt the connection to ground 65. This changes the magnitude of a signal generated within the interface and thereby effectively transmits the "1" bit from the No. 1 data terminal to the interface which in turn transmits the "1" bit to the main data terminal in a manner that will be further explained hereinafter. Thus, a "1" bit ground effected at the No. 1 terminal is translated into a negative voltage which in turn is changed into a ground which is applied to the interface for indicating thereat the receipt of a "1" bit in a predetermined millisecond time interval. Thereafter, the circuit of FIG. 3 is returned to normal. Resistors 46 and 47 and 58 are utilized to preclude unnecessary current drain from batteries 48 and 57, respectively.

When, however, a "0" bit is to be transferred from the No. 1 terminal to the interface, there is no change in the current flow to the operating winding of relay 56 which fails to operate. As a consequence, no current is caused to flow on the cable pair 38, 41 whereupon relay 62 remains unoperated. Hence, no change is reflected in the magnitude of the signal generated within the interface in a manner and for a purpose that will be futrher described below. Thus, a "0" bit initiated at the No. 1 battery is transmitted on a predetermined millisecond time interval from the control logic and bit circuits at the No. 1 data terminal to the main control logic and bit circuits at the interface. Thereafter, the circuit of FIG. 3 is again returned to normal.

Figure 4A:
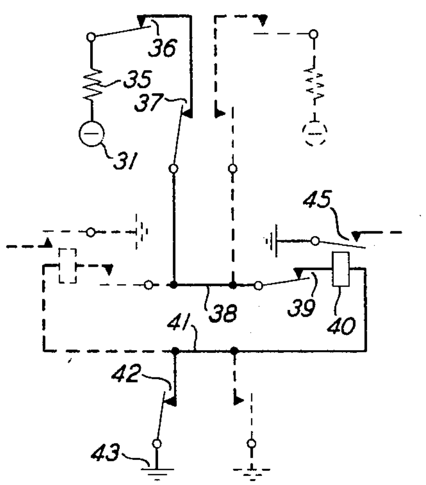
FIGS. 4A through 4D are schematic circuits showing various operations of FIG. 3.
Figure 4B:
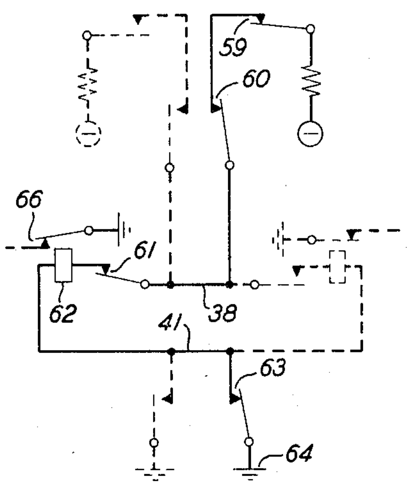
Figure 4C:
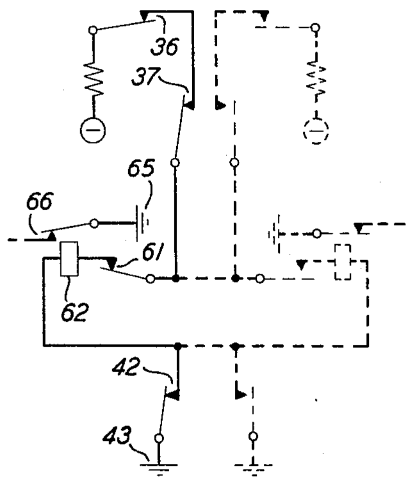
Figure 4D:
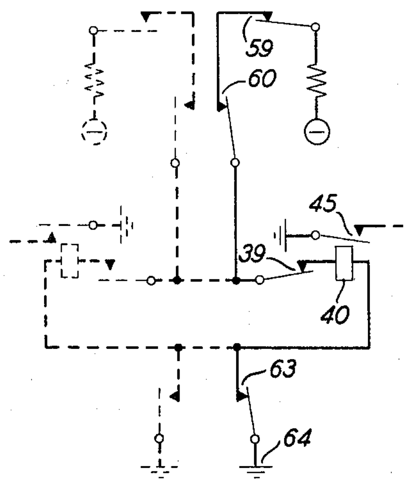

In operation of FIG. 3 as above described, the transmission of a "1" bit from the interface to the No. 1 terminal is clearly shown in FIG. 4A, which delineates the specifically closed circuit therefor, whereas the transmission of a "0" bit in the same direction between the same terminals causes no change in open circuit condition of the circuit as shown in FIG. 3. On the other hand, the transmission of a "1" bit from the No. 1 terminal to the interface is clearly indicated in FIG. 4B, which displays the specifically closed circuit therefor, while the transmission of a "0" bit in the same direction between the same terminals will effect no change in open circuit condition of the circuit as delineated in FIG. 3. FIGS. 4A and 4B thus illustrate the operation of FIG. 3 on an interterminal basis. The operation of FIG. 3 on an intraterminal basis is indicated in FIGS. 4C and 4D in which FIG. 4C shows the closed circuitry for the operation of the main control logic and bit circuit 13 at the interface for intraterminal communication thereat, whereas FIG. 4D displays the closed circuitry for the operation of the control logic and bit circuit 14 at the No. 1 terminal for intraterminal communication thereat.

While the foregoing descriptions of the operation of FIGS. 1, 2, 3 and 4A through 4D illustrate the transmission of a "1" and/or a "0" bit from the main data terminal to the No. 1 data terminal, and vice versa, via a single coaxial conductor cable comprising the inner and outer conductors 38 and 41, and vice versa, it will be understood that substantially the same operative descriptions apply to the transmission of each of the 120 bits constituting a given message as above mentioned.

*System elements*

The transistor resistance logic mentioned in the following detailed description will be understood to be provided by the circuit elements shown in FIGS. 5A through 5H, 5K and 5L.

Figure 5A:
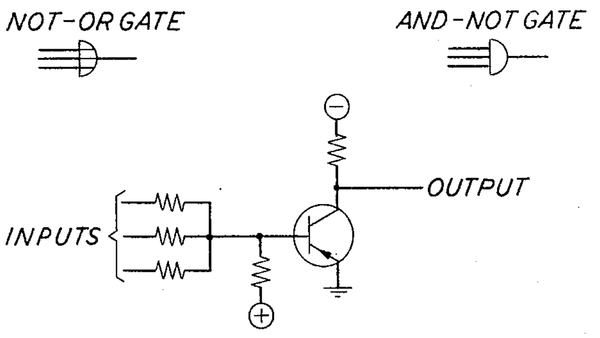
FIGS. 5A through 5H and 5K and 5L are schematic circuits of several circuit elements used in FIGS. 1 through 4.
Figure 5B:
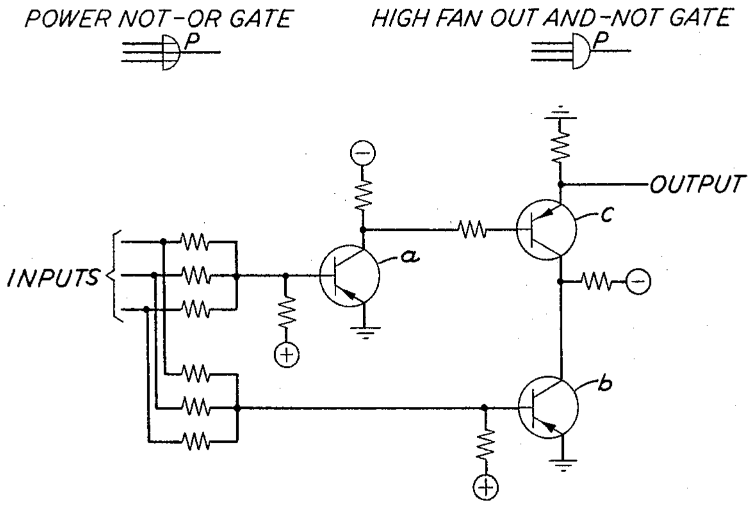

A normal AND-NOT or NOT-OR gate comprises a single transistor stage as shown in FIG. 5A, and a power AND-NOT or NOT-OR gate comprises three transistor stages as illustrated in FIG. 5B.

The outjut of an AND-NOT gate illustrated in FIGS. 5A and 5B is a negative voltage when all inputs thereto are ground, and is ground when any one of several inputs thereto is a negative voltage.

The output of a NOT-OR gate shown in FIGS. 5A and 5B is a negative voltage when all inputs thereto are ground, and is ground when any one or all inputs thereto is a negative voltage.

The power AND-NOT or NOT-OR gate illustrated in FIG. 5B comprises three stages: stage *a* which is the normal AND-NOT or NOT-OR gate shown in FIG. 5A, stage *b* which is a clamp for holding the output voltage at a predetermined magnitude, and stage *c* which provides the power output. The gate of FIG. 5B functions substantially in the manner of the AND-NOT or NOT-OR gate in FIG. 5A, except the former provides sufficient output power for activating a larger number of circuit elements over the capability of the latter gate in the same respect.

Figure 5C:
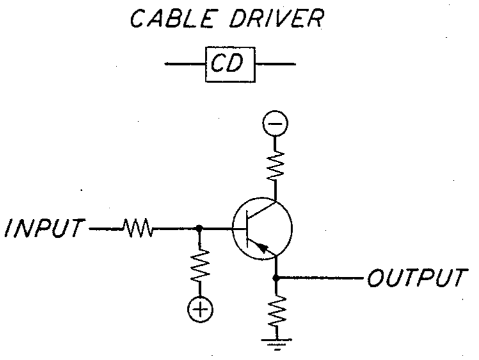
Figure 5D:
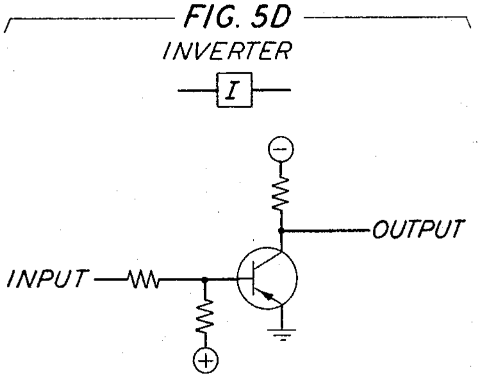
Figure 5E:
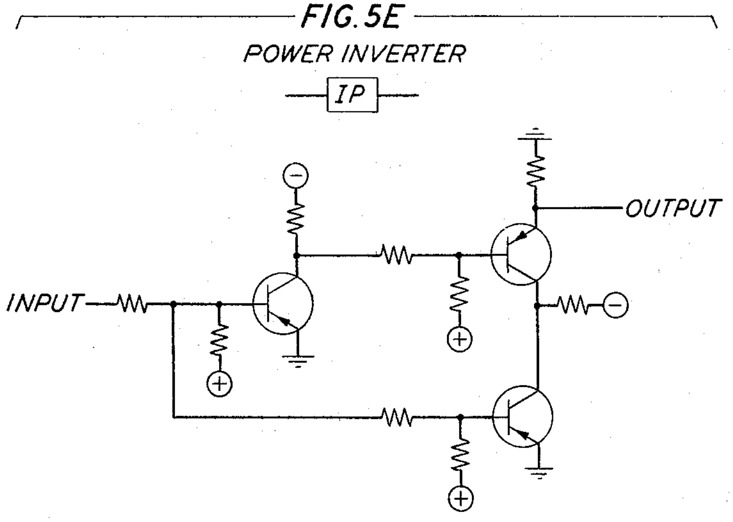
Figure 5F:
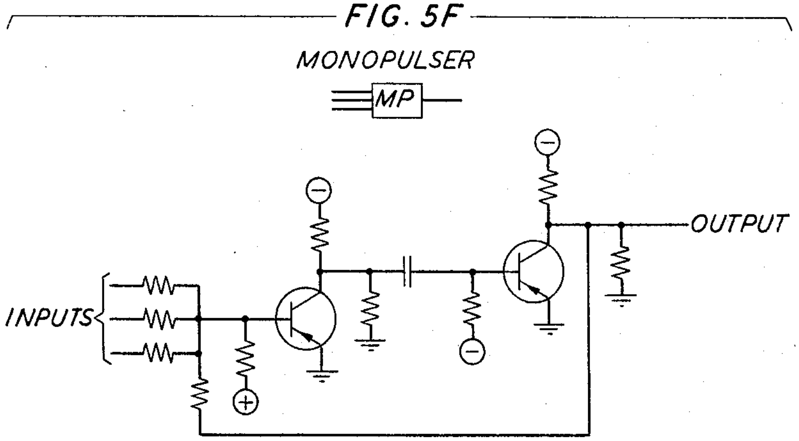

A monopulser shown in FIG. 5F produces a negative output voltage of a predetermined time duration when a signal input thereto is a negative voltage, no output voltage when the signal input is changing from a negative voltage to ground.

Figure 5G:
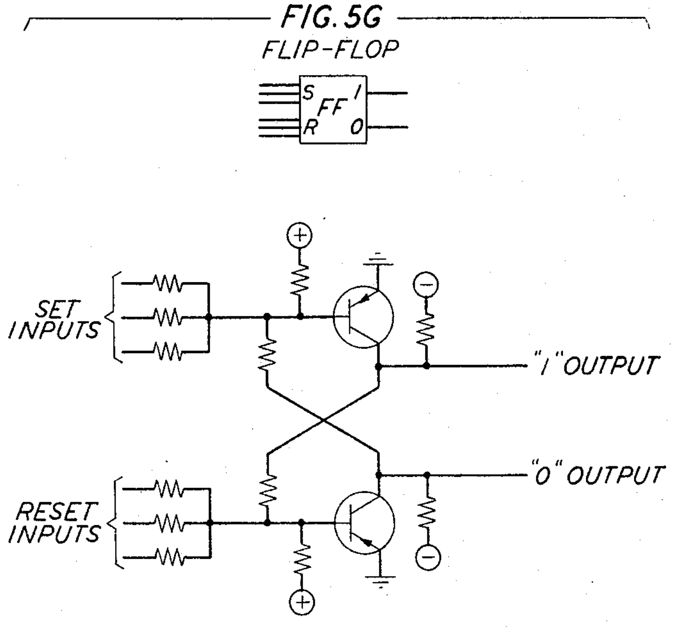

A flip-flop shown in FIG. 5G comprises two gates connected back-to-back, that is, the collector output of one feeds the base input of the other and the collector output of the other feeds the base input of one. This is a bistable device in which, when the output of one gate is at ground, the output of the other is a negative voltage, and vice versa. When a negative voltage is applied to the input of the one gate whose output is then a negative voltage, the flip-flop changes its state in such sense that outputs of the two gates are thereby reversed, that is, the one gate whose output was a negative voltage output is changed to a ground output while the other gate whose output was then ground is changed to a negative voltage, or vice versa.

Figure 5H:
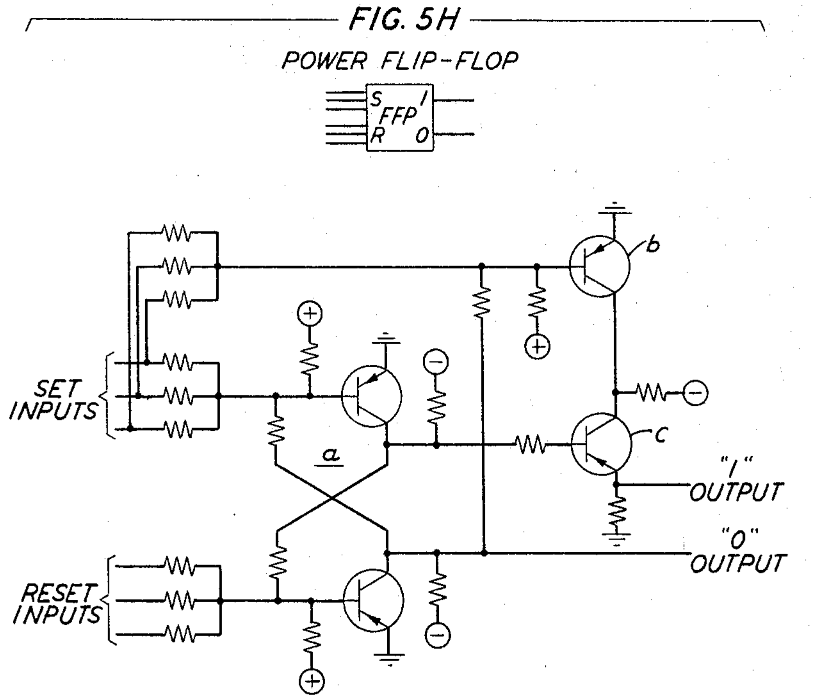

A power flip-flop shown in FIG. 5H comprises three stages: stage *a* which is the normal flip-flop shown in FIG. 5G, stage *b* which is the clamp for holding the output voltage at a predetermined magnitude, and stage *c* which provides the power output. The gate in FIG. 5H functions substantially in the manner of the AND-NOT or NOT-OR gate in FIG. 5G, except the former provides sufficient power output for activating an increased number of circuit elements over the number activated by the latter.

Figure 5K:
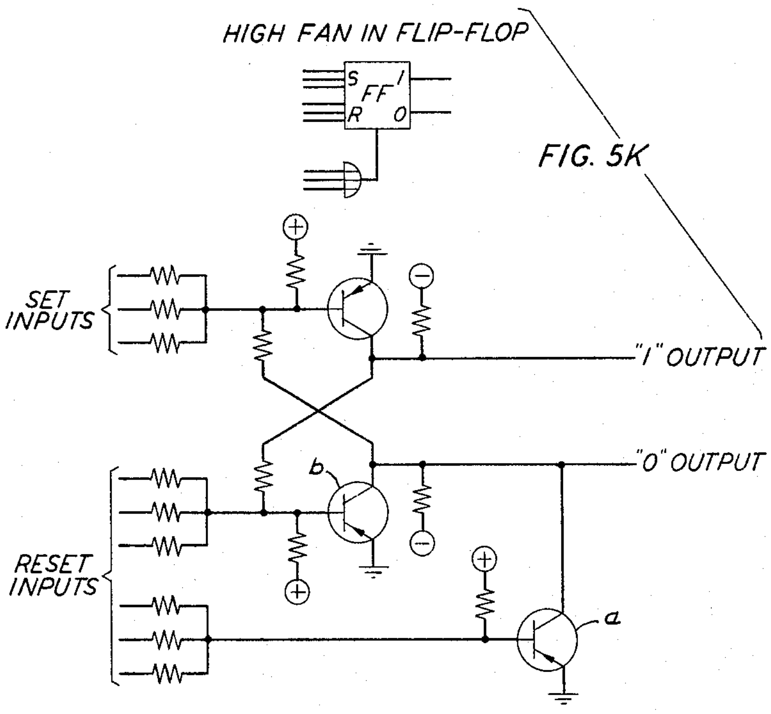
Figure 5L:
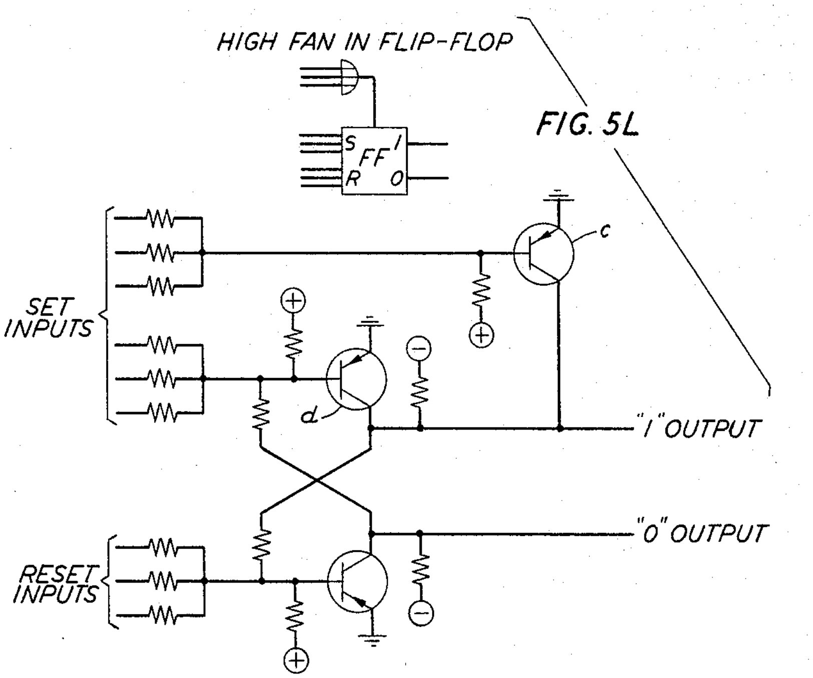

High fan-in flip-flops illustrated in FIGS. 5K and 5L are similar to the normal flip-flop shown in FIG. 5G, except the flip-flop shown in FIG. 5K includes three extra reset inputs which are applied via clamping transistor *a* to a point common to the collector of reset transistor *b* and the output of the 0-side and the flip-flop shown in FIG. 5L includes three extra set inputs which are applied via clamping transistor *c* to a point common to the collector of set transistor *d* and the output of the 1-side. It is understood that the extra number of reset and set inputs shown in FIGS. 5K and 5L over the number of corresponding inputs shown in FIG. 5G may vary from one to three or more for particular circuits. The transistors *a* and *c* in FIGS. 5K and 5L clamp the outputs of the 0- and 1-sides, respectively, thereof to predetermined voltage magnitudes. The flip-flops shown in FIGS. 5K and 5L activate a higher number of circuit elements relative to the number of circuit elements activated by the flip-flop shown in FIG. 5G.

A flip-flop is set when the output of its "1" side provides ground and the output of its "0" side provides a negative voltage, and is reset when the output of its "1" side provides a negative voltage and the output of its "0" side provides ground.

A normal inverter shown in FIG. 5D comprises a single translator logic stage, either an AND-NOT gate or NOT-OR gate, which inverts the polarity of its input signal, that is, a negative voltage input effects a positive voltage output, and vice versa; and it provides sufficient voltage to drive at least four logic stages.

A power inverter shown in FIG. 5E comprises at least three transistor stages to provide sufficient voltage for driving four or more logic stages.

A cable driver amplifier shown in FIG. 5C is a transistor emitter follower which does not invert the polarities between its input and output voltages and is driven by a logic element providing only a single output voltage.

*Clock signals*

Figure 7A:
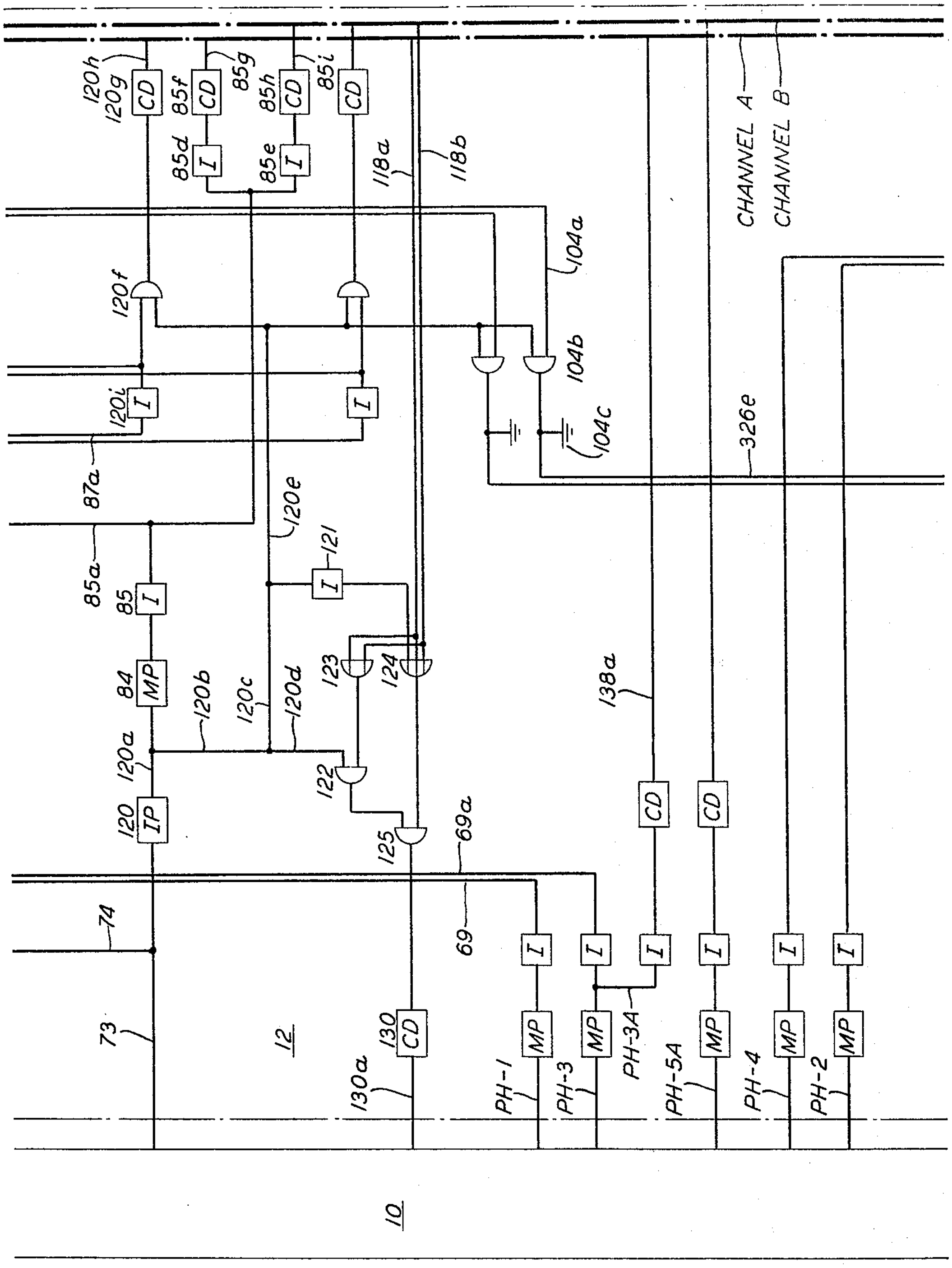
Figure 7B:
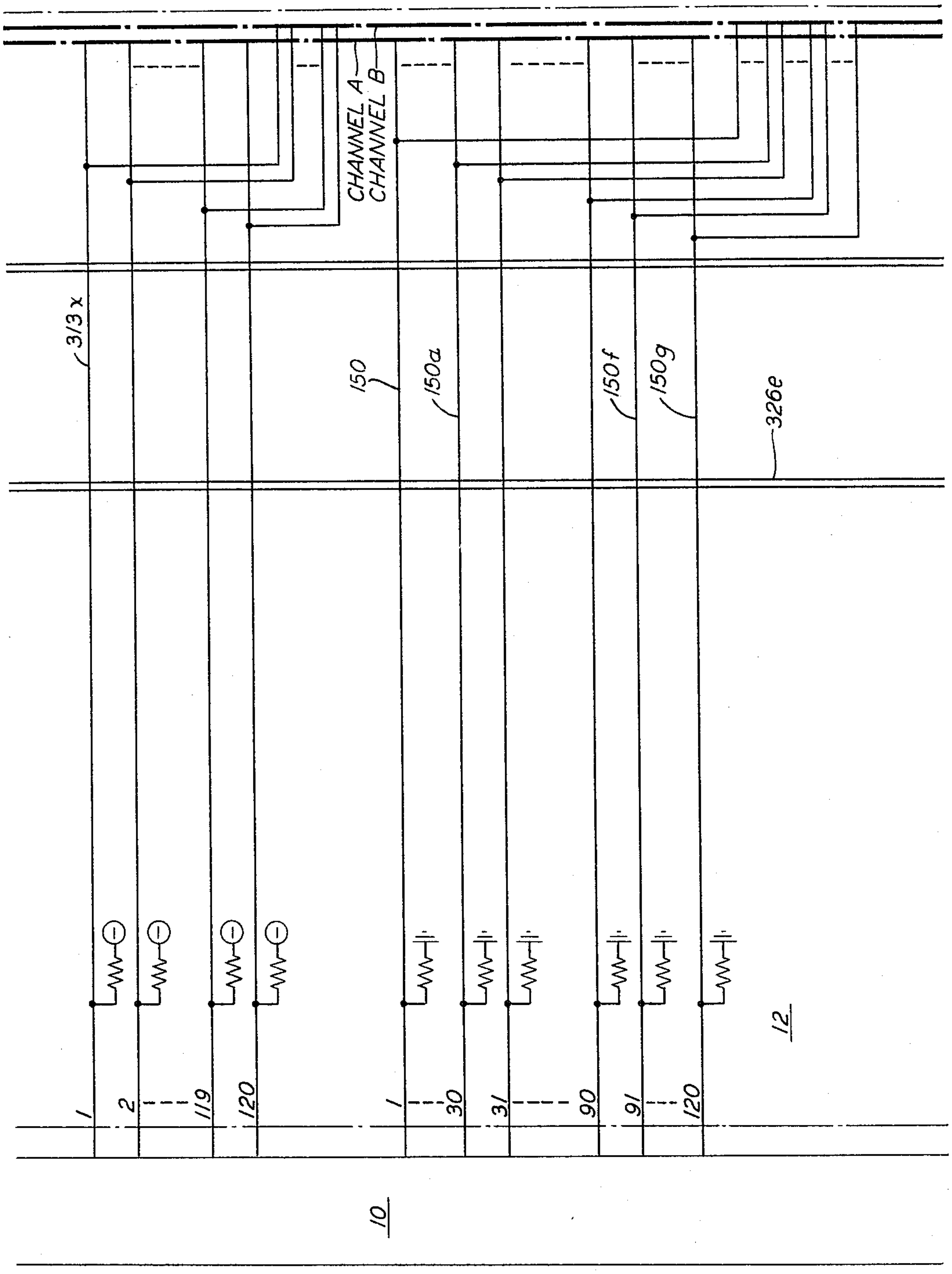

Clock signals used hereinafter to select either channel A or B in FIG. 1 for a given message transfer in a particular direction are derived in a well-known manner at the main data terminal as shown in FIG. 7A. Each signal comprises a negative voltage effective for a 1-microsecond interval and having a repetition rate of 5 microseconds. The signals are identified as time phases PH–1 through PH–4, of which signal phase PH–1 is utilized to select channel A, and signal phase PH–3 serves to select channel B in the direction outgoing from the main terminal and signal phases PH–2 and PH–4 are employed to control message transfer incoming to the main terminal from channels A and B, respectively. Signal phase PH–3A controls the direction of message transfer either from or to the main terminal relative to channel A while signal phase PH–5A controls the direction of message transfer either from or to the main terminal relative to channel B. Each of time phases PH–1 through PH–4 includes a monopulser MP for changing the negative voltage into a 1-microsecond negative voltage pulse and an inverter I for translating the 1-microsecond negative voltage pulse into a 1-microsecond ground pulse. Each of time phases PH–3A and PH–5A includes an inverter I whose input is connected to the output of the associated monopulser MP and a cable driver CD whose input is connected to the last-mentioned inverter. The details and operation of the timing circuit will be further explained as the description of the system unfolds hereinafter.

*Selection of channel A by interface*

In processing a message transfer from the main data terminal via channel A to the No. 1 or via channel B to the No. 2 data terminal as shown in FIG. 1, the first action involves the selection of a particular channel as between channels A and B. This is accomplished on an essentially random basis by using the time discrimination between the time phase pulses for determining the selection of a particular one channel over the other, as hereinafter explained. When a message is to be transferred in the direciton indicated, a have message signal originating in the main terminal is available as a negative voltage on lead 70 in FIG. 6A at the input of the interface. As this is an ordinary message, a ground on lead 73 indicates an absence of a test message signal thereon. As negative voltage and ground signals are now effective on leads 70, 73 and 74, respectively, to the input of have message NOT-OR gate 75 in FIG. 6A, the output thereof is ground. When all inputs to have message AND-NOT gate 71 are satisfied, channel A is selected for the transmission of the contemplated message. If it should happen that such is not the case, however, then an endeavor is made to satisfy all inputs to have message AND-NOT gate 72 which, when so supplied, serves to select channel B. In the following explanation, it will be assumed that all inputs to gate 71 are satisfied at ground, when time phase PH–1 is ground, thereby resulting in the selection of channel A in a manner that will be presently explained.

Time phase PH–1 provides ground on lead 69 shown in FIG. 7A. As channel A is assumed to be in an idle condition, an idle signal on leads 76 and **76*a* is at ground. Also, an option ground 77*a* is on normal parity leads 77 and 77*b*. As channel B is not being selected as hereinbefore assumed, have message flip-flop 78 provides ground at the output of its 0-side on leads 79, 80 and 81. As an acknowledgment signal is not being transmitted because a previous message was not handled by channel A, the output of acknowledge monopulser 83 is a ground which is effective via leads 83***a* and 83*b*. As the end of a test message signal is not being transmitted at this time, the output of end test message monopulser 84 is ground which is changed in the output of end test message inverter 85 to a negative voltage. This voltage is changed in the output of reset inverter 86 to ground which is available via leads 86*a* and 86*b* as another input to gate 71.

Since all inputs to gate 71 are ground at this time, its output is a negative voltage. As this voltage may not always have sufficient time duration to set have message flip-flop 87, it is initially used to trigger have message monopulser 88 which thereupon produces in its output a 2-microsecond negative voltage pulse. This pulse applied to the input of the set side of flip-flop 87 sets it and applied to the input of the reset side of flip-flop 89 resets it. Flip-flop 87 in the set state provides in the output of its 1-side ground which is changed in the output of have message inverter 90 to a negative voltage. This negative voltage is applied through have message cable driver 91 to constitute a make busy signal on lead 92 to channel A. The output of the 0-side of flip-flop 87 provides a negative voltage which is supplied to leads 87*a* and 87*b*, and as aforementioned the output of the 0-side of flip-flop 78 is ground on leads 79 and 80. This negative voltage and ground effective at the input of NOT-OR gate 93 are translated in the output thereof to ground. This ground is changed by inverter 94 to a negative voltage which is applied through cable driver 95 to appear as a send message signal on lead 96 to the main data terminal. The negative voltage effective via leads 87*a*, 87*b* and 87*c* to the input of gate 72 inhibits it thereby precluding the selection of channel B for the transfer of the instant message at this time. It is now apparent that the signal of time phase PH-3 effective on lead 69*a* in FIG. 7A exerts no influence on the operation of gate 72. Channel A responds to the make busy signal on lead 92 by providing an idle signal of negative voltage on lead 76 and a busy signal of ground on lead 99 in a manner that will be subsequently explained. The idle signal of negative voltage effective on lead 76 and the busy signal of ground applied to lead 99 as just mentioned perform no specific functions at this time.

When the main terminal has placed the message to be transmitted on the line to the interface as shown in FIGS. 1, 6A, 6B, 7A, 7B, 8A and 8B, a message on line signal of negative voltage is applied to lead 100. This voltage is translated in the output of monopulser 101 into a 5-microsecond negative voltage pulse which is then changed by inverter 102 into a 5-microsecond ground pulse. This is transmitted through AND-NOT gate 103 because a ground from the output of the 1-side of flip-flop 87 is already available at the other input of the gate. The output of gate 103 provides a 5-microsecond negative pulse which is transmitted through input gate inverters 104 and 105 and cable driver 106 in sequence and which appears thereafter as a 5-microsecond negative voltage pulse to constitute an operate input gate signal on lead 107 to channel A. When channel A has processed the message to the extent that a text parity signal of negative voltage effective on lead 118*a* as a result of the gate signal on lead 107 in a manner that will be subsequently explained, then an acknowledgment signal comprising a 5-microsecond ground pulse is effective on lead 108 and an acknowledgment gate signal at ground is on lead 109, both being provided in a manner that will be hereinafter described. These two ground signals applied simultaneously to the input of acknowledgment AND-NOT gate 110 activate it to provide in its output a negative voltage which is applied to the input of the set side of flip-flop 89 thereby setting it. As negative voltage from the output of the 0-side of flip-flop 89 is supplied to the inputs of monopulser 83 and reset monopulser 112, 5-microsecond negative voltage pulses in the outputs of the respective monopulsers provide an acknowledgment signal to the main terminal and reset flip-flop 87. As a consequence, flip-flop 87 is left in the set state and flip-flop 89 remains in the set state. Flip-flop 89 is reset at the time of the next message transmission in channel A as was previously explained.

When energizing power is initially applied to the overall data communication system from source 8 of suitable voltage via DPST switch 9 as shown in FIG. 1 at its initially starting time, a certain amount of chatter effected by the switch is sufficient at times to provide an extraneous voltage to override any reset pulse of 5-microseconds of negative voltage provided by the output of monopulser 112. It is therefore possible that both flip-flops 87 and 89 may be simultaneously activated to the set state and temporarily locked therein. As a consequence, the acknowledgment signals of ground effective on leads 108 and 109 from channel A as aforenoted will not activate flip-flop 87 to the reset state because the necessary reset signal is not provided at this time by flip-flop 89; and both flip-flops 87 and 89 would therefore remain locked in the set state. Assuming now that both flip-flops 87 and 89 are resting in the set state, then a first ground voltage received on lead 108 indicating a first acknowledgment signal provided for clearing the interface while ground is being received on lead 109 is applied to the input of gate 110 which is thereby activated to provide in its output a ground. This is applied to the input of the set side of flip-flop 89 but does not activate it. This ground is also applied as one input to reset acknowledgment gate 89*a* which is also receiving ground as a second input from the output of the 1-side of flip-flop 89 resting in the set state at the moment. At the same time, gate 89*a* is also receiving ground as a third input via lead 89*b* from the output of inverter 120*i* whose input is receiving negative voltage from the output of the 0-side of flip-flop 87 resting in the set state at this time as just mentioned. As a consequence of such three simultaneous ground inputs, gate 89*a* provides in its output a negative voltage which is applied to the input of the reset side of flip-flop 89 thereby resetting it. Since the output of the 0-side of flip-flop 89 in the reset state is ground, it does not activate flip-flop 87 which continues to rest in the set state.

A second acknowledgment signal comprising a ground voltage on lead 108 and ground on lead 109 activates gate 110 which provides in its output a negative voltage which is simultaneously applied to the input of the set side of flip-flop 89 thereby setting it and as a first input to gate 89*a*. This voltage activates flip-flop 89 to the set state wherein the ground in the output of its 1-side is applied as a second input to gate 89*a*. This gate is also receiving a third input of ground via lead 89*b* in the manner aforementioned. As the input to gate 89*a* is a negative voltage and two discrete grounds, the output of the gate is ground which is applied to the input to the reset side of flip-flop 89 but fails to change its state. Hence, this flip-flop remains in the set state just mentioned. Since flip-flop 89 in the set state provides in the output of its 0-side a negative voltage, this is supplied to monopulser 112 which translates it into a 5-microsecond negative voltage pulse. This is applied via leads 112*a* and 112*b* to the input to the reset side of flip-flop 87 thereby resetting it. As a consequence, flip-flop 89 is now resting in the set state while flip-flop 87 is in the reset state whereby both flip-flops are precluded from being locked in the set state which is undesired.

The negative voltage pulse in the output of monopulser 112 effective on leads 112*a* and 112*c* is applied to the reset input of flip-flop 113 thereby resetting it. The 5-microsecond negative voltage output of monopulser 83 effective on leads 83*a* and 83*c* is applied to the input of NOT-OR gate 114 whose other input effective on lead 114*a* is ground from the output of monopulser 115 because channel B is not selected to handle the particular message as aforenoted. As a consequence, the output of gate 114 provides ground which is changed in the output of acknowledgment inverter 116 to a 5-microsecond negative voltage. This is passed via acknowledgment cable driver 117 and lead 117*a* as an acknowledgment signal to the main terminal and signifies thereto to the completion of the message transmission thus far in the direction from the main terminal to the No. 1 terminal.

If the text parity of the message as transmitted were correct, a text parity signal of ground transmitted on lead 118*a* from channel A in the manner hereinafter pointed out appears on lead 118*a* at the input of NOT-OR gate 124. Because the message transmitted at this time is not of a test type, a ground on test message lead 73 is changed in the output of power inverter 120 to a negative voltage. This voltage effective on leads 120*a*, 120*b* and 120*c* and applied to the input of inverter 121 is thereby changed in its output to ground which is applied to the input of gate 124. The negative voltage in the output of inverter 120 is also effective on leads 120*a*, 120*b* and 120*d* and applied to the input of AND-NOT gate 122, together with a second negative voltage from NOT-OR gate 123 whose two inputs are at ground because the text parity signals on leads 118*a* and 118*b* respectively, are at ground. As the input of gate 124 is supplied with three discrete grounds via leads 118*a* and 118*b* and the output of inverter 121, this gate provides an output of negative voltage. Since the input of AND-NOT gate 125 is simultaneously supplied with a negative voltage from the output of gate 124 and ground from the output of gate 122, the output of gate 125 is ground. This is transmitted via cable driver 130 and lead 130*a* to the main data terminal for signifying thereat the message had correct parity, that is, an even number of "1" bits when it was checked via channel A at the No. 1 data terminal in a manner that will be subsequently explained. If the text parity of the transmitted message had been incorrect, that is, an odd number of "1" bits, then the corresponding signal on lead 118*a* would have been a negative voltage whereupon the output of gate 124 would have been ground. This would have caused the output of gate 125 to be a negative voltage which would have been transmitted via cable driver 130 and lead 130*a* to the main data terminal for indicating thereat an incorrect text parity for a purpose that will be later mentioned. At the trailing edge of the 5-microsecond ground voltage pulse effective on acknowledgment lead 108 as mentioned above, that is, when the latter signal goes from ground to negative voltage, the idle signal on lead 76 is ground, and the busy signal on lead 99 is a negative voltage, both of which are provided in a manner that will be subsequently described. These idle and busy signals indicate to the interface that channel A is idle and is therefore available to accept a message originating at the main data terminal.

Referring now to FIGS. 6A, 6B, 7A and 7B, it is seen that the several inputs to AND-NOT gate 131 include grounds on leads 76 and 76*b*, lead 69, lead 77*c* as above mentioned together with ground on leads 133*a* and 134*a*. The ground on lead 133*a* is derived from the have message signal of negative voltage effective on leads 70 and 70*a* and applied as one input to NOT-OR gate 132 which also includes as a second input ground on lead 74*a* indicating an absence of a test message signal as hereinbefore mentioned. These negative voltage and ground signals at the input of gate 132 activate the latter to provide an output of ground which is effective on leads 133 and 133*a* to the input of gate 131. The fifth and final input to gate 131 is ground on lead 134*a* from the outpue of the 0-side of reset clock activate flip-flop 134. As all five inputs to gate 131 are now ground, the output thereof provides a negative voltage which may not have sufficient time duration to set flip-flop 113. As a consequence, this negative voltage is initially caused to trigger monopulser 135 which thereupon produces in its output a 2-microsecond pulse of negative voltage. This pulse applied to the set input of flip-flop 113 has sufficient time duration to set it. Now, this flip-flop provides in the output of its 1-side ground which is translated in the output of inverter 136 into a negative voltage. This is transmitted through cable driver 137 to lead 137*a* for activating a clock circuit in channel A in a manner that is subsequently mentioned.

Figure 9:
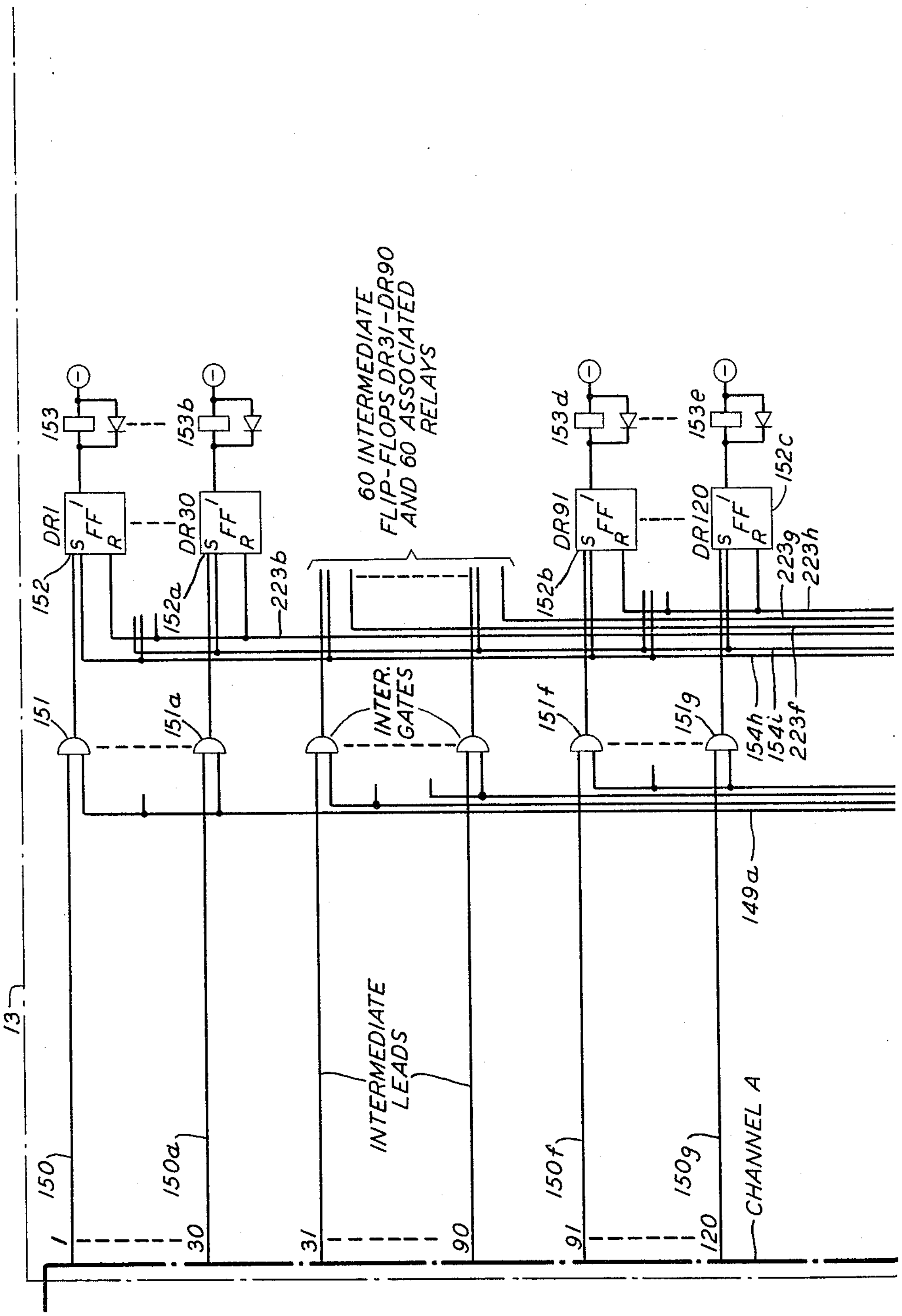

The digital data message comprising 120 bits for the purpose of this description and available in the main data terminal is to be transferred therefrom to the No. 1 terminal on leads 150 through 150*a*, (1, 2 . . . 30), the intermediate leads (31, 32 . . . 90) and leads 150*f* through 150*g* (91, 92 . . . 120) or a total of 120 discrete leads as illustrated in FIG. 9. Thus, each of the 120 discrete bits constituting the complete message is to be transmitted on one of the 120 leads. All 120 bits of the message are to be transmitted in parallel on the 120 leads at one time in a manner that is explained below.

*Transmission of message from interface to channel A*

It is understood at this time that the overall system has been placed in an operative condition thereupon closing the following relay contacts: (1) in the main control logic terminal at the interface: 353*p* in FIG. 10; 144*a*, 146*a*, 353*h* and 353*i* in FIG. 11; 219*a*, 237, 353*r*, 353*s* and 353*t* in FIG. 13; 310*a*, 306*b* and 311*a* in FIG. 14; and 353*k*, 353*m*, 353*n*, and 353*x* in FIG. 15; and (2) in the No. 1 control logic terminal at the No. 1 data terminal: 250*a*, 274*a*, 277*d*, and 298*a* in FIG. 29; 206*b*, 288*a*, 300*d* and 300*e* in FIG. 30; 195*a* in FIG. 31; and 196*d*, 197*a* and 197*b* in FIG. 32.

When the message is selected for transfer from the main data terminal via the interface to channel A, the interface initiates the make busy signal of negative voltage on lead 92. This signal transmitted via closed make contact 353*i* to channel A serves to inhibit have message AND-NOT gate 138 thereby precluding a selection of channel A for the transmission of a similar message originating at the No. 1 data terminal at this time. Now, the make busy signal activates monopulser 139 to produce in its output a 5-microsecond negative signal which is applied to the set side of busy idle flip-flop 140 thereby activating it to the set state. The other two signal inputs to the set side of flip-flop 140 are inactive at this time because (a) the inhibiting of gate 138 prevents monopulser 141 from producing an output and (b) lead 142 has ground thereon since channel A is now supplying an idle signal of ground to the interface.

Figure 11:
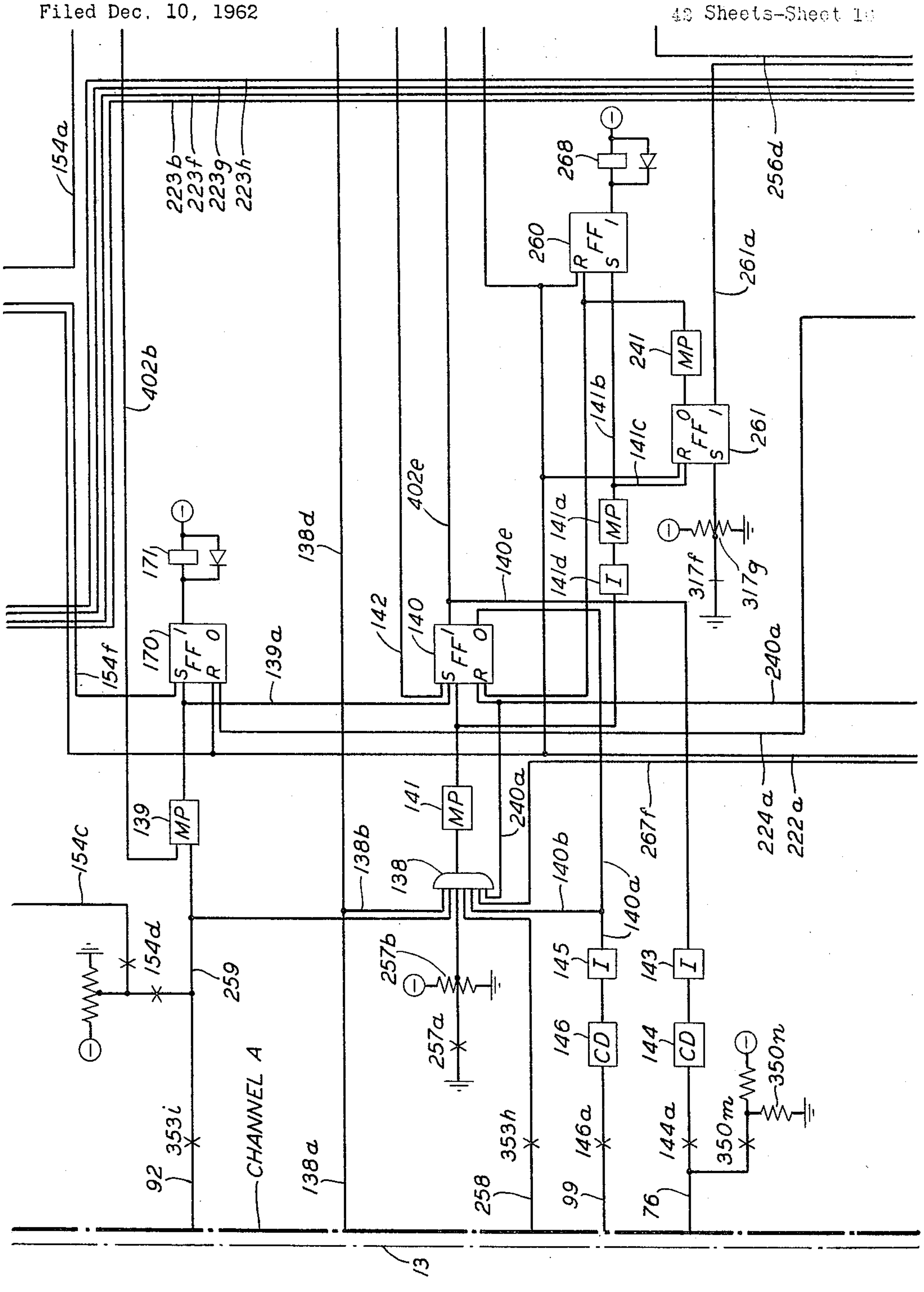

When flip-flop 140 in FIG. 11 was set, the output of its 1-side provides on its output lead 140*e* ground which is changed in the output of inverter 143 to a negative voltage. This voltage applied through cable driver 144 and closed relay contact 144*a* is transmitted on idle lead 76 to inform the interface that channel A is now ready to accept the message from the main data terminal and at the same time to prevent a message originating at the No. 1 data terminal from being transmitted on channel A. Also, with flip-flop 140 in the set state, its 0-side output supplies a negative voltage. This is transmitted on lead 140*b* to inhibit gate 138 thereby preventing the selection of channel A for signal transfer from the No. 1 data terminal to the main data terminal in a manner that will be pointed out subsequently. When flip-flop 140 was set, the output of its 0-side supplies via lead 140*a* a negative voltage which is changed in the output of inverter 145 to ground. This is transmitted through cable driver 146 and closed relay contact 146*a* to appear as a busy signal on lead 99 for informing the interface that channel A is now busy.

Figure 10:
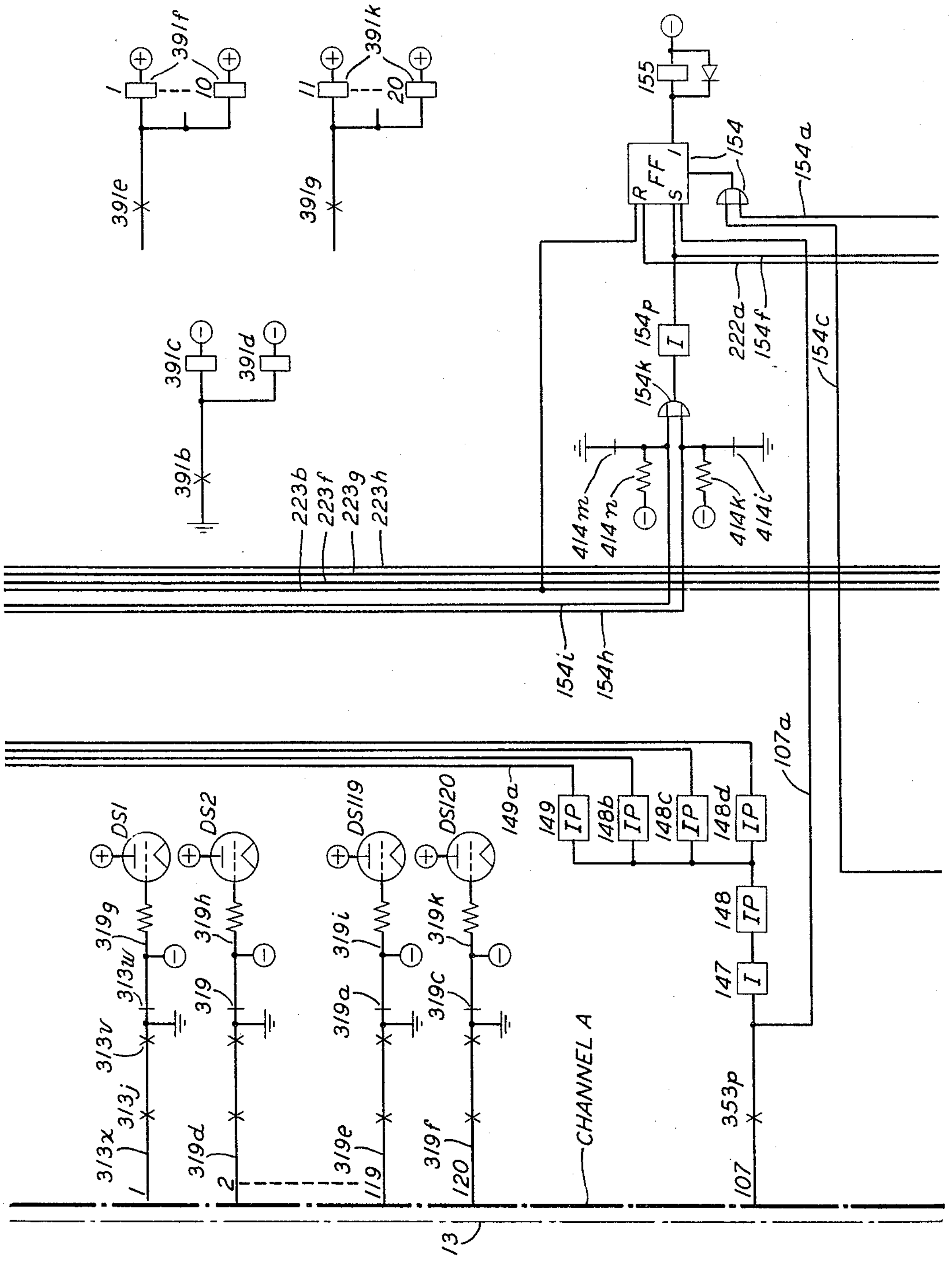

Next, an operate input gate signal transmitted from the interface via lead 107 and closed relay contact 353*p* in FIG. 10 and comprising a 5-microsecond negative voltage is changed in the output of inverter 147 into a ground. This is applied to the input of power inverter 148 shown in FIGS. 5E and 10 and providing in its output a negative voltage which is applied in parallel to the inputs of power inverters 149, 148*b*, 148*c* and 148*d*, each of which is identical with inverter 148 and provides ground in its output. Ground from the output of inverter 149 is applied to one input of each of gates 151 through 151*a* in FIG. 9. Ground from the outputs of inverters 148*b* and 148*c* is applied to the inputs of the intermediate gates, not shown. Ground is also applied from the output of inverter 148*d* to one input of gates 151*f* and 151*g*, respectively. At this time, it is understood that the message comprising 120 "0" and/or "1" bits is transmitted simultaneously in parallel on the 120 discrete leads represented by leads 150, 150*a*, intermediate leads, and leads 150*f* and 150*g* in FIG. 9 from the main terminal to the other inputs of gates 151, 151*a*, intermediate gates, and gates 151*f* and 151*g* in a manner well known in the art. In regard to these gates, it is apparent that while each of these gates transmits a single bit, the gate group 151 through 152*a* represents 30 identical gates for transmitting discrete bits 1 through 30, the intermediate gate groups represent the addition of 60 identical gates for additionally transmitting discrete bits 31 through 90, and gate group 151*f* through 151*g* represents the further addition of 30 identical gates for further transmitting discrete bits 91 through 120.

The outputs of the 30 gates 151 and 151*a* are connected to the set sides of 30 associated DR1 through DR30 flip-flops 152 through 152*a* which have the outputs of their 1-sides connected to the operating windings of the 30 associated relays 153 through 153*b*. The outputs of the 60 intermediate gates are connected to the set sides of the 60 associated DR31 through DR90 flip-flops, not shown, which have the outputs of their 1-sides connected to the operating windings of 60 additional relays, not shown. The outputs of the 30 gates 151*f* through 151*g* are connected to the set sides of DR91 through DR120 flip-flops 152*b* and 152*c* which have the outputs of their 1-sides connected to the operating windings of the 30 associated relays 153*d* and 153*e*. The windings of the respective 120 relays are provided with shunting diodes as current surge protection for the associated flip-flops. Thus, the 120 bits transmitted on the 120 circuits represented by leads 150, 150*a*, intermediate leads, and leads 150*f* and 150*g* control the activation of the 120 DR1 through DR120 data register flip-flops represented by flip-flops 152–152*a*, the intermediate flip-flops, and the 152*b*–152*c* flip-flops. These in turn control the operation of the 120 associated data register relays represented by relays 153–153*b*, the intermediate relays, and the relays 153*d*–153*e*. The 120 bits of each message are thus transmitted simultaneously in parallel, in a manner that is subsequently explained.

If a given data bit "1," for example, were to be transferred from the main terminal via channel A to the No. 1 terminal, for example, then the corresponding signal on lead 150 is ground which is applied to the input of gate 151 together with ground on lead 149*a*. Thereupon, this gate produces in its output a negative voltage which is applied to the input of the set side of flip-flop 152 to set it. On the other hand, if a given data bit "0" were to be transferred from the main terminal via channel A to the No. 1 terminal, for example, the corresponding signal on lead 150 is a negative voltage whereby the two inputs to gate 151 are different in the sense that one input is a negative voltage while the other input is ground. As a consequence, gate 151 does not change the polarity of its output whereupon flip-flop 152 remains in the reset state. When flip-flop 152 was set by the transfer of a "1" bit as aforenoted, the output of the "1" side of the flip-flop is ground to complete an operating circuit for relay 153 which operates to close its associated contact 153*a* in FIG. 16. When flip-flop 152 failed to change its output in response to the transfer of a "0" bit as above pointed out, the output of the "1" side of the flip-flop remained a negative voltage whereby relay 153 was not operated to actuate its associated contact 153*a*.

Figure 16:
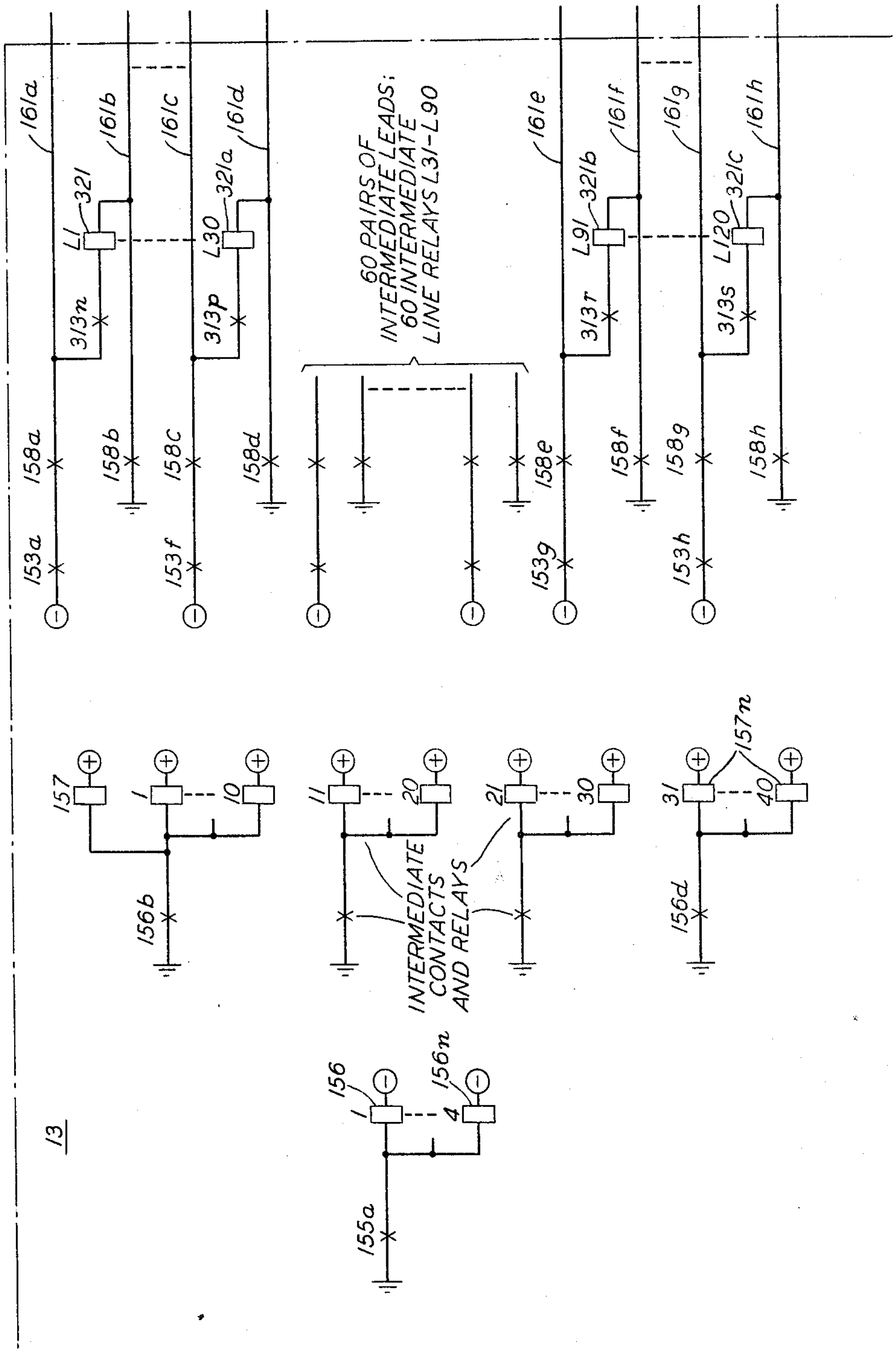

In a similar manner, the remaining 29 relays of the 30 relays 153 through 153*b* are operated or nonoperated to close or fail to close the remaining 29 associated contacts of the 30 contacts 153*a* through 153*f* for transmitting the next 29 bits of the 120-bit message in FIG. 16; the "1" and/or "0" bits constituting the 31 through 90 bits of the 120-bit message and transmitted on the 60 leads between the leads 150*a* and 150*f*, together with the ground outputs of inverters 148*b* and 148*c*, control the actuation of the 60 intermediate gates and corresponding DR31 through DR90 flip-flops and thereby the operation or nonoperation of the associated 60 relays, not shown, and contacts in FIG. 16; and the "1" and/or "0" bits constituting the 91 through 120 bits of the 120-bit message and transmitted on the 30 leads represented by leads 150*f* through 150*g*, together with ground in the output of inverter 148*d*, control the activation of the 30 gates represented by gates 151*f* through 151*g* and corresponding DR91 through DR120 flip-flops represented by flip-flops 152*b* through 152*c* and thereby the operation of the associated 30 relays represented by relays 153*d* through 153*e* and 30 contacts represented by contacts 153*g* and 153*h* in FIGS. 9 and 16. The closure or nonclosure of the 120 contacts comprising the 30 contacts 153*a* through 153*f*, the 60 intermediate contacts, and the 30 contacts 153*g* through 153*h* in FIG. 16 for transmitting the 120-bit message as further discussed herein.

When the operate input gate signal on lead 107 is a negative voltage as previously mentioned, this voltage is applied via lead 107*a* to the set side of flip-flop 154 shown in FIGS. 5L and 10 thereby setting it. This is effected because the other inputs to the set side of flip-flop 154 are at ground.

When flip-flop 154 in FIG. 10 was set, the output of its 1-side provides ground which is applied to the operating winding of transmit data driver relay 155 whose contact 155*a* in FIG. 16 is thereupon closed to ground thereby completing an operating path for each of 4 transmit driver relays represented by relays 156 to 156*n* in FIG. 16. The operation of these relays is controlled for a purpose which is now explained. When operated, relay 156 closes its contact 156*b* which thereupon supplies ground to complete the operating paths for transmit relays 157 and 157*c* causing them to operate. Here, the term *c* represents the integor 10 so that the group of relays 157*c* comprises ten in number, each including 6 contacts. When operated, a first relay, for example, of the group of 10 relays 157*c*, closes its contacts 158*a* and 158*b* representing 6 contacts thereby connecting a source of negative voltage and ground to 3 pairs of leads represented by leads 161*a* and 161*b*, respectively, since contact 153*a* in each pair of leads is now closed because relay 153*a* is now operated, assuming a "1" bit is transmitted. In a similar manner each of the 9 remaining operated relays of the relay group 157*c* closes its 6 contacts represented by contacts 158*c* and 158*d* which, together with an associated closed contact 153*f* in each pair of these leads for the reason that its associated relay 153*b* is now operated, applies a source of negative voltage and ground to each of the 27 remaining pairs of leads represented by the pair of leads 161*c* and 161*d*. While the 30 contacts 153*a* through 153*f* are closed to transmit preselected bits, they are opened to transmit different bits. Thus a first 30 of the 120-bit message orginating at the main terminal and transmitted via the 30 discrete leads represented by leads 150 and 150*a* serve to control the activation of the corresponding 30 gates represented by the gates 151 and 151*a* in FIG. 9. These in turn serve to control the setting of the 30 associated DR1 through DR30 data register flip-flops 152 through **152*a* and thereby the operation of the 30 relays 153 through 153*b* and 30 associated contacts 153*a* through 153*f***.

The closure of contact **155*a* by the operation of relay 155 also supplies ground to 2 relays intermediate relays 156 and 156*n* but not shown, where such 2 intermediate relays are operated close the individual contacts associated therewith and equivalent to contact 156*b* of relay 156. The closed contact of each of the 2 intermediate relays supplies ground to complete the operating paths of a group of 10 relays, each including 6 contacts and identical with each of the 10 relays in the relay group 157*c*. Thus, the 2 intermediate groups of 10 relays provide 60 pairs of closed contacts, each pair comparable with each of the pairs 158*a* and 158*b* and 158*c* and 158*d*. Each pair of these 60 pairs of contacts, together with a closed relay contact provided by the intermediate flip-flops DR31 through DR90 suggested but not shown in FIG. 9 but equivalent to each of contacts 153*a* and 153*f* in FIG. 16, serves to control the connection of a source of negative voltage and ground to the respective conductors of the 60 pairs of conductors, not shown, but equivalent to each of the conductor pairs represented by the 30 conductor pairs 161*a* and 161*b* and 161*c* and 161*d* in FIG. 16. Again, the 60 individual contacts of the 60 pairs of intermediate leads comparable to the individual contacts 153*a* and 153*f* are closed to transmit preselected bits but opened to transmit a different bit. Thus, the 31 through 90 bits of the 120-bit message are transmitted on the 60 leads intermediate the leads 150*a* and 150*f* in the manner hereinbefore explained for the transmission of the first 30 bits on the 30 leads 150 through 150*a*** in FIG. 9.

In addition, the operation of relay **156*n* in FIG. 16 and the closure of its associated contact 156*d* supply ground to the operating paths of the 10 relays in the 157*n*, each relay having 6 contacts, whereby these relays are operated to close their 30 associated contact pairs represented by the contact pairs 158*e* and 158*f* and 158*g* and 158*h*, respectively. Each of the 30 closed contact pairs, together with one of the 30 closed relay contacts represented by the contacts 153*g* and 153*h* associated with the 30 relays 153*d* through 153*e* in FIGS. 9 and 16, serves to control the connection of a source of negative voltage and ground to the respective leads of the 30 pairs of leads represented by lead pairs 161*e* and 161*f* and 161*g* and 161*h*. The 30 contacts 153*g* and 153*h* are closed to transmit certain bits but opened to transmit different bits. Thus, the 91 through 120 bits of the 120-bit message are transmitted on the 30 leads 150*f* through 150*g* in the manner previously explained for the transmission of the first 30 bits on the leads 150 through 150*a*. Further progress of the transfer of the 120-bit message through the system to its ultimate destination in the No. 1** terminal is hereinafter explained.

Figure 12:
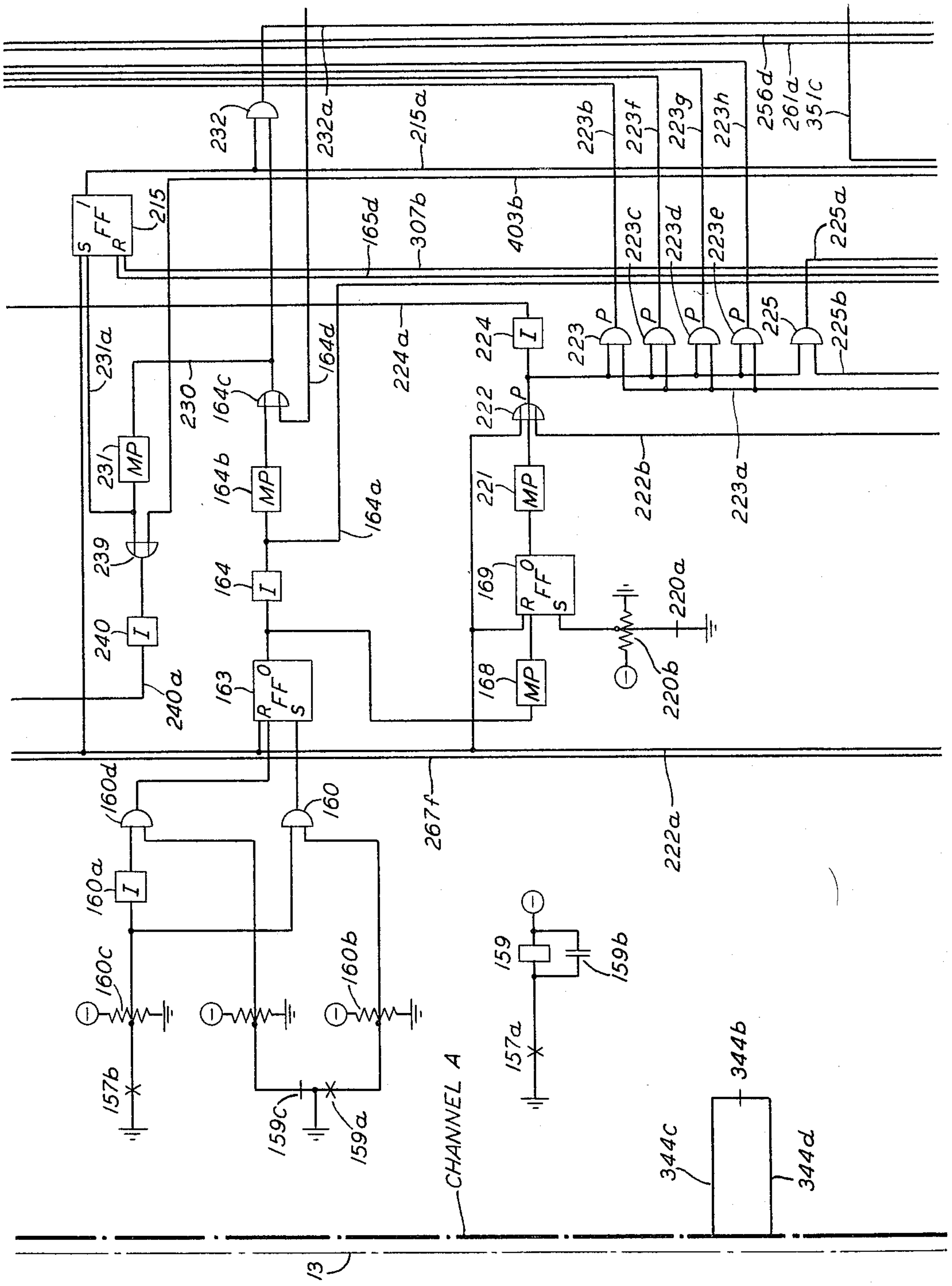
Figure 13:
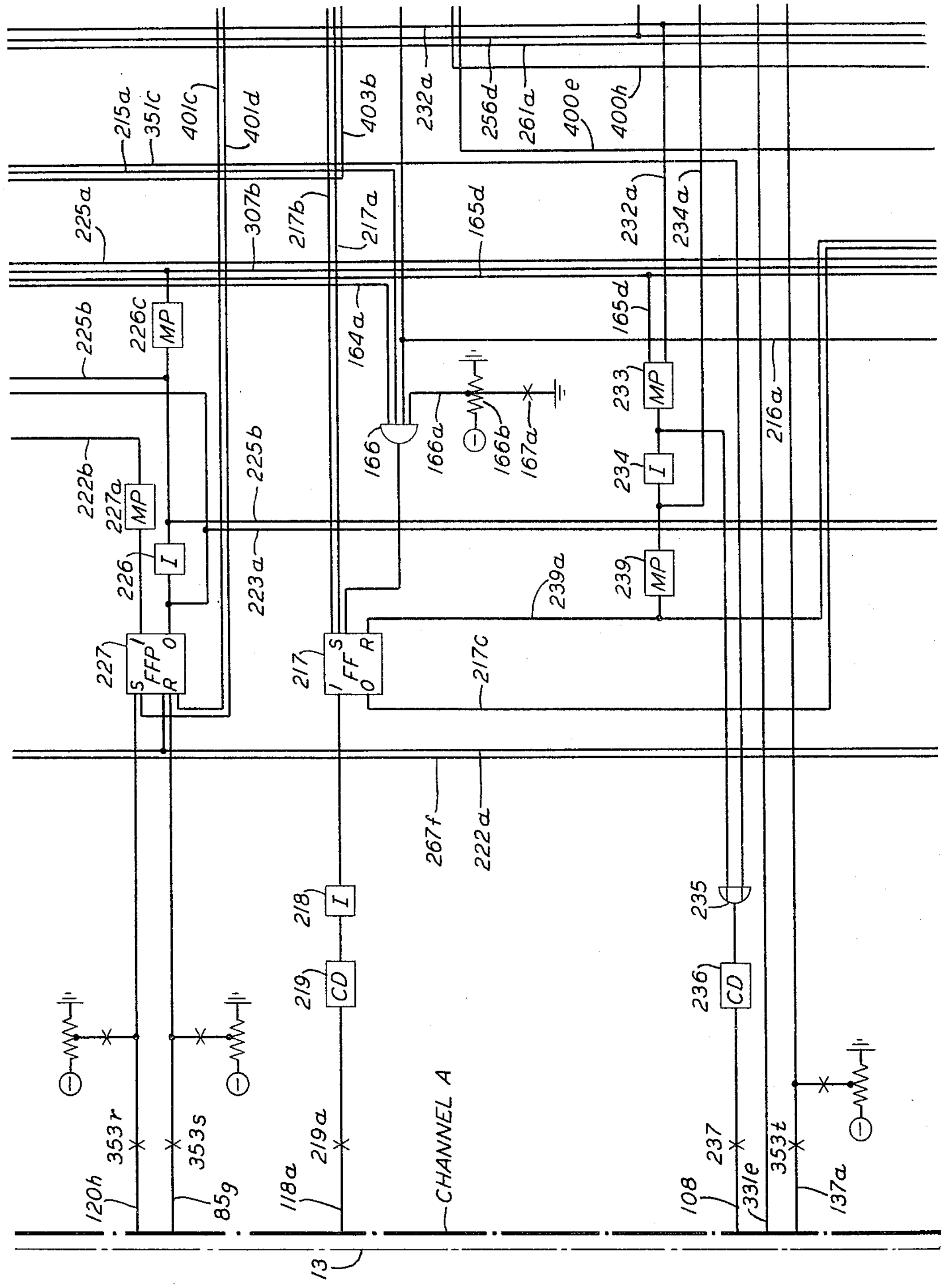
Figure 18:
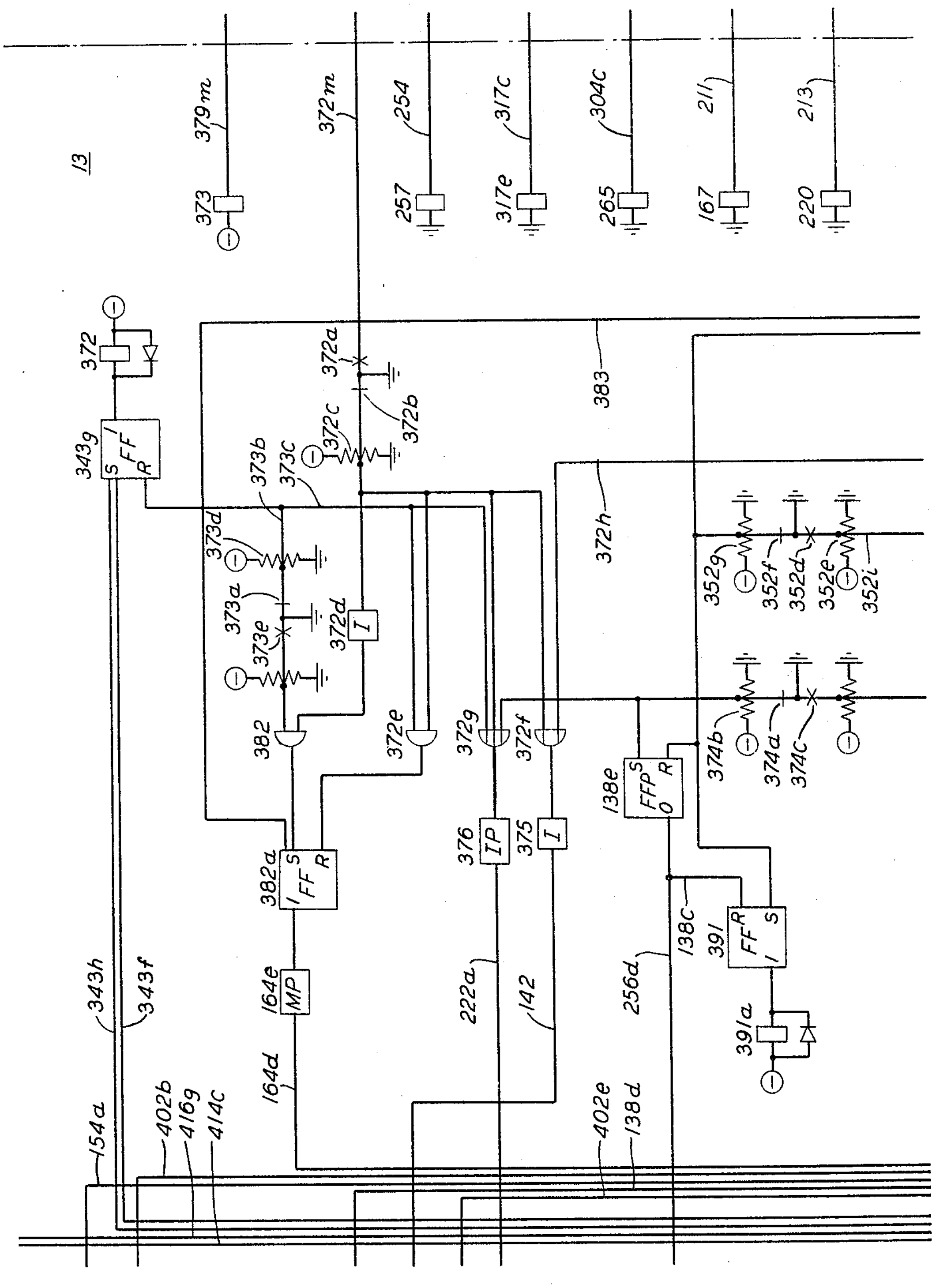

The operation of relay 157 closes its contact **157*a* in FIG. 12 which applies ground to the operating winding of gate control data register relay 159 thereby causing it to operate as shown in FIGS. 12 and 16. This relay closes its contact 159*a* in FIG. 12 whereby the associated ground is applied to a first input of gate control send AND-NOT gate 160 in FIG. 12 whose second input of ground is received via closed contact 157*b* of operated relay 157. This causes gate 160 to provide in its output a negative voltage which is applied to the set side of gate control flip-flop 163 in FIG. 12 thereby setting it. In the set state, this flip-flop provides from its 0-side output an output of negaive voltage which is changed in the output of inverter 164 to ground which is effective on lead 164*a*. There is no further action in the circuit at this point at the moment because AND-NOT gate 165 is inhibited by a negative voltage on output lead 165*a* from the output of the 1-side of message on line flip-flop 216 in FIG. 14 and AND-NOT gate 166 in FIG. 13 is inhibited by a negative voltage due to voltage divider 166*b* since contact 167*a* is open because its associated relay 167 in FIG. 18 is in the released state. Relay 159 is slow to release because of the capacitor connected in shunt of its operating winding in the well-known manner. The negative voltage in the 0-side output of flip-flop 163 in FIG. 12 activates monopulser 168 which produces a 5-microsecond negative voltage. This is applied to the reset side of acknowledgment flip-flop 169 which is thereby reset and which provides ground at its 0-side output. No further action is effected at this point at the moment. Referring to the 5-microsecond negative pulse provided in the output of make busy monopulser 139 for setting flip-flop 140 in FIG. 11 as hereinbefore mentioned, it is seen that this pulse is also applied to the set side of have message flip-flop 170 thereby resetting it, because the output of inverter 154*p* supplies ground to lead 154*f* at that time. When flip-flop 170 was set as aforenoted, the output of its 1-side provides ground which is applied to the operating winding of transmit have message relay 171 in FIG. 11. This relay operates to close its make contact 171*a* in FIG. 19 which thereupon applies the associated negative voltage to lead 171*b* for notifying the No. 1** data terminal that a message is to be transmitted thereto from the main data terminal, in a manner that is further explained hereinafter.

*No. 1 data terminal notified via channel A message available at main data terminal*

Figure 19:
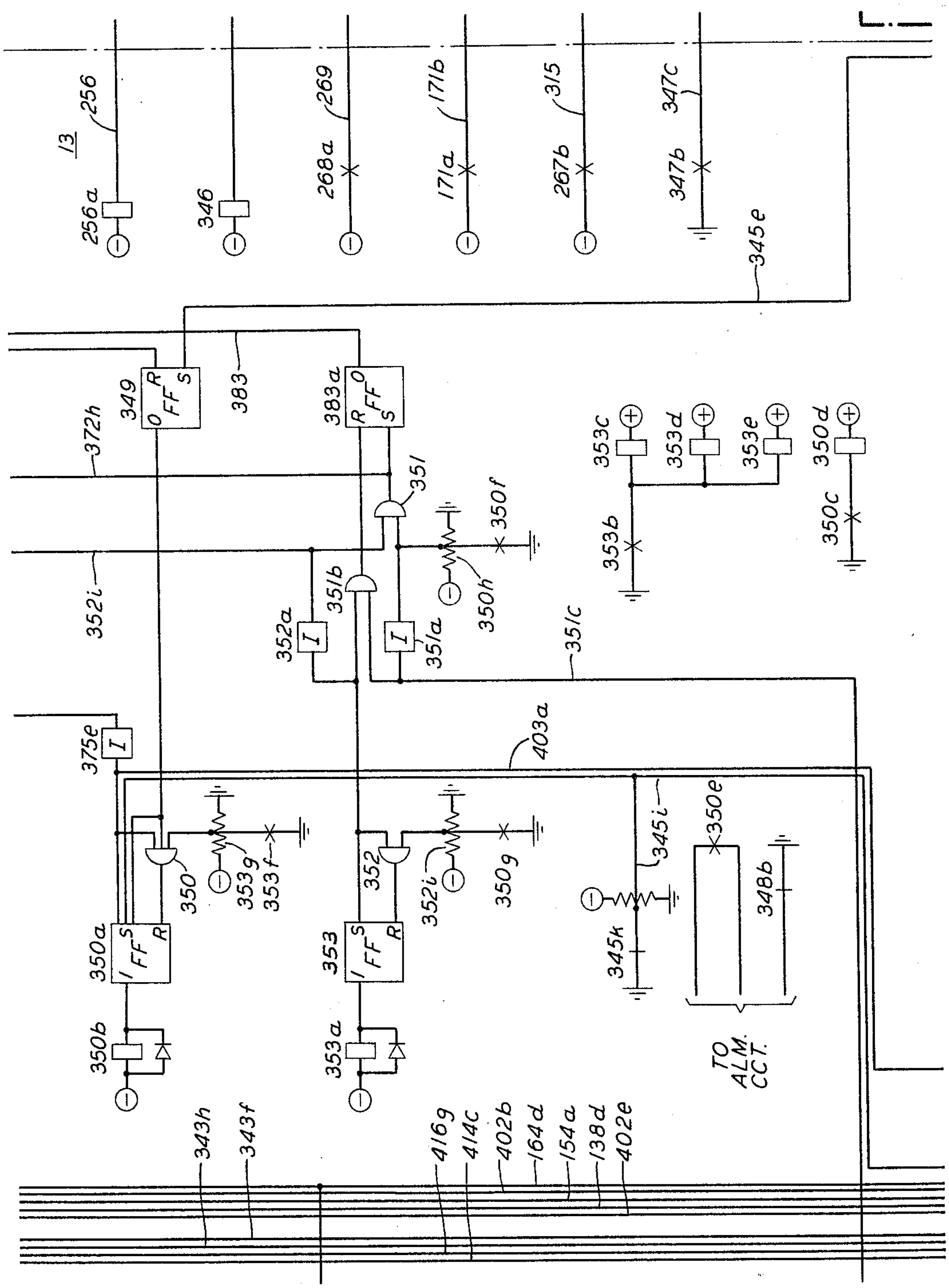
Figure 24:
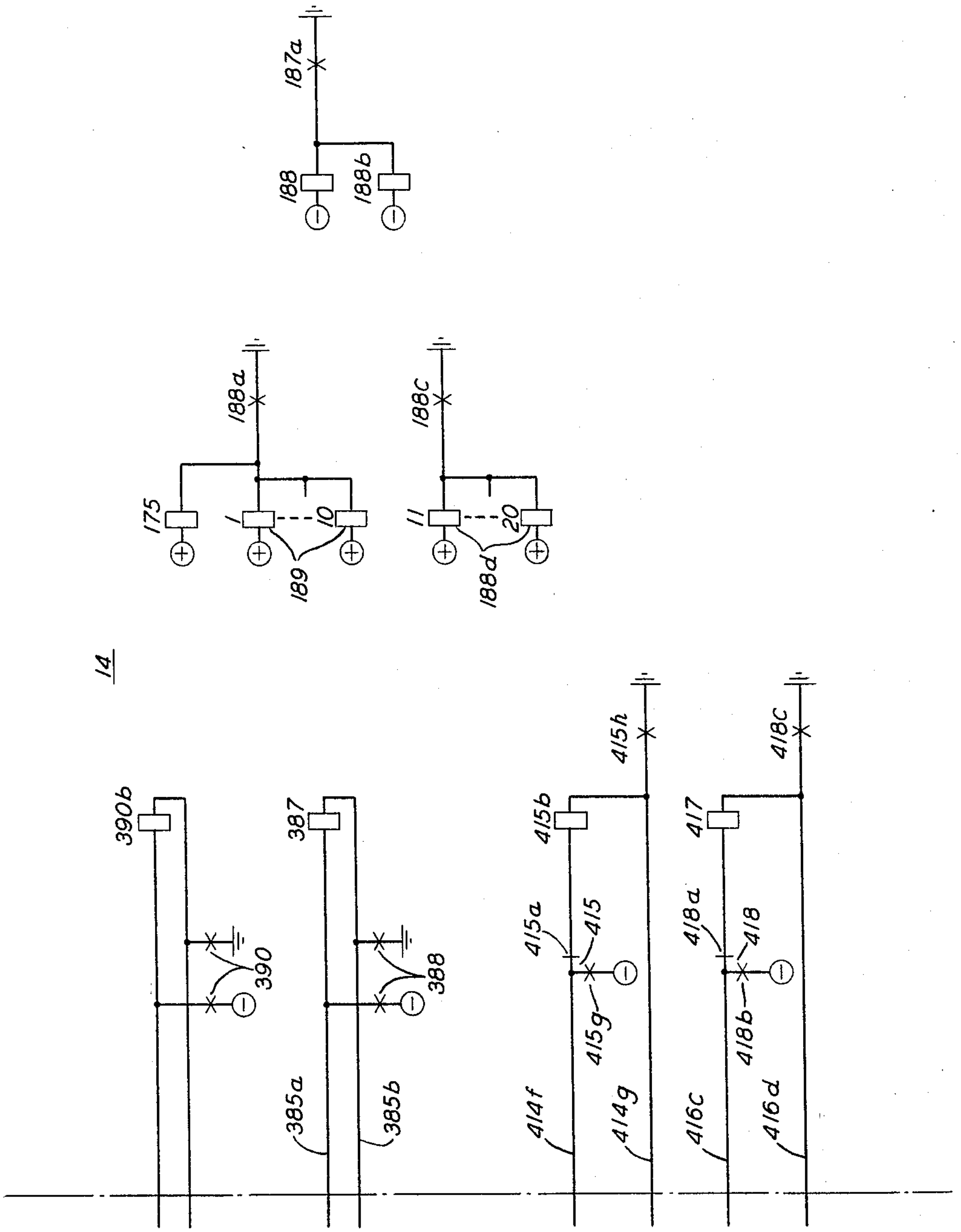
Figure 26:
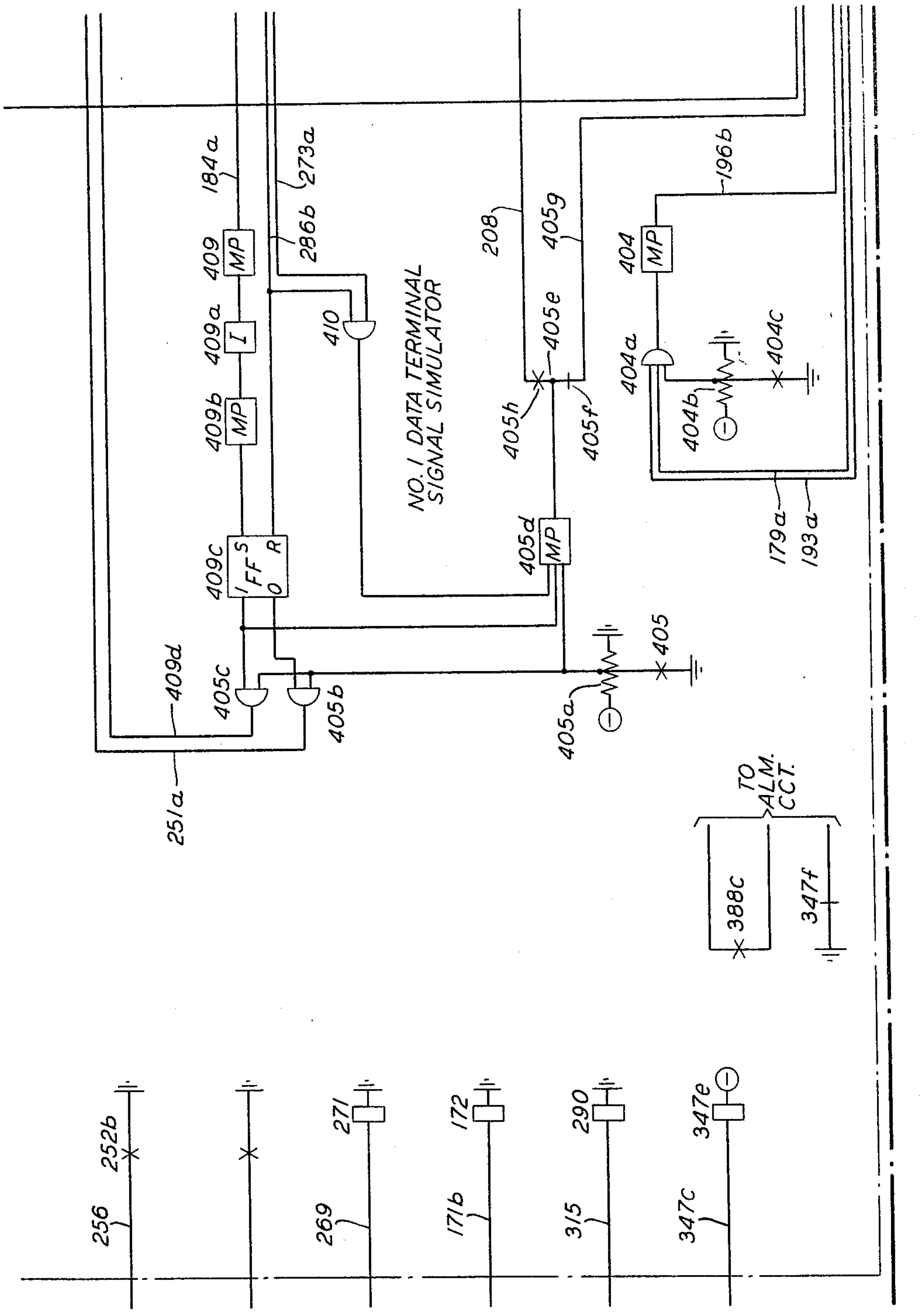
Figure 31:
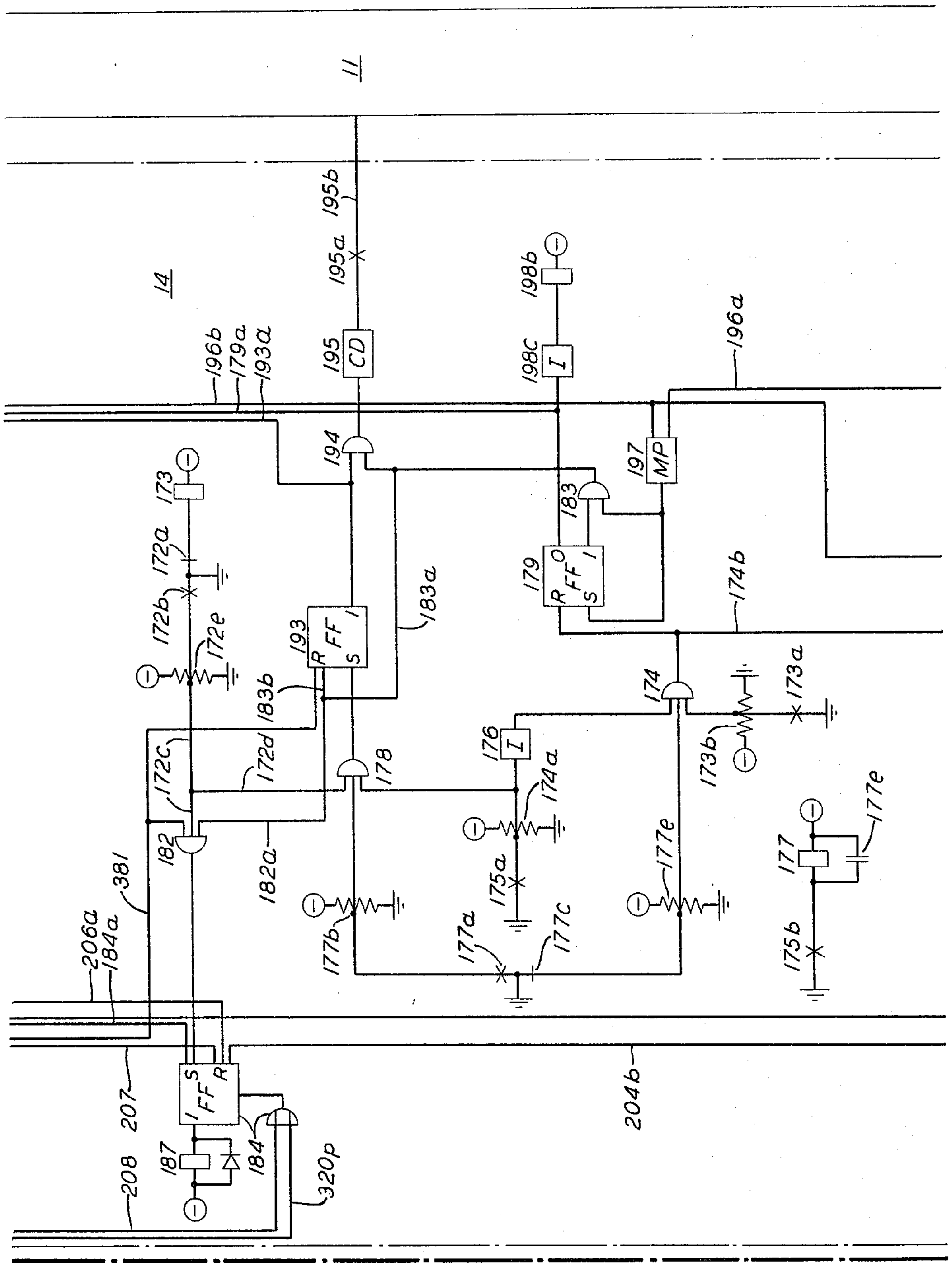

The negative voltage effective via closed contact **171*a* and lead 171*b* in FIG. 19 serves to operate receive message ready relay 172 in FIG. 26 which when operated opens its break contact 172*a* thereby interrupting an operating path for have message relay 173 in FIG. 31. This relay returns to the released state to open its make contact 173*a* whereby a negative voltage effected by voltage divider 173*b* is applied to acknowledgment AND-NOT gate 174 in FIG. 31. At the same time, a negative voltage, produced by voltage divider 174*a* because a contact 175*a* of released relay 175 in FIG. 24 is open for a reason to be mentioned later, is applied to inverter 176 in FIG. 31 whose output then provides ground which is applied to gate 174. Also, open contact 175*b* in FIG. 31 of relay 175 interrupts the operating path for have message relay 177 which is thereupon released whereby its associated open contact 177*a* enables voltage divider 177*b* to supply a negative voltage to have message AND-NOT gate 178. In addition, break contact 177*c* of relay 177 supplies ground to gate 174 via voltage divider 177*e*. In view of the two ground inputs and the negative voltage supplied simultaneously to the input of gate 174, this gate is caused to produce ground on its output lead 174*b*. This removes reset voltages from the reset sides of acknowledgment flip-flop 179 in FIG. 31, transmit acknowledgment flip-flop 180, and transmit bad parity flip-flop 181**, both latter being in FIG. 32.

Closed contact **172*b* of relay 172 provides ground on input lead 172*c* to receive driver gate 182 in FIG. 31. At this time ground is also on leads 182*a* and 183*a* to the input of gate 182 from the output of message inhibitor AND-NOT gate 182 because flip-flop 179 has been reset, thereby supplying a negative voltage to the input of gate 183 in a manner to be later explained. In addition, ground is on clock inverter lead 381 because the system is not being cleared at this time, in a manner that will be subsequently mentioned. In view of the aforenoted three ground inputs to gate 182, the output thereof supplies a negative voltage to the set side of receive driver flip-flop 184 which is thereby set. Also, at this time ground is on input lead 184*a* to the set side of flip-flop 184 from the output of send message AND-NOT gate 276 in FIG. 29 which is now receiving a negative voltage from the output send message inverter 185. This inverter is now receiving ground from the output of the 0-side of receive send message flip-flop 186** which is in the reset state at this time.

In the set state, flip-flop 184 in FIG. 31 supplies ground from the output of its 1-side to the operating winding of receive data relay 187 which is thereby caused to operate to close its contact 187*a* in FIG. 24. This closed contact applies ground simultaneously to the operating paths of receive data relays 188 and 188*b*, in FIG. 24, both of which are thereby caused to operate. Operated relay 188 supplies ground via its closed contact 188*a* to the operating paths of relays 175 and a group of 10 discrete relays represented by relay 189 causing them to operate. Each of the 10 relays includes 6 contacts for a purpose that is later mentioned. When operated, five relays, for example, of the group of 10 relays 189 close their 30 contacts represented by contacts 190 through 190*a* to 30 L1 through L30 line relays represented by relays 191 through 191*a* in FIG. 23; five remaining relays of the group of 10 relays 189 and five relays of the group of operated 10 relays represented by relay 188*d* close their 60 contacts to 60 L31 through L90 line relays, not shown, in FIG. 23; and the five remaining relays of the group of 10 relays 188*d* close their 30 contacts represented by contacts 190*b* through 190*c* to 30 L91 through L120 line relays represented by relays 191*b* through 191*c* in FIG. 23. In regard to the 120 line relays L1 through L120 represented by relays 191 through 191*c* in FIG. 23, it is recalled from the previous explanation that on those leads transmitting a "1" bit a source of negative voltage and ground is now connected at the main control logic terminal to the 120 pairs of leads represented by the leads 161*a*, 161*b*, 161*c*, 161*d*, 161*e*, 161*f*, 161*g* and 161*h*, including the 60 pairs of intermediate leads shown in FIG. 23 whereby the last-mentioned 120 L1 through L120 line relays are operated.

Figure 23:
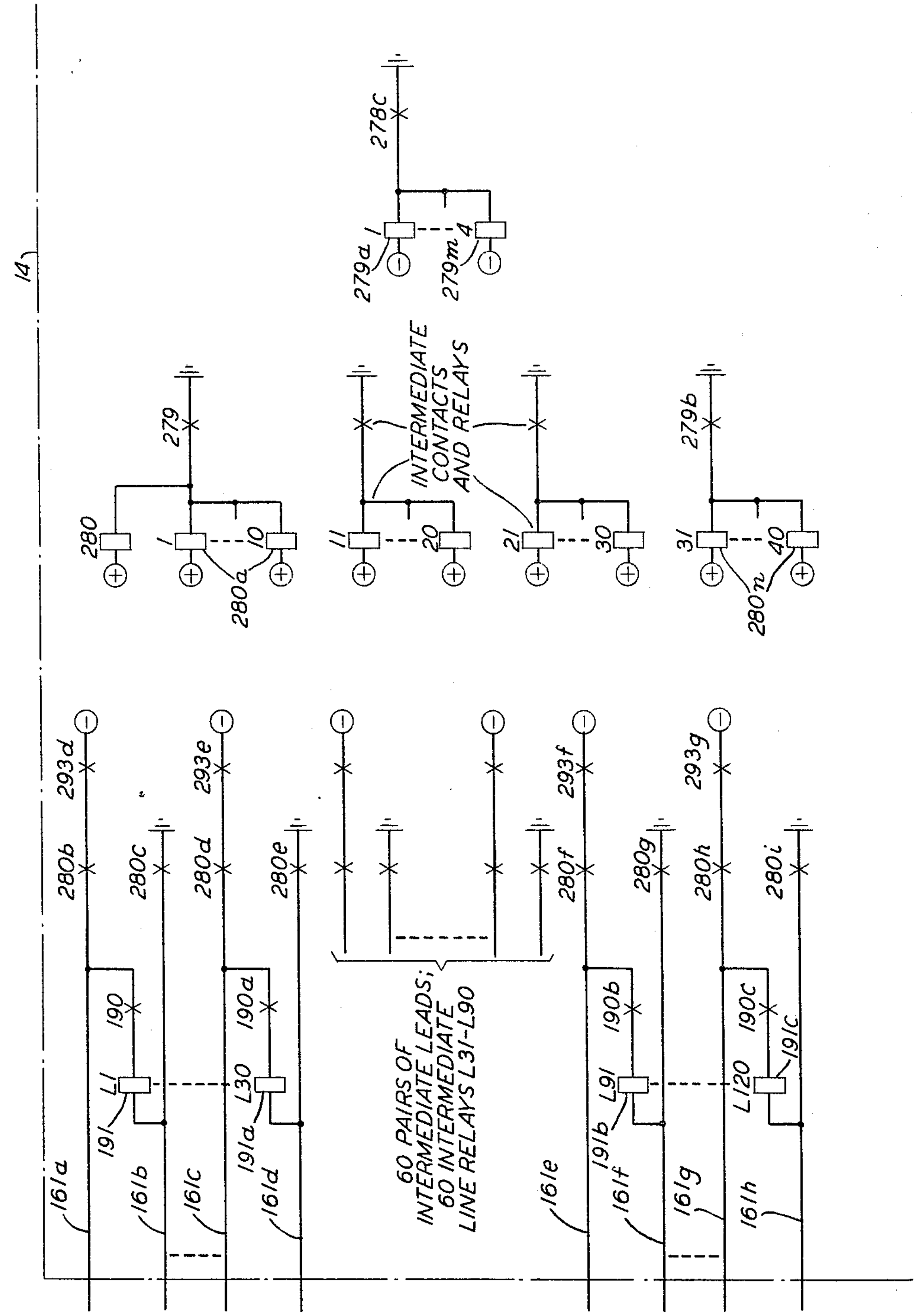
Figure 28:
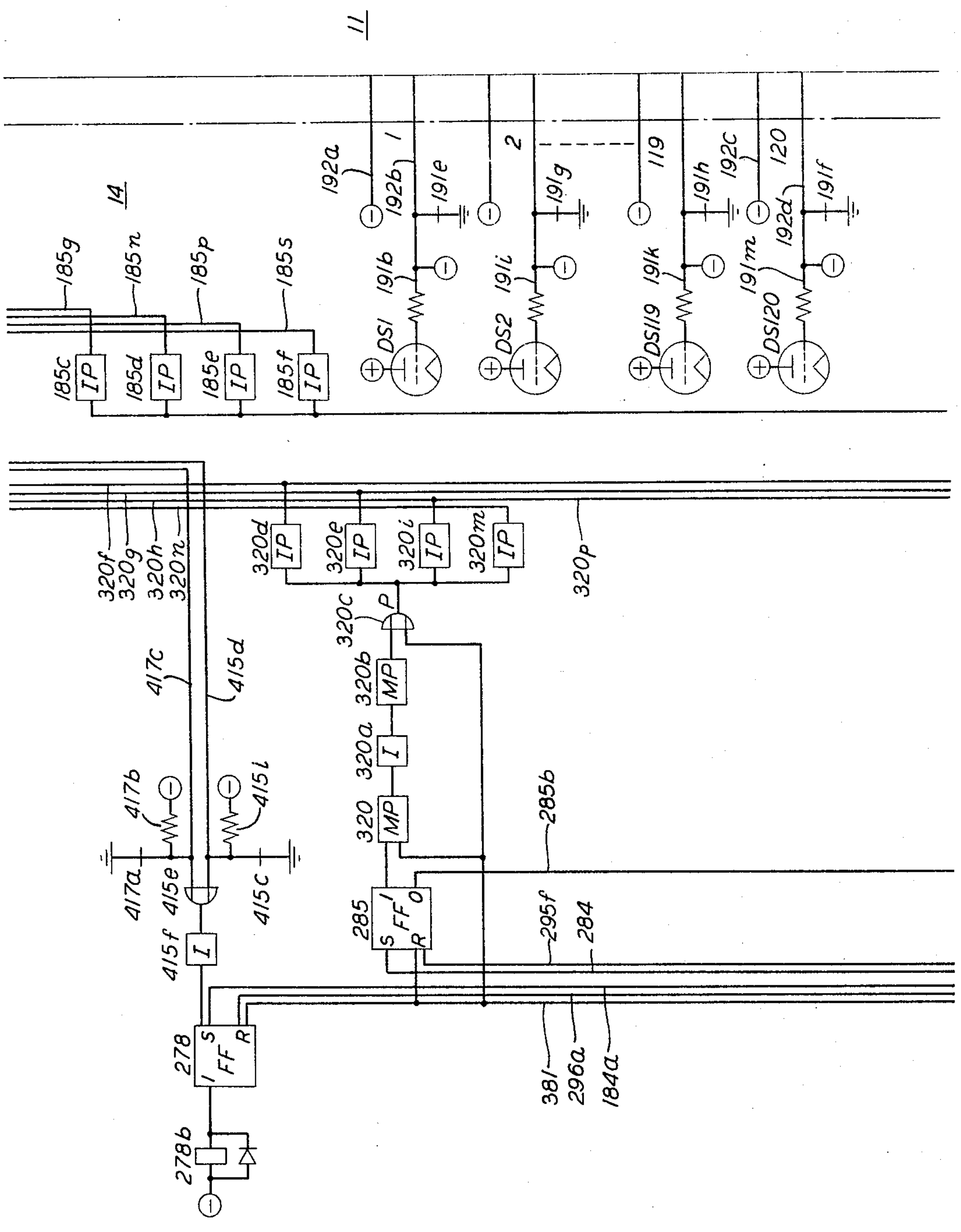

Each of the 120 L1 through L120 line relays in FIG. 23 opens its break contact 191*e* included in the 120 contacts represented by contacts 191*e* through 191*f* in FIG. 28 thereby interrupting current flow to the No. 1 data terminal in a circuit including ground and a source of negative voltage connected to a pair of leads 192*a* and 192*b* terminating in the No. 1 data terminal. In this connection, the 120 pairs of leads involved are represented by lead pairs 192*a* and 192*b* and 192*c* and 192*d* in FIG. 28 for transmitting the 120 bits of the assumed 120-bit message being transferred. Current flow on leads 192*a* and 192*b*, for example, serves to represent the transfer of a "0" bit via channel A to the No. 1 data terminal while the interruption of current flow on these leads serves to represent the transfer of a "1" bit via channel A to the No. 1 data terminal, for the purpose of this illustration. In this connection, it is apparent that since the 120-bit message being transferred may involve both "0" and "1" bits, the respective L1 through L120 line relays in FIG. 23 are operated or nonoperated in correspondence therewith.

*No. 1 data terminal informed message is available*

The operation of relay 175 in FIG. 24 provides ground via its closed contact 175*b* in FIG. 31 to the operating winding of relay 177 and its closed contact 175*a* to inverter 176 and to a first input of gate 178. Relay 177 is slow to operate by capacitor 177*e* connected in shunt of the relay operating winding for providing sufficient time delay before indicating a message is available for receipt as mentioned below. As relay 177 is now operated, it provides ground via its closed contact 177*a* as a second input to gate 178 and a negative voltage from voltage divider 177*e* to gate 174 since contact 177*c* is now open. At the time relay 172 operated as above explained, ground was provided via its closed contact 172*b* and leads 172*c* and 172*d* as a third input to gate 178. In view of the three simultaneous ground inputs to gate 178, it is thereby caused to produce in its output a negative voltage which is applied to the set-side of have message flip-flop 193 thereby setting it. As a consequence, ground in the output of the 1-side output of this flip-flop is supplied as a first input to have message gate 194. It will now be recalled from the previous explanation that the output of gate 183 contains ground which is applied as a second input to gate 194. In view of its two ground inputs, gate 194 is thereby caused to provide in its output a negative voltage which is transmitted through cable driver 195 and closed contact 195*a* to appear as a have message signal on lead 195*b* in FIG. 31. This relay contact is closed because its associated relay is operated for the reason that the system is in an operative condition as hereinbefore mentioned. This signal indicates to the No. 1 data terminal that a message is available for receipt thereby.

*Return of acknowledgment signal from No. 1 data terminal*

The have message signal stimulates the No. 1 data terminal in FIG. 32, in a manner not shown to produce an acknowledgment signal comprising a negative voltage which is applied via lead 196, closed relay contact 196*d* and lead 196*a* to the input of acknowledgment monopulser 197 in FIG. 31. This thereupon produces a 5-microsecond negative signal in its output. This monopulser, at the same time, is also receiving ground on lead 196*b* from the output of monopulser 404 included in an acknowledgment pulse simulator which is shown in FIG. 26 and which is described below but is presently inactive. The ground on lead 196*b* is also transmitted as a second input to monopulser 202 for a purpose that is mentioned below. The 5-microsecond signal from the output of monopulser 197 in FIG. 31 is applied to the set side of flip-flop 179 thereby setting it and at the same time as an inhibit to gate 183. The output of the 1-side of flip-flop 179 in the set state provides ground to gate 183. When the output of monopulser 197 is returned to ground at the termination of the acknowledgment signal, the output of gate 183 is then caused to provide a negative voltage output because the two inputs thereto are now ground. Acknowledgment key 199 in FIG. 32 is normally nonoperated thereby presenting an open circuit to lead 196 but is operable to provide a negative voltage for simulating an acknowledgment signal originating in the No. 1 data terminal for testing purposes as hereinafter mentioned.

The negative voltage effective on leads 183*a* and 182*a* from the output of gate 183 provides an inhibit on gate 182 which thereupon returns its output to ground thereby removing the negative voltage from the input of the set side of flip-flop 184 theretofore effective as previously explained. The negative voltage signal from the output of gate 183 is also applied via leads 183*a* and 183*b* to the reset side of flip-flop 193 for effecting the resetting thereof and as an inhibit to gate 194. This causes gate 194 to provide ground in its output thereby removing the have message signal of negative voltage theretofore effective on lead 195*b* for the information of the No. 1 data terminal.

When the No. 1 data terminal has processed the message supplied thereto on the 120 pairs of leads 192*a* and 192*b* through 192*c* and 192*d* in FIG. 28 as hereinbefore explained, the acknowledgment signal transmitted therefrom on lead 196 in FIG. 32 is changed to ground. Simultaneously therewith, the No. 1 data terminal supplies a text parity signal to lead 197 whereby a correct parity is indicated by ground and an incorrect parity by a negative voltage. When the signal on lead 196 returned to ground, this was applied to acknowledgment gate 198 in FIG. 32, together with ground via closed contact 198*a* of operated relay 198*b* in FIG. 31 whose operating path is completed with ground supplied by the output of acknowledgment inverter 198*c*. This inverter is activated by a negative voltage received from the output of the 0-side of flip-flop 179 which is now in the set state as just mentioned. In view of the two ground inputs to gate 198 in FIG. 32 at this time, its output provides a negative voltage.

The negative voltage in the output of gate 198 is applied, together with ground on lead 196*b*, to monopulser 202 which provides in its output a 5-microsecond pulse of negative voltage which is changed to a ground in the output inverter 203. This ground is simultaneously applied to the inputs of inverter 204 and text parity AND-OR gate 205. The output of inverter 204 supplies directly a first portion of negative voltage to the set side of transmit acknowledgment flip-flop 180 in FIG. 32 for effecting a setting thereof, and a second portion of such voltage on lead 204*b* to the reset side of receive driver flip-flop 184 in FIG. 31 thereby resetting it. A discard message signal effective in FIG. 30 via lead 206, closed relay contact 206*b* and lead 206*a* to the reset side of flip-flop 184 is ground because the message being transferred at the moment is not being discarded, and therefore a discard message signal is not being originated at this time at the No. 1 data terminal. This signal will be later described. A transmit message signal of ground is effective on lead 207 in FIGS. 30 and 31 to the reset side of flip-flop 184 at the moment because a message for transfer is not being originated at No. 1 data terminal at this time. Now, ground is on leads 320*h* and 320*p* connected to the reset side of flip-flop 184 in FIGS. 28, 29, 30 and 31 from the output of reset inverter 320*i* in FIG. 28 because the system is not being cleared in a manner that is later explained. Ground is presently on lead 208 in FIGS. 26, 30 and 31 because the No. 1 data terminal signal simulator shown in FIG. 26 is not active at the moment. Therefore, the portion of the negative voltage representing the transmit acknowledge signal on lead 204*b* activates flip-flop 184 to the reset state in which ground is removed from the operating winding of receive data relay 187. This relay is thereby enabled to return to the released state whereby its contact 187*a* is opened to remove ground from the operating winding of relays 188 and 188*b* in FIG. 24. This opens contacts 188*a* and 188*c* associated with relays 175 and 189 and 188*d*, respectively, in FIG. 24 to remove ground from the operating windings of the respective relays which are then returned to the released state.

Released relay 175 opens its contacts 175*a* and 175*b* in FIG. 31 whereby open contact 175*a* enables voltage divider 174*a* to supply negative voltage to gate 178 and open contact 175*b* removes ground from the operating winding of relay 177 which releases. The negative voltage activates gate 178 to provide ground in its output thereby removing the negative voltage from the set side of flip-flop 193. Since the negative voltage applied to its reset side for resetting flip-flop 193 is still effective via lead 183*a* from the output of 183 in FIG. 31, flip-flop 193 is reset. When contact 175*a* of relay 175 opened in FIG. 31, the negative voltage supplied by voltage divider 174*a* to the input of inverter 176 is changed thereby to a ground which is applied to gate 174. When relay 177 returned to its released condition as just mentioned, it closed its break contact 177*c* in FIG. 31 to supply ground to one input of gate 174. No further action takes place at gate 174 which is now inhibited by a voltage supplied via voltage divider 173*b* since relay contact 173*a* is open.

If an incorrect parity had been indicated by a negative voltage on lead 197 in FIG. 32 instead of the ground previously mentioned, such voltage would be changed to ground in the output of inverter 209. This ground, together with the 5-microsecond ground from the output of inverter 203, would be supplied to the two inputs of AND-NOT gate 205 which would be thereupon caused to produce in its output a negative voltage. This voltage applied to the set side of flip-flop 181 activates the latter to the set state whereby a ground in the output of its 1-*side* would be supplied to complete the operating circuit of transmit bad parity relay 210. This relay would be thereby operated to close its contact 210*a* for applying a negative voltage to lead 211 in FIG. 25. As flip-flop 180 in FIG. 32 is set as aforementioned, the output of its 1-side supplies ground to complete the operating path to the winding of transmit acknowledge relay 212 which is operated to close its contact 212*a* for applying a negative voltage to lead 213 in FIG. 25 for a purpose that will be pointed out below.

Figure 25:
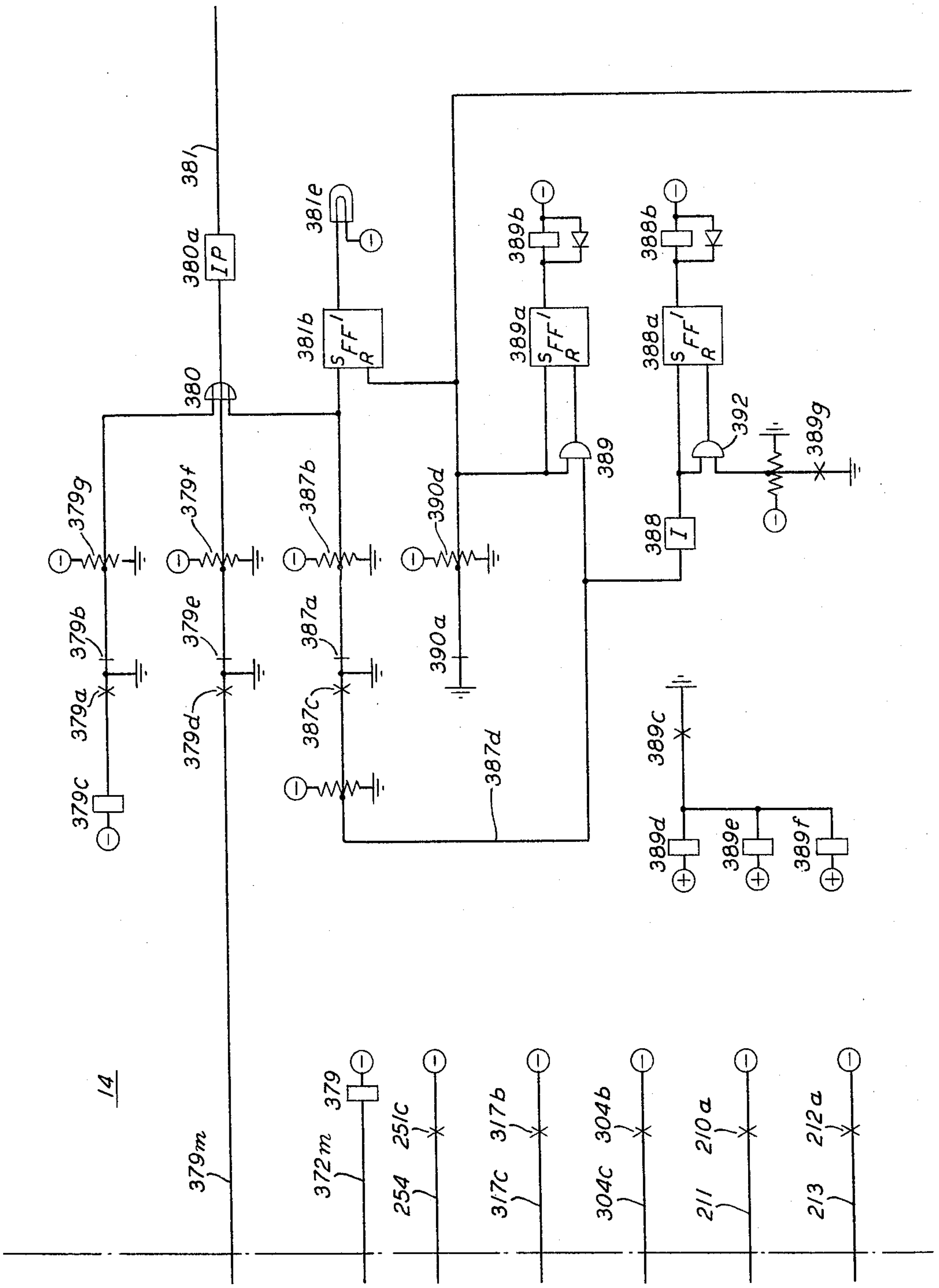

Now, the negative voltage effective on lead 211 in FIG. 25 as just mentioned provides an energization path for incorrect parity pulse relay 167 in FIG. 18 which operates to provide a ground through its closed contact 167*a* in FIG. 13. This ground is applied to one input of gate 166 whose second input on lead 215*a* is also ground received from the output of the 1-side of acknowledgment flip-flop 215 in FIG. 12, presently in the set state. This flip-flop was heretofore set by a negative voltage effective on lead 231*a* from the output of monopulser 231 in FIG. 12 due to the completion of the last message transferred in a manner that will be further discussed below. It was previously mentioned that ground was present on lead 164*a* in FIG. 12. Ground is also provided on lead 216*a* in the output of the 0-side of flip-flop 216 which is in a reset state and which is activated to the set state only during message transfer from the No. 1 data terminal to the main data terminal in a manner that will be described subsequently. As four inputs of ground are now simultaneously supplied to gate 166 in FIG. 13, it provides an output of negative voltage which is applied to the reset side of text parity flip-flop 217 in FIG. 13 thereby activating it to the set state. The remaining two inputs to this flip-flop via leads 217*a* and 217*b* are both ground because a time out has not occurred in a manner and for a purpose that will be subsequently explained. The output of the 1-side of flip-flop 217 provides ground to the input of inverter 218 whose output supplies a negative voltage via cable driver 219 and closed relay contact 219*a* to text parity lead 118*a*. This voltage indicates an incorrect parity in the message being transferred from the main data terminal to the No. 1 data terminal at the moment. As flip-flop 217 is in the set state, the output of its 0-side provides a negative voltage on lead 217*c* to a parity count circuit shown in FIG. 22 and further discussed hereinafter.

Referring back to the negative voltage on lead 213 in FIGS. 18 and 25, it is seen that such voltage energizes the operating winding of relay 220 which operates to open its break contact 220*a* in FIG. 12 to disconnect ground therefrom. This enables voltage divider 220*b* to supply a negative voltage to the set side of receive acknowledgment flip-flop 169 in FIG. 12 thereby setting it. Now, the output of the 0-side of this flip-flop supplies a negative voltage to acknowledgment monopulser 221 which in turn provides a 5-microsecond negative voltage pulse to acknowledgment power NOT-OR gate 222 in FIG. 12 which comprises effectively a combination of a unitary AND gate, a power amplifier, and a clamper shown in FIG. 5B and described hereinbefore. Ground is on input lead 222*a* to flip-flop 169 because the system is not being cleared at this time in a manner that will be explained subsequently. Ground is also on test message reset lead 222*b* for the reason that a test message is not being processed in a manner that will be mentioned later. As a consequence of the input of negative voltage and the two inputs of ground, the output of gate 222 is thereby caused to provide a 5-microsecond ground pulse to supervisory reset inverter 224, reset AND-NOT power gates 223, 223*c*, 223*d* and 223*e*, and test message gate 225. Gates 223, 223*c*, 223*d* and 223*e* are a high fan-out type shown in FIG. 5B. Gate 225 still provides ground on its output lead 225*a* because the input thereto on lead 225*b* from test message inverter 226 in FIG. 13 is a negative voltage which indicates a test message is not being processed at this time.

The 5-microsecond ground pulse supplied to inverter 224 in FIG. 12 provides on its output lead 224*a* a 5-microsecond negative voltage which is supplied to the reset side of have message flip-flop 170 in FIG. 11. It is noted that the reset side of this flip-flop is also being supplied with ground at the same time via lead 222a for the reason that the system is not being cleared as hereinbefore mentioned. As a consequence, flip-flop 170 is activated to the reset state whereby ground is removed from the output of its 1-side to interrupt the operating path of relay 171 which returns to the released state. This relay then opens its contact 171a to disconnect a source of negative voltage from lead 171b in FIG. 19 whereupon relay 172 in FIG. 26 is returned to its released condition. This relay now connects ground via contact 172a in FIG. 31 to the operating winding of relay 173 which is operated to supply ground via its closed contact 173a in FIG. 31 to gate 174. As hereinbefore mentioned, ground is now effective via break contact 177c and in the output of inverter 176. As all three inputs to gate 174 are now ground, the output of this gate on lead 174b is a negative voltage which is applied to the reset sides of flip-flops 179, 180 and 181 thereby resetting them, if flip-flop 181 had been previously set to indicate an incorrect parity in the text of the previous message.

As relay 172 in FIG. 26 is now in the released state, its open contact 172b in FIG. 31 enables voltage divider 172e to provide a negative voltage on lead 172c to inhibit gate 182 and on lead 172d to inhibit gate 178. The latter gate at this time is also being supplied with inhibiting negative voltages by the associated voltage dividers 174a and 177b because the associated contacts 175a and 177a, respectively, are open. As flip-flops 180 and 181 in FIG. 32 are now in the reset state as above pointed out, ground is thereby removed from the outputs of the 1-sides thereof to interrupt the operating paths of associated relays 212 and 210, respectively. These relays return to the released state which removes sources of negative voltage via open contacts 210a and 212a from their associated leads 211 and 213, respectively. This serves to restore the No. 1 data terminal to the idle condition.

Referring to FIGS. 9 and 12, it is recalled that a 5-microsecond ground pulse is presently being supplied to the input of gates 223, 223c, 223d and 223e. The operation of gate 223 controls via lead 223b the operation of 30 DR1 through DR30 data register flip-flops 152 through 152a which in turn control the operation of 30 associated relays 153 through 153b; gates 223c and 223d control via leads 223f and 223g, respectviely, the operation of 60 DR31 through DR90 data register flip-flops which in turn control the operation of 60 associated relays, not shown; and gate 223e controls via lead 223h the operation of 30 DR91 through DR120 data register flip-flops 152b through 152c which in turn control the operation of 30 associated relays 153d through 153e. In addition to the 5-microsecond ground pulse received from the output of gate 222, gates 223, 223c, 223d and 223e are also presently being supplied with ground on lead 223a from the output of the 0-side of test message enable flip-flop 227 in FIG. 13 which is presently in the reset state because a test message is not being processed at this time in a manner that is subsequently explained. In view of the two simultaneous inputs of ground, each of gates 223, 223c, 223d and 223e provides on its output lead a 5-microsecond negative voltage pulse which is applied to the reset sides of the associated data register flip-flops thereby resetting them. In the reset state of the 120 data registers, the outputs of their 1-sides provide negative voltages which replace the ground theretofore applied to the operating circuits of the 120 associated data register relays whereupon the 120 relays are returned to the released condition. In this condition, the 120 relays open their 120 associated contacts 153a through 153h to remove the negative voltage that was applied to 120 leads 161a through 161h shown in FIG. 16.

Transmit driver flip-flop 154 in FIG. 10 has ground on input lead 222a to its reset side because the system is not being cleared as hereinbefore mentioned. At the same time, a negative voltage on lead 223b in the output of gate 223 is also applied to the reset side of flip-flop 154 which is thereby reset. This removes ground from the output of the 1-side of flip-flop 154 whereby its associated relay 155 is de-energized and returns to the released state. This removes the ground that was being furnished via its contact 155a in FIG. 16 to the operating windings of the 4 relays 156 through 156n in FIG. 16 whereby these relays are de-energized. This removes the ground that was being supplied via contact 156b to relay 157 and the 10 relays 157c, the ground that was being supplied via contacts similar to contact 156b to the 20 intermediate relays, and via contact 156d to the 10 relays 157n. As a consequence, relay 157 and the 40 relays included between relays 157c and 157n in FIG. 16 are de-energized. As each of the 40 relays 157c through 157n includes 6 contacts, this opens the 120 pairs of contacts represented by the contact pairs 158a and 158b through 158g and 158h connected to the 120 pairs of leads represented by the lead pairs 161a and 161b through 161g and 161h utilized for transmitting 120 data bits in FIG. 16 as previously mentioned. The opening of the 120 pairs of contacts represented by contact pairs 158a and 158b interrupts the connection of a source of negative voltage and ground to the last-mentioned 120 pairs of leads. This interrupts the transmission path of the message from the main data terminal via channel A to the No. 1 data terminal.

Relay 157 in FIG. 16 being de-energized opens its contacts 157a and 157b to remove ground via contact 157a from the operating winding of relay 159 and via contact 157b from the inputs of gate 160 and inverter 160a in FIG. 12. Open relay contact 157b permits a negative voltage provided at voltage divider 160c to be supplied to a first input to gate 160 and to the input of inverter 160a. This negative voltage input inhibits gate 160 whose output then furnishes a ground to the set side of flip-flop 163. Relay 159 is made slow release by a capacitor 159b connected across its operating winding so that when it is de-energized, it opens its contact 159a and closes its contact 159c. Open contact 159a permits voltage divider 160b to supply a negative voltage to a second input to gate 160. As this gate is now supplied with two simultaneous negative inputs of voltage, its output supplies ground to the set side of flip-flop 163, causing no action therein. Break contact 159c of relay 159 provides a ground input to gate control reset AND-NOT gate 160d. The negative input to inverter 160a as just mentioned is changed in its output to ground which is also furnished as an input to gate 160d. This gate is thereby caused to produce in its output a negative voltage which is applied to the reset side of flip-flop 163 thereby resetting it. Ground on lead 222a is also applied to the reset side of flip-flop 163 at this time because the system is not being cleared as previously mentioned. In its reset state, flip-flop 163 provides in the output of its 0-side ground which is changed to a negative voltage in the output of inverter 164. This negative voltage supplied via lead 164a to gate 166 in FIG. 13 has no effect thereon because a test message is not being processed by the system at the moment, as previously stated.

The negative voltage in the output of inverter 164 in FIG. 12 is also supplied to monopulser 164b which is thereupon caused to produce in its output a 5-microsecond negative pulse. This pulse is applied to the input of gate control NOT-OR gate 164c whose other input is also receiving at the same time a ground signal on lead 164d from on line monopulser 164e in FIG. 18 because the system is not being cleared at this time as previously mentioned. The negative pulse from monopulser 164b causes gate 164c to produce in its output a 5-microsecond ground pulse which is simultaneously effective on lead 230 to the input of gate control pulser 231 and to acknowledgment gate 232. This ground pulse at the input of gate 232, together with a ground pulse applied to the other input thereto from the output of the 1-side of flip-flop 215, activates gate 232 to produce in its output a 5-microsecond negative voltage which is supplied via lead 232*a* to the input of acknowledgment monopulser 233 in FIG. 13. A ground pulse is effective at the output of the 1-side of flip-flop 215 because it had been previously activated to the set state via a negative voltage on lead 231*a* in the output of monopulser 231 due to the completion of the next-preceding message transfer in the direction of the main data terminal to the No. 1 data terminal, in a manner that is subsequently mentioned. The output of gate 165 in FIG. 14 effective on lead 165*d* is ground because a message is not being transmitted in the direction from the No. 1 data terminal to the main terminal. As a result of the simultaneous inputs of negative voltage and ground, monopulser 233 produces in its output a 5-microsecond negative voltage which is simultaneously applied to acknowledgment inverter 234 and acknowledgment NOT-OR gate 235. This gate changes the negative voltage to ground which is transmitted via cable driver 236 and closed relay contact 237 to lead 108. This relay contact is closed because the system is in operation as hereinbefore stated. This ground on lead 108 informs the main data terminal via the interface circuit shown in FIG. 6A that the message transfer has been successfully completed.

The 5-microsecond negative voltage applied to the input of inverter 234 in FIG. 13 produces a 5-microsecond ground pulse in the output thereof. This ground pulse is supplied to text parity flip-flop reset monopulser 239 and to lead 234*a*. The effect of the ground pulse on lead 234*a* will be hereinafter discussed in regard to the parity count circuit shown in FIGS. 20 and 21 and the message simulator circuit shown in FIG. 20. After 5 microseconds have elapsed, the output of monopulser 233 in FIG. 13 returns to ground which causes the output of inverter 234 to provide a negative voltage which is converted to a 5-microsecond negative voltage in the output monopulser 239. This voltage applied to the reset side of text parity flip-flop 217 resets it to the 0 state in which the output of the 1-side provides a negative voltage which is changed to ground in the output of inverter 218. This ground applied via cable driver 219 to lead 118*a* removes the text parity indication that was theretofore effective thereon, as hereinbefore mentioned. The negative voltage in the output of monopulser 239 is also effective on lead 239*a* which is connected to the automatic clear and alarm circuit shown in FIG. 21 and discussed hereinafter.

From the previous discussion, it will be recalled that after 5 microseconds had elapsed, the output of monopulser 164*b* in FIG. 12 returned to ground which is changed to a negative voltage in the output of gate 164*c*. This negative voltage activates monopulser 231 which produces in its output a 2-microsecond negative voltage which is supplied to the input of NOT-OR gate 239 and via lead 231*a* to the set side of flip-flop 215 which is thereby set. The operation of this flip-flop has been previously explained. Returning to gate 239, the output thereof provides a 2-microsecond ground which is changed by inverter 240 to a 2-microsecond negative voltage. This voltage is applied on lead 240*a* to the reset side of flop-flop 140 which is thereby reset; and at the same time, it is applied as an inhibit to gate 138 for a purpose that will be explained subsequently in connection with message transfer from the No. 1 data terminal to the main terminal.

Ground is presently being applied to the reset input of flip-flop 140 from the output of discard message monopulser 241 in FIG. 11 because the message transfer at the moment is not in the direction from the No. 1 data terminal to the main terminal. As flip-flop 140 has just been reset, the output from its 1-side is a negative voltage while the output from its 0-side is ground. This negative voltage is changed by inverter 143 into ground which is applied via cable driver 144 and closed relay contact 144*a* to idle lead 76 for indicating an idle condition to the interface shown in FIG. 6A and thereby to the main data terminal. Ground in the output of the 0-side of flip-flop 140 provided on lead 140*a* is changed in the output of inverter 145 into a negative voltage which is applied via cable driver 146 and closed relay contact 146*a* to busy lead 99 for indicating a busy condition to the interface shown in FIG. 6A and thereby to the main data terminal. Ground from the 0-side of flip-flop 140 is also provided via leads 140*a* and 140*b* as one enabling input to gate 138. This gate is further discussed below during the explanation of message transfer from the No. 1 data terminal to the main data terminal.

Figure 34:
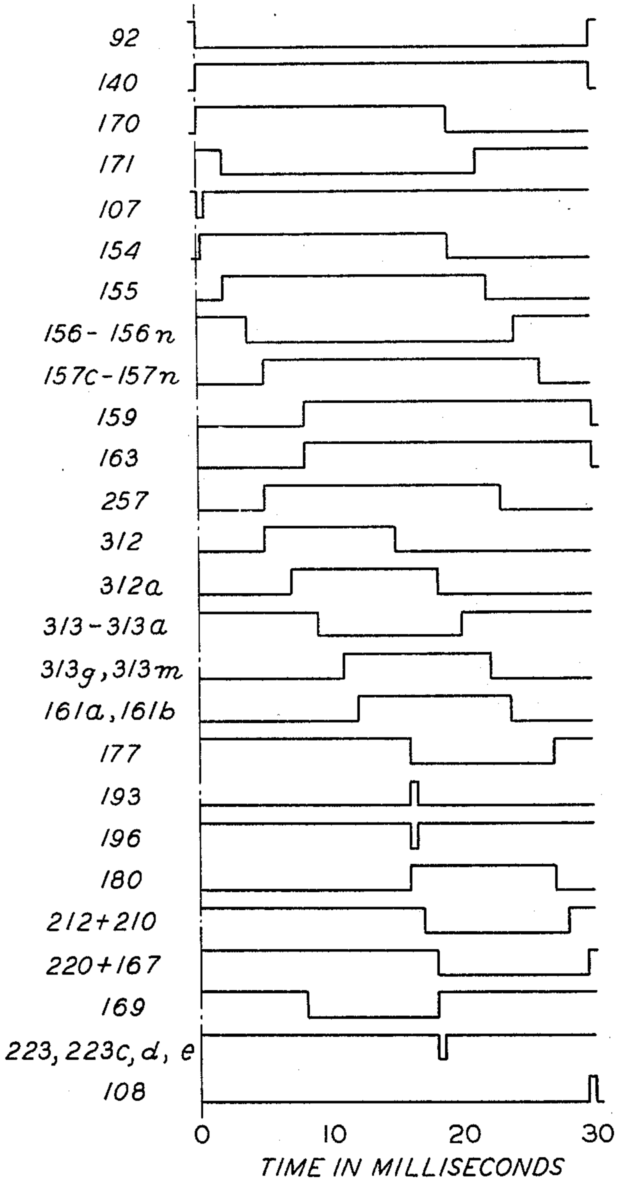

The logic sequence time diagrams for effecting message transfer from the main data terminal to the No. 1 data terminal are illustrated in FIG. 34.

*Message transfer from the No. 1 data terminal to the main data terminal*

Figure 29:
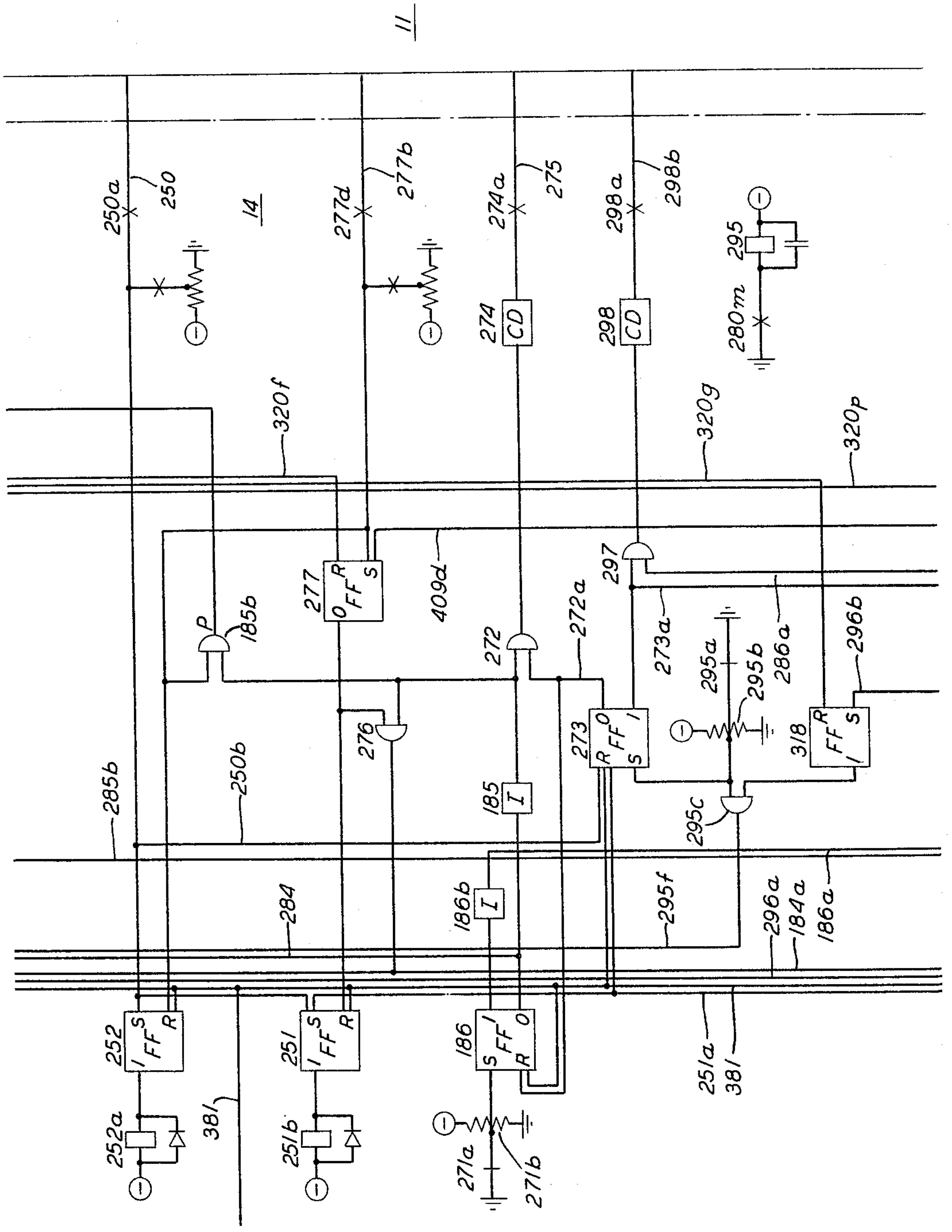

When the No. 1 data terminal has a message for transmission to the main data terminal, a have message signal effective as a negative voltage on lead 250 in FIG. 29 is transmitted through closed relay contact 250*a* to the set sides of transmit have message flip-flops 251 and 252 whereby both flip-flops are activated to the set state. Flip-flop 251 is set because ground is on lead 251*a* originating in FIG. 26 due to the fact that the message transfer of the moment does not involve a simulated message. Now, the output of the 1-side of flip-flop 251 supplies ground to the operating winding of relay 251*b* which is thereby operated; and the output of the 1-side of flip-flop 252 supplies ground to the operating winding of relay 252*a* which is thereby operated. The operation of relay 251*b* closes its contact 251*c* in FIG. 25 to complete an operating circuit from a source of negative voltage to ground via lead 254 for relay 257 in FIG. 18; and the operation of relay 252*a* closes its contact 252*b* in FIG. 26 to complete an operating circuit from ground to a source of negative voltage via lead 256 for relay 256*a* in FIG. 19. This relay operates to close its contact 256*b* in FIG. 20 thereby applying ground to one input of clock activate gate 256*c* for a purpose that is subsequently explained.

Referring now to FIG. 18, the negative voltage effective on lead 254 energizes the operating winding of relay 257 which operates to close its contact 257*a* in FIG. 11 thereby supplying ground to gate 138. At this time, all seven inputs to this gate are satisfied with a ground signal in the following manner. Clock phase PH–3 of the clock timing circuit provides ground on leads 138*a* and 138*b* as shown in FIG. 11. Ground is on lead 240*a* from the output of inverter 240 in FIG. 12 which is not indicating the termination of a message. The output of the 0-side of flip-flop 140 is at ground via leads 140*a* and 140*b* because channel A in FIG. 1 is idle at this time. A prevent lock-up signal on lead 258 via closed contact 353*h* is at ground since flip-flop 140 is indicating an idle condition via lead 76 to the interface in FIG. 6A as aforementioned. Make busy lead 259 via lead 92 and closed contact 353*i* is at ground because channel A cannot be seized by the main data terminal during the clock timing phase 3. Ground is also on lead 267*f* connected to the output of the 0-side of flip-flop 266 in FIG. 15 which is presently in the reset state. As ground is now supplied to all inputs of gate 138, its output provides a negative voltage which is applied to the input of have message monopulser 141 whose output produces a 2-microsecond negative voltage pulse. This pulse supplied to the set side of flip-flop 140 sets it and at the same time is changed in the output of inverter 141*d* to ground which is applied to have message monopulser 141*a*. Flip-flop 140 is set because ground is on lead 142 due to the fact that the system is not being cleared in a manner that is explained later, and ground is on make busy lead 139*a* since channel A is not being siezed by the interface in FIG. 11 during phase PH–3.

When flip-flop 140 was set, the output of its 1-side provided a ground which was changed in the output of inverter 143 into a negative voltage. This voltage transmitted through cable driver 144 and closed relay contact **144*a* is now effective on lead 76. Also, when flip-flop 140 was set, the output of its 0-side supplies a negative voltage which was changed in the output of inverter 145 to ground. This transmitted through cable driver 146 and closed relay contact 146*a* is now effective on lead 99. When monopulser 141 goes to ground after 2 microseconds, this ground is changed to a negative voltage in the output of inverter 141*d*. This is translated into a 2-microsecond negative voltage pulse which is changed in the output of monopulser 141*a* and transmitted via lead 141*b* to the set side of transmit send message flip-flop 260 which is thereupon activated to the set state. This 2-microsecond negative voltage pulse is also supplied via lead 141*c* to the reset side of receive discard message flip-flop 261 for resetting it. Thus, inverter 141*d* serves to provide a 2-microsecond delay between the setting of flip-flop 140 and the resetting of flip-flops 260 and 261. Flip-flop 261 is reset because ground is effective on lead 222*a* due to the fact that the system is not being cleared at this time as previously mentioned. In the reset state, the output of flip-flop 261 is a negative voltage which is applied on lead 261*a* to one input of No. 1 data terminal clear AND-NOT gate 262 in FIG. 14 which is thereby caused to change its output on lead 262*a* to ground. Simultaneous second and third inputs of ground to gate 262 are received from the output of No. 1 data terminal NOT-OR gate 263 and via closed contact 264*a* associated with released message on line relay 264. The output of gate 263 is ground for the reason that receive transmit message relay 265 in FIG. 18 is released at this time whereby its open contacts 265*a* in FIG. 14 enables a negative voltage produced at associated voltage divider 265*b* to be applied as one input thereto, and ground effective on lead 222*a*, since the system is not being cleared at this time as above mentioned, is applied as the second input thereto. Since the output of gate 262 is ground on lead 262*a*, this ground also effective on lead 262*b* fails to activate monopulser 267** in FIG. 21 for a reason that is mentioned later.

When flip-flop 260 in FIG. 11 was set as hereinbefore stated, the output of its 1-side provided ground which completes the operating path for operating transmit send relay 268. Now this relay closes its contact **268*a* in FIG. 19 thereby connecting a source of negative voltage to its associated lead 269. This completes an energizing path for receive send message relay 271 shown in FIG. 26. This relay opens its break contact 271*a* in FIG. 29 whereupon voltage divider 271*b* is enabled to provide a negative voltage to the set side of receive send massage flip-flop 186 which is thereby set. Now, this flip-flop provides in the output of its 0-side a negative voltage which is changed to ground in the output of inverter 185. This ground applied to send message AND-NOT gate 272 is changed in the output thereof to a negative voltage because ground is on the signal on OK to check flip-flop lead 272*a* from the output of the 0-side of flip-flop 273 at this time. This is so since flip-flop 273 is presently in the reset state for the reason that a negative voltage is effective on leads 250 and 250*b* via closed contact 250*a* as previously stated. As a consequence of the negative voltage applied to its reset side, flip-flop 273 is activated to the reset state. Returning to gate 272 whose output is now a negative voltage, as previously noted, this voltage applied through send message cable driver 274 and closed relay contact 274*a* appears on send message lead 275 to the No. 1** data terminal.

As the ground output of inverter 185 in FIG. 29 is now applied to send message gate 276, this gate provides in its output a negative voltage. This is so for the reason that the output of the 0-side of message sent flip-flop 277 is ground since the latter flip-flop is in the reset state. This state obtains at the moment because the No. 1 data terminal has not yet transmitted the message sent signal which is a negative voltage effective via lead **277*b* in a manner that is mentioned below. The negative output of gate 276 via lead 184*a* activates receive driver flip-flop 184 in FIG. 31 and transmit driver flip-flop 278 in FIG. 28 to the reset state. The latter flip-flop is set because ground is received from the output of inverter 415*f*. When flip-flop 278 is set, the output of its 1-side provides ground which completes an operating circuit for relay 278*b*. This relay operates to close its associated contact 278*c* in FIG. 23 to supply ground for completing the operating circuit for each of four transmit driver relays represented by relays 279*a* through 279*m***.

In operating, relay **279*a* closes its contact 279 thereby supplying ground to complete the operating paths for transmit send relay 280 and 10 transmit relays 280*a***, causing them to operate. Here, the term *a* represents the integer 10 so that the group of relays **280*a* comprises 10 in number, each relay including 6 contacts. When operated, a first relay, for example, of the group of 10 relays 280*a* closes its contacts 280*b* and 280*c* representing 6 contacts thereby connecting a source of negative voltage and ground to three pairs of leads represented by leads 161*a* and 161*b*, respectively, upon the closure of another contact that is later mentioned. In a similar manner each of the nine remaining operated relays of the relay group 280*a* closes its 6 contacts represented by contacts 280*d* and 280*e* which, together with another closed contact to be later identified, apply a source of negative voltage and ground to each of the 27 remaining pairs of leads represented by the pair of leads 161*c* and 161*d***.

The closure of contact **278*c* as just mentioned also supplies ground to two relays, intermediate relays 279*a* and 279*m*, but not shown, whereby such intermediate relays are operated to close the individual contacts associated therewith and equivalent to contact 279 of relay 279*a*. The closed contact of each of the two intermediate relays supplies ground to complete the operating paths or of a group of 10 relays, each including 6 contacts and identical with each of the 10 relays in the relay group 280*a*. Thus, the two intermediate groups of 10 relays provide 60 pairs of closed contacts, each pair corresponding with each of the contact pairs 280*b* and 280*c* or 280*d* and 280*e*. Each pair of the 60 intermediate contact pairs, together with a closed contact to be later identified, serves to control the connection of a source of negative voltage and ground to the respective pairs of the 60 intermediate lead pairs, not shown but equivalent to each of the conductor pairs represented by the 30 conductor pairs 161*a* and 161*b* or 161*c* and 161*d***. Thus, the 60 intermediate lead pairs, not shown but equivalent tact pairs in FIG. 23 correspond with the 60 intermediate pairs of leads and associated contact pairs in FIG. 16.

In addition the operation of relay **279*m* in FIG. 23 and the closure of its associated contact 279*b* supply ground to the operating paths of the 10 relays in the group 280*n*, each relay including 6 contacts, whereby these relays are operated to close their 30 associated contact pairs represented by contact pairs 280*f* and 280*g* or 280*h* and 280*i*, respectively. Each of the 30 closed contact pairs, together with a closed contact to be hereinafter identified, controls the connection of a source of negative voltage and ground to the respective leads of the 30 pairs of leads represented by lead pairs 161*e* and 161*f* and 161*g* and 161*h*. The 30 contact pairs 280*f* and 280*g* through 280*h* and 280*i* correspond with the similar contact pairs 158*e* and 158*f* through 158*g* and 158*h* in FIG. 16. Thus, the operation of the four relays 279*a* through 279*m* and of the 40 relays 280*a* through 280*n*** control the transmission of the respective bits of the 120-bit message via the 120 pairs of leads 161*a* and 161*b* through 161*g* and 161*h* and the 120 line relays 191 through 191*c* from the No. 1 data terminal to the main data terminal in a manner that is further explained hereinafter.

Flip-flop 184 in FIG. 31 is activated to the set state when the negative voltage on lead 184*a* in the output of gate 276 in FIG. 29 is supplied to the set side of the flip-flop while ground is also supplied thereto from the output of gate 182 at the same time. This ground is due to the fact that since the main data terminal is not transmitting a message at this time, relay 172 in FIG. 26 is de-energized and its associated contact 172*b* is open. As a consequence, a negative voltage provided via voltage divider 172*e* is supplied to the input of gate 182 which is thereby activated to produce the aforenoted ground input to the set side of flip-flop 184. When set, this flip-flop provides in the output of its 1-side ground which completes the operating path for relay 187, thereby causing this relay to operate and close its contact 187*a* in FIG. 24 for completing an operating path to ground for two relays 188 and 188*b*. The operation of relay 188 closes its associated contact 188*a* which completes operating paths to ground from a source of positive voltage for relay 175 and a group of 10 relays 189, each including 6 contacts for a purpose that is later mentioned. Similarly, relay 188*b* operates to close its associated contact 188*c* to provide ground for operating an additional 10 relays 188*d*, also including 6 contacts for the last-mentioned purpose. The first relay of the ten in the group 189 operates to close its associated contact 190 in FIG. 23 while the remaining 5 contacts of the first relay close 5 additional and similar contacts associated with the 30 line relays 190 through 190*a*. Thus, 30 of the 60 closed contacts of the ten relays in the relay group 189 closes all of the 30 contacts 190 through 190*a* associated with the 30 L1 through L30 line relays 191 through 191*a*. The remaining 30 closed contacts of the relay group 189 are associated with the first 30 line relays included in the 60 intermediate line relays L31–L90 in FIG. 23. Finally, the first 30 closed contacts of the ten relays in the relay group 188*d* are associated with the second 30 line relays included in the 60 intermediate line relays L31–L90 while the remaining 30 closed contacts of the relay group 188*d* close the 30 contacts 190*b* through 190*c* associated with the 30 L91–L120 line relays 191*b* through 191*c* in FIG. 23.

Figure 30:
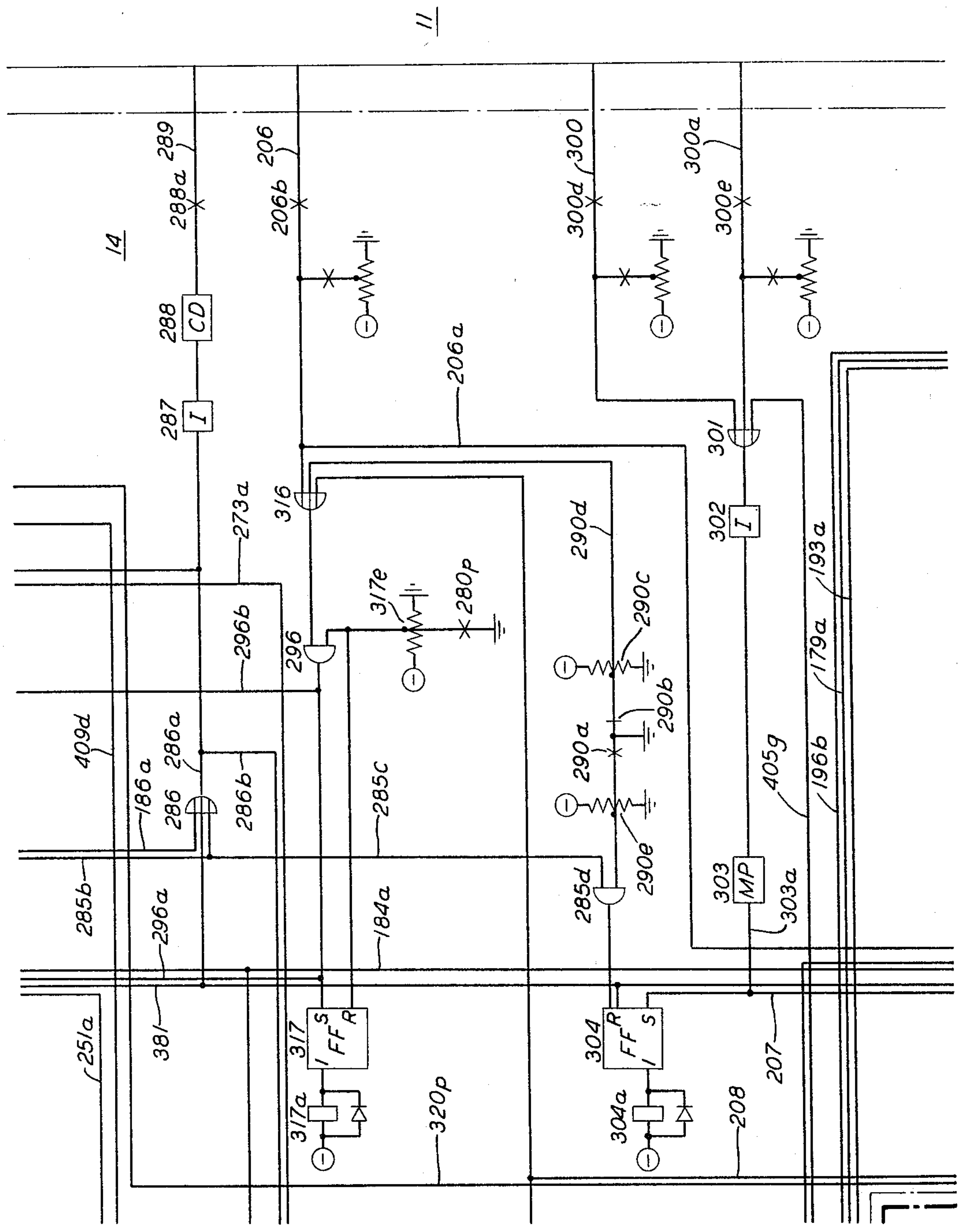

It is recalled from the foregoing that when flip-flop 186 in FIG. 29 was set, the output of its 0-side provided a negative voltage which was supplied on lead 284 to the set side of instruction received flip-flop 285 in FIG. 28, thereby activating it to the set state. Now, the output from the 1-side of flip-flop 285 provides ground which is applied to the input of monopulser 320 for a purpose that is later explained. At the same time the output from the 0-side of flip-flop 285 on lead 285*b* is a negative voltage which is changed in the output of NOT–OR gate 286 to ground on its output lead 286*a*. This ground is changed in the output of inverter 287 to a negative voltage which is applied via cable driver 288 and closed send message contact 288*a* to instructions received lead 289. The negative voltage in the output of the 0-side of flip-flop 285 effective on leads 285*b* and 285*c* is also applied to a first input of AND-NOT gate 285*d* in FIG. 30 which is now further activated to change its output at this time. This is so for the reason that since received message ready relay 290 in FIG. 26 is released, its associated contact 290*a* in FIG. 30 is open whereupon voltage divider 290*e* also applies a negative voltage to the other input of gate 285*d*. This gate is therefore being supplied with two simultaneous inputs of negative voltage and is thereby activated to continue the ground in its output.

When the output of the 0-side of flip-flop 186 in FIG. 29 in the set state provided a negative voltage, this was changed in the output of inverter 185 to ground which is applied to the input of message sent acknowledgement gate 185*b* thereby causing the latter to supply in its output a negative voltage. At this time, the other input to this gate is ground which is still effective on message sent lead 277*b* as just mentioned. The negative voltage in the output of gate 185*b* is simultaneously applied to the inputs of operate input gate inverters 185*c*, 185*d*, 185*e*, and 185*f*. The output of inverter 185*c* provides ground which appears on lead 185*g* and which is simultaneously supplied as a first input to each of 30 of 120 input gates represented by gates 185*h* through 185*i*. The outputs of inverters 185*d* and 185*e* also provide ground which is supplied via leads 185*n* and 185*p* to the inputs of 60 intermediate gates, that is, the 31 through 90 gates, of the 120 input gates. The output of inverter 185*f* also provides ground which is applied via lead 185*s* to the first inputs of the 30 remaining gates 185*k* through 185*m* of the 120 input gates. It is noted that 30 leads 291 through 291*a* extending from the No. 1 data terminal are connected to the second inputs of the 30 gates 185*h* through 185*i* for transmitting the 1 through 30 bits of the 120-bit message to be transferred; 60 leads 291*b* through 291*c* extending from the No. 1 data terminal are connected to the second inputs of the 60 intermediate gates for transmitting the 31 through 90 bits of the 120-bit message just mentioned; and 30 leads 291*d* through 291*e* extending from the No. 1 data terminal are connected to the second inputs of the final 30 gates 185*k* through 185*m* for transmitting the 91 through 120 bits of the last-mentioned 120-bit message, in the manner that is subsequently explained. When ground is supplied to the second inputs of the respective gates, together with ground to the first inputs thereof, then such gates are activated to provide negative voltage in their outputs. On the other hand, when negative voltage is supplied to the second inputs of the respective gates, together with ground to the first inputs thereof, then such gates are not activated but are enabled to continue to provide ground in their outputs. As previously mentioned, the message to be transferred comprises 120 "0" and/or "1" bits transmitted simultaneously in parallel on the 120 discrete leads represented by the 120 leads 291, 291*a*, 291*b*, 291*c*, 291*d* and 291*e* extending between the No. 1 data terminal and the corresponding 120 gates 185*h* through 185*m* as just mentioned.

The outputs of the 30 gates 185*h* through 185*i* are connected to the set sides of 30 associated DR1 through DR30 flip-flops 292 through 292*a* which have the outputs of their 1-sides connected to the operating windings of 30 associated relays 293 through 293*a*. The outputs of the 60 intermediate gates are connected to the set sides of 60 associated DR31–DR90 flip-flops, not shown which have the outputs of their 1-sides connected to the operating windings of 60 associated relays, not shown. The outputs of the 30 gates 185*k* through 185*m* are connected to the set sides of DR91–DR120 flip-flops 292*b* through 292*c* which have the outputs of their 1-sides connected to the operating windings of the 30 associated relays 293*b* through 293*c*. The operating windings of the 120 relays are shunted by diodes which serve as current surge protection devices for the flip-flops 292, 292*a*, etc. Thus, the 120 bits transmitted on the 120 leads represented by the leads 291, 291*a*, 291*b*, 291*c*, 291*d* and 291*e* control the activation of the 120 RD1–DR120 data register flip-flops represented by the flip-flops 292–292*a*, the intermediate flip-flops, and the flip-flops 292*b*–292*c*. These in turn control the operation of the 120 associated data register relays represented by relays 293–293*a*, the intermediate relays, and relays 293*b*–293*c*.

Figure 27:
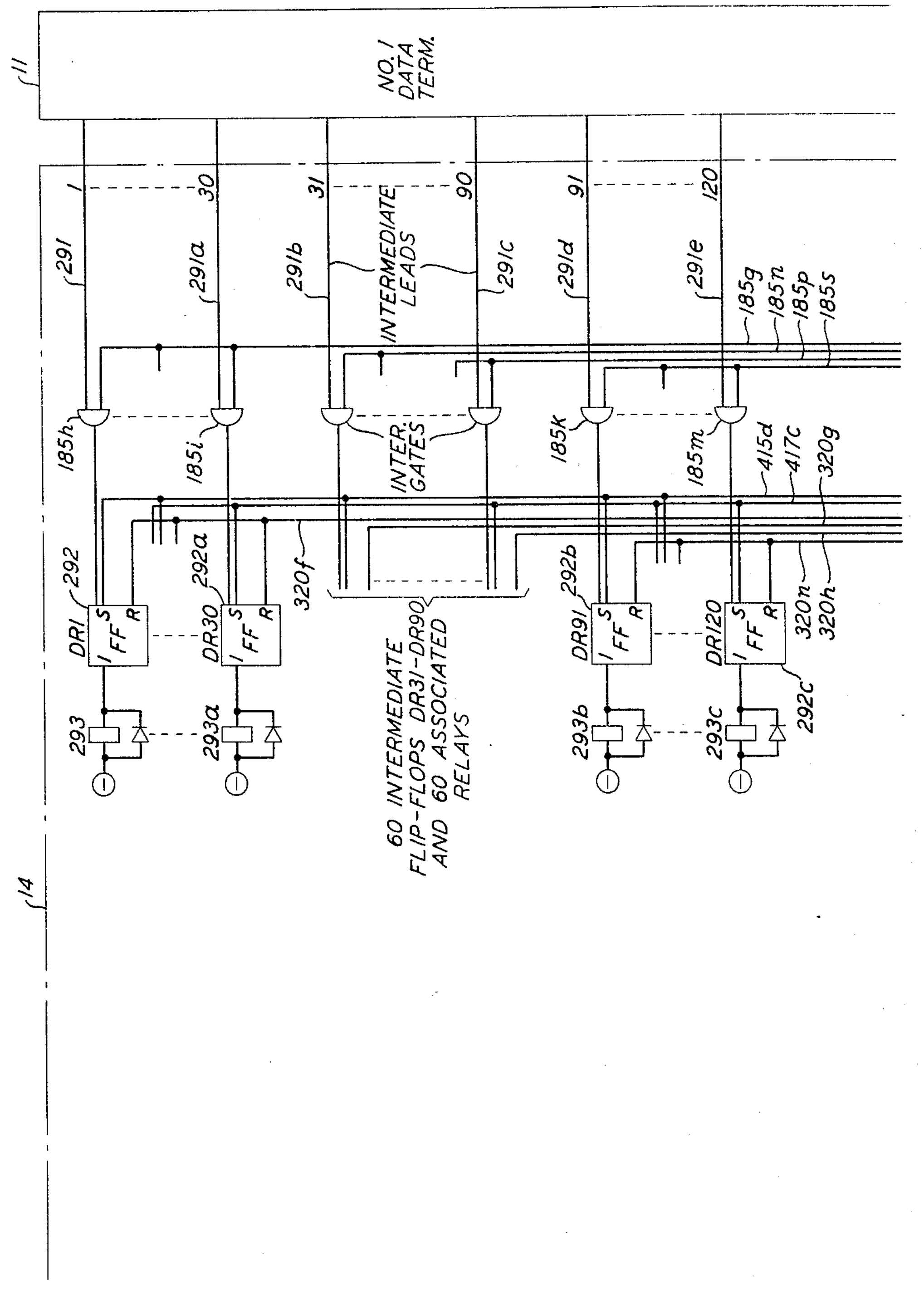

If a given data bit "1," for example, were to be transferred from No. 1 data terminal via channel A to the main data terminal, then the corresponding signal on lead 291 in FIG. 27 is ground which is applied to the input of gate 185*h* together with ground on lead 185*g*. This gate is thereby activated to provide in its output a negative voltage which is applied to the set side of DR1 flip-flop 292 to set it. On the other hand, if a given data bit "0," for example, were to be transferred from the No. 1 data terminal via channel A to the main data terminal, the corresponding signal on lead 291 is a negative voltage. Now, negative voltage and ground are simultaneously applied to the two inputs of gate **185*h* which remains in status quo of its ground output and its associated flip-flop 292 remains in the reset state. In the set state, in response to the transfer of "1" bit, flip-flop 292 provides in the output of its 1-side ground which completes the operating circuit for relay 293. This relay operates to close its associated contact 293*d* in FIG. 23. When flip-flop 292 remained in the reset state in response to the transfer of a "0" bit, the output of its 1-side provided a negative voltage which does not complete the operating path of relay 293 whereby the latter remains in the released state and its associated contact 293*d*** remains open.

In a similar manner, the remaining 29 relays of the 30 relays 293 through **293*a* are operated or nonoperated to close or fail to close the remaining 29 associated contacts of the 30 contacts 293*d* through 293*e* in FIG. 23; the "1" and/or "0" bits constituting the 31 through 90 bits of of the 120-bit message and transmitted on the 60 intermediate leads 291*b* through 291*c* in FIG. 27, together with the ground outputs of inverters 185*d* and 185*e* in FIG. 28, control the activation of the 60 intermediate gates and corresponding flip-flops DR31 through DR90 and thereby the operation or nonoperation of the 60 associated relays, not shown, and contacts in FIG. 23; and the "1" and/or "0" bits constituting the 91 through 120 bits of the 120-bit message and transmitted on the 30 leads represented by leads 291*d* through 291*e* in FIG. 27, together with ground in the output of inverter 185*f* in FIG. 28, control the activation of the 30 gates represented by gates 185*k* through 185*m* and corresponding DR91 through DR120 flip-flops represented by the flip-flops 292*b* through 292*c* and thereby the operation of the associated 30 relays represented by the 30 relays 293*b* through 293*c* and 30 contacts represented by the 30 contacts 293*f* through 293*g* in FIG. 23. The closure or nonclosure of discrete contacts of 120 contacts comprising the 30 contacts 293*d* through 293*e*, the 60 intermediate contacts, and the 30 contacts 293*f* through 293*g* in FIG. 23 determines the completion of the operating paths of the corresponding discrete relays of the 120 L1 through L120 line relays comprising 30 L1 through L30 line relays 191 through 191*a*, the 60 L31 through L90 intermediate relays, and the 30 L91 through L120 line relays 191*b* through 191*c***.

Assuming contacts 190, **280*b*, 280*c* and 293*d* associated with the L1 relay 191 in FIG. 23 are closed, this contact closure completes an operating path from a source of negative voltage to ground for the relay which is thereby operated. This connects the voltage source and ground to leads 161*a* and 161*b*, respectively, for a purpose that is later mentioned. On the other hand, assuming any one or more of the contacts associated with the L1 relay 191 is opened, this fails to complete the operating path for the relay which remains in the released condition. This serves to remove the voltage source and ground from the leads 161*a* and 161*b*. In a similar manner, the L2 through L120 line relays are operated or nonoperated for supplying the voltage source and ground to the associated leads 161*c* and 161*d*, the intermediate leads, and the leads 161*e* and 161*f* and 161*g* and 161*h***, or withholding them therefrom. Thus, each of the operated line relays serves to transmit a "1" bit while each of de-energized line relays serves to transmit a "0" bit. That is to say, a "1" bit transmitted on a pair of leads is represented by the removal of current therefrom while a "0" bit transmitted on a pair of leads is represented by no change in the transmission of the current thereon.

*Message sent signal from No. 1 data terminal to interface*

Within a predetermined period of time say, for example, 600 microseconds for the purpose of the instant description, after a send message signal is transmitted from the interface to the No. 1 data terminal, a message sent signal is transmitted via lead **277*b* and closed relay contact 277*d* in FIG. 29 from the No. 1 data terminal to the interface and thereby to the main data terminal. This message sent signal comprises on lead 277*b* a negative voltage which is applied to the set side of message sent flip-flop 277 which is thereby activated to the set state and to the reset side of clock activate flip-flop 252 which is thereby activated to the reset state. This flip-flop is reset because the have message signal effective on lead 250 via closed contact 250*a* and transmitted from the No. 1 data terminal is ground which is applied to the set side of flip-flop 252. In the reset state flip-flop 252 supplies a negative voltage from the output of its 1-side to the operating winding of relay 252*a* which is thereupon de-energized to open its contact 252*b* for removing ground from its associated lead 256 in FIG. 26. Thus, associated No. 1 terminal clock activate lead 256 is interrupted in the transmission of the activating voltage from the No. 1 data terminal to relay 256*a*** in FIG. 19 whereupon this relay and associated circuit are restored to normal.

When flip-flop 277 in FIG. 29 was set as just mentioned, the output of its 0-side provides a negative voltage which is applied to the reset side of transmit message flip-flop 251. This is thereby activated to the reset state so that the output of its 1-side is a negative voltage which serves to de-energize the operating winding of its associated relay **251*b*. This relay returns to the released condition to open its contact 251*c* thereby removing the source of negative voltage from its associated lead 254 in FIG. 25. This interrupts the energizing voltage for relay 257 in FIG. 18 thereby discontinuing the have message signal sent from the No. 1 data terminal. This relay and its associated circuit are thereupon restored to normal. Referring now to FIG. 18, the release of relay 257 opens its contact 257*a* in FIG. 11 thereby enabling voltage divider 257*b* to apply a negative voltage to have message gate 138. This does not affect the output of the gate for the reason that the output of the 0-side of busy idle flip-flop 140 supplies ground via leads 140*a* and 140*b* to gate 138**.

When the output of the 0-side of flip-flop 277 in FIG. 29 provides negative voltage, this is applied to the input of gate 276 whose output is thereupon changed to ground. This is so for the reason that the other input to gate 276 is ground received from the output of inverter 185 whose input is receiving a negative voltage from the output of flip-flop 186 which is now in the set state.

The message sent signal of negative voltage effective on lead **277*b* in FIG. 29 as above mentioned and applied to the input of gate 185*b* is changed in the output thereof to ground because, as above stated, the output of inverter 185 is ground at this time. Now, the output of gate 185*b* provides ground which is simultaneously applied to the inputs of inverters 185*c*, 185*d*, 185*e* and 185*f* in FIG. 28 and changed in the outputs thereof to a negative voltage. This voltage appearing on leads 185*g*, 185*n*, 185*p* and 185*s* in FIG. 27 is applied to one input of each of the 120 gates represented by the 30 gates 185*h* through 185*i*, the 60 intermediate gates, and the 30 gates 185*k* through 185*m* in FIG. 27, together with ground applied to a second input of each of the 120 gates via the 120 leads represented by the 30 leads 291 through 291*a*, the 60 intermediate leads, and the 30 leads 291*d* through 291*e*. These voltage and ground inputs activate all gates to provide grounds in their outputs. These grounds effective at the set sides of the 120 data registers 292 through 292*c* as above identified replace the negative voltage theretofore thereon whereby these registers are permitted to return to the reset state in which outputs of their 1-sides provide negative voltage. This voltage serves to interrupt the operating paths for all of the 120 associated relays 293 through 293*c* that were operated thereby opening such of the 120 contacts 293***d* through 293*g* in FIG. 23 that are associated therewith. This opens the previously traced operating paths for those of the 120 line relays 191 through 191*c* that were operated. At this time, all 120 line relays in FIG. 23 are in the released state.

When relay 280 operated in response to the closing of contact 279 associated with relay 279*a* in FIG. 23 as previously mentioned, a first contact 280*m* of relay 280 is closed to supply ground to an operating path for relay 295 which is a slow operate type as shown in FIG. 29. This ground is also supplied via a second closed contact 280*p* of relay 280 to discard message AND-NOT gate 296 in FIG. 30. When relay 295 is eventually operated to open its break contact 295*a*, a negative voltage provided by voltage divider 295*b* is simultaneously supplied to AND-NOT gate 295*c* and the set side of flip-flop 273. This flip-flop is thereby activated to the set state to provide in the output of its 1-side a ground which, together with the ground on lead 286*a* from the output of gate 286, stimulates OK to check driver AND-NOT gate 297 to provide in its output a negative voltage. This voltage passed through cable driver 298 and closed contact 298*a* appears on lead 298*b* extending into the No. 1 data terminal. This negative voltage informs the No. 1 data terminal that the message sent therefrom to the main data terminal as just described is returned for the purpose of checking.

At this time, the No. 1 data terminal has the choice of completing the transmission of the message to the main data terminal or terminating the transmission thereof.

*Completion of data transmission from the No. 1 data terminal to the main data terminal*

Referring now to FIG. 30, a negative voltage effective on lead 300 indicates the No. 1 data terminal is ready to transmit a message to the main data terminal. This voltage is applied via closed relay contact 300*d* to transmit message NOT-OR gate 301 which produces in its output a ground voltage which is supplied to transmit message inverter 302 whose output is thereupon caused to include a negative voltage. This voltage is then applied to transmit message monopulser 303 which produces in its output a 5-microsecond negative voltage. This voltage effective via leads 303*a* and 207 and applied to the reset side of flip-flop 184 in FIG. 31 serves to activate it to the reset state, and applied directly via lead 303*a* to the set side of transmit message flip-flop 304 in FIG. 30 serves to stimulate it to the set state. The resetting of flip-flop 184 effects a negative voltage in the output of its 1-side to interrupt the previously mentioned operating path for relay 187 which thereupon releases. This relay opens its contact 187*a* in FIG. 24 which then interrupts the previously mentioned operating paths for 20 relays 188 and 188*b* whereupon these relays are released. Released relay 188 opens its contact 188*a* to interrupt the previously mentioned operating paths for relays 175 and 189. Released relays 188*b* open its contact 188*c* to interrupt the previously traced operating paths for relays 188*d* which then release.

The released relays 188*d* and 189 open their respectively associated 120 contacts 190 through 190*c* as above noted in FIG. 23 to interrupt the previously traced operating paths for the 120 L1 through L120 line relays 191 through 191*c* which thereupon release. As released, these relays transmit no useful information to the No. 1 data terminal. Flip-flop 304 in FIG. 30 in the set state at the moment provides ground in the output of its 1-side to complete an operating path for transmit message relay 304*a*. This relay then transmits via its closed contact 304*b* in FIG. 25 a negative voltage on transmit message lead 304*c* to complete an operating path for relay 265 in FIG. 18. This relay operates to close its associated contact 265*a* in FIG. 14 whereby ground is simultaneously supplied to acknowledgment NOT-OR gate 263, send message AND-NOT gate 305, and message sent gate 306.

Figure 8A:
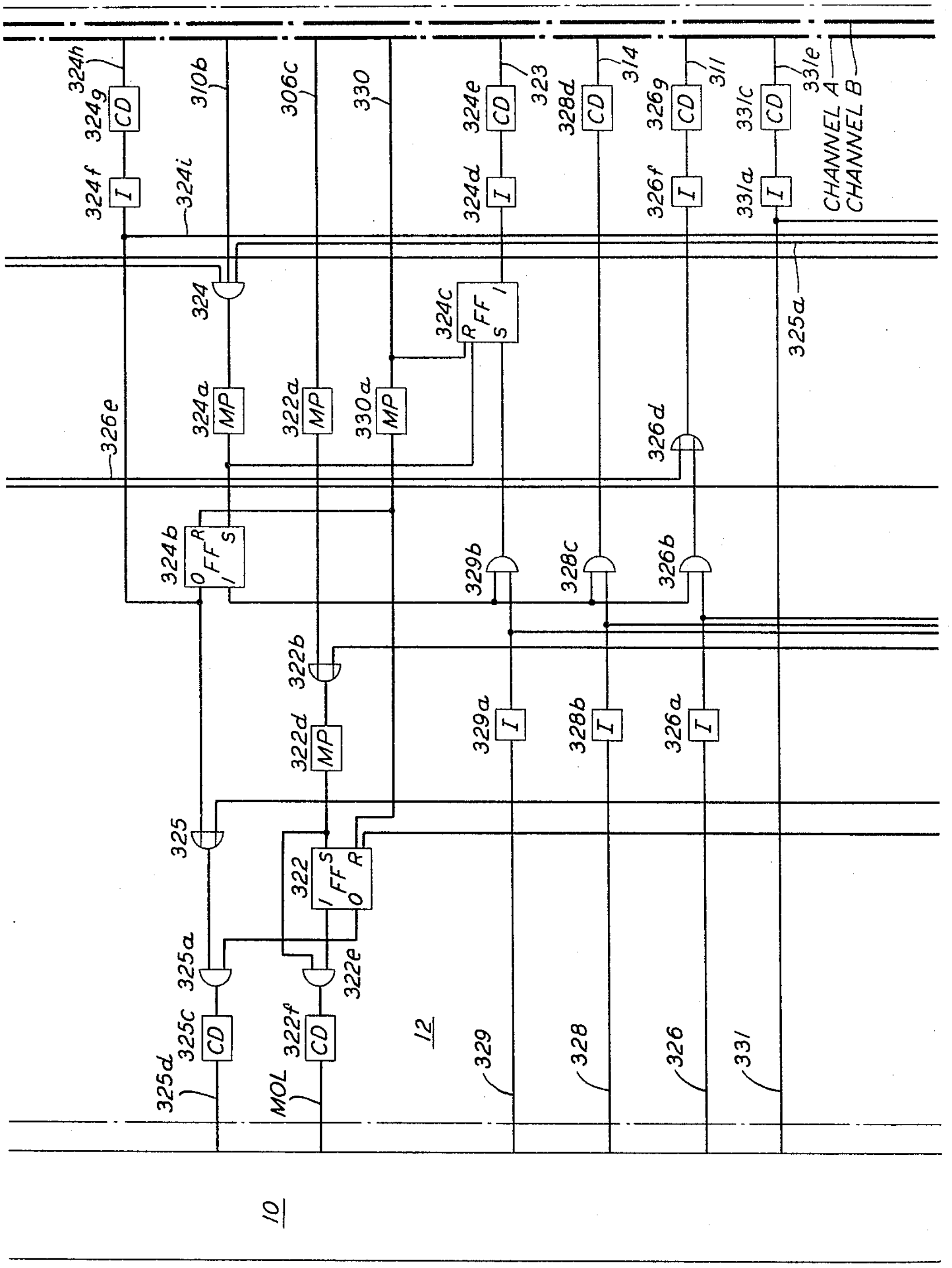
Figure 14:
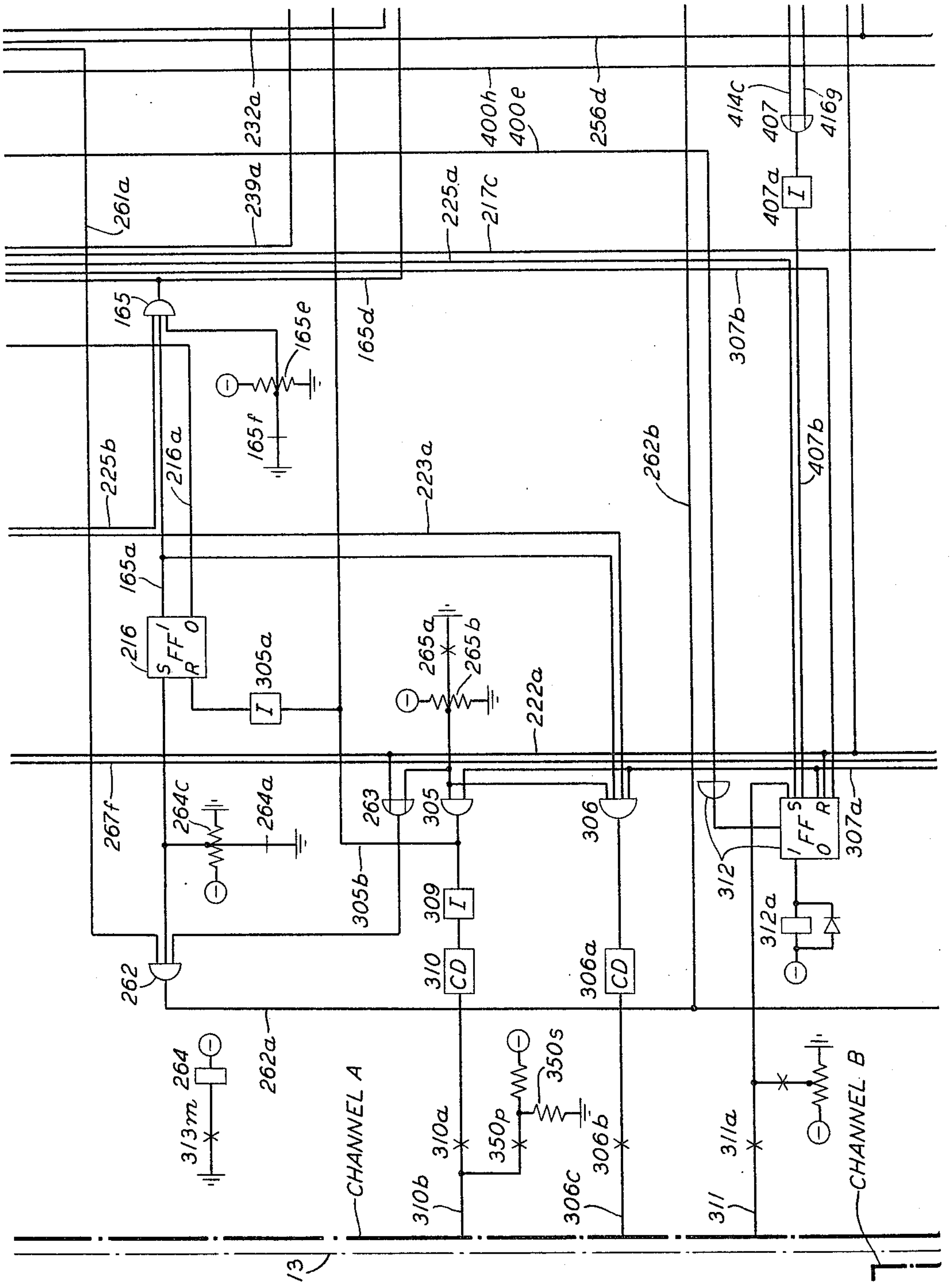
Figure 15:
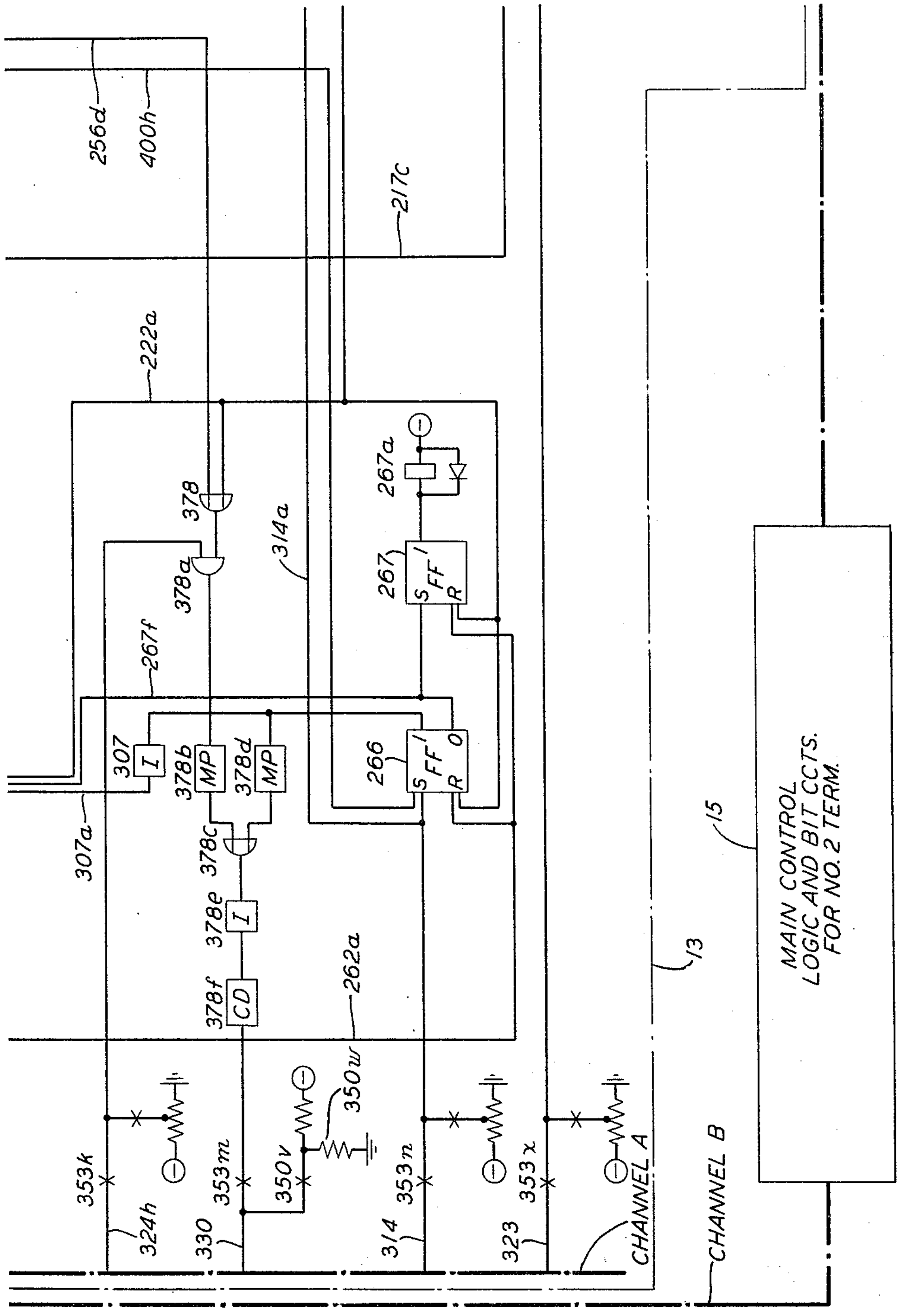

Gate 305 is also being concurrently supplied via lead 307*a* with ground from the output of acknowledgment inverter 307 in FIG. 15 whose input is now being supplied with a negative voltage from the output of the 1-side of acknowledgment flip-flop 266 in FIG. 15 resting in the set state at the moment. This flip-flop was set during the transmission of the last message from the No. 1 data terminal to the main data terminal. As a consequence of these two concurrent ground inputs, gate 305 produces in its output a negative voltage which is transmitted to send message inverter 309 whose output of ground is supplied via send message cable driver 310 and closed relay contact 310*a* to have message lead 310*b*. This ground signal is supplied to the interface shown in FIG. 8A to inform the main data terminal that a message is awaiting transfer thereto from the No. 1 data terminal. As indicated in FIG. 8A, the interface in response to a proper command signal that is later identified provides a negative voltage on lead 311. This voltage is applied via lead 311 and closed contact 311*a* to the set side of receive driver flip-flop 312 shown in FIGS. 5L and 14 which is thereby set.

Flip-flop 312 in the set state supplies ground from the output of its 1-side to complete the operating path for receive driver relay 312*a* which is thereupon operated. This relay closes its contact 312*b* in FIG. 17 whereby ground is supplied to complete the operating paths for relays 313 and 313*a*. Relay 313 closes its contact 313*e* to supply ground for completing the operating paths for relay 313*f* and 313*g*, the latter comprising a group of 10 relays. Relay 313*a* closes its associated contact 313*h* to ground for completing operating path for relay 313*m* which comprises another group of 10 relays. Each of the relays in the respective groups 313*g* and 313*m* includes 6 contacts. The relays 312*a*, 313, 313*a*, 313*f*, 313*g* and 313*m* correspond with the relays 187, 188, 188*b*, 175, 189 and 188*d*, respectively, shown in FIGS. 31 and 24 and discussed hereinbefore. Five of the relays in the group of 10 relays 313*g* close their 30 contacts represented by the contacts 313*n* through 313*p* to 30 L1 through L30 line relays represented by relays 321 through 321*a* in FIG. 16; five remaining relays of the group of 10 relays 313*g* and five relays of the group of 10 relays 313*m* close their 60 contacts to 60 L31 through L90 line relays, not shown, in FIG. 16; and the remaining five relays of the group of 10 relays 313*m* close their 30 contacts represented by contacts 313*r* through 313*s* to 30 L91 through L120 represented by relays 321*b* through 321*c* in FIG. 16. In regard to the 120 line relays L1 through L120 represented by relays 321 through 321*c* in FIG. 16, it is recalled from the previous explanation that a source of negative voltage and ground is now connected at the No. 1 control logic terminal to the 120 pairs of leads represented by leads 161*a*, 161*b*, 161*c*, 161*d*, the 60 pairs of intermediate leads, and the leads 161*e*, 161*f*, 161*g* and 161*h* in FIG. 16, whereby the last-mentioned 120 line relays are operated.

Each of the 120 L1 through L120 line relays in FIG. 16 in the operated condition opens its break contact and closes its make contact included in 120 pairs of such contacts represented by break contact 313*w* and make contact 313*v* in FIG. 10. These contact openings and closures apply ground to each of 120 line leads represented by lead 313*x*. Each of these leads includes an outgoing gate relay contact 313*j* which is closed at this time for the reason that the associated relays are always closed when the overall system is in an operative condition as will be hereinafter explained. Thus, the contacts 313*j* and 313*v* are closed in each of the 120 line leads whereby ground is applied thereto. In connection with the 120 L1 through L120 line relays represented by line relays 321 through 321*c* in FIG. 16, it is understood that only those line relays transmitting a "1" bit are operated to transmit the ground just mentioned while the remainder of the line relays are unoperated for interrupting the ground to transmit a "0" bit.

Figure 17:
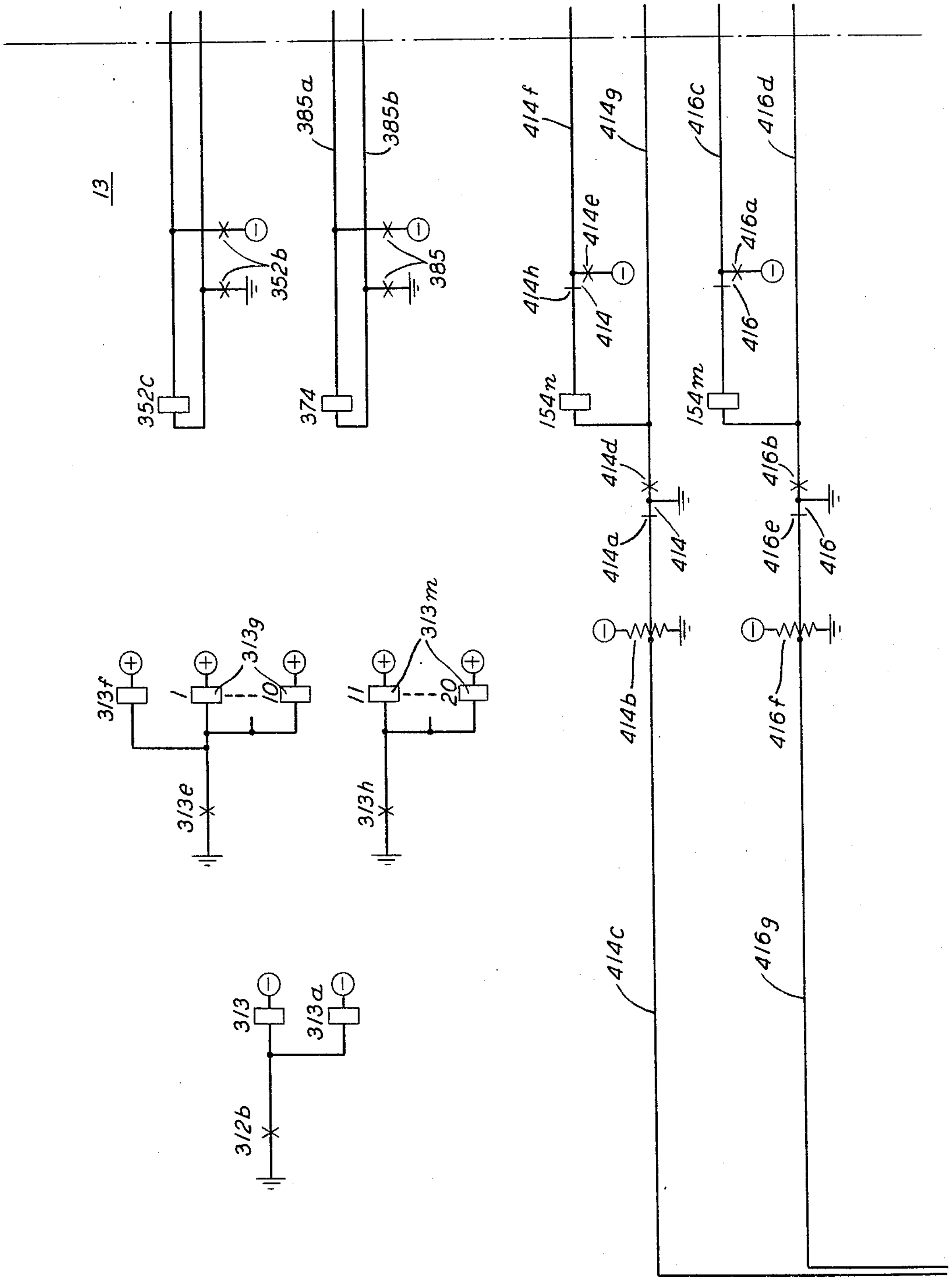

When relay 313*f* in FIG. 17 operated, it closed its contact 313*m* in FIG. 14 to complete an operating path for slow operate relay 264 which operates to open its contact 264*a* whereby a negative voltage provided by voltage divider 264*c* is simultaneously applied to the set side of flip-flop 216 thereby activating it to the set state and to one input of gate 262. This flip-flop in the set state provides in the output of its 1-side ground which is applied to one input of gate 306 whose second input is being supplied with another ground signal via closed relay contact 265*a* as hereinbefore mentioned. The third input to gate 306 is ground received via lead 307*a* from the output of inverter 307 in FIG. 15 which received a negative voltage from the output of the 1-side of flip-flop 266 in FIG. 15 for indicating a proper termination upon the completion of the next-preceding message transmission in the same direction as that of the instant message transfer, that is, in the direction from the No. 1 data terminal to the main data terminal for a reason that will be pointed out hereinafter. Ground is also effective on lead 223*a* from the output of the 0-side of flip-flop 227 in FIG. 13 which is now in the reset state. As all four inputs to gate 306 in FIG. 14 are simultaneous ground, this gate provides in its output a negative voltage which is transmitted through message sent cable driver 306*a* and closed contact 306*b* to lead 306*c*. This negative voltage transmitted on lead 306*c* to the interface in FIG. 8A stimulates the interface to return on message received lead 314 in FIG. 8A in a manner that is subsequently described. This negative voltage effective on lead 314 in FIG 15 and applied via closed contact 353*n* to the input of the 1-side of flip-flop 266 stimulates the latter to the set state. This flip-flop then provides a ground in the output of its 1-side and negative voltage in the output of its 0-side. This ground is changed in the output of inverter 307 to a negative voltage which is applied on lead 307*a* as an inhibit to gates 305 and 306 in FIG. 14 so that the outputs of both latter gates provide ground. At the same time the negative voltage in the output of inverter 307 transmitted via lead 307*a* and applied to the reset side of flip-flop 312 in FIG. 14 which is also receiving ground on leads 222*a* and 307*b*. This flip-flop is activated to the reset state so that its 1-side output provides a negative voltage to interrupt the operating path for relay 312*a* whereupon this relay 312*a* releases to open its contact 312*b* in FIG. 17. This removes ground from the operating paths of relays 313 and 313*a* whereupon these relays release to open their contacts 313*e* and 313*h* to interrupt the operating paths for relays 313*f*, 313*g* and 313*m*. Relays 313*g* and 313*m* release to open their associated contacts 313*n* through 313*s* in FIG. 16 as previously identified for interrupting the above-traced operating paths for the 120 L1 through L120 line relays 321 through 321*c* as previously mentioned. These relays release to open their contacts 313*v* and to close their contacts 313*w* for restoring the 120 outgoing lines 313*x* in FIG. 10 to the idle state.

The negative voltage in the output of the 0-side of flip-flop 266 in FIG. 15 as aforementioned is applied to the set side of flip-flop 267 thereby activating it to the set state. Now, the output of the 1-side of this flip-flop provides a ground to complete an operating path for relay 267*a* which, on operating, closes its contact 267*b* in FIG. 19 which provides a negative voltage on lead 315 to complete an operating path for relay 290 in FIG. 26. This relay operates to open its contact 290*b* in FIG. 30 thereby supplying a negative voltage effected by voltage divider 290*c* to one input of discard message NOT-OR gate 316. The discard message input on lead 206 and closed contact 206*b* is ground because a discard message signal is not presently originated at the No. 1 data terminal at this time. As a consequence, gate 316 provides in its output a ground which is supplied to one input of gate 296, together with a second ground input which is also being supplied thereto via closed contact 280*p* of relay 280 in FIG. 23 which is now operated as previously mentioned. As the two inputs to gate 296 in FIG. 30 are ground, the output of this gate provides a negative voltage which is applied (1) to the input of the set side of transmit discard message flip-flop 317 thereby activating it to the set state, (2) via lead 296*a* to the reset side of flip-flop 278 in FIG. 28 for resetting it as ground is on lead 381 for the reason that the system is not being automatically cleared in a manner to be mentioned later, and (3) on lead 296*b* to the set side of discard message flip-flop 318 in FIG. 29 for setting it.

Flip-flop 278 in FIG. 28 in the reset state providing a negative voltage in the output of its 1-side interrupts the operating path for relay 278*b* which thereupon opens its contact 278*c* in FIG. 23 thereby interrupting the previously traced operating paths for the relays 279*a* and 279*m* which now release. These released relays in turn open their contact 279, the intermediate contacts and contact 279*b* to interrupt the operating paths for relays 280, 280*a*, the intermediate relays and relay 280*n*. As a consequence, these relay groups open their associated contacts 280*b*, 280*c*, 280*d*, 280*e*, the intermediate contacts and contacts 280*f*, 280*g*, 280*h* and 280*i* to interrupt the negative voltage and ground being theretofore supplied to leads 161*a*, 161*b*, 161*c*, 161*d*, the intermediate leads, and leads 161*e*, 161*f*, 161*g* and 161*h* as previously mentioned. Release of relay 280 opens its contact 280*m* in FIG. 29 which removes ground from the operating path of relay 295 thereby enabling it to release. Ground is provided via the closed contact 295*a* of this relay to the input of the 1-side of flip-flop 273 and one input to gate 295*c*. This ground, together with a second ground input to gate 295*c*, causes the gate to produce in its output a negative voltage which is supplied on lead 295*f* to the input of the reset side of flip-flop 285 in FIG. 28 which is thereby activated to the reset state. Now, the output of the 0-side of this flip-flop includes ground while its 1-side output contains a negative voltage. This ground is supplied on lead 285*b* to one input of gate 286 in FIG. 30 and on leads 285*b* and 285*c* to one input of gate 285*d*.

The ground on lead 285*c* and the ground now being simultaneously supplied via closed contact 290*a* of operated relay 290 in FIG. 26 to gate 285*d* in FIG. 30 stimulate the latter to provide a negative voltage in its output. This voltage applied to the input of the reset side of flip-flop 304 resets it, as ground is on lead 381 since the system is not being manually cleared at this time in a manner to be mentioned later. This flip-flop thereupon provides in the output of its 1-side a negative voltage thereby removing ground from the operating path of relay 304*a*. This releases to open its contact 304*b* to remove the negative voltage from lead 304*c* in FIG. 25 thereby interrupting the previously traced operating path for relay 265 in FIG. 18. This releases to open its contact 265*a* in FIG. 14 thereby enabling a negative voltage provided by voltage divider 265*b* to be applied simultaneously to the inputs of gates 263, 305, and 306. This voltage does not effect any action in gates 305 and 306 at the moment. Gate 263, however, provides in its output a ground which is applied as one input to gate 262. Now, it is recalled that when relay 313*f* in FIG. 17 released as just mentioned it opened its contact 313*m* which interrupted the operating path for relay 264 in FIG. 14. This relay releases to close its contact 264*a* whereby a ground is supplied to the input to the set side of flip-flop 216 and as a second input to gate 262. This gate, for the moment, effects no action therein.

Figure 35:
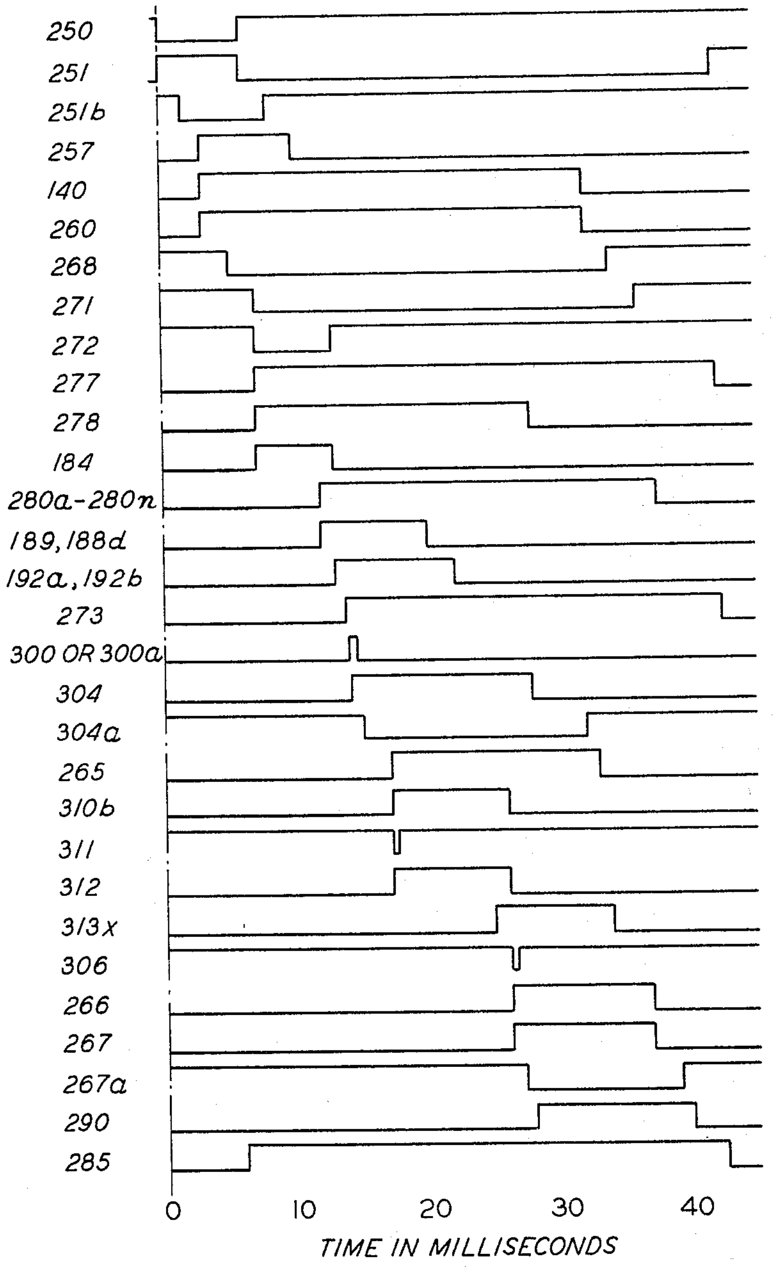

The ground output from gate 305 in FIG. 14 applied via lead 305*b* to the input of inverter 305*a* is changed in the output thereof to a negative voltage which is applied to the input of the reset side of flip-flop 216 which is thereby activated to the reset state. Now, the output of the 0-side of this flip-flop provides via lead 216*a* ground which is applied as one input to gate 166 in FIG. 13 but stimulates no action therein at this time for the reason that the message transfer is not in the direction from the main station to either the No. 1 or No. 2 data station at the moment. The logic sequence time diagrams for the aforedescribed message transfer from the No. 1 data terminal to the main data terminal are shown in FIG. 35.

*Operation to discard message originated at the No. 1 data terminal*

Referring now to FIG. 30 regarding the operation to terminate the transfer of a message originating in the No. 1 data terminal, lead 206 provides a negative voltage which is applied via closed contact 206*b* and on lead 206*a* as one input to the reset side of flip-flop 184 in FIG. 31. Of the remaining inputs to the reset side of this, gate, lead 204*b* includes ground because message transfer from the main data terminal to the No. 1 or No. 2 data terminal is not involved; and lead 207 is at ground for the reason that an actual message transfer from the No. 1 data terminal to the main data terminal is not involved. The negative voltage on lead 206*a* as just mentioned resets flip-flop 184 which thereupon changes the output of its 1-side to a negative voltage thereby interrupting the previously mentioned operating path for relay 187. This relay releases to open its contact 187*a* to interrupt the operating paths for relays 188 and 188*b* which release to open their associated contacts 188*a* and 188*c* for interrupting the operating paths of the relays 189 and 188*d*. These relays are then released to open their 120 contacts 190 to 190*c* comprising the 30 contacts 190 through 190*a*, the 60 intermediate contacts, and the 30 contacts 190*b* through 190*c* in FIG. 23 thereby interrupting the operating paths of the 120 line relays comprising the 30 relays 191 through 191*a*, the 60 intermediate relays, and the 30 relays 191*b* through 191*c* as above discussed.

Referring back to gate 316 which received the negative voltage on lead 206 in FIG. 30 for representing the discard message, it is recalled that lead 290*d* was at ground. As a consequence, gate 316 provides in its output a ground which is supplied to gate 296 which is also being furnished at this time with a ground via closed contact 280*p* in FIG. 30 of operated relay 280 in FIG. 23. These two simultaneous inputs to gate 296 cause it to provide in its output a negative voltage which is applied both to the input of the set side of flip-flop 317 and via lead 296*a* to the input to the 0-side of flip-flop 278 in FIG. 28 whereby flip-flop 317 is set and flip-flop 278 is reset. Reset flip-flop 278 provides a negative voltage in its 1-side output thereby interrupting the previously mentioned operating path of relay 278*b* which is then released. This relay thereupon opens its contact 278*c* in FIG. 23 to interrupt the above-identified operating paths of the relays 279*a* and 279*m* which then open their contacts 279 through 279*b*, including the corresponding contacts of the intermediate relays. These open contacts serve to interrupt the previously mentioned operating paths for relay 280 and the groups of relays represented by relays 280*a*, the intermediate relays and relay 280*n*. These relays are then released to open their 120 pairs of contacts represented by the contact pairs 280*b* and 280*c* through 280*d* and 280*e*, the intermediate contact pairs and the contact pairs 280*f* and 280*g* through 280*h* and 280*i* thereby interrupting the afore-identified operating paths of the 120 line relays represented by the relays 191 through 191*a*, the intermediate relays and the relays 191*b* through 191*c*.

When relay 280 releases, its contact 280*p* in FIG. 30 is opened thereby enabling voltage divider 317*e* to apply a negative voltage to the reset side of flip-flop 317 which is thereupon reset; and at the same time its contact 280*m* in FIG. 29 is opened to interrupt the aforestated operating path of relay 295 which then releases. Now closed contact 295*a* of released relay 295 supplies ground simultaneously to one input of gate 295*c* and to the input to the set aside of flip-flop 273. To gate 295*c* ground is also supplied from the output of the 1-side of flip-flop 318 which is in the set condition as aforestated. As two ground inputs are now currently supplied to gate 295*c*, its output provides a negative voltage via lead 295*f* to the input of the reset side of flip-flop 285 in FIG. 28 which is thereby reset. Now, this flip-flop provides in the output of its 0-side a ground which is furnished via lead 285*b* to one input of gate 286 in FIG 30 and via leads 285*b* and 285*c* to one input of gate 285*d*. At the same time the output of the 1-side of flip-flop 285 effects a negative voltage which is supplied to the input of reset monopulser 320 which is thereupon activated to produce a 5-microsecond negative pulse in its output. This pulse is changed in the output of reset-pulse inverter 320*a* to a 5-microsecond ground pulse.

When the negative pulse in the output of monopulser 320 returns to ground, the output of inverter 320*a* then returns to a negative voltage which triggers reset pulse delay monopulser 320*b* to generate in its output a 5-microsecond negative voltage pulse. In this manner, a 5-microsecond time delay is provided between the time of the initial introduction of the negative voltage into the input of monopulser 320 and the time of the production of the negative pulse in the output of monopulser 320*b*. This negative pulse applied to the input of pulse delay NOT–OR gate 320*c* of a power type shown in FIG. 5B is translated in the output thereof into a 5-microsecond ground pulse. This pulse is changed into a 5-microsecond negative voltage pulse in the output of power inverters 320*d*, 320*e*, 320*i* and 320*m*, each of a type shown in FIG. 5E.

Referring to FIGS. 27 and 28, the 5-microsecond negative voltage pulse in the output of inverter 320*d* is applied via lead 320*f* to the reset sides of 30 DR1 through DR30 data register flip-flops 292 through 292*a* for activating them to the reset state; the 5-microsecond negative voltage pulse in the outputs of inverters 320*e* and 320*i* are applied via leads 320*g* and 320*h* to the reset sides of 60 intermediate DR31 through DR90 data register flip-flops for activating them to the reset state; and the 5-microsecond negative voltage pulse in the output of inverter 320*m* is applied via lead 320*n* to the reset sides of 30 DR91 through DR120 data registers 292*b* through 292*c* for activating them to the reset state. It is apparent that only the data registers theretofore advanced to the set state are reset whereas the data registers theretofore advanced to the reset state are unaffected for the reason that is presently mentioned.

As a consequence, any of the data registers that are reset in the manner just explained provide negative voltages in the outputs of their 1-sides thereby interrupting the operating paths for their 120 associated data register relays comprising the 30 relays represented by the relays 293 through 293*a* (1 through 30), the 60 intermediate relays (31 through 90), not shown, and the 30 relays represented by relays 293*b* through 293*c* (91 through 120). In this connection, it is further understood from the previous explanation that certain of the data registers DR1 through DR120 were placed in the set state to operate their associated relays which thereupon close their contacts in the group of contacts 293*d* through 293*g* as above explained thereby operating corresponding line relays in the group 191 through 191*c* in FIG. 23 for effecting the transmission of a "1" data bit to the main data terminal while the remaining data registers, theretofore in the reset state, remained in the reset state for effecting the transmission of a "0" data bit to the main data terminal. In this way the "1" and "0" bits of the 120 bits of the message are transmitted. That is to say, for the transmission of a "1" bit, for example, flip-flop 292 is operated to the set state wherein the output of its 1-side provides ground which completes an operating path for its associated relay 293 in FIG. 27. When operated, this relay closes its contact 293*d* in FIG. 23 thereby applying a source of negative voltage and ground to its associated leads 161*a* and 161*b* to transmit the "1" bit to the main data terminal. On the other hand, for the transmission of a "0" bit, for example, flip-flop 292 is left in the reset state wherein the output of its 1-side provides a negative voltage which interrupts the operating path for relay 293. In the released state of this relay, its associated contact 293*d* remains open to withhold the source of negative voltage and ground from its associated leads 161*a* and 161*b* to transmit a "0" bit to the main data terminal.

In addition the 5-microsecond negative voltage pulse in the output of inverter 320*d* on lead 320*f* applied to the input of the reset side of flip-flop 277 in FIG. 29 serves to reset it so that its output from the 0-side provides ground for a purpose that will later appear. At the same time, the 5-microsecond negative voltage pulse in the output of inverter 320*e* on lead 320*g* applied to the input of the reset side of flip-flop 318 in FIG. 29 serves to reset it so that the output from its 1-side is now a negative voltage. This voltage applied to one input of gate 295*c* causes it to provide in its output on lead 295*f* a ground which is furnished to the input of the reset side of flip-flop 285 in FIG. 28 which is then allowed to reset to provide a negative voltage in the output of its 1-side and ground in the output of its 0-side. This negative voltage applied on lead 285*b* to gate 286 in FIG. 30 activates it to produce in its output a negative voltage which is supplied via lead 286*a* to the input of gate 297 in FIG. 29 and inverter 287 in FIG. 30. This negative voltage also inhibits gate 297 which provides in its output a ground applied via cable driver 298 and closed relay contact 298*a* to lead 298*b*. The ground on this lead stimulates no action at the moment. The negative voltage applied to inverter 287 is changed in the output thereof to ground which is transmitted via cable driver 288 and closed relay contact 288*a* to instructions received lead 289 for indicating to the No. 1 data terminal that the message has been terminated.

It is recalled now from the previous description that flip-flop 317 in FIG. 30 is now in the set state which provides ground in the output of the 1-side to complete the operating path for its associated transmit discard message relay 317*a* which is thereupon operated. This relay closes its contact 317*b* in FIG. 25 to supply a source of negative voltage to lead 317*c* which completes an operating path for receive discard message relay 317*e* in FIG. 18. This relay operates to open its contact 317*f* in FIG. 11 thereby enabling voltage divider 317*g* to apply a negative voltage to the input of the set side of flip-flop 261 which is thereby set to provide in the output of its 1-side a ground effective on lead 261*a* to gate 262 in FIG. 14 for a purpose that is later mentioned. The output of the 0-side of flip-flop 261 in the set state supplies a negative voltage to discard monopulser 241 which translates it in its output into a 2-microsecond negative voltage pulse which is supplied simultaneously to the inputs on the reset sides of flip-flops 140 and 260 for activating both of them to the reset state.

As reset, flip-flop 260 in FIG. 11 provides a negative voltage in the output of its 1-side thereby interrupting the operating path for relay 268. This relay releases to open its contact 268*a* in FIG. 19 thereby disconnecting the source of negative voltage from lead 269 to interrupt the operating path for relay 271 in FIG. 26 to release it. In releasing relay 271 closes its contact 271*a* in FIG. 29 to provide a ground to the input of the set side of flip-flop 186 which theretofore had a negative voltage supplied to its set side as well as to the input of its reset side whereby a ground voltage was theretofore produced in the output of its 0-side, as previously mentioned. As flip-flop 186 is now reset, the output of its 0-side provides ground which effects no action at the moment. As flip-flop 140 in FIG. 11 is reset for the reason just mentioned, the output to its 0-side is ground at this time because the message transfer is not in the direction from the main data terminal to the No. 1 or No. 2 data terminal. In the reset state, flip-flop 140 indicates an idle condition to the main data terminal by providing (1) a negative voltage from the output of its 1-side to inverter 143 which changes it in its output to ground which is applied via cable driver 144 and closed relay contact 144*a* to lead 76, and (2) a ground from the output of its 0-side on lead 140*a* to inverter 145 for translation in the output thereof into a negative voltage which is supplied via cable driver 146 and closed relay contact 146*a* to lead 99, as hereinbefore mentioned.

Figure 37:
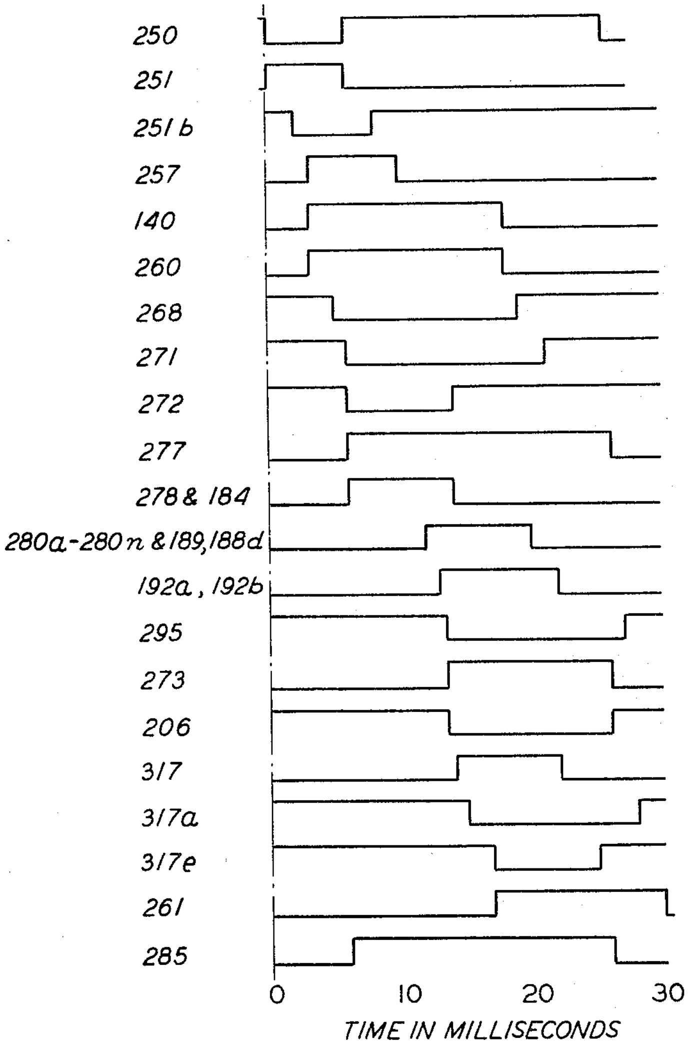

It is recalled from the previous explanation that gate 262 in FIG. 14 is now being supplied with ground on its input lead 261*a*. At the same time, it is also recalled from the prior discussion that a second input to gate 262 is presently being furnished with ground via closed contact 264*a*, and a third input of ground is being supplied from the output of gate 263. As all three inputs to gate 262 at this time are simultaneous grounds, its output provides a negative voltage via lead 262*a* to the inputs of the reset sides of both flip-flops 266 and 267 in FIG. 15. This voltage resets flip-flop 266 whose output at its 0-side provides ground to the input of the set side of flip-flop 267 and on lead 267*f* while the output of the 1-side of flip-flop 266 produces a negative voltage for a purpose that will appear later. Now, the negative voltage applied from the output of gate 262 to the reset side of flip-flop 267 as just stated resets it whereupon the output of its 1-side provides a negative voltage which interrupts the previously mentioned operating path for its associated relay 267*a* which releases. This relay then opens its contact 267*b* in FIG. 19 to disconnect the source of negative voltage from lead 315 thereby interrupting the operating path for relay 290 in FIG. 26, which remains in the idle or unoperated condition. The logic sequence time diagrams for the above-described discard message are illustrated in FIG. 37.

*Parity counting circuit for message transfer from No. 1 data terminal to main data terminal*

As hereinbefore mentioned, a message is considered, for example, to possess correct parity if it contains an even number of "1" bits, and incorrect parity if it contains an odd number of "1" bits. Assuming an incorrect message is received in the main data terminal from the No. 1 data terminal, for example, the interface provides a negative voltage on lead 323 in FIG. 8A. This voltage in FIG. 15 applied through closed relay contact 353*x* triggers main parity pulser 323*a* in FIG. 22 which provides in its output a 1-microsecond negative voltage pulse. This pulse in turn triggers main parity monopulser 323*b* which provides a 5-microsecond negative voltage pulse in its output. This negative pulse, applied to the input of the set side of main parity unit flip-flop 323*c*, serves to set it and to main parity counter unity AND-NOT gate 323*d* thereby inhibiting the gate. As a consequence, the output of this gate is held at ground. In the set state, flip-flop 323*c* provides from the output of its 1-side ground which is also supplied to the input of gate 323*d*. The output from the 0-side of flip-flop 323*c* is a negative voltage which is applied to monopulser 323*b* thereby inhibiting it. When, however, the output of monopulser 323*b* returns to ground in its output, this remains unaffected by further inputs to the monopulser so long as flip-flop 323*c* is set to supply the inhibiting negative voltage to monopulser 323*b*. A first incorrect message is thus counted.

It is noted that the 1-microsecond negative voltage pulse in the output of monopulser 323*a* is changed by main pulse inverter 323*e* into a 1-microsecond ground pulse which is simultaneously applied to the inputs of No. 1 AND-NOT gate 323*d* and to Nos. 2 and 3 main parity AND-NOT gates 323*f* and 323*g*, respectively. It is understood for the purpose of this description that gates 323*d*, 323*f* and 323*g* serve to count one, two and three pulses, respectively. Since, as previously mentioned, the output of monopulser 323*b* is supplying an inhibiting negative voltage to gate 323*d*, it is also understood that both main parity two and three count flip-flops 323*h* and 323*k*, respectively, are in the reset state whereby the output from the 1-side of flip-flop 323*h* provides an inhibiting negative voltage as one input to gate 323*f* and the output from the 1-side of flip-flop 323*k* supplies an inhibiting negative voltage as one input to gate 323*g*.

Assuming that the next-succeeding or second message is also incorrect, the main data terminal again provides a negative voltage on lead 323 as just mentioned. This causes the production of a 1-microsecond negative voltage pulse in the output of monopulser 323*a*. This pulse, however, has no effect on monopulser 323*b* which is now subject to the aforenoted inhibiting voltage. This 1-microsecond negative voltage pulse is changed by inverter 323*e* into a 1-microsecond ground pulse which is supplied to gate 323*d*, together with ground from the output of the 1-side of set flip-flop 323*c* and ground from the output of monopulser 323*b* which is now returned to a ground output. As all three inputs to gate 323*d* are now ground, it provides in its output a negative voltage which triggers main parity pulser 323*m* whose output then includes a 5-microsecond negative voltage pulse which is applied to the set side of flip-flop 323*h*. This sets the flip-flop whose output from the 1-side is a ground supplied to one input of gate 323*f* and whose output from the 0-side supplies a negative voltage to inhibit monopulser 323*m*. When this monopulser returns to ground in its output, it remains unaffected by further inputs to the monopulser 323*m*, so long as flip-flop 323*h* provides the inhibiting voltage to the monopulser. A second incorrect message is thus counted.

Assuming a third consecutive incorrect message is received, the main data terminal again provides a negative voltage on lead 323. This has no effect on monopulser 323*b* but serves to activate monopulser 323*a* and inverter 323*e* to supply a 1-microsecond ground pulse to gate 323*f*, together with grounds supplied thereto from the output of the 1-side of set flip-flop 323*h* and from the output of monopulser 323*m* which is now returned to ground in its output. As all three inputs to gate 323*f* are now ground, it provides in its output a negative voltage which triggers main parity pulser 323*n* whose output then includes a 5-microsecond negative voltage pulse which is applied to the set side of flip-flop 323*k*. This sets the flip-flop whose output from the 1-side is ground supplied to the input of gate 323*g* and whose output from the 0-side furnishes a negative voltage to inhibit monopulser 323*n*. When the output of this monopulser returns to ground, it remains unaffected by further inputs to the monopulser 323*n*, so long as flip-flop 323*k* provides inhibiting voltage to the monopulser. A third incorrect message is thus counted.

Assuming now a fourth consecutive incorrect message is received, the main data terminal again provides a negative voltage on lead 323. This will be changed by inverter 323*e* to ground which is then applied as one input to gate 323*g*, together with the second and third grounds supplied thereto from the output of the one side of set flip-flop 323*k* and from the output of monopulser 323*n* which is now returned to ground in its output. As all three inputs to gate 323*g* are now ground, it provides in its output a negative voltage which is supplied to the input to the set side of main parity alarm flip-flop 323*p* to set it. This then produces in the output of the 0-side of the flip-flop a negative voltage effective on bad parity alarm lead 323*r* to disconnect the No. 1 data terminal from the system in a manner that will be subsequently explained.

Figure 22:
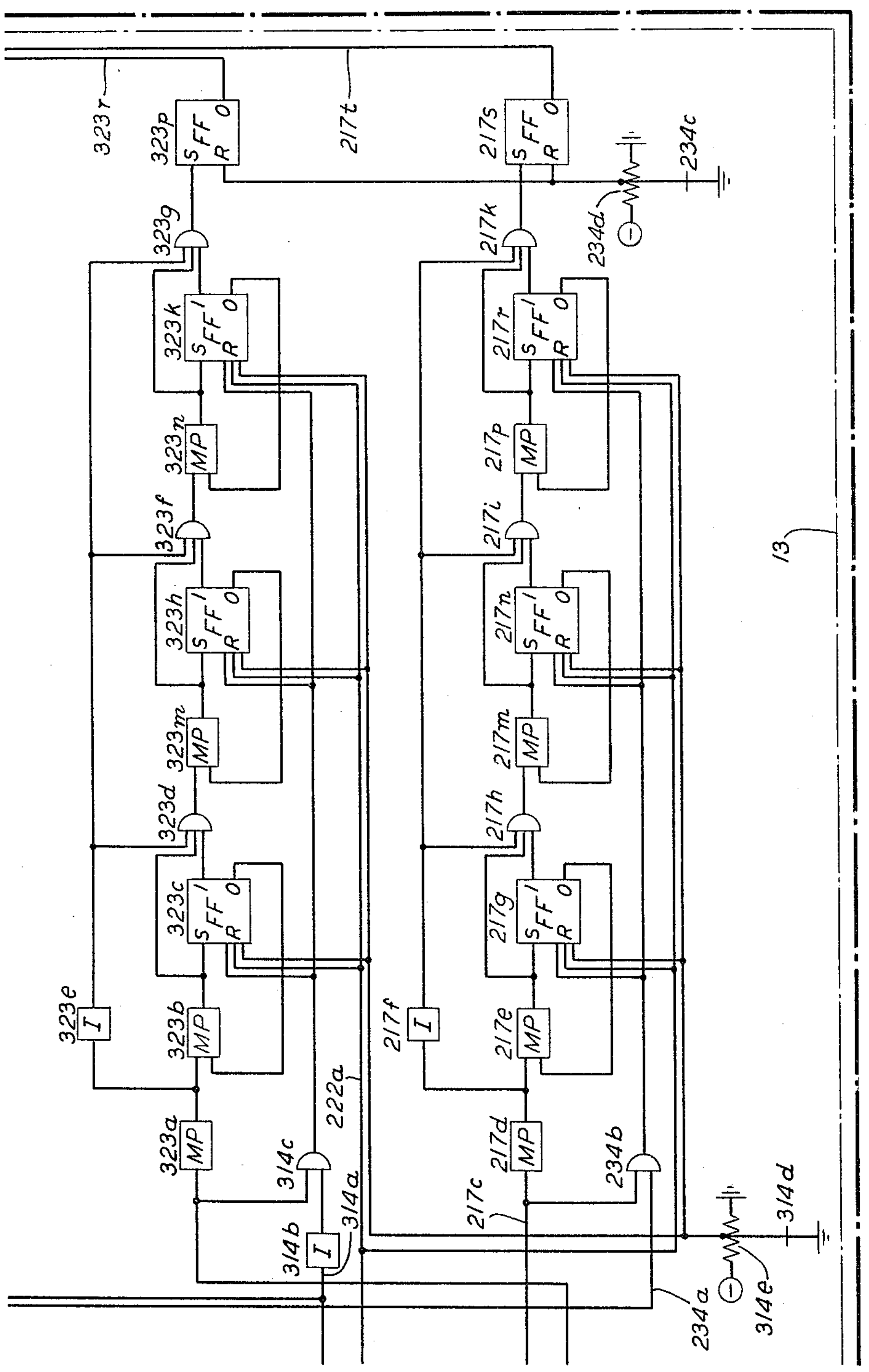

Assuming now the second, third or fourth consecutive message is correctly received in the main data terminal instead of being incorrectly recieved therein as previously assumed, the interface, in response to such correct message, provides a negative voltage on message received lead 314 in FIG. 8A to indicate the termination of such second message. This voltage on leads 314 and 314*a* in FIGS. 15 and 22 is changed by message received inverter 314*b* into a ground which is supplied as one input to message received AND-NOT gate 314*c*. If a correct parity indication is being received on lead 323, then ground effective thereon to provide such indication is supplied as a second input to gate 314*c*. As both inputs to the gate are ground, it provides in its output a negative voltage which is simultaneously applied to the reset sides of flip-flops 323*c*, 323*h* and 323*k* to reset them at the same time. At this time, ground is effective on lead 222*a* as the system is not being cleared; and it is also effective via unoperated clear parity count key 314*d*. This erases the count stored up to this time in the message parity count circuit just described thereby restoring it to normal. Flip-flop 323*p* is reset in a manner that is later explained. In this connection, the clear parity count key 314*d* can be manually operated at any time to restore the parity count circuit to normal regardless of the count stored therein. This is achieved by manually operating the key which interrupts the associated circuit to remove ground therefrom while at the same time effectively applying a negative voltage from voltage divider 314*e* to the inputs of the 0-sides of flip-flops 323*c*, 323*h* and 323*k*.

*Parity counting circuit for message transfer from main data terminal to No. 1 or No. 2 data terminal*

This circuit operates in the manner of the operation of the parity counting circuit previously described and is therefore only briefly described here. When a first incorrect parity is involved in a message being transferred from the main data terminal to the No. 1 data terminal, for example, then a negative voltage is supplied on lead 217*c* from the output of the 0-side of flip-flop 217 in FIG. 13 as hereinbefore discussed to bad parity monopulser 217*d* in FIG. 22. This monopulser then causes the production in its output of a 1-microsecond negative voltage which is simultaneously applied to (1) a second bad parity monopulser 217*e* which in turn produces in its output a 5-microsecond negative voltage pulse and to (2) bad parity inverter 217*f* which changes this voltage into a 1-microsecond ground. This voltage applied to the set side of bad parity flip-flop 217*g* sets it whereupon its 0-side output supplies an inhibiting negative voltage to monopulser 217*e* while its 1-side output supplies a ground to bad parity AND-NOT gate 217*h*. At the same time the ground now in the output of inhibited monopulser 217*e* is also applied to gate 217*h*. This terminates the count of the first bad parity.

The second successive bad parity message provides on lead 217*c* a negative voltage which is translated by monopulser 217*d* into a 1-microsecond negative voltage. This voltage has no effect on inhibited monopulser 217*e* but is changed by inverter 217*f* into a 1-microsecond ground which is applied to gate 217*h*. As this gate is now supplied with three ground inputs, it provides in its output a negative voltage which is changed by monopulser 217*m* into a 5-microsecond pulse which sets bad parity flip-flop 217*n*. This, as set, supplies from its 1-side output a ground to bad parity AND-NOT gate 217*i* and from its 0-side output a negative voltage to inhibit monopulser 217*m*. In addition, ground now in the output of monopulser 217*m* is also being supplied to gate 217*i*. This terminates the count of the second successive bad parity message.

The third bad parity message provides on lead 217*c* a negative voltage which is changed by monopulser 217*d* into a 1-microsecond negative voltage which does not affect monopulser 217*e* but is translated by inverter 217*f* into a 1-microsecond ground which is applied to gate 217*i*. As this gate is now supplied with three simultaneous ground inputs, it produces in its output a negative voltage which is changed by bad parity monopulser 217*p* into a 5-microsecond negative pulse which sets bad parity flip-flop 217*r*. This, as set, provides from its 1-side output a ground to bad parity AND-NOT gate 217*k* and from its 0-side output a negative voltage to inhibit monopulser 217*p*. Also, at this time, ground in the output of monopulser 217*p*. Also, at this time, ground in the output of monopulser 217*p* is being supplied to gate 217*k*. This terminates the count of the third successive bad parity message.

The fourth bad parity message provides on lead 217*c* a negative voltage which is translated by monopulser 217*d* into a 1-microsecond negative voltage which does not affect monopulser 217*e* but is changed by inverter 217*f* into a 1-microsecond ground which is applied to gate 217*k*. As this gate is now supplied with three concurrent grounds, it provides in its output a negative voltage which sets bad parity alarm flip-flop 217*s*. This then produces in the output of its 0-side a negative voltage effective on bad parity alarm lead 217*t* to disconnect the main data terminal from the system in a manner that will be hereinafter explained.

In the event of the second, third or fourth messages being correct, ground representing such correct message is transmitted on lead 234*a* from the output of inverter 234 in FIG. 13 to acknowledgement inhibit gate 234*b* in FIG. 22. As lead 217*c* is transmitting a ground to show a correct parity indication, two grounds are concurrently supplied to the two inputs of gate 234*b* which is thereby activated to provide in its output a negative voltage which is simultaneously applied to the inputs of the reset sides of flip-flops 217*g*, 217*n* and 217*r* to reset them at the same time. At this time ground is effective on lead 222*a* because the system is not being cleared; and it is also effective via unoperated manual clear key 314*d*. This erases the count stored in the parity count circuit at this moment thereby restoring it to normal. At any time, a clear parity counter alarm key 234*c* in FIG. 22 can be manually operated to interrupt the associated circuit to remove ground therefrom while at the same time enabling a negative voltage to be applied from voltage divider 234*d* concurrently to the inputs of the 0-sides of flip-flops 323*p* and 217*s* whereby both flip-flops are reset to restore them to a normal condition.

*Operation of interface in message transfer from No. 1 data terminal to main data terminal*

Figure 8B:
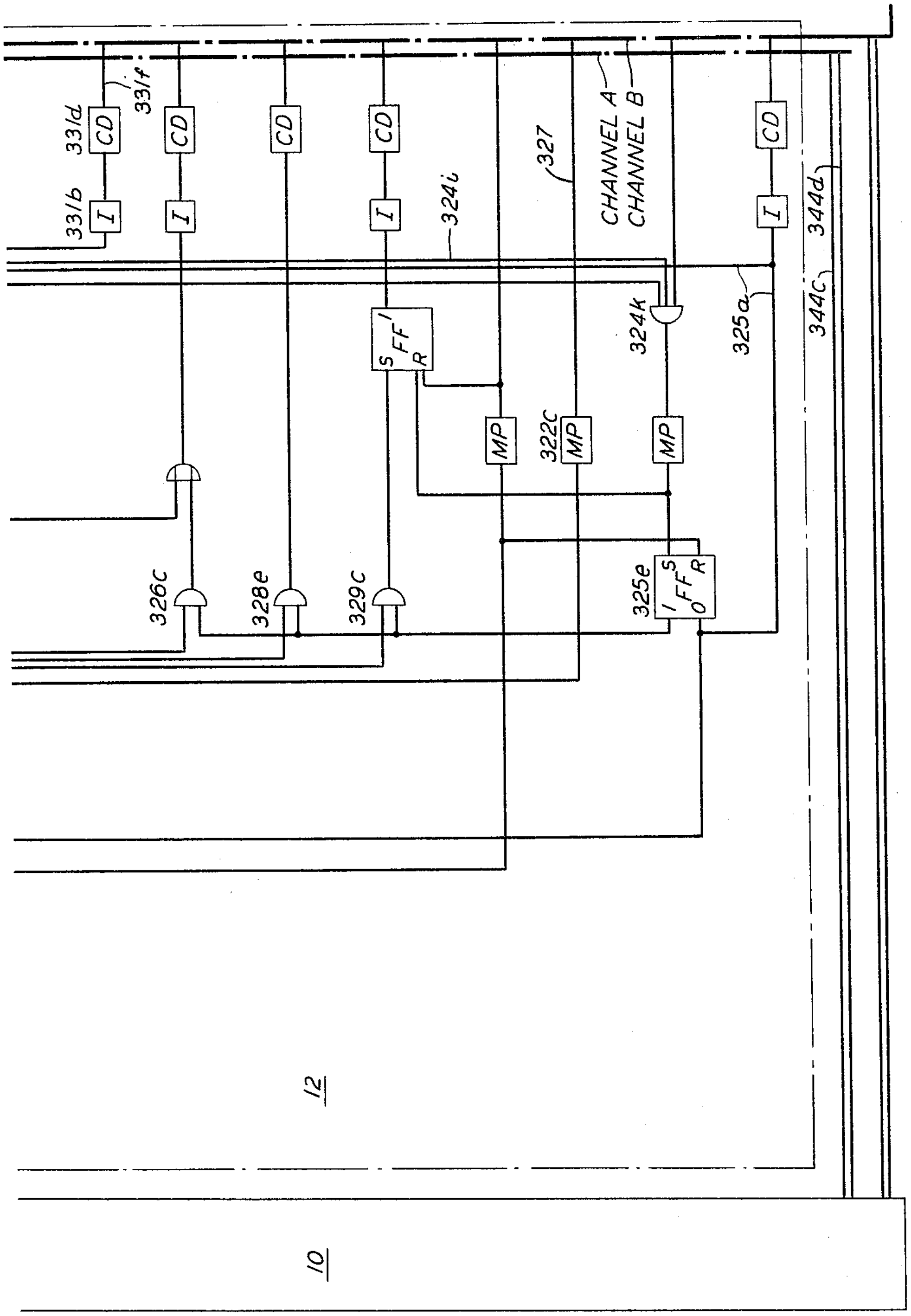

It is assumed for the purpose of this description that a message is now being processed from the No. 1 data terminal to the main data terminal and further that no message is being transferred from the No. 2 data terminal to the main data terminal. It is now recalled that lead 310*b* in FIG. 14 is presently transmitting ground to inform the main data terminal that the No. 1 data terminal has a message for it, as mentioned hereinbefore. This ground on lead 310*b* in FIG. 8A is applied as one input to have message AND-NOT gate 324. Since, as assumed above, a message is not being received via channel B from the No. 2 data terminal at this time, the output of the 0-side of have message flip-flop 325*e* in FIG. 8B is ground because the latter is in a reset state at this time for the reason that the No. 2 data terminal is inactive as just mentioned. This is applied on lead 325*a* as a second input to gate 324. When phase PH–2 of the timing circuit explained above changes to ground, this is also supplied as a third input to gate 324. As all three inputs to ground 324 a re now ground, the output of this gate provides a negative voltage. This is changed by have message monopulser 324*a* applied to the input of the set side of have message flip-flop 324*b* thereby setting it. At the same time this pulse is applied to the reset side of message parity flip-flop 324*c* to reset it. The output of the 1-side of reset flip-flop 324*c* provides a negative voltage which is changed to ground by bad parity inverter 324*d*. This ground is applied via cable driver 324*e* to lead 323 for indicating good parity to the parity count circuit shown in FIG. 22 and discussed above. This restores the parity count circuit to normal, if the next previous signal on lead 323 thereto was a negative voltage for indicating bad parity; and it is ineffective in the parity count circuit if the next preceding signal on lead 323 thereto was a ground for indicating good parity.

One portion of the output of the 0-side of set flip-flop 324*b* provides a negative voltage which is changed by clear interface inverter 324*f* into ground. This is applied through clear interface cable driver 324*g* to appear as a clear interface control signal on clear interface control lead 324*h* for a purpose that will be subsequently explained in regard to FIG. 15. A second portion of the negative voltage output of the 0-side of set flip-flop 324*b* is supplied on lead 324*i* to one input of make busy AND-NOT gate 324*k* in FIG. 8B thereby ensuring that the output of the latter gate remains at ground so long as flip-flop 324*b* remains in the set state. A third portion of the negative voltage output of the 0-side of set flip-flop 324*b* is applied as a first input to NOT-OR gate 325, whose second input is ground received from the 0-side of reset flip-flop 325*e* in FIG. 8B as above stated. Gate 325 thereupon provides in its output a ground which is applied to one input of and changed by have message AND–NOT gate 325*a* into a negative voltage which is applied through cable driver 325*c* to appear on have message lead 325*d* as a have message signal for transmission thereon to the main data terminal. The other input to gate 325*a* is ground at this time as it is received from the output of the 0-side of flip-flop 322 which in in the reset state at this time for a reason that is later mentioned.

When the main data terminal recognizes the receipt of the have message signal just noted, it transmits a send message signal comprising a negative voltage on lead 326. This voltage is changed in the output send message inverter 326*a* to ground which is applied simultaneously to send message AND-NOT gates 326*b* and 326*c* as one input thereto. At the same time ground from the output of the 1-side of set flip-flop 324*b* is being supplied as a second input to gate 326*b*. As both inputs to this gate are now ground, its output provides a negative voltage. Gate 326*c* does not change its output from ground because, together with the aforenoted ground from inverter 326*a*, it is also receiving a negative voltage from the output of the 1-side of flip-flop 325*e* which is in the reset condition for the reason stated above. The negative voltage in the output of gate 326*b* is applied as one input to send message NOT-OR gate 326*d* whose other input comprises a ground on lead 326*e* because the main data terminal is not transmitting a message to the No. 2 data terminal for the reason mentioned hereinbefore. As the two inputs to gate 326*d* are dissimilar for the reason just mentioned, its output is ground which is changed by send message inverter 326*f* to a negative voltage. This is transmitted through send message cable driver 326*g* and appears as the aforesaid negative voltage on lead 311 for setting flip-flop 312 in FIG. 14 as hereinbefore mentioned.

When the message sent signal from the No. 1 data terminal to the interface appears as a negative voltage on lead 306*c* in FIGS. 8A and 14, this negative voltage is transmitted as a message on the line signal to the interface. This negative voltage is changed in the output of monopulser 322*a* in FIG. 8A to a 5-microsecond negative voltage which is applied as one input to message sent NOT-OR gate 322*b*. The other input to this gate is a 5-microsecond ground received from the output of monopulser 322*c* because ground is on lead 327 in FIG. 8B from channel B which is in the idle condition at this time. Now, the output of gate 322*b* provides ground which is translated into a 5-microsecond ground in the output of message sent monopulser 322*d*. At the trailing edge of the ground in the output of gate 322*b*, that is, when such output changes to negative, the output of monopulser 322*d* changes to a negative voltage for 5 microseconds. Thus, a 5-microsecond time delay is provided by monopulser 322*a*, gate 322*b*, and monopulser 322*d*.

An additional 5-microsecond delay is provided by message sent monopulser 322*d* and message sent AND-NOT gate 322*e* in the following manner. The output of the 1-side of message sent flip-flop 322 in the reset state is a negative voltage. This is applied to one input of gate 322*e* which is also receiving the output of monopulser 322*d* whereby the gate provides ground in its output. At the trailing edge of ground in the output of monopulser 322*d*, that is, when such output goes negative, this negative voltage applied to the set side of flip-flop 322 activates the latter to the set state. The output of the 1-side of his flip-flop in the set state provides a ground signal which is overlapped by the negative voltage heretofore supplied by monopulser 322*d*. Therefore, when flip-flop 322 is set, the ground in the output of its 1-side effects no change in the output gate 322*e*. Five microseconds later, however, the output of monopulser 322*d* changes to ground whereupon the output of gate 322*e* changes to a negative voltage as both inputs thereto are ground. This negative voltage occurs therefore at the trailing edge of the output of monopulser 322*d* whereby the negative voltage output therefrom is delayed by 5 microseconds. When the output of gate 322*e* provides the negative voltage, this voltage is applied via message sent cable driver 322*f* and lead MOL as a message on line signal to the main data terminal. When flip-flop was set as just mentioned, the output of its 0-side provides a negative voltage which activates gate 325*a* to provide ground in its output. This is applied via cable driver 325*c* to have message lead 325*d* thereby indicating the idle condition.

When the negative voltage representing the message on line signal via lead MOL is received and processed by the main data terminal, it returns a message acknowledgment signal of negative voltage via lead 328 in FIG. 8A and a message parity signal on lead 329 in such time sequence that the parity signal precedes the acknowledgment signal by approximately 3 microseconds. If the message parity signal is bad, it comprises on lead 329 a negative voltage which is changed by message parity inverter 329*a* to ground. This supplied simultaneously as one input to message parity AND-NOT gate 329*b* and as one input to message parity AND-NOT gate 329*c* in FIG. 8B which is connected via channel B to the No. 2 data terminal. As the gate 329*b* is also being supplied with a ground from the output of the 1-side of flip-flop 324*b* which is in the set state, this gate provides in its output a negative voltage. The output of gate 329*c* in FIG. 8B remains ground at this time for the reason that it is presently receiving ground from the output of the 1-side of flip-flop 325*e*. The negative voltage from the output of gate 329*b* as just mentioned applied to the input of the set side of flip-flop 324*c* whose output from its 1-side is now ground. This is changed in the output of inverter 324*d* to a negative voltage which is applied through cable driver 324*e* to lead 323. This constitutes a bad parity signal initiated in the main data terminal and transmitted back to FIG. 22 of the No. 1 terminal, as hereinbefore explained.

Approximately 3 microseconds after the arrival of the parity signal on lead 329 in FIG. 8A as just mentioned, the acknowledgment signal comprising a 5-microsecond negative voltage produced in the main data terminal is made effective on lead 328. This voltage is changed in the output of message acknowledgment inverter 328*b* to a 5-microsecond ground which is simultaneously applied to message acknowledgment gate 328*c* for the No. 1 data terminal and message acknowledgment gate 328*e* in FIG. 8B for the No. 2 data terminal. This ground is changed in the ouput of gate 328*c* to a negative voltage because ground is also being presently supplied to the other input thereto from the output of the 1-side of flip-flop 324*b* which is in the set state at this time, as previously explained. The output of gate 328*e* remains at ground since at this time the second input thereto is a negative voltage from the output of the 1-side of flip-flop 325*e* as hereinbefore described. The negative voltage in the output of gate 328*c* is transmitted through message received cable driver 328*d* to constitute the message received signal on lead 314 sent to the control logic and bit circuit for th No. 1 data terminal shown in FIG. 15 and above described.

*Release of interface from channel A for possible use with channel B*

The signal on lead 314 in FIG. 8A restores the equipment associated with channel A and No. 1 data terminal to normal or the idle state which after an elapse of approximately 10 milliseconds provides on reset lead 330 in FIG. 8A a negative voltage in a manner that is hereinafter explained. This voltage is applied to the reset side of flip-flop 324*c* which is thereby reset to provide in the output of its 1-side a negative voltage. This is changed in the output of inverter 324*d* to ground which is supplied via cable driver 324*e* and lead 323 to the parity circuit in FIG. 22 for indicating good parity. The negative voltage on lead 330 is also translated in the output of message sent reset monopulser 330*a* to a 5-microsecond negative voltage which is applied to the reset side of flip-flop 324*b* and to the reset side of flip-flop 322. This resets the flip-flop 324*b* which now provides in the output of its 0-side a grounds which serves: to remove the negative voltage that was theretofore effective on lead 324*i* for inhibiting gate 324*k* in FIG. 8B thereupon rendering channel B operative for bit transmission, and to supply ground to inverter 324*f* which is thereby changed into a negative voltage for transmission through cable driver 324*g* to lead 324*h* for a purpose that is subsequently explained. At this time the output of the 1-side of reset flip-flop 324*b* supplies a negative voltage to gates 329*b*, 328*c*, and 326*b* for inhibiting them thereby causing all three gates to maintain an output of ground regardless of the type of signal applied to their other inputs. When flip-flop 322 is reset, the output of its 1-side provides a negative voltage which is applied to gate 322*e* whose output is thereupon changed to ground. This is applied via cable driver 322*f* to message on line lead MOL to represent the idle condition as aforementioned. In the reset state, flip-flop 322 provides in the output of its 0-side ground which is supplied to one input of gate 325*a*. At the same time the ground in the output of the 0-side of reset flip-flop 324*b* is applied to one input of gate 325 whose other input is also ground as supplied thereto from the output of the 0-side of reset flipflop 325*e*. Now, gate 325 provides in its output a negative voltage which is changed in the output of gate 325*a* to a ground. This is applied through cable driver 325*c* and on lead 325*d* to the main data terminal for indicating thereto the normal or idle condition of the interface as connected to channel A associated with the No. 1 data terminal.

A timing signal supplied at the main data terminal establishes the proper time duration for the transfer of the respective messages. Each timing signal is applied by the main data terminal in FIG. 8A to lead 331 as a negative voltage which is changed in the outputs of clock signal inverters 331*a* and 331*b* to ground which is transmitted through clock cable drivers 331*c* and 331*d* to appear on clock lead 331*e* for controlling message transfer via channel A to the No. 1 data terminal and on clock lead 331*f* for controlling message transfer via channel B to the No. 2 data terminal. Obviously, when the main data terminal supplies ground to lead 331 the opposite action is effected whereby negative voltage is ultimately effective on leads 331*e* and 331*f*. The main data terminal is thus enabled to transfer signals therefrom on the single lead 331 to either channel A or B in a manner that is further described hereinafter.

*Test message from main data terminal to No. 1 data terminal*

Test messages are originated at the main terminal for the purpose of exercising the system, checking parity circuits, and aiding in trouble shooting of the interconnection of the interface with the control logic and bit circuits constituting channels A and B and involved in opposite directions of message transfer, as shown in FIGS. 1 and 2. This assumes for the moment that the entire system is restored to the idle condition. Referring now to FIG. 7A, a test message in the form of a negative voltage is applied by the main terminal to lead 73 which transmits it to the input of test message inverter 120 whose output thereupon is caused to produce ground. This is transmitted via leads 120*a*, 120*b*, 120*c* and 120*e* to one input of test message AND-NOT gate 120*f* whose other input comprises another ground received from the output of have message inverter 120*i*. This inverter receives its input of negative voltage on lead 87*a* from the output of the 0-side of have message flip-flop 87 in FIG. 6A which is the set state at this time because channel A is now idle. As the two inputs to gate 120*f* are ground at the moment, its output is a negative voltage which constitutes a test message signal and which is applied through test message cable driver 120*g* to lead 120*h*.

This signal effective on the same lead 120*h* and closed contact 353*r* in FIG. 13 is supplied as one input to the set side of flip-flop 227. At the same time, the main terminal provides via the interface a make busy signal of negative voltage on lead 92 in FIGS. 6A and 11 to activate monopulser 139 whose output sets flip-flop 140 and gate 138 for ultimately effecting the operation of relay 220 in FIG. 18, in the manner hereinbefore explained. It will be recalled from the foregoing description that a bad parity signal of negative voltage was assumed to have been transmitted by the No. 1 terminal whereby relay 167 in FIG. 18 was operated via lead 213 in FIG. 25, as above mentioned. Open contact 220*a* in FIG. 12 of relay 220 applies negative voltage from voltage divider 220*b* to the input of the set side of flip-flop 169 whose output from its 0-side is thereby caused to provide a negative voltage to the input of monopulser 221 which produces a 5-microsecond negative voltage pulse in its output. This pulse is applied as one input to gate 222 whose second input is a ground received via lead 222*b* from the output of test message monopulser 227*a* in FIG. 13. The input to this monopulser is ground supplied thereto from the output of the 1-side of flip-flop 227 which is in the set state at this time. As a consequence of the single negative voltage pulse supplied to the input of gate 222, it provides in its output a 5-microsecond ground pulse which is applied to the inputs of reset gates 223, 223*c*, 223*d* and 223*e* as well as to inverter 224 and gate 225 in FIG. 12. This constitutes essentially the description given hereinbefore regarding message transfer from the main terminal to the No. 1 terminal.

At this time, however, gates 223, 223*c*, 223*d* and 223*e* are inhibited by a negative voltage supplied thereto on lead 223*a* from the output of the 0-side of the set flip-flop 227 in FIG. 13. At the same time the negative voltage from the 0-side output of set flip-flop 227 is changed in the output of inverter 226 to ground. This ground on lead 225*b* together with ground from the output of gate 222 is supplied to the two inputs of gate 225, which is thereupon activated to provide in its output a negative voltage. This voltage is supplied via lead 225*a* to the input of the set side of flip-flop 312 in FIG. 14 thereby setting it. At the same time, ground on lead 311 is applied through closed relay contact 311*a* to the input of the 1-side of flip-flop 312 because the interface in FIG. 8A is not now supplying an operating negative voltage on lead 311.

As flip-flop 312 is in the set state, it supplies ground from the output of its 1-side to the operating winding of relay 312*a* which operates to close its contact 312*b* whereby ground is supplied to the operating windings of relays 313 and 313*a* in FIG. 17. As these relays are operated, they complete operating paths for relays 313*f*, 313*g* and 313*m* whose 120 closed contacts, together with the 120 pairs of closed contacts of operated relays 157*c*, intermediate relays, and relay 157*n*, represented by contact pairs 158*a* and 158*b*, 158*c* and 158*d*, the intermediate contacts, and contacts 158*e* and 158*f* and 158*g* and 158*h* shown in FIG. 16 serve to provide operating voltage for the 120 L1 through L120 line relays represented by relays 321, 321*a*, the intermediate relays, and relays 321*b* and 321*c*, in the manner hereinbefore explained. These 120 line relays are now operated to close their associated 120 contacts 313*v* thereby supplying ground via the 120 closed contacts 313*j*, the latter being closed by the fact the system is in operation at this time, to the 120 discrete line leads represented by line leads 313*x*, 319*d*, 319*e* and 319*f* extending to the interface in FIG. 10. This demonstates that the test message sent by the main terminal to the No. 1 terminal was received therein and is returned to the main terminal for the purpose of checking it for proper parity.

When relay 313*f* is operated, its closed contact 313*m* in FIG. 14 provides ground to the operating winding of relay 264 which operates to open its contact 264*a* to remove effectively ground from the circuit. This, at the same time, enables voltage divider 264*c* to apply a negative voltage to the input of the set side of flip-flop 216 to set it and to the input of gate 262. As set, flip-flop 216 supplies ground from the output of its 1-side to gate 165. This is also being supplied with ground via closed contact 165*f*. Ground is also being supplied on lead 225*b* to another input of gate 165 from the output of inverter 226 in FIG. 13 whose input is being supplied from the output of the 0-side of flip-flop 227 resting in the set state at this time in response to the next previous message transfer from the main terminal to the No. 1 terminal. As the three inputs to gate 165 are ground at this time, it provides on its output lead 165*d* a negative voltage which triggers monopulser 233 in FIG. 13 and which is applied to the input of the 0-side of flip-flop 215 in FIG. 12 to reset it.

At this time, the other input to monopulser 233 is ground received on lead 232*a* from the output of gate 232 in FIG. 12 whose input via lead 230 is a negative voltage for the reason mentioned above in connection with the message transfer from the main terminal to the No. 1 terminal as hereinbefore discussed. In view of these two inputs of negative voltage to monopulser 233, it therefore provides in its output a 5-microsecond negative voltage which is supplied to inverter 234 and gate 235. As a consequence, gate 235 produces in its output a ground pulse which is applied through cable driver 236 and closed relay contact 237 to lead 108 and thereby as an acknowledgment signal to the interface shown in FIG. 6A. At the same time, inverter 234 effects in its output a 5-microsecond ground pulse which is applied to 234*a* and thereby to one input of parity gate 234*b* in FIG. 22, mentioned above.

When the output of monopulser 233 in FIG. 13 returns to ground, inverter 234 produces in its output a 5-microsecond negative voltage which activates monopulser 239 whose output then includes a 5-microsecond negative voltage transmitted on lead 239*a* to flip-flop 340*d* in FIG. 21 for a purpose that is mentioned later as indicated above. In addition, the negative voltage pulse in the output of monopulser 239 is applied to the input of the reset side of flip-flop 217 in FIG. 13 to reset it. This produces in the output of its 1-side a negative voltage which is changed to ground in the output of inverter 218. This ground is applied through cable driver 219 and closed relay contact 219*a* to lead 118*a* and thereby to the interface in FIG. 7A for indicating correct parity. This erases the indication of incorrect or bad parity provided above in the message transfer from the main terminal to the No. 1 terminal as hereinbefore explained.

Figure 6A:
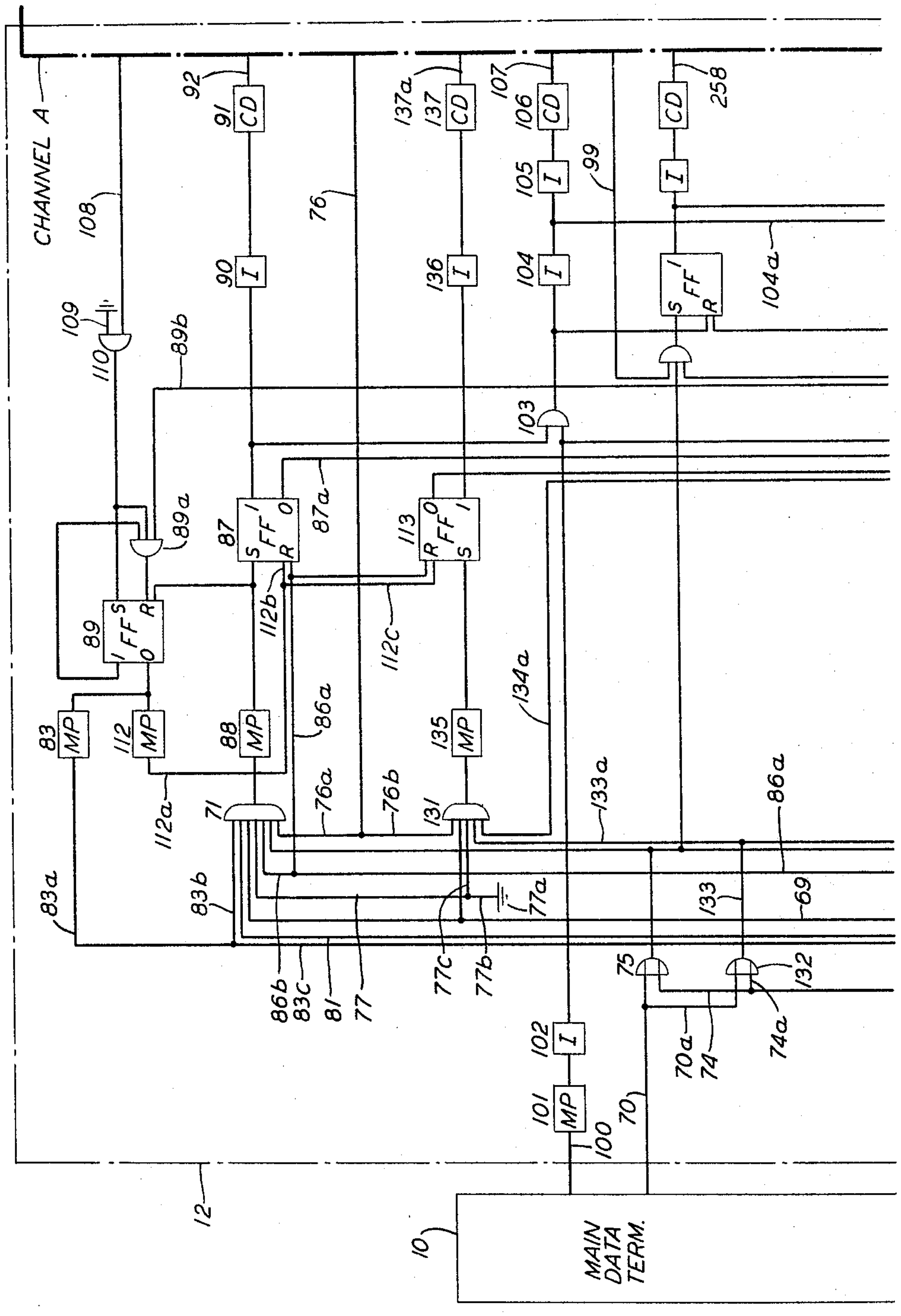

When the main terminal receives ground representing the acknowledgment signal via lead 108 in FIG. 6A as just mentioned, it also receives ground on acknowledgment gate lead 109 in FIG. 6A, both of which grounds are simultaneously applied to the two inputs of gate 110. This then produces in its output a negative voltage which is subsequently utilized to transmit an acknowledgment signal comprising a negative voltage on lead 117*a* in FIG. 6B to the main terminal for indicating the completion of the message transfer from the main terminal to the No. 1 terminal in the manner explained in detail hereinbefore. This causes the main terminal to apply on lead 73 in FIG. 7A a ground which is changed in the output of inverter 120 to a negative voltage. This voltage is translated in the output of monopulser 84 in to 5-microsecond negative voltage pulse which is translated in the output of inverter 85 into a 5-microsecond ground pulse. One portion of this pulse is applied on lead 85*a* to inverters 85*b* and 86 in FIG. 6B.

Figure 6B:
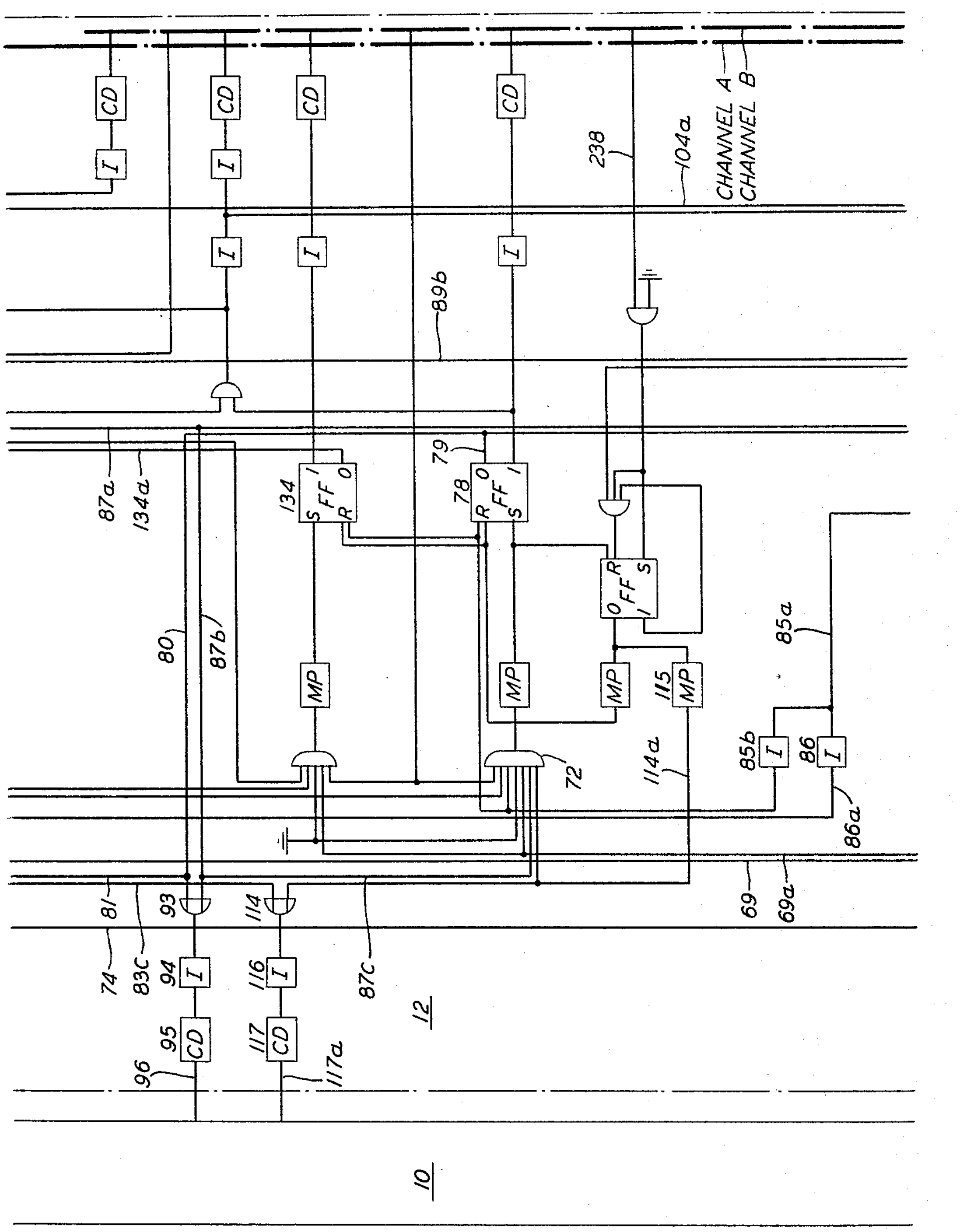

As the output of inverter 85*b* is applied to gate 72 and flip-flop 78 connected to channel B in FIG. 6B, which is not involved in the message transfer under discussion at this time, the effect of such output is not further mentioned at this point. The pulse in the output of inverter 86 is a 5-microsecond negative voltage pulse which is simultaneously applied on lead 86*a* to the reset sides of flip-flops 87 and 113 in FIG. 6A, both of which are thereby reset. This restores the interface shown in FIG. 6A to the idle condition. A second portion of the 5-microsecond ground pulse in the output of inverter 85 in FIG. 7A is changed in the outputs of end test message inverters 85*d* and 85*e* into 5-microsecond negative voltage pulses. As inverter 85*e* is included in channel B, which is not involved in the message transfer at this time, its output is not being further discussed at this point. The 5-microsecond negative voltage pulse in the output of inverter 85*d* is applied through end test message cable driver 85*f* to lead 85*g* in FIGS. 7A and 13 as an end test message signal.

The 5-microsecond negative voltage pulse on lead 85*g* in FIG. 13 is applied to the reset side of test message end flip-flop 227 for resetting it. As a consequence, negative voltage in the output of the 1-side of flip-flop 227 triggers monopulser 227*a* whose output then includes a 5-microsecond negative voltage. This is applied on lead 222*b* to gate 222 in FIG. 12 which is concurrently receiving ground from the output of monopulser 221 at this time, as well as on lead 222*a* as aforenoted. This output of the monopulser is ground because it returned thereto after having supplied a 5-microsecond negative voltage in response to the operation of relay 220 in FIG. 18 as explained above. Due to the ground and negative voltage supplied concurrently to the input of gate 222, its output provides ground which is simultaneously supplied as a first input to reset gates 223, 223*c*, 223*d* and 223*e*, as well as a single input to inverter 224 and a first input to gate 225. A second input to each of gates 223, 223*c*, 223*d* and 223*e* at this time is ground received via lead 223*a* from the output of the 0-side of reset flip-flop 227, in FIG. 13. As both inputs to gates 223, 223*c*, 223*d* and 223*e* are ground at this time, they produce in their outputs negative voltage which is applied via leads 223*b*, 223*f*, 223*g* and 223*h* to the reset sides of the 120 DR1 through DR120 data register flip-flops represented by flip-flops 152, 152*a*, the intermediate flip-flops, and flip-flops 152*b* and 152*c* in FIG. 9 to reset them. Now, the outputs of the 1-sides of the 120 reset data registers are changed to negative voltage thereby interrupting the previously mentioned operating paths of their 120 associated relays represented by relays 153, 153*b*, the intermediate relays, and relays 153*d* and 153*e*. These relays release to open their associated 120 contacts represented by contacts 153*a*, 153*f*, the intermediate contacts, contacts 153*g* and 153*h* in FIG. 16. These opened contacts remove the voltage source from the previously identified operating paths for the 120 L1 through L120 line relays mentioned above.

Also, the negative voltage output of gate 223 is supplied via lead 223*b* to the input of the reset side of flip-flop 154 in FIG. 10 which is thereupon reset. As the output of the 1-side of the reset flip-flop is a negative voltage, it serves to interrupt the previously mentioned operating path for relay 155 which releases to open its contact 155*a* in FIG. 16. This interrupts the above-identified operating paths for relays 156 and 156*n* which thereupon release to open their associated contacts 156*b*, the intermediate contacts, and contacts 156*d*, thereby interrupting the aforementioned operating paths for the associated relays 157, 157*c*, the intermediate relays and relay 157*n*. These relays release thereby opening their contacts 157*a* and 157*b* in FIG. 12 and the 120 pairs of contacts represented by contact pairs 158*a* and 158*b*, 158*c* and 158*d*, the intermediate contact pairs, and contact pairs 158*e* and 158*f* and 158*g* and 158*h* in FIG. 16 to interrupt the previously traced operating paths for the 120 L1 through L120 line relays as above-identified. These relays then return to the released state.

When flip-flop 227 in FIG. 13 was reset by the end test message signal as previously mentioned, the output of its 0-side provided ground to inverter 226 whose output produced a negative voltage. This applied to monopulser 226*c* causes it to produce in its output a 5-microsecond negative voltage which is supplied via lead 307*b* to the reset side of flip-flops 215 in FIG. 12 and 312 in FIG. 14. As ground is on lead 307*a* connected to the reset side of flip-flop 312 because the message transfer at the moment is from the main terminal to the No. 1 terminal, the negative voltage, effective on lead 307*b* to the reset side of flip-flop 312 as just mentioned, resets it. This causes the output of the 1-side of flip-flop 312 to provide a negative voltage thereby interrupting the previously identified operating path for relay 312*a*. This relay releases to open its contact 312*b* in FIG. 17 thereby interrupting the above-noted operating paths for relays 313 and 313*a* which release to open their associated contacts 313*e* and 313*h*. These open contacts interrupt the afore-identified operating paths for relays 313*f*, 313*g* and 313*m*. These relays release to open their 120 contacts 313*n* through 313*s* as above-identified in FIG. 16 for interrupting the previously traced operating paths for the 120 L1 through L120 line relays previously mentioned, all of which then release.

Figure 36:
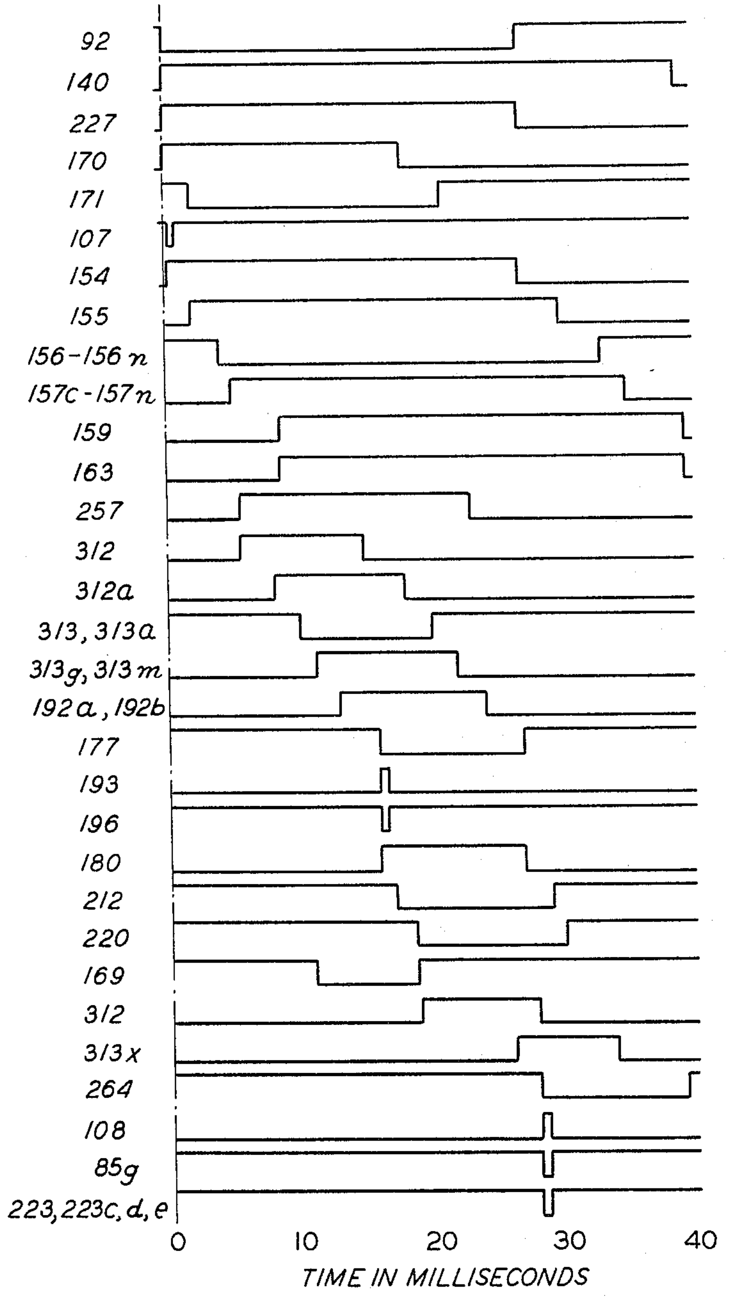

The release of relay 157 opens its contacts 157*a* and 157*b* in FIG. 12 to institute an action which provides eventually ground on lead 76 in FIG. 11 for indicating to the interface in FIG. 6A an idle condition and negative voltage on lead 99 in FIG. 11 for indicating to the interface a busy condition in FIG. 6A, in the manner described hereinbefore. In order to prevent the transmission of a second acknowledgment signal via lead 108 in FIG. 13 at this time, however, the negative voltage effective on lead 307*b* and applied to the reset side of flip-flop 215 in FIG. 12 resets it as above described for the reason that ground now present on lead 165*d* connected in the output of gate 165 in FIG. 14 does not affect the reset. In the reset state of flip-flop 215, the output of its 1-side is a negative voltage which serves to inhibit gate 232, while ground is effective at this time on the other input lead 230 thereto for the reason explained above. As a consequence, the output of gate 232 remains at ground thereby precluding a second activation of monopulser 233 in FIG. 13 to effect the transmission of a second acknowledgment signal on lead 108 in the manner explained above. Upon the expiration of the 2-microsecond ground in the output of monopulser 231 on lead 231*a* in FIG. 12, the output of this monopulser then provides a 2-microsecond negative voltage to the input of the 1-side of flip-flop 215 which is thereby set to its normal state. This voltage is provided in the output of monopulser 231 in response to the release of relay 157 in FIG. 16 and the opening of its associated contacts in FIG. 12 as just mentioned, in the manner of the message transfer from the main terminal to the No. 1 terminal as explained hereinbefore. Logic sequence diagrams for the transfer of a test message from the main data terminal to the No. 1 data terminal are illustrated in FIG. 36.

*Automatic clear and alarm circuit in direction from the main data terminal to the No. 1 data terminal*

At the time of the operation of the interface to provide a make busy signal of negative voltage on lead 92 in FIG. 6A for message transfer from the main terminal to the No. 1 terminal, such operation also provides a clock activate signal of negative voltage on lead 137*a* as previously explained. This voltage transmitted vial lead 137*a* and closed contact 353*t* in FIG. 13 triggers clock activate monopulser 340 in FIG. 20 whose output thereupon produces a 5-microsecond negative voltage pulse which is applied to the set side of clock activate flip-flop 340*b* thereby setting it. At the same time, the 5-microsecond negative voltage pulse in the output of monopulser 340 is supplied on lead 340*c* to the set side of main terminal time out flip-flop 340*d* in FIG. 21 to set it. During this time, a clock signal of negative voltage on lead 331*e* in FIG. 13 as previously mentioned triggers clock monopulser 341 in FIG. 20 which is thereby caused to produce in its output a 1-microsecond negative voltage pulse. This is changed in the output of clock inverter 341*a* into a 1-microsecond ground pulse which is supplied to one input of clock pulse AND-NOT gate 341*b*. As flip-flop 340*b* is presently in the set state, ground from the output of the 1-side thereof is also being supplied to a second input of gate 341*b*. As a consequence of such two concurrent input grounds, gate 341*b* provides in its output a negative pulse. Assuming the clock included in the main terminal is supplying a signal at each one-eighth second, for example, then the output of gate 341*b* provides a negative voltage in the corresponding one-eighth second, so long as flip-flop 340*b* remains in the set state.

On each occasion gate 341*b* provides a negative voltage pulse in its output, the pulse activates a time out pulse counting circuit comprising monopulser 342, flip-flop 342*a*, AND-NOT gate 342*b*, monopulser 342*c*, flip-flop 342*d*, AND-NOT gate 342*e*, monopulser 342*f* and inverter 342*g*. This counting circuit operates to count two input time pulses from gate 341*b* in a manner which is essentially identical with that of the parity counting circuit shown in FIG. 22 for counting three input pulses as explained hereinbefore. For the moment, it is understood that the output of the 0-side of flip-flop 342*a* in the set state supplies a negative voltage to inhibit monopulser 342 thereby precluding the latter from changing its output after it has reverted to ground so long as flip-flop 342*a* is set, and that the output of the 0-side of flip-flop 342*d* in the set state supplies a negative voltage to inhibit monopulser 342*c* thereby preventing the latter from changing its output after it has reverted to ground so long as flip-flop 342*d* is set, in the manner of the corresponding elements of the parity counting circuit as previously mentioned.

After the time out counting circuit has counted the two pulses supplied thereto from the output of gate 341*b*, the third negative voltage pulse therefrom is changed in the output of clock pulse inverter 342*g* to ground which is applied to the input of gate 342*e*. This ground, together with the other ground inputs, activates gate 342*e* to provide in its output a negative voltage pulse. This is translated in the output of monopulser 342*f* into a 2-microsecond negative voltage pulse. This pulse is changed in the output of time out inverter 343 into a 2-microsecond ground pulse which is supplied, together with ground from the output of the 1-side of flip-flop 340*d* in FIG. 21 presently in the set state, to the input of main terminal input AND-NOT gate 343*a*. In response to the two concurrent inputs thereto, gate 343*a* provides in its output a 2-microsecond negative voltage pulse which is applied to supervisory alarm pulser 343*b*. This in turn produces in its output a 5-microsecond negative voltage pulse which is simultaneously applied to supervisory alarm AND-NOT gate 343*c* and the set side of main terminal clock flip-flop 343*d*. This flip-flop is thereby set to provide in the output of its 0-side a negative voltage of which one portion applied to monopulser 343*b* serves to inhibit it in such manner that another negative voltage input to monopulser 343*b* fails to provide corresponding 5-microsecond negative pulse in the output thereof. A second portion of the negative voltage in the output of the 0-side of flip-flop 343*d* triggers automatic clear pulser 343*e* whose output includes a 5-microsecond negative voltage pulse which is applied via lead 343*f* to the input of the set side of automatic clear flip-flop 343*g* in FIG. 18 thereby setting it. At this time a second input on lead 343*h* to the set side of flip-flop 343*g* is ground because the message transfer is in the direction of the main terminal to the No. 1 terminal or in other words, it is not in the direction from the No. 1 terminal to the main terminal. The action responsive to the negative voltage in the output of the 1-side of flip-flop 343*g* is subsequently described.

Now, it is assumed that the system comprising the main terminal, interface, channel A and No. 1 terminal has been cleared and the time out counter circuit has been cleared by a negative voltage effective on lead 370*e* in a manner that will be hereinafter explained and applied to the inputs of the 0-sides of flip-flops 342*a* and 342*d*, both of which are thereupon reset. This removes the inhibiting voltages from the respective monopulsers 342 and 342*c* whereby both of them are restored to the normal condition in readiness to respond to another time out count. At this time, however, flip-flop 343*d* in FIG. 21 is not reset and now serves as a memory element to indicate that one time out has occurred in the direction of message transfer from the main terminal to the No. 1 terminal, in the event that a second consecutive time out has taken place in the same direction. On the other hand, flip-flop 343*d* is reset in response to the proper message transfer in the same direction, in a manner that is subsequently described.

Figure 20:
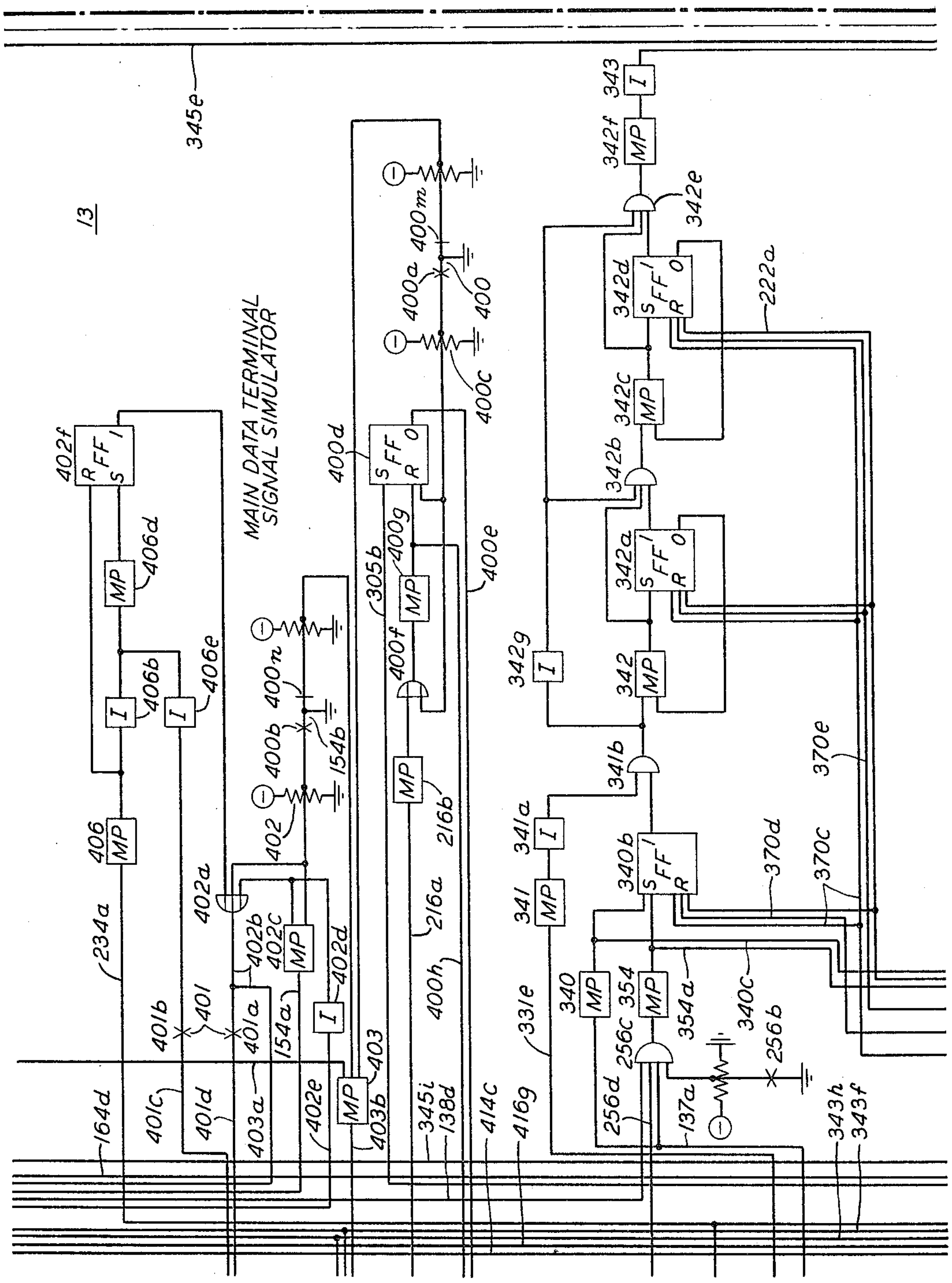
Figure 21:
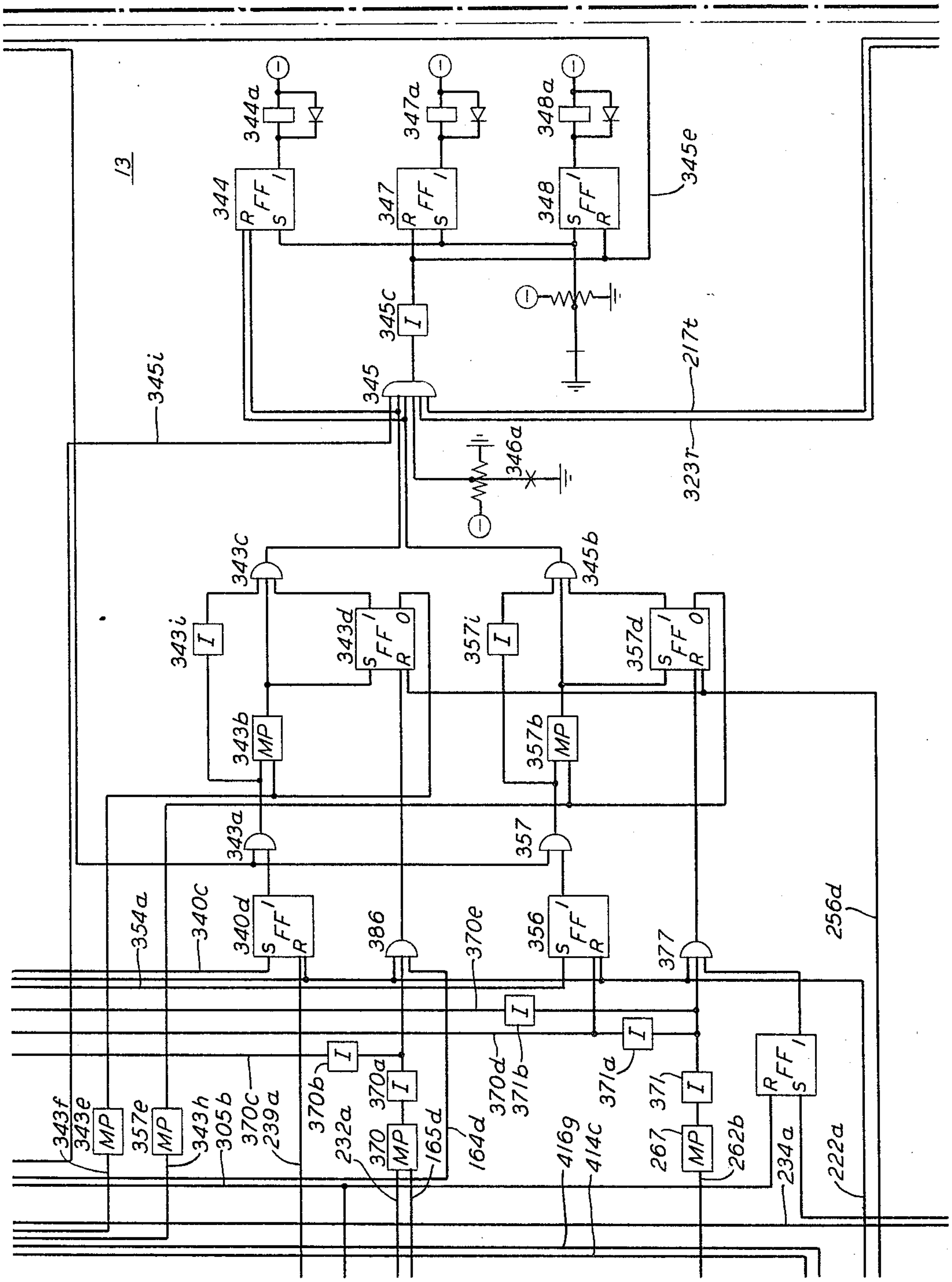

It is further assumed now that a second consecutive time out has occurred so that when negative voltage is again applied to lead 137*a* in FIG. 13, monopulser 340 in FIG. 20 is triggered to provide in its output a 5-microsecond negative voltage pulse which sets both flip-flop 340*b* and 340*d* in FIG. 21 as previously mentioned. Flip-flop 340*d* in the set state provides in the output of its 1-side ground which activates the time out counting circuit to count two pulses from the output of gate 341*b* in the manner hereinbefore discussed. In the event a third negative voltage pulse is received from the output of gate 341*b* in FIG. 20 before the instant message transfer is properly terminated in the indicated direction, the third pulse is changed in the output of inverter 342*g* into a ground which is applied as one input to gate 342e. This ground together with its other inputs of ground activates gate 324*e* to produce in its output a negative voltage which is supplied via monopulser 342*f*, but changed in the output of inverter 343 to ground. This, together with the other ground supplied from the output of the 1-side of flip-flop 340*d*, stimulates gate 343*a* in FIG. 21 which produces a negative voltage in its output. Although a portion of this voltage is supplied to the input of monopulser 343*b*, the latter's output maintains its status quo under control of the inhibiting negative voltage applied thereto from the output of the 0-side of flip-flop 343*d* which is in the set state, as previously mentioned.

At the same time, another portion of the negative voltage in the output of gate 343*a* in FIG. 21 is changed in the output of supervisory alarm inverter 343*i* to ground which is applied to an input of gate 343*c*. In addition to this ground, other grounds are also being supplied at the same time from monopulser 343*b* and the output of the 1-side of flip-flop 343*d* to the input of gate 343*c*, whereby the latter is activated to produce in its output a negative voltage which is simultaneouly supplied to the reset side of channel supervisory alarm flip-flop 344 and alarm NOT-OR gate 345. Flip-flop is reset whereby a negative voltage is provided in the output of its 1-side. This voltage replaces the ground provided for the operating path of channel supervisory alarm relay 344*a* when flip-flop 344 was in the set state. As the operating path for relay 344*a* is now interrupted, it releases to close its contact 344*b* in FIG. 12 to complete a circuit including channel supervisory alarm leads 344*c* and 344*d* for a purpose that is subsequently mentioned.

Gate 345 receives, in addition to the negative voltage received from gate 343*c*, ground from via closed contact 346*a* of relay 346 in FIG. 19 which is operated at this time for a reason that is subsequently mentioned, ground from the output of supervisory alarm gate 345*b*, which is effective to provide a negative voltage only when the direction of message transfer is from the No. 1 terminal to the main terminal, ground from alarm lead 345*i* in FIG. 19 via closed contact 345*k*, and ground is on main terminal bad parity lead 323*r* for channel A and lead 217*t* for channel B because the parity count circuit in FIG. 22 is idle at this time. As one input is a negative voltage while the remaining inputs to gate 345 are ground at the moment, this gate provides in its output ground which is changed in the output of alarm inverter 345*c* to a negative voltage. This applied to the reset sides of transmit major alarm flip-flop 347 and main terminal major alarm flip-flop 348, both of which are thereby reset, and via lead 345*e* to the set side of automatic system off line flip-flop 349 in FIG. 19 which is thereby set. In the reset state flip-flop 347 in FIG. 21 provides a negative voltage in the output of its 1-side thereby interrupting the operating path of transmit major alarm relay 347*a*. This releases to open its contact 347*b* in FIG. 19 to remove ground from its associated lead 347*c* thereby interrupting the operating path for receive major alarm relay 347*e* in FIG. 26. This relay releases to open its contact 347*f* thereby disconnecting ground from the alarm circuit in FIG. 26 for providing a suitable indication of the occurrence of a third time out at the No. 1 terminal maintenance point, not shown. Lead 345*i* via open contact 345*k* in FIG. 19 provides a negative voltage from the alarm circuit shown for activating gate 345 and thereby flip-flops 347 and 348 in FIG. 21 essentially in the manner just mentioned for providing a major alarm in response to the occurrence of a major fault at the main control logic terminal 13 in FIG. 1.

In the reset state, flip-flop 348 in FIG. 21 provides in the output of its 1-side a negative voltage which interrupts an operating path for relay 348*a* which thereupon releases to close its contact 348*b* in FIG. 19. This supplies ground for activating main data terminal alarm circuit in FIG. 19 which indicates the occurrence of the third time out at the main terminal maintenance point, not shown.

Flip-flop 349 in FIG. 19 in the set state provides in the output of its 0-side a negative voltage to one input of break driver gate 350 thereby inhibiting it and to the set side of break driver flip-flop 350*a* thereby setting it. In the set state of flip-flop 350*a*, the output of its 1-side supplies ground which completes the operating path of system break driver relay 350*b*. This operates to close its contact 350*c* in FIG. 19 thereupon supplying ground to complete the operating path for system break relay 350*d*. In operating, this relay closes contacts 350*e*, 350*f*, 350*g*, all in FIG. 19, 350*m* in FIG. 11, 350*p* in FIG. 14 and 350*v* in FIG. 15 for the several purposes which are presently discussed. Closure of contact 350*e* in FIG. 19 completes a loop path to alarm and indicating circuit for registering therein that channel A is cut off from the interface. Closure of contact 350*f* in FIG. 19 supplies ground to one input of manual on line set AND-NOT gate 351 and to system break inverter 351*a*. The output of this inverter is applied a negative voltage to inhibit manual on line set AND-NOT gate 351*b* and is transmitted on lead 351*c* to gate 235 in FIG. 13 wherein the negative voltage is changed to ground. This is applied through cable driver 236 and closed relay contact 237 to acknowledgment lead 108 connected to the interface as in FIG. 6A. This ground serves to disconnect channel A from the interface which is thereupon available to institute message transfer therefrom via channel B.

Closure of contact 350*g* in FIG. 19 supplied ground to one input of make driver AND-NOT gate 352 whose other input from the output of system on line inverter 352*a* is also ground because system on line key 352*b* in FIG. 17 is not operated. As a consequence, main terminal system relay 352*c* is released whereby its make contact 352*d* in FIG. 18 is opened to permit negative voltage provided by voltage divider 352*e* to be applied via lead 352*i* to the input inverter 352. This changes the input of negative voltage to an output of ground which is supplied to the other input of gate 352 as just mentioned. As a result of its two ground inputs, as just mentioned, gate 352 provides in its output a negative voltage which is applied to the reset side of make driver flip-flop 353 which is thereby reset to produce in its output a negative voltage. This interrupts an operating path for system make driver relay 353*a* which thereupon releases to open its associated contact 353*b* to disconnect ground from the operating paths of system make relays 353*c* and 353*d* and system make set relay 353*e*. These relays release to open their associated contacts for purposes that will be presently explained. Released relay 353*e* opens its contact 353*f* thereby enabling voltage divider 353*g* to apply an inhibiting negative voltage to gate 350 for a purpose that is later mentioned.

Returning again to operated relay 350*d* just mentioned and to FIG. 19, closed contact 350*m* in FIG. 11 serves to supply negative voltage from associated voltage divider 350*n* to idle lead 76; closed contact 350*p* in FIG. 14 serves to apply negative voltage from associated voltage divider 350*s* to have message lead 310*b*; and closed contact 350*v* in FIG. 15 serves to provide negative voltage from voltage divider 350*w* to reset lead 330. The effect of the negative voltage on the three leads just identified is to indicate to the interface a permanent busy signal from channel A, in the manner explained hereinbefore in regard to the signaling voltage on the respective leads.

When, therefore, released relays 353*c*, 353*e* and 353*d* in FIG. 19 open their contacts 353*h*, 353*i*, 144*a*, 146*a*, 310*a*, 306*b*, 353*k*, 353*m*, 353*n*, 219*a*, 237, 353*p*, 311*a*, 353*r*, 353*s*, 353*t* and 353*x* in FIGS. 10, 11, 13, 14 and 15, communication between the interface and channel A is thereby interrupted, but is still continued between channel A and the No. 1 data terminal. The latter communication may be interrupted, if desired, by a manual operation in a manner that will be subsequently mentioned. As channel A is now off line in regard to the interface, the channel is available for appropriate testing operations.

*Time out in direction from No. 1 data terminal to main data terminal*

A time out in the direction of message transfer from the No. 1 terminal to the main terminal causes the system to disconnect channel A from the interface in a manner that is presently explained. It is recalled that the relay 257 in FIG. 18 and relay 256*a* in FIG. 19 were operated during the message transfer from the No. 1 terminal to the main terminal; and that closed contact 256*b* in FIG. 20 of relay 256*a* served to apply ground to one input of gate 256*c*. At the same time ground is applied via lead 256*d* from the output of the 0-side of flip-flop 138*e* in FIG. 18 to a second input of gate 256*c* because the flip-flop is in the reset state since channel A is not being cleared at this time. Ground is also being applied on lead 137*a* in FIG. 13 and closed relay contact 353*t* as a third input to gate 256*c* for the reason that the message transfer at the moment is not in the direction from the main terminal to the No. 1 terminal. Now, when clock phase PH3 is supplied on lead 138*a* in FIG. 7A an on leads 138*a* and 138*d* in FIG. 11, it provides a 1-microsecond ground as a fourth input to gate 256*c*, in FIG. 20. As all four inputs to this gate are now ground, it provides in its output a negative voltage which is supplied to clock activate monopulser 354. This provides in its output a 5-microsecond negative voltage pulse which is supplied to the set side of clock activate flip-flop 340*b* in FIG. 20 thereby setting it and which is also applied on lead 354*a* to the 1-side of No. 1 terminal time out flip-flop 356 in FIG. 21 thereby setting it. In the set state, flip-flop 340*b* supplies ground to one input of gate 341*b* whose other input is also receiving a 1-microsecond ground at the same time from the output of inverter 341*a*. As a consequence, flip-flop 341*b* produces in its output a 1-microsecond negative voltage which activates the time out pulse counting circuit comprising monopulser 342 flip-flop 342*a*, gate 342*b*, monopulser 342*c*, flip-flop 342*d*, gate 342*e*, monopulser 342*f*, and inverter 342*g* in FIG. 20 to effect a count of two in the manner hereinbefore explained in regard to the message transfer from the main terminal to the No. 1 terminal.

Now, as above explained, when the third negative pulse is provided in the output of gate 341*b*, the pulse is changed to ground in the output of inverter 342*g* and applied as one input to gate 342*e*. This input, together with the two other simultaneous ground inputs to this gate, serves to produce in the output of gate 342*e* a negative voltage which is translated in the output monopulser 342*f* into a 2-microsecond negative voltage pulse. This pulse is applied to the input of inverter 343 whose output thereupon effects a 2-microsecond ground pulse which is applied to one input of No. 1 terminal time out AND-NOT gate 357 in FIG. 21. This gate is also receiving ground from the output of the 1-side of flip-flop 356 resting in its set state at this time. As a consequence of its two ground inputs, gate 357 provides in its output a negative voltage which is applied to a circuit comprising No. 1 terminal supervisory alarm monopulser 357*b*, supervisory alarm gate 345*b*, No. 1 terminal clock flip-flop 357*d*, automatic clear monopulser 357*e*, and supervisory alarm inverter 357*i* to provide a negative voltage on lead 343*h*, in the manner described hereinbefore for the operation of the circuit including the corresponding elements 343*b*, 343*c*, 343*d*, 343*e*, and 343*i* to produce a negative voltage on lead 343*f*.

In addition, gate 345*b* produces the negative voltage which is applied as one input to gate 345 as previously mentioned. As this negative voltage is effective while the remaining inputs to gate 345 are ground, this gate provides in its output ground which is changed in the output of inverter 345*c* to a negative voltage which is simultaneously applied to the inputs of the reset sides of flip-flops 347 and 348 thereby resetting them, and to the input of the 1-side of flip-flop 349 in FIG. 19 to set it. In the reset state, the ouput of the 1-side of flip-flop 347 in FIG. 21 is negative voltage which interrupts the previously mentioned operating path of relay 347*a*. This releases to open its contact 347*b* in FIG. 19 to remove ground from lead 347*c* thereby interrupting the previously identified operating path via this lead for relay 347*e* in FIG. 26 which then releases to open its contact 347*f* to remove ground from the alarm circuit in FIG. 26. This serves to provide an alarm indication at the No. 1 terminal maintenance point, not shown, of the occurrence of the third time out. As the reset of flip-flop 348 in FIG. 21 serves to release relay 348*a* which then closes its contact 348*b* in FIG. 19 thereupon to supply ground for activating the main terminal alarm circuit in FIG. 19, as previously mentioned, the occurrence of the time out is indicated at the main terminal maintenance point, not shown.

As flip-flop 349 in FIG. 19 is now set in the manner just described, the output of its 0-side is a negative voltage which inhibits gate 350 and which is applied to the set side of flip-flop 350*a* to set it. This flip-flop in the set state provides a ground to operate relay 350*b* which closes its contact 350*c* to complete an operating path for relay 350*d*. This relay operates to close its contacts 350*e*, 350*f*, 350*g*, 350*m*, 350*p* and 350*v* for the following purposes: via closed contact 350*e* to register an alarm in the alarm circuit in FIG. 19; via closed contact 350*f* to effect the transmission of ground on lead 108 in FIG. 13 to FIG. 6A as above explained for disconnecting channel A from the interface; via closed contact 350*g* in FIG. 19 to disconnect ground from relays 353*c*, 353*d* and 353*e* thereby releasing them, as previously mentioned; via closed contact 350*m* in FIG. 11 to supply negative voltage to idle lead 76; via closed contact 350*p* in FIG. 14 to apply negative voltage to lead on lead 310*b*; and via closed contact 350*v* in FIG. 15 to apply negative voltage on lead 330. The effect of the negative voltage on leads 76, 310*b* and 330 is to indicate a permanent busy signal from channel A to the interface. Release of relays 353*c*, 353*d* and 353*e* in FIG. 19 opens contacts 353*h*, 353*i*, 144*a*, 146*a*, 310*a*, 306*b*, 353*k*, 353*m*, 353*n*, 219*a*, 237, 353*p*, 311*a*, 353*r*, 353*s*, 353*t* and 353*x* in FIGS. 10, 11, 13, 14 and 15 to interrupt communication between the interface and channel A thereby rendering this channel available for appropriate testing operations.

*Release of counter circuit upon completion of proper message transfer*

In the direction from the main terminal to the No. 1 terminal: when a count of one or two is effected in the time out counting circuit and a message is then properly transferred in the direction from the main terminal to the No. 1 terminal, for example, the time out counting circuit for such direction is restored to normal in the following manner. Negative voltage effective on lead 232*a* from the output of gate 232 in FIG. 12 is applied to main terminal clear monopulser 370 in FIG. 21 when an acknowledgment signal is to be transmitted on lead 108, as previously mentioned. The output of monopulser 370 provides in its output a 2-microsecond negative voltage pulse which is changed to a 2-microsecond ground pulse in the output of main terminal clear inverter 370*a*. This ground pulse is again changed in the output of main terminal clear inverter 370*b* to a 2-microsecond negative voltage pulse which is applied on lead 370*c* to the reset sides of flip-flops 340*b*, 342*a* and 342*d* in FIG. 20 while at the same time ground is also effective on lead 222*a* because the system is not being automatically cleared and on lead 370*e* because the system is not being cleared in response to a proper message transfer from the main terminal to the No. 1 terminal, both latter grounds being applied to the remaining two inputs of the respective flip-flops. As a consequence, flip-flops 340*b*, 342*a* and 342*d* are reset so that the outputs of their 1-sides and 0-sides are negative voltage and ground respectively, thereby reversing the voltages supplied from the outputs of the respective sides when the flip-flops were in the set state. This serves to restore the time out counting circuit to a normal or idle condition. After the output of monopulser 233 in FIG. 13 returns to ground upon the expiration of 5 microseconds, this ground is changed in the output of inverter 234 into a negative voltage which is translated into a 5-microsecond negative voltage pulse in the output of monopulser 239. This pulse, in the output of monopulser 233, serves to effect ground on lead 108 to the main terminal in the manner aforedescribed. It is recalled from the previous description of message transfer from the No. 1 terminal to the main terminal that gate 262 in FIG. 14 provided a negative voltage on its output lead 262*a*. This voltage is now applied on lead 262*b* to monopulser 267 in FIG. 21 whose output is thereupon caused to produce a 2-microsecond negative voltage pulse. This is changed in the output of No. 1 terminal clear inverter 371 to a 2-microsecond ground pulse and again changed to a 2-microsecond voltage pulse in the outputs of No. 1 terminal clear inverters 371*a* and 371*b*. The pulse from the output of inverter 371*a* is applied to the reset side of flip-flop 356 thereby resetting it, while at this time ground on lead 222*a* is also applied to the same input because the time out counter circuit is not being cleared at this time as previously indicated. The negative voltage pulse in the output of inverter 371*a* on lead 370*d* is also applied to the reset side of flip-flop 340*b* in FIG. 20 thereby resetting it. Ground is also effective on lead 370*c* because the message transfer at the moment is not in the direction of the main terminal to the No. 1 terminal, and on lead 222*a* because the system is not being cleared at this time. Ground is also on lead 118*a* in FIG. 13 to remove the text parity indication, and on lead 239*a* to activate flip-flop 340*d* in FIG. 21 to the reset state in the manner discussed hereinbefore. This resetting of flip-flop 340*d* is achieved because ground is effective on lead 222*a* for the reason that the system is not being cleared of time out counts at this time. In the reset state flip-flop 340*d* allows gate 343*a*, monopulser 343*b*, gate 343*c*, inverter 343*i*, flip-flop 343*d*, monopulser 343*e* and flip-flop 344 in FIG. 21 to return to the normal or idle state. Now the restoration of time out counter circuit for the direction of message transfer from the main terminal to the No. 1 terminal is not being cleared of time out counts in the manner explained hereinbefore. The negative voltage pulse in the output of inverter 371*b* in FIG. 21 is applied on lead 370*e* to the reset sides of flip-flops 342*a* and 342*d* in FIG. 20 while ground on leads 222*a* and 370*e* for the reasons just mentioned is also being applied to the same sides whereby both flip-flops are reset. As the outputs of the 1-sides and 0-sides of both reset flip-flops are negative voltage and ground, respectively, this restores the previously identified time out counter circuit to the idle condition for the direction of message transfer from the No. 1 terminal to the main terminal, as mentioned above for the direction of message transfer from the main terminal to the No. 1 terminal.

*Automatic clear and alarm circuit*

In the previous discussion of the time out counter circuit for the direction of either from the main terminal to the No. 1 terminal or vice versa, it was mentioned that a 5-microsecond negative voltage pulse effective on either lead 343*f* or 343*h* in FIG. 21 served to activate flip-flop 343*g* in FIG. 18 to the set state. As a consequence, the flip-flop provided in the output of its 1-side ground which serves to complete an operating path for transmit automatic clear relay 372 which thereupon closed its contact 372*a* and opened its contact 372*b*. This opened contact disconnects ground from associated voltage divider 372*c* which then supplies a negative voltage to the inputs of automatic clear inverter 372*d*, reset on line flip-flop gate 372*e*, clear NOT-OR gate 372*f* and clear NOT-OR gate 372*g*. Gate 372*f* is also receiving ground on lead 372*h* from the output of gate 351 in FIG. 19; and gate 372*g* is also receiving ground on leads 373*c* and 373*b* via closed contact 373*a* of released relay 373 and via closed contact 374*a* of main terminal major clear relay 374 in FIG. 17. Since gates 372*f* and 372*g* are receiving negative voltage together with ground, their outputs provide ground. Ground from the output of gate 372*f* is changed by clear inverter 375 to a negative voltage which is effective on lead 142. As the voltage on lead 142 relates to channel B shown in FIG. 1, no further description of it is given for a reason that is mentioned later herein. Ground from the output of gate 372*g* is changed by clear power inverter 376 to a negative voltage which is applied to lead 222*a*. The negative voltage on lead 222*a* is applied to the reset sides of flip-flops 340*b*, 342*a* and 342*d* in FIG. 20 thereby resetting them. This negative voltage is also applied to No. 1 terminal clear gate 377 in FIG. 21 but has no effect thereon at the moment. In this manner the time out counter circuit discussed hereinbefore is restored to the idle state.

In addition, the negative voltage effective on lead 222*a* is also applied to inputs of the 0-sides of flip-flops 154 in FIG. 10, 163 in FIG. 12, 169 in FIG. 12, 170 in FIG. 11, 227 in FIG. 13, 260 in FIG. 11, 266 and 267 in FIG. 15 and 312 in FIG. 14, thereby resetting all of them. The negative voltage is applied on lead 222*a* to the input of rset NOT-OR grate 378 in FIG. 15 which is receiving at the same time ground on lead 256*d* because the system is not being manually cleared in a manner that subsequently will be explained. As gate 378 is receiving both negative voltage and ground at its two inputs, it provides in its output a ground which is supplied to the input of reset gate 378*a* whose other input is also receiving ground on lead 324*h* and closed relay contact 353*k*. In view of such two input grounds, gate 378*a* provides in its output a negative voltage which activates reset monopulser 378*b*. This produces in its output a 5-microsecond negative voltage pulse which stimulates NOT-OR gate 378*c* to produce in its output a 5-microsecond ground. This ground in the output of gate 378*c* is changed in the output of reset inverter 378*e* into a 5-microsecond negative voltage which is applied via reset cable driver 378*f* and closed relay contact 353*m* to reset lead 330. This lead supplies negative voltage to the interface in FIG. 8A for the purpose mentioned hereinbefore.

Negative voltage effective on lead 142 as just mentioned is now applied to the set side of flip-flop 140 in FIG. 11 thereby setting it. Ground from the output of the 1-side of this flip-flop on lead 140*e* is changed in the output of inverter 143 to a negative voltage which is supplied via cable driver 144 and closed relay contact 144*a* to idle lead 76. At the same time, negative voltage from the output of the 0-side of flip-flop 140 on lead 140*a* is changed in the output of inverter 145 into ground which is supplied via cable driver 146 and closed relay contact 146*a* to busy lead 99. These voltages on leads 76 and 99 serve to provide the interface in FIG. 6A with a busy indication while the remainder of the system is being cleared by the negative voltage effective on lead 222*a*, in the manner previously explained.

Referring now to FIG. 18, it is recalled relay 372 is in the operated condition. As a consequence, ground is available on its closed contact 372*a* whereby both ground and negative voltage are effective on main terminal automatic clear lead 372*m* for operating receive automatic clear relay 379 in FIG. 25. This operates to close its make contact 379*a* and open its break contact 379*b*. Closed contact 379*a* provides ground to complete an operating path for automatic clear relay 379*c* which operates to close its make contact 379*d* and open its break contact 379*e*. Open contact 379*e* enables negative voltage to be supplied from voltage divider 379*f* as one input to clear NOT-OR gate 380. Break contact 379*b* of operated relay 379 permits negative voltage of voltage divider 379*g* to be applied as a second input to gate 380. At this time ground is on the third input to gate 380 because the system is not being manually cleared in a manner that will be subsequently explained. As a consequence of such two inputs of negative voltage, gate 380 provides ground in its output. This ground is changed in the output of clear inverter 380*a* to negative voltage which is applied on lead 381 to the reset sides of the following flip-flops to activate them to the reset state: 186, 193, 251, 252, 273, 278, 285 and 304 in FIGS. 28, 29, 30 and 31.

The negative voltage on lead 381 is also applied to monopulser 320 in FIG. 28 which is thereby stimulated to produce in its output a 5-microsecond negative voltage pulse. This is changed in the output of inverter 320*a* to a 5-microsecond ground pulse which provokes no action in the system until the output of monopulser 320 returns to ground, whereupon the output of inverter 320*a* returns to its normal state which supplies an output of negative voltage. This effects in the output of monopulser 320*b* a 5-microsecond negative voltage pulse which is supplied to one input of gate 320*c* which is also receiving a negative voltage on lead 381. As both inputs to gate 320*c* are negative voltage, it provides in its output ground which is changed in the outputs of inverters 320*d*, 320*e*, 320*i*, and 320m into negative voltage which resets the 120 data registers DR1 through DR120 in FIG. 27 in the manner explained hereinbefore.

It will be recalled from the foregoing explanation that relay 379c in FIG. 25 is now operated to close its contact 379d. This completes an operating path including ground and a source of negative voltage applied via lead 379m for relay 373 in FIG. 18. This relay operates to open its normally closed contact 373a for disconnecting ground thereby enabling voltage divider 373d to apply a negative voltage to the reset sides of flip-flop 343g, and gates 372e and 372g. Gate 372g is not activated at this time due to the inhibiting negative voltage applied thereto by voltage divider 372c, as relay 372 is operated to open its break contact 372b. Flip-flop 343g is now reset to provide negative voltage in the output of its 1-side thereby interrupting the operating path for relay 372. This relay releases to open its make contact 372a and to close its break contact 372b. Closed contact 372b supplies ground to inverter 372d, and gates 372e, 372f and 372g. Gate 372g is still inhibited for the reason just mentioned thereby precluding any change of the voltage in the output thereof.

At the time relay 373 was operated, its closed contact 373e supplied ground to one input of set on line flip-flop gate 382. Also, at the time relay 372 was operated, its open contact 372b enabled voltage divider 372c to supply a negative voltage to inverter 372d as aforementioned. This voltage is changed in the output of the inverter 372d to a ground which is applied as one input gate 382. As this gate is now supplied with two ground inputs, it provides in its output a negative voltage which is applied to the set side of flip-flop 382a, together with ground on manual on line flip-flop lead 383 because manual on line flip-flop 383a in FIG. 19 is in the reset state at this time. Flip-flop 382a is now activated to the set state. The release of relay 372 opens its contact 372a thereby disconnecting ground from lead 372m to interrup the operating path of relay 379 in FIG. 25. This relay releases to open its contact 379a to disconnect ground from the operating path of relay 379c which thereupon releases to open its contact 379d. This disconnects ground from lead 379m to interrupt the operating path for relay 373 in FIG. 18 which then releases to close its contact 373a and open its contact 373e. Closure of contact 373a supplies ground on leads 373b and 373c to gates 372e and 372g. As ground is now effective on all three inputs to gate 372g, it provides in its output a negative voltage which is changed in the output of inverter 376 into a ground. This removes the negative voltage from lead 222a that was heretofore utilized to effect the automatic clear signal in the manner previously mentioned, and permanently places a ground thereon.

As relays 372 and 373 are now released, ground is supplied from their closed break contacts 372b and 373a, respectively, to the two inputs of gate 372e which provides negative voltage in its output. This voltage applied to the reset side of flip-flop 382a resets it whereupon the output of the 1-side is a negative voltage. This activates monopulser 164e to produce in its output a 5-microsecond negative voltage pulse which is applied via lead 164d to gate 164c in FIG. 12 whose other input from the output of monopulser 164b is ground at the moment because a message is not being terminated as described hereinbefore. As a consequence, gate 164c provides in its output a 5-microsecond ground pulse. When monopulser 164e in FIG. 18 returns to ground after 5 microseconds of elapsed time, the output of gate 164c provides a negative voltage in its output. This voltage stimulates monopulser 231 which is then caused to provide a 2-microsecond negative voltage in its output. This voltage is changed in two successive inversions via gate 239 and inverter 240, and is then applied as a negative voltage on lead 240a to the reset side of flip-flop 140 thereby resetting it. Negative voltage in the output of the 1-side of flip-flop 140 is changed in the output of inverter 143 to ground which is applied via monopulser 144 and closed relay contact 144a to idle lead 76; and ground from the output of the 0-side of flip-flop 140 is changed in the output of inverter 145 to negative voltage which is supplied through monopulser 146 and closed relay contact 146a to busy lead 99. This restores both leads 76 and 99 to the normal state and terminates the automatic clearing of the system at the main terminal for channel A.

*Manual clear and off line operation*

A manual actuation of manual clear off line key 385 in FIG. 17 closes two associated contacts to complete an operating path on leads 385a and 385b for main terminal manual control relays 374 in FIG. 17 and 387 in FIG. 24 both of which operate. Relay 374 opens its contact 374a in FIG. 18 to disconnect ground therefrom and at the same time permit voltage divider 374b to apply a negative voltage to the set side of flip-flop 138e and to one input of gate 372g which is receiving ground at its two other inputs from contact 372b of released relay 372 and from contact 373a of released relay 373, as aforementioned. As a consequence, gate 372g provides in its output ground which is changed in the output of inverter 376 to negative voltage which is then effective on lead 222a. This clears the main terminal at channel A as described above for the automatic clearing of the same terminal. The output from the 0-side of flip-flop 138e in FIG. 18, which is in the set state, is a negative voltage which is simultaneously applied via lead 256d (*a*) to the input of gate 256c in FIG. 20 thereby inhibiting it, (*b*) to lead 138c in FIG. 18, and (*c*) to the reset sides of flip-flops 343d and 357d in FIG. 21 thereby resetting them. At this time, the inputs to the reset sides of flip-flops 343d and 357d from the outputs of main terminal clear gate 386 and No. 1 clear gate 377, respectively, in FIG. 21 are ground. This is so for the reason that a negative voltage effective on lead 222a to the respective gates, while the other inputs thereto are ground, provides ground in outputs of the gates during the system clearing operation explained hereinbefore.

Referring to the negative voltage effective now on lead 138c in FIG. 18, this voltage applied to the reset side of output gate driver flip-flop 391 resets it. In the reset state the output of the 1-side of the flip-flop provides a negative voltage thereby interrupting the operating path of output gate driver relay 391a which releases to open its contact 391b in FIG. 10 thereby disconnecting ground from the operating paths of output gate driver relays 391c and 391d. These relays release so that relay 391c opens its associated contact 391e which disconnects ground from the operating paths of 10 output gate relays represented by relays 391f and so that relay 391d opens its associated contact 391g which disconnects ground from the operating paths of 10 output gate relays represented by relays 391k. In all, the relays 391c and 391d control 20 relays represented by relays 391f and 391k. Each of the 20 relays 391f through 391k includes 6 contacts represented by contacts 313j in FIG. 10 so that 120 relay contacts 313j are involved in the 120 leads 313x, 319d, 319e and 319f, as mentioned hereinbefore. At this time, therefore, the 120 contacts 313j are open to interrupt the last-mentioned 120 outgoing line leads which thereupon disconnect the contacts 313v and 313w of each of the 120 L1 through L120 line relays 321 through 321c in FIG. 16 as above-identified from the interface in FIG. 7B. Channel A is now disconnected from the interface. Referring now to FIG. 18, the closed contact 374c of operated relay 374 in FIG. 17 provides ground to the input of manual clear inverter 375e in FIG. 19 whose output supplies a negative voltage to gate 350 thereby inhibiting it and to the set side of flip-flop 350a thereby setting it. This serves to initiate the off line operation for disconnecting channel A from the interface precisely in the manner described hereinbefore as effected by a negative voltage applied simultaneously to gate 350 and the set side of flip-flop 350*a* from the output of the 0-side of flip-flop 349 in the set state for the automatic clearing of the system.

As relay 387 in FIG. 24 is now operated, it opens its break contact 387*a* in FIG. 25 for disconnecting ground therefrom and at the same time to enable voltage divider 387*b* to supply negative voltage to the set side of manual clear flip-flop 381*b* thereby setting it and to one input of gate 380. In the set state of flip-flop 381*b*, the output of its 1-side provides ground for energizing signal lamp 381*e* to indicate the operation of the key 385 in FIG. 17 as above-mentioned. At this time ground is also being supplied to the other two inputs of gate 380 via contacts 379*b* and 379*e* of released relays 379 and 387, respectively. As a consequence, gate 380 provides in its output ground which is changed in the output of inverter 380*a* to a negative voltage effective on lead 381. This negative voltage applied to the input of gate 320*c* in FIG. 28 activates it to produce in its output ground which is simultaneously applied to the inputs of inverters 320*d*, 320*e*, 320*i* and 320*m*, as above mentioned, but only the response of inverter 320*i* is now discussed. The ground in the input of inverter 320*i* is changed in the output thereof to a negative voltage which is transmitted on lead to 320*p* to the reset side of flip-flop 184 in FIG. 31 thereby resetting it. In the reset state, the output of the 1-side of flip-flop 184 is negative voltage which interrupts the operating path of relay 187 thereby releasing it. This relay opens its contact 187*a* in FIG. 24 to disconnect ground therefrom whereby in due course relays 188, 188*b*, 175, 189 and 188*d* are released. Released relays 189 and 188*d* open their associated 120 contacts comprising contacts 190, 190*a*, the intermediate contacts, and contacts 190*b* and 190*c* in FIG. 23 thereby opening the operating paths for the 120 L1 through L120 line relays comprising relays 191, 191*a*, the intermediate relays, and relays 191*b* and 191*c*, as above discussed and shown in FIG. 23.

In FIG. 25, closed contact 387*c* of operated relay 387 supplies ground on lead 387*d* to manual control inverter 388 and make driver AND-NOT gate 389. The output of inverter 388 provides in its output a negative voltage which is applied to the set side of break driver flip-flop 388*a* thereby setting it. In the set state, this flip-flop provides in the output of its 1-side a ground which completes the operating path of system break driver relay 388*b* thereby operating it. This relay closes its contact 388*c* to complete an electrical path to alarm circuit in FIG. 26 for indicating channel A terminal at the No. 1 terminal is off line. As on line key 390 in FIG. 24 is not actuated at this time, ground is applied via closed contact 390*a* in FIG. 25 of relay 390*b* in FIG. 24 to one input of gate 389. As the two inputs to gate 389 are now ground, the output thereof provides negative voltage which is applied to the reset side of make driver flip-flop 389*a* thereby resetting it. This results in the production of a negative voltage in the output of the 1-side of the flip-flop whereupon ground is disconnected from the operating path of system make driver relay 389*b* which is thereby released. Open contact 389*c* of this relay removes ground from the operating paths of send message relays 389*d*, 389*e* and 389*f* which are then released to open the 6 contacts including contacts 206*b*, 250*a*, 274*a*, 277*d*, 288*a* and 298*a* controlled by relay 389*d*, the 4 contacts including contacts 195*a*, 196*d*, 300*d*, and 300*e*, controlled by relay 389*e* and the two contacts 197*a* and 197*b* controlled by relay 389*f* as shown in FIGS. 29, 30, 31 and 32. These opened contacts disconnect the following leads from the No. 1 terminal: 250, 275, 277*b*, 206, 298*b*, 289, 300, 300*a*, 195*b*, 196, 197 and 197C. Now, channel A is disconnected from the No. 1 terminal. As channel A is now disconnected from both the interface and No. 1 terminal, this channel is available for any trouble shooting that may be required.

*Operation for returning channel A to on line*

Actuation of either main terminal on line key 352*b* in FIG. 17 or No. 1 terminal on line key 390 in FIG. 24 or both operates associated relays 352*c* and 390*b* whereby open contact 352*f* in FIG. 18 of relay 352*c* removes ground to enable voltage divider 352*g* to apply a negative voltage to the reset sides of flip-flops 138*e* and 349 and resets them.

A negative voltage from voltage divider 352*g* is also applied to the set side of flip-flop 391 in FIG. 18. This sets the flip-flop which thereupon provides in the output of its 1-side ground which completes an operating path for relay 391*a*. This operates to close its contact 391*b* in FIG. 10 and thereby to supply ground to the operating paths of relays 391*c* and 391*d* which operate to supply in turn ground to the operating paths of the 20 relays 391*f* and 391*k*. These relays operate to close their 120 contacts 313*j* in FIG. 10 and thereby again connect the contacts 313*v* and 313*w* of each of the 120 L1 through L120 line relays in FIG. 16 as above identified to the respective 120 outgoing lines 313*x*. This serves to reconnect channel A to the interface in FIG. 7B.

Again in FIG. 18, closed contact 352*d* of operated relay 352*c* in FIG. 17 provides on lead 352*i* ground which is simultaneously supplied to the inputs of gate 351 and inverter 352*a* in FIG. 19. The output of this inverter provides a negative voltage which inhibits gate 352 and which is also supplied to the set side of flip-flop 353 thereby setting it. This flip-flop provides in the output of its 1-side ground which completes the operating path for relay 353*a* which is then operated. This relay closes its contact 353*b* in FIG. 19 to supply ground to the operating paths of relays 353*c*, 353*d* and 353*e* which operate to close their associated contacts as follows: relay 353*c* closes its contact 353*h* to complete lead 258 in FIG. 11, its contact 353*i* to complete lead 92 in FIG. 11, its contact 144*a* to complete lead 76, its contact 146*a* to complete lead 99 in FIG. 11, its contact 353*k* to complete lead 324*h* in FIG. 15, and its contact 353*m* to complete lead 330 in FIG. 15; relay 353*d* closes its contact 310*a* to complete lead 310*b* in FIG. 14, its contact 306*b* to complete lead 306*c* in FIG. 14, its contact 353*n* to complete lead 314 in FIG. 15, its contact 219*a* to complete lead 118*a* in FIG. 13, its contact 353*r* to complete lead 120*h* in FIG. 13, and its contact 353*s* to complete lead 85*g* in FIG. 13; and relay 353*e* closes its contact 237 to complete lead 108 in FIG. 13, its contact 353*p* to complete lead 107 in FIG. 10, its contact 311*a* to complete lead 311 in FIG. 14, its contact 353*t* to complete lead 137*a* in FIG. 13, and contact 353*x* to complete lead 323 in FIG. 15. All of the completed leads just identified reconnect channel A to the interface shown in FIGS. 6A, 6B, 7A, 7B, 8A and 8B.

In addition, closed contact 353*f* of relay 353*e* in FIG. 19 supplies ground to one input of gate 350 whose second input via the 0-side of flip-flop 349 is ground because the system is not being cleared through the automatic clear and alarm circuit as discussed hereinbefore and whose third input is also ground from the output of inverter 375*e* because the manual clear circuit is not operative at this time. As all three inputs to gate 350 are ground, its output is a negative voltage which is applied to the reset side of flip-flop 350*a* thereby resetting it. This flip-flop provides now in the output of its 1-side a negative voltage which interrupts the operating path of relay 350*b* which is thereby released and opens its contact 350*c*. This disconnects ground from contact 350*c* thereby interrupting the operating path of relay 350*d* which releases to open its contacts 350*e*, 350*f* and 350*g*. Opening of contact 350*g* enables voltage divider 352*i* to apply a negative voltage to the second input of gate 352 as a permanent inhibit thereto. Open contact 350*f* removes ground and thereby permits voltage divider 350*h* to supply negative voltage to the inputs of gate 351 and inverter 351*a*. This inverter provides in its output ground which is supplied to the input of gate 351*b*. Open contact 350*e* opens the two alarm leads connected thereto.

Prior to the release of relay 350*d*, ground on lead 352*i* supplied to the input of gate 351 together with the ground provided by closed contact 350*f* activated the gate to provide in its output a negative voltage. This is supplied to the set side of flip-flop 383*a* thereby setting it. This flip-flop provides in the output of its 0-side a negative voltage which is applied on lead 383 to the set side of flip-flop 382*a* in FIG. 18 thereby setting it. Therefore, when the on line key 352*b* in FIG. 17 is released to restore its associated relay 352*c* to the unoperated condition, its open contact 352*d* in FIG. 18 disconnects ground therefrom to enable voltage divider 352*e* to supply on lead 352*i* a negative voltage. This voltage is simultaneously applied to the input of inverter 352*a* which is changed to ground in the output thereof and to one input of gate 351 to inhibit it. The ground in the output of inverter 352*a* is applied to the input of gate 351*b* which is also then receiving ground in its other input from the output of inverter 351*a*.

As gate 351*b* is presently receiving ground at two of its inputs, it provides in its output a negative voltage which is applied to the reset side of flip-flop 383*a* thereby resetting it. This flip-flop produces in the output of its 0-side ground which is supplied on lead 383 to the set side of flip-flop 382*a* in FIG. 18. This permits the flip-flop to be reset by the negative voltage which is also being simultaneously supplied to the reset side thereof from the output of gate 372*e*. In the reset state, the output of the 1-side of flip-flop 382*a* is a negative voltage which activates monopulser 164*e* to produce in its output a 5-microsecond negative voltage effective on lead 164*d*. This voltage, applied in FIG. 12 to one input of gate 164*c* whose other input is ground from the output of monopulser 164*b*, activates it to provide in its output a 5-microsecond ground. This, as previously explained in connection with the automatic clear and alarm circuit, results eventually in the establishment of ground on lead 76 and a negative voltage on lead 99 both of which leads are thereby returned to the idle state in FIG. 11. Channel A is now on line at the main terminal.

Referring now to FIG. 24, relay 390*b* being operated in the manner described above, it opens its contact 390*a* in FIG. 25 thereby enabling voltage divider 390*d* to supply a negative voltage to the input of gate 389 for inhibiting it and to the set side of flip-flop 389*a* for setting it. In the set state, this flip-flop provides in the output of its 1-side a ground which completes the operating path of relay 389*b*. This relay operates to close its contact 389*c* thereby connecting ground to the operating paths of relays 389*d*, 389*e* and 389*f*. These relays operate to close their associated contacts identified below for connecting channel A to the No. 1 terminal in the on line status: operated relay 389*d* closes its contact 250*a* to complete lead 250 in FIG. 29, its contact 274*a* to complete lead 275 in FIG. 29, its contact 277*d* to complete lead 277*b* in FIG. 29, its contact 206*b* to complete lead 206 in FIG. 30, its contact 298*a* to complete lead 298*b* in FIG. 29, and its contact 288*a* to complete lead 289 in FIG. 30; operated relay 389*e* closes its contact 300*d* to complete lead 300 in FIG. 30, its contact 300*e* to complete lead 300*a* in FIG. 30, its contact 195*a* to complete lead 195*b* in FIG. 31, and its contact 196*d* to complete lead 196 in FIG. 32; and operated relay 389*e* closes its contact 197*a* to complete lead 197 in FIG. 32, and its contact 197*b* to complete lead 197*c* in FIG. 32, and in addition, its contact 389*g* in FIG. 25 to supply ground to one input of break driver gate 392 whose other input is also ground received from the output of inverter 388 because a manual clear procedure as explained above is not effective at the moment. In view of its two present ground inputs, gate 392 provides in its output a negative voltage which is supplied to the reset side of flip-flop 388*a* thereby resetting it. In the reset state, this flip-flop provides in the output of its 1-side a negative voltage which serves to interrupt the operating path of relay 388*b*. This releases to open its contact 388*c* in FIG. 26 thereby interrupting the electrical path connected to the alarm circuit whereupon the previous indication therein is discontinued so that the alarm now shows channel A is returned to the on line at both the main terminal and the No. 1 terminal.

*Simulation of message transfer in opposite directions*

It will be understood that when messages are to be simulated in the direction from the main terminal to the No. 1 terminal or vice versa, channel A is operated to the off line condition in the manner previously explained. Simulation of message transfer from the main data terminal to the No. 1 data terminal shown in FIG. 20 is achieved in the following manner. Initially, when the simulators are in the idle condition, main terminal key 154*b* and No. 1 terminal key 400 are resting in the unoperated condition whereupon contacts 400*a* and 400*b* of the respective keys are open. As a consequence, negative voltage from voltage divider 400*c* is applied to the reset side of output gate flip-flop simulator 400*d* thereby resetting it. In the reset state, the output of the 0-side of flip-flop 400*d* supplies ground to message simulator lead 400*e*. Negative voltage from voltage divider 400*c* activates message inverter simulator NOT-OR gate 400*f* which provides ground in its output. This ground is effectively applied through monopulser message simulator 400*g* to message simulator lead 400*h*. As test message simulator key 401 is unoperated, its contacts 401*a* and 401*b* are open and test message leads 401*c* and 401*d* are not provided with test message signals. As key 154*b* is unoperated and its contact 400*b* is open, negative voltage from voltage divider 402 is applied to the input of message simulator NOT-OR gate 402*a* which is thereby caused to provide in its output ground which is effective on message simulator lead 402*b*. As negative voltage from voltage divider 402 is also applied to one input of operate input gate simulator monopulser 402*c*, the output of this monopulser is a 2-microsecond negative voltage pulse which is effective on operate input gate simulator lead 154*a*.

Monopulser 403 has one input connected via lead 403*a* to the output of inverter 375*e* in FIG. 19, a second input is connected via closed contact 400*m* to ground associated with key 400, and a third input is connected to ground via closed contact 400*n* associated with key 154*b*. When key 385 in FIG. 17 is actuated, relay 374 is operated to close its contact 374*c* in FIG. 18 which supplies ground to the input of inverter 375*e* in FIG. 19 whose output then provides a negative voltage. This is applied over lead 403*a* in FIG. 20 to the input of monopulser 403 which is thereby caused to produce in its output a 5-microsecond negative voltage pulse made effective on lead 403*b*. This pulse is applied to the input of gate 239 in FIG. 12 which produces ground in its output. This ground is changed in the output of inverter 240 to a 5-mircosecond negative voltage pulse which is applied to the reset side of flip-flop 140 thereby resetting it. This flip-flop is thereupon caused to provide ground on idle lead 76 and a negative voltage on busy lead 99 in FIG. 11 in the manner and for the purpose explained hereinbefore.

This ensures that flip-flop 140 in FIG. 11 is always reset upon the actuation of manual clear key 385 in FIG. 17 in the manner just mentioned. At this time channel A is cleared and taken off line with flip-flop 140 in the reset state and is available for operation by the simulators now being discussed. In supplement of such control, actuation of on line key 352*b* in FIG. 17 operates its associated relay 352*c* which thereby serves to actuate gate 351 to provide on its output lead 372*h* in FIG. 19 a negative voltage in the manner previously explained. This voltage is applied to the input of gate 372*f* in FIG. 18 which is thereby caused to provide ground in its output. This ground is changed in the output of inverter 375 to a negative voltage which is supplied on lead 142 to the set side of flip-flop 140 thereby setting it. Thus, flip-flop 140 is activated to the set state when the on line key 352*b* in FIG. 17 is actuated. Upon release of this on line key, a negative voltage is supplied to the 0-side of flip-flop 140 thereby resetting it, in the manner previously described. Now, channel A is available for on line operation. In order to preclude the operation of gate 402*a* in FIG. 20 during message simulation before the system is idle or off line, negative voltage form the output of inverter 402*b* provides an inhibit thereto.

Referring now to the message simulator shown in FIG. 26, ground is effective on lead 196*b* in the output of acknowledgment monopulser simulator 404 which is receiving a ground from the output of acknowledgment AND-NOT gate simulator 404*a*. This gate is receiving a negative voltage from voltage divider 404*b* because No. 1 terminal key 404*c* is unoperated whereby ground is disconnected therefrom. Since No. 1 terminal key 405 is unoperated, ground is disconnected therefrom whereby voltage divider 405*a* is enabled to supply negative voltage to the inputs of said message simulator gate 405*b* and message simulator gate 405*c* and monopulser 405*d*, all of which provide ground in their outputs. Therefore, if transmit simulator key 405*e* is actuated to the transmit position, its contact 405*f* is closed to supply ground on lead 405*g* while its contact 405*h* is open to provide no signal on lead 208.

*Simulated test messages from main data terminal to No. 1 data terminal*

To initiate the transfer of a simulated message from the main terminal via channel A to the No. 1 terminal, key 401 is unoperated but key 154*b* in FIG. 20 is operated to close its contact 400*b* thereby supplying ground to the input of monopulser 402*c* which does not change its output because it is also receiving ground from the output of inverted 402*d* at this time. Now, the input to this inverter via lead 402*e* is a negative voltage received from the output of the 1-side of flip-flop 140 in FIG. 11 which is in the reset state due to the fact that channel A is in the off line condition. Closed contact 400*b* of ey 154*b* in FIG. 20 supplies ground to the input of gate 402*a* which is also receiving ground from the output of the 1-side of message flip-flop simulator 402*f*. This flip-flop is always in the set state when it is in the idle condition. At this time, a negative voltage effective on lead 402*e* from the output of the 1-side of flip-flop 140, as qust mentioned, is changed in the output of inverter 402*d* and applied to the input gate 402*a*. In view of the three inputs of ground, gate 402*a* is thereby caused to provide a negative voltage on its output lead 402*b* which activates monopulser 139 in FIG. 11 to produce a 5-microsecond negative voltage pulse in its output.

The 5-microsecond negative voltage pulse in the output of monopulser 139 is applied via lead 139*a* to the set side of flip-flop 140 thereby setting it. As a consequence on lead 402*e* to the input of inverter 402*d* in FIG. 20 is changed in the output thereof to a negative voltage. This is translated by monopulser 402*c* into a 2-microsecond negative voltage pulse which is supplied via lead 154*a* to the input of the 1-side of flip-flop 154 in FIG. 10 thereby setting it. At the moment, flip-flop 154 is also being supplied at its set side with ground on lead 154*f*, and no signal is on lead 154*c* because make busy key 154*d* is in the idle condition.

As flip-flops 140 and 154 in FIGS. 10 and 11 are now set, the operation of channel A for the transfer of the simulated message is identical with that for the operation of the transfer of a regular message until flip-flop 193 in FIG. 31 is set, as above explained. Now, the output of ground from the 1-side of this flip-flop is applied via lead 193*a* to the input of gate 404*a* in FIG. 26, which is also receiving ground from closed key 404*c* and via lead 179*a* from the output of the 0-side of flip-flop 179 in FIG. 31 which is in the reset state. As all three inputs to gate 404*a* are ground at this time, it provides in its output a negative voltage which is changed to a 2-microsecond negative voltage pulse in the output of monopulser 404. This pulse is applied on lead 196*b* to the input of monopulser 202 in FIG. 32. Now, the operation of channel A for the transfer of the simulated message is the same as that for the operation of a regular message until the output of gate 164*c* in FIG. 12 provides a 5-microsecond ground on lead 230 in its output as previously explained.

This ground is applied to the input of gate 232 which thereupon provides on its output lead 232*a* a 5-microsecond negative voltage pulse which activates monopulser 233 in FIG. 13 to produce a 5-microsecond negative voltage pulse in its output. This pulse is changed in the output of inverter 234 to a 5-microsecond ground pulse which is supplied via lead 234*a* to the input acknowledgment monopulser simulator 406 in FIG. 20 whose output is not changed at the moment. When the ground on lead 234*a* changes to a negative voltage after the 5-microsecond period, the output of monopulser 406 changes to a 5-microsecond negative voltage pulse. This pulse applied to the reset side of flip-flop 402*f* resets it so that its 1-side now provides an output of negative voltage. This activates gate 402*a* which is thereby caused to provide in its output ground which is supplied on lead 402*b* to monopulser 139 in FIG. 11 but which causes no change in the output thereof.

When the output of gate 164*c* in FIG. 12 provides on lead 230 a negative voltage which is changed in the output of monopulser 231 into a 2-microsecond negative voltage pulse, this pulse supplied on lead 231*a* to the set side of flip-flop 215 effects no change in the state thereof since it is resting at the moment in the set state. The pulse in the output of monopulser 231 is changed into a 2-microsecond ground pulse in the output of gate 239 and changed again in the output of inverter 240 into a 2-microsecond negative voltage pulse which is applied to the reset side of flip-flop 140 in FIG. 11, thereby resetting it. This provides ground on idle lead 76 and a negative voltage on busy lead 99 thereby placing channel A comprising the main control logic and bit circuits for the No. 1 terminal and the No. 1 terminal control logic and bit circuits in the idle condition, as previously explained.

When the output of monopulser 406 in FIG. 20 returns to ground, this is changed in the output of inverter simulator 406*b* into a negative voltage which is translated in the output of monopulser simulator 406*d* into a 5-microsecond negative voltage pulse. This applied to the set side of flip-flop 402*f* sets it whereupon the output of the 1-side thereof provides ground which is applied to the input of gate 402*a*. This ground is produced 5 microseconds after flip-flop 140 in FIG. 11 is reset in the manner just mentioned. Therefore, the main control logic and bit circuit for the No. 1 terminal has been in the idle condition for 5 microseconds when the flip-flop 402*f* in FIG. 20 is reset. The ground in the output of the 1-side of this flip-flop at the moment initiates the transfer of a new simulated message from the main terminal to the No. 1 terminal in the manner just explained. This repetitive transfer of simulated messages from the main terminal to the No. 1 terminal is automatically continued with a 5-microsecond time interval provided between the transfer of successively simulated messages, so long as key 154*b* in FIG. 20 is locked in the operated position.

*Termination of transfer of simulated regular messages from main terminal to the No. 1 terminal*

Termination of the transfer of simulated messages from the main terminal to the No. 1 terminal is effected by restoring key 154*b* in FIG. 20 and key 405 in FIG. 26 to the idle positions. In such position, key 154*b* opens its associated contact 400*b* to remove ground therefrom and thereby enable voltage divider 402 to apply negative voltage to the inputs of gate 402*a* and monopulser 402*c* thereby placing ground and a 2-microsecond negative voltage pulse on leads 402*b* and 154*a*, respectively. This termination may occur during the transfer of a simulated message so that channel A is thereafter cleared by a manual clear procedure as has been previously explained.

*Simulated test messages from No. 1 data terminal to main data terminal*

The transfer of test messages from the No. 1 terminal to the main terminal is initiated by operating key 404*c* in FIG. 26 to apply ground to one input of gate 404*a* and by operating key 401 in FIG. 20. This gate is also receiving at this time negative voltage via lead 193*a* from the output of the 1-side of flip-flop 193 in FIG. 31 and ground via lead 179*a* from the output of the 0-side of flip-flop 179 in FIG. 31, both of which are lying in the reset state at the moment. However, gate 404*a* does not change its output which is ground at this time. Since the outputs of message inverter simulator 406*e* and gate 402*a* in FIG. 20 are ground, this is applied to leads 401*c* and 401*d*, respectively, but causes no action in the circuits to which they are connected because such circuits do not sense any difference between ground and the open circuit before key 401 was operated. To start the transfer of the simulated test message, key 154*b* in FIG. 20 is operated to close its contact 400*b* whereby ground voltage from voltage divider 402 is supplied to the inputs of gate 402*a* and monopulser 402*c*. This causes gate 402*a* to provide in its output a negative voltage on leads 401*d* and 402*b* because the other two inputs to gate 402*a* are ground at this time.

As flip-flop 402*f* in FIG. 20 is in the set state in response to the reset state of flip-flop 140 in FIG. 11 as previously explained, the output of the 1-side of flip-flop 402*f* is ground. As negative voltage is on lead 402*e* from the output of the reset flip-flop 140, this is changed in the output of inverter 402*d* in FIG. 20 to ground. This is applied to the inputs of gate 402*a* and monopulser 402*c* together with ground via closed contact 400*b* of operated key 154*b*. The two ground inputs to monopulser 402*c* do not change the ground in the output thereof. As three grounds are now being applied to the inputs of gate 402*a*, its output is changed to a negative voltage which is applied to leads 402*b* and 401*d*, contact 401*a* being closed in the latter lead. As was previously explained in regard to the transfer of simulated regular messages, negative voltage on lead 402*b* activates monopulser 139 in FIG. 11 to provide a 5-microsecond negative voltage pulse in the output thereof. This pulse applied to the set side of flip-flop 140, in FIG. 11, sets it whereby ground is provided on idle lead 76 and negative voltage on busy lead 99, as previously mentioned for the transfer of a simulated regular message.

Negative voltage on lead 401*d* applied to the input of the 1-side of flip-flop 227 in FIG. 13 sets it while the other lead 120*h* to the same input is an open circuit via open relay contact 353*r* because channel A is now in the off line condition. The output from the 1-side of flip-flop 227 is ground which does not change the output of monopulser 227*a* from ground effective on lead 222*b*. The output from the 0-side of flip-flop 227 provides negative voltage which is changed in the output of inverter 226 to ground. This does not change the output of monopulser 226*c* from ground effective on lead 307*b*. The ground output from inverter 226 effective on lead 225*b* is applied thereon to the input of gate 165 which is not thereby activated to change its output at this time. This is occasioned by the fact that the output of the 1-side of flip-flop 216 in the reset state is supplying a negative voltage to a second input of gate 165 in FIG. 14 and by the further fact that ground is being supplied to a third input from its associated voltage divider 165*e* via the closed contact of unoperated acknowledge inhibit key 165*f*. As a consequence, gate 165 provides no change in its output of ground.

The ground output from inverter 226 on lead 225*b* in FIG. 13 is also supplied to the input of gate 225 in FIG. 12 which does not change its output from ground for the reason that the other input thereto from the output of gate 222 is negative voltage. The negative voltage effective on lead 223*a* from the output of the 0-side of flip-flop 227 in FIG. 13 is applied via lead 223*a* to one input of gate 306 in FIG. 14 which inhibits it to provide ground on its output to output lead 306*c* while flip-flop 227 in FIG. 13 remains in the set state. The negative voltage effective on lead 223*a* is also an input to reset gates 223, 223*c*, 223*d* and 223*e* in FIG. 12 for ensuring that ground remains effective on the output leads 223*b*, 223*f*, 223*g* and 223*h*, so long as flip-flop 227 remains in the set state. From this point on, the operation of channel A will progress in the manner explained hereinbefore for the transfer of a regular and a simulated regular message until an acknowledgment is received via lead 213 in FIG. 18 whereby a source of negative voltage is connected to one end of the operating path of relay 220 whose opposite end is permanently connected to ground. This operates relay 220 which opens its contact 220*a* in FIG. 12 to remove ground therefrom and to allow voltage divider 220*b* to apply a negative voltage to the input of the set side of flip-flop 169 thereby setting it. The output of the 0-side of this flip-flop is a negative voltage which is translated by monopulser 221 into a 5-microsecond negative voltage pulse. This activates gate 222 to produce in its output a 5-microsecond ground which is applied to the inputs of reset gates 223, 223*c*, 223*d*, and 223*e* but effects no change in the ground outputs thereof as just mentioned because the inhibiting negative voltage is still effective on the other input lead 223*a* as previously stated.

The 5-microsecond ground in the output of gate 222 supplied to the input of gate 225 activates it to provide in its output a 5-microsecond negative voltage which is applied via lead 225*a* to the set side of flip-flop 312 in FIG. 14 thereby setting it. At this time, ground is applied to the other 1-side input of flip-flop 312 via lead 407*b* which is connected to the output of test receive inverter 407*a* whose input of negative voltage is obtained from the output of test receive gate 407 because channel A is not transmitting odd or even test messages in a manner that will be subsequently explained, via lead 400*e* from FIG. 20 as hereinbefore mentioned regarding the initial outputs of the simulator circuit of FIG. 20 in the idle state, and an open circuit exists on lead 311 because relay contact 311*a* is open due to the fact that channel A is off line at the moment. Flip-flop 312 in the set state provides in the output of its 1-side ground which serves to complete an operating path for relay 312*a*. This operates to close its contact 312*b* in FIG. 17 and thereby complete operating paths for relays 313 and 313*a* which in turn operate to complete via closed contacts 313*e* and 313*h* operating paths for 20 relays 313*g* and 313*m* which are thereupon operated to close the 120 contacts associated therewith for operating the 120 L1 through L120 line relays to transmit 120 bits via the 120 leads 161*a* through 161*h* in FIG. 16, in the manner previously explained for the operation of the transfer of a regular message.

When flip-flop 216 in FIG. 14 is set by the negative voltage supplied to the input of its 1-side from voltage divider 264*c* as above mentioned, the output of its 1-side is ground which is applied to one input of gate 165, whose other ground inputs are via lead 225*b* and manual acknowledgment key 165*f* which is not operated. These three ground inputs activate gate 165 to provide on its output lead 165*d* a negative voltage which triggers monopulser 233 in FIG. 13 to produce in its output a 5-microsecond negative voltage pulse, and which also is supplied to the reset side of flip-flop 215 in FIG. 12 thereby resetting it. At this time ground is supplied to the set side of this flip-flop because it is on lead 222a since channel A is not being cleared and on lead 231a because the instant message is not being terminated. The 5-microsecond negative voltage pulse in the output of monopulser 233 in FIG. 13 is applied to the input of gate 235 which translates into a 5-microsecond ground pulse. This pulse transmitted through cable driver 236 and closed relay contact 237 to lead 108 provides an acknowledgment to the interface in FIG. 6A, in the manner described hereinbefore for a regular message.

Flip-flop 215 in FIG. 12 in the reset state as just mentioned provides in the output of its 1-side a negative voltage which is supplied directly to the input of gate 232 and via lead 215a to gate 166 in FIG. 13. No change is effected in the ground output of gate 166 which is also receiving a negative voltage from voltage divider 166b because relay 167 is in the released condition whereby its associated contact 167a is to open for disconnecting ground therefrom. Also, no change is produced in the output of gate 232 in FIG. 12 because negative voltage is effective on lead 230 for the reason that since the instant message is not being terminated, and ground is in the output of monopulser 164b whereby gate 164c is not activated but continues to supply negative on its output lead 230. This precludes any further activation of monopulser 233 in FIG. 13 at this time thereby preventing the transmission of a second acknowledgement signal via lead 108 to the interface in FIG. 6A at this time.

The 5-microsecond negative voltage provided in the output of monopulser 233 as above mentioned is changed to a 5-microsecond ground pulse which is supplied to monopulser 239 and via lead 234a to the input of monopulser 406 in FIG. 20 but effects no changes in the outputs of the respectively last-mentioned monopulsers. The 5-microseconds negative voltage provided by monopulser 233 causes no change in the output of gate 235 in FIG. 13 because it is inhibited by a negative voltage effective on lead 351c. This voltage is taken from the output of inverter 351a in FIG. 19 whose input is activated by ground associated with contact 350f of relay 350d in FIG. 19 which is operated because channel A is in the off line condition at this time. At the termination of the 5-microsecond negative voltage pulse produced by monopulser 233 in FIG. 13, the output thereof returns to ground, the output of inverter 234 returns to a negative voltage for 5-microseconds, and the output of monopulser 239 effects no change in the condition of the system. The latter is so for the reason that flip-flops 217 and 340d in FIGS. 13 and 21, respectively, are in a reset state at this time, although the output of monopulser 239 is currently providing a negative voltage that could otherwise effect the reset of both latter flip-flops.

The negative voltage effective on lead 234a activates monopulser 406 in FIG. 20 to provide in its output a 5-microsecond negative voltage pulse which is applied to the reset side of flip-flop 402f thereby resetting it. Later, upon the expiration of 5 microseconds, the output of monopulser 406 returns to ground which is changed in the output of inverter 406b into a negative voltage pulse which is applied to monopulser 406d producing a 5-microsecond negative voltage pulse to the set side of flip-flop 402f thereby setting it. Ground in the output of the 1-side of this flip-flop is now applied to the input of gate 402a, together with a negative voltage from the output of inverter 402d because ground, on lead 402e from the output of the 1-side of flip-flop 140 in FIG. 11 now resting in the reset state, is applied to the input of inverter 402d. This ground and negative voltage applied concurrently to the input of gate 402a effect no change in the output thereof.

When the output of monopulser 406 is a negative voltage pulse for 5 microseconds as above mentioned, this pulse is changed to a 5-microsecond ground pulse in the output of inverter 406b. This pulse is changed in the output of inverter 406e into a 5-microsecond negative voltage pulse which is applied via closed key contact 401b and lead 401c to the reset side of flip-flop 227 in FIG. 13 thereby resetting it. This is so for the reason that, at this time, the other inputs to the reset side of flip-flop 227 are an open circuit via open relay contact 353s because channel A is in the off line condition and ground is on lead 222a because channel A is not being cleared; and ground is also on lead 401d to set side of the flip-flop via closed key contact 401a from the output of gate 402a. The output of the 1-side of flip-flop 227 in the reset state is a negative voltage which is changed to a 5-microsecond negative voltage pulse in the output of monopulser 227a. This pulse applied on lead 222b to the input of gate 222 in FIG. 12 is thereby translated in the output thereof into a 5-microsecond ground pulse which is applied to the input of gate 225 but effects no change in the output thereof. This is so because an inhibiting negative voltage is also being applied via lead 225b from the output of inverter 226 in FIG. 13 whose input is ground from the output of the 0-side of flip-flop 227 resting in the reset state at this time.

The 5-microsecond ground pulse in the output of gate 222 in FIG. 12 as just mentioned is applied, together with ground on lead 223a, to the input of reset gates 223, 223c, 223d and 223e. The output of gate 223 provides a negative voltage on lead 223b to the reset side of flip-flop 154 thereby resetting it. As channel A is not being cleared at this time, ground is on lead 222a which constitutes the other input to the reset side of flip-flop 154 at this time. Since, as above mentioned, flip-flop 227 in FIG. 13 is in the reset state, the output of its 0-side is ground which is changed in the output of inverter 226 into a negative voltage. This is translated in the output of monopulser 226c into a 5-microsecond negative voltage pulse which is supplied on lead 307b to the reset side of flip-flop 312 thereby resetting it. At this time, the reset side of this flip-flop is also receiving ground on lead 222a because channel A is not being cleared and on lead 307a from the output of inverter 307 for the reason that a message transfer from the No. 1 terminal to the main terminal is not in progress at the moment. In the reset state, flip-flop 312 removes ground from the operating path of relay 312a which releases to open its contact 312b in FIG. 17 thereby removing ground from the operating paths of relays 313 and 313a. These relays release to open their contacts 313e and 313h to interrupt the previously traced operating paths for relays 313f, 313g and 313m. Relays 313g and 313m release to open their associated 120 contacts 313n through 313s to interrupt the previously defined operating paths for the 120 L1 through L120 line relays 321 through 321c, as above identified in FIG. 16, which release to open their associated 120 contacts 313v and to close their associated 120 contacts 313w, as above identified in FIG. 10, for restoring the 120 outgoing lines 313x to the idle state. When flip-flop 140 in FIG. 11 is activated to the reset state in the manner hereinbefore explained, the negative voltage at the output of its 1-side is applied on lead 402e to the input of inverter 402d in FIG. 20 which is thereby activated to provide ground in its output. This ground, together with ground from the 1-side output of flip-flop 402f and ground via closed contact of 400b of operated key 154b, is applied to the input of gate 402a, which is thereby activated to supply negative voltage to outgoing leads 401d and 402b for effecting another simulated test message in the direction from the main terminal to the No. 1 terminal. These simulated messages are repetitively continued so long as keys 154b and 401 are operated. Obviously, the messages are discontinued by returning these keys to the idle position. The system may then be restored to normal by the manual clear procedure which is later discussed.

*Simulated discard messages from No. 1 data terminal to main data terminal*

Referring to FIG. 26, a simulated discard message in this direction is achieved by operating key 405*e* to the discard position for completing a path to lead 208 and also by operating key 405 in FIG. 26 and key 154*b* in FIG. 20. The operation of key 405 applies ground to the inputs of gates 405*b* and 405*c* and monopulser 405*d*. Since flip-flop 409*c* is in the reset condition, the output of its 0-side is ground. These two inputs of ground activate gate 405*b* to produce in its output a negative voltage on lead 251*a* to the set side of flip-flop 251 in FIG. 29 thereby setting it. Since channel A is off line whereby relay contact 250*a* is open, no signal is present on lead 250 to the other input of the set side of flip-flop 251 at the moment. From this point on, the operation of channel A for the discard message is identical with that of its operation for the transfer of a regular message from the No. 1 terminal to the main terminal as hereinbefore explained until gate 276 in FIG. 29 provides a negative voltage which is supplied on its output lead 184*a* to the set sides of flip-flops 184, in FIG. 31, and 278, in FIG. 28, thereby setting them. These flip-flops function thereafter in the manner explained previously for the last-mentioned transfer of a regular message.

In addition, the negative voltage effective on lead 184*a* from the output of gate 276 in FIG. 29 is supplied on lead 184*a* to simulator monopulser 409 in FIG. 26, which is thereby triggered to provide in its output a 5-microsecond negative voltage pulse. This is changed in the output of simulator inverter 409*a* to a 5-microsecond ground pulse. Upon the expiration of 5 microseconds, the output of inverter 409*a* reverts to a negative voltage. This negative voltage output of inverter 409*a* triggers simulator monopulser 409*b* to produce in its output a 5-microsecond negative voltage pulse. This pulse applied to the set side of have message simulator flip-flop 409*c* sets it whereupon the output of its 0-side provides a negative voltage that is applied to the input of gate 405*b*. As the inputs to this gate are now receiving a negative voltage and ground, the gate output produces ground on output lead 251*a* thereby removing the setting negative voltage from the input of the 1-side of flip-flop 251 in FIG. 29.

In the set state, the output of the 1-side of flip-flop 409*c* provides ground which is applied to one input of gate 405*c* whose other input is receiving ground via operated key 405. As a consequence of such two input grounds, the output of gate 405*c* provides a negative voltage which is applied on lead 409*d* to the set side of flip-flop 277 in FIG. 29 thereby setting it. From this point on, the operation of channel A is identical with that involved for the transfer of a regular message from the No. 1 terminal to the main terminal as hereinbefore mentioned until flip-flop 273 is set. At this time, the output of the 1-side of flip-flop 273 in FIG. 29 is ground while the output of its 0-side is a negative voltage. From here on, this ground and negative voltage activate gate 297 and flip-flop 186 and gate 272, respectively, in the manner occasioned by the transfer of a regular message from the No. 1 terminal to the main terminal, as hereinbefore described.

The ground in the output of the 1-side of flip-flop 273 is also applied via lead 273*a*, together with ground on lead 286*b* in FIG. 30, to the input of OK AND-NOT gate simulator 410 in FIG. 26. This gate is thereby activated to provide in its output a negative voltage which is supplied as one input to monopulser 405*d*. Ground is on leads 286*a* and 286*b* because flip-flop 285 in FIG. 28, resting in the set state, provides on lead 285*b* in the output of its 0-side a negative voltage which is applied to one input of gate 286 in FIG. 30. Negative input voltage to gate 286 stimulates it to provide the ground on its output leads 286*a* and 286*b* as just mentioned.

The aforenoted two ground inputs activate gate 410 in FIG. 26 to provide in its output a negative voltage which is translated into a 2-microsecond negative voltage pulse effective via closed contact 405*h* and lead 208 in the output of monopulser 405*d* whose other inputs are ground from the output of the 1-side of flip-flop 409*c* resting in the set state and from operated key 405.

The 2-microsecond negative voltage pulse effective on lead 208 is applied to the reset side of flip-flop 184 in FIG. 31 thereby resetting it and to the input of gate 316 in FIG. 30. As the other two inputs to gate 316 are ground at this time, it provides ground in its output. One of the above-mentioned inputs to gate 316 via lead 206*a* is no signal or effectively ground because relay contact 206*b* is open to hold channel A in the off line condition while the other input to this gate is ground via lead 290*d* and normally closed contact 290*b* of unoperated relay 290 in FIG. 26. Ground in the output of gate 316 is applied to the input of gate 296 whose other input is also ground via closed relay contact 280*p* of operated relay 280 in FIG. 23. These two inputs of ground activate gate 296 to produce in its output a negative voltage which is supplied to the set side of flip-flop 317 thereby setting it. The output of the 1-side of this flip-flop supplies ground to complete the operating path of relay 317*a* which is thereby operated. From this point on, the resetting of channel A functions in the manner for the transfer of a regular message from the No. 1 terminal to the main terminal as previously explained.

Negative voltage from the output of gate 296 in FIG. 30 is supplied on lead 296*a* to the reset side of flip-flop 278 in FIG. 28 thereby resetting it. At this time flip-flop 184 in FIG. 31 and flip-flop 278 in FIG. 28 are activated to the reset state. Flip-flop 184 functions in the reset state to release relay 187 in FIG. 31 and relays 188, 188*b*, 175, 189 and 188*d* in FIG. 24 for opening their associated contacts, thereby effectively disconnecting the 120 L1 through L120 line relays 191 through 191*c* from the 120 pairs of associated outgoing lines 161*a* and 161*b* through 161*g* and 161*h* as above identified; and flip-flop 278 functions in the reset state to release relays 278*b* in FIG. 28 and relays 279*a*, 279*m*, 280, 280*a*, the intermediate relays, and relay 280*n* in FIG. 23 for opening their associated 120 pairs of contacts 280*b* and 280*c* through 280*h* and 280*i* in FIG. 23 as above identified thereby effectively interrupting the operating paths for the 120 line relays just mentioned, in the manner described above for the transfer of a regular message from the No. 1 terminal to the main terminal.

When the resetting of the No. 1 terminal control of channel A has progressed to the point at which flip-flop 285 in FIG. 28 is activated to the reset state, the output of its 0-side supplies ground on lead 285*b* to a first input of gate 286 in FIG. 30 whose second input is receiving ground via lead 186*a* from the output of simulator inverter 186*b* in FIG. 29 connected to the output of the 1-side of flip-flop 186 now resting in the reset state and whose third input is receiving ground on lead 381 from the output of monopulser 380*a* in FIG. 25. These three inputs to gate 286 activate it to produce in its output a negative voltage which is applied on lead 286*b* to the reset side of flip-flop 409*c* in FIG. 26 thereby resetting it. The output of the 1-side of this flip-flop supplies a negative voltage to the input of monopulser 405*d*. As contacts 280*m* in FIG. 29 and contact 280*p* in FIG. 30 of released relay 280 in FIG. 23 are opened, associated voltage divider 317*e* supplies a negative voltage to inhibit gate 296. This precludes the output of gate 316 activated by the output of monopulser 405*d* via its lead 208 in FIG. 26 from further influencing the output of gate 296 at this time.

The output of the 1-side of flip-flop 409*c* in FIG. 26 in the reset state provides a negative voltage to the input of gate 405$c$ whose other input is receiving ground via operated key 405 whereby the gate is caused to produce ground in its output. This removes from lead 409$d$ the negative voltage which was heretofore utilized to activate flip-flop 277 in FIG. 29 to the set state. After an elapse of 5 microseconds, a negative voltage in the output of gate 320$d$ in FIG. 28 is applied on lead 320$f$ to the reset side of flip-flop 277 in FIG. 29 thereby resetting it. Also, the negative voltage effective in the outputs of inverters 320$d$, 320$e$, 320$i$ and 320$m$ on leads 320$f$, 320$g$, 320$h$ and 320$n$ in FIG. 28 reset data register flip-flops DR1 through DR120 in FIG. 27 and thereby return their associated relays to the unoperated condition, and the negative voltage effective on leads 320$h$ and 320$p$ from the output of inverter 320$i$ is applied to the input of the 0-side of flip-flop 184 thereby resetting it for restoring the No. 1 terminal of channel A to the idle state, in the manner mentioned previously in connection with the transfer of a normal message from the No. 1 terminal to the main terminal. In the reset state, ground in the output of the 0-side of flip-flop 409$c$ in FIG. 26 is supplied to the input of gate 405$b$ together with ground via operated key 405, whereby this gate is activated to provide a negative voltage in its output for automatically commencing the transfer of another simulated discard message from the No. 1 terminal to the main terminal, in the manner above explained. The transfer of such messages continues automatically until either key 404$c$ or 405$e$ in FIG. 26, or both, or key 154$b$ in FIG. 20, is released to the idle position whereupon the transfer is terminated. As such termination may occur during the transfer of a given discard message, the main and No. 1 terminals of channel A are returned to idle state in a manner that is subsequently explained.

*Simulated regular messages from No. 1 data terminal to main data terminal*

Key 405$e$ in FIG. 26 is actuated to the transmit position thereby closing contact 405$f$ for completing an electrical path to outgoing lead 405$g$. In addition key 405 in FIG. 26 and key 400 in FIG. 20 are also actuated to the operated positions. The operation of channel A and the message simulator of FIG. 26 for the transfer of a regular message from the No. 1 terminal to the main terminal is identical with that for the transfer of a discard message in the same direction as previously described, until monopulser 405$d$ is activated to produce a 2-microsecond negative voltage on its output lead 405$g$. This is applied as one input to gate 301 in FIG. 30 whose remaining two inputs are effectively ground via open contacts 300$e$ and 300$d$ because the No. 1 terminal control of channel A is in the off line state. From the output of gate 301, the operation of channel A is the same as that for the transfer of a regular message via transmit contact 405$f$ in FIG. 26 from the No. 1 terminal to the main terminal as previously described, until the transfer of the simulated message reaches the point at which a negative voltage is produced in the output of gate 305 in FIG. 14.

A first portion of this negative voltage applied via inverter 309 and cable driver 310 to open relay contact 310$a$ is ineffective to stimulate further action in channel A because the main control terminal of channel A is in the off line state at the moment. However, a second portion of this negative voltage is applied on lead 305$b$ to the input of the set side of flip-flop 400$d$ in FIG. 20 thereby setting it. The negative voltage resulting in the output of the 0-side of this flip-flop is applied on lead 400$e$ to the input of the 1-side of flip-flop 312 in FIG. 14. thereby setting it. Thereafter, the operation of the main control terminal of channel A in FIG. 14 is identical with that involving the transfer of a regular message in channel A, until a negative voltage is provided in the output of the 0-side of flip-flop 216 in FIG. 14 which is now activated to the set state. Again, a first portion of this negative voltage effects the operation of the main control terminal of channel A in the manner just mentioned to the point at which a second portion of the negative voltage provided in the 0-side output of flip-flop 216 and effective on lead 216$a$ triggers monopulser 216$b$ in FIG. 20 to produce a 5-microsecond voltage pulse in its output. This pulse together with ground supplied via closed contact 400$a$ of operated key 400 activates gate 400$f$ to produce in its output a ground which has no effect on the output of monopulser 400$g$ whose output remains ground. When this pulse terminates, the output of monopulser 400$g$ provides a 5-microsecond negative voltage pulse which is applied to the reset side of flip-flop 400$d$ thereby resetting it.

At the same time, the negative voltage pulse effective on lead 400$h$ in the output of monopulser 400$g$ is applied to the set side of flip-flop 266 in FIG. 15 thereby setting it. Ground from the output of the 1-side of this flip-flop in the set state is changed in the output of inverter 307 into a negative voltage which is applied on lead 307$a$ to one input of gate 305 in FIG. 14 thereby changing the output thereof to ground. This ground on lead 305$b$ is translated by inverter 305$a$ into a negative voltage which is applied to the reset side of flip-flop 216 thereby resetting it. This provides on lead 216$a$ ground which will allow monopulser 216$b$ in FIG. 20 to trigger again during the next cycle. However, as was previously mentioned, monopulser 216$b$ produced a 5-microsecond negative voltage signal which has returned to a ground condition. This ground along with ground from closed contact 400$d$ produces in the output of gate 400$f$ a negative voltage which is applied via monopulser 400$g$ to the reset side of flip-flop 400$d$. After this negative voltage pulse terminates, then ground replaces the resetting voltage from the 0-side of flip-flop 400$d$ in FIG. 20. Flip-flop 400$d$, activated to the reset state in the manner just mentioned, provides ground on its output lead 400$e$ thereby removing the setting negative voltage from the input of the 1-side of flip-flop 312 in FIG. 14. The 5-microsecond delay provided by monopulser 216$b$, gate 400$f$ and monopulser 400$g$ ensures that the time duration of the input to monopulser 216$b$ is effectively longer than the necessary minimum time duration for the reason that if the 5-microsecond time delay were not provided, the negative voltage input to monopulser 216$b$ would be an extremely short pulse and the output thereof might not endure for 5-microseconds.

The operation of the main and No. 1 terminal controls of channel A proceeds from the setting of flip-flop 266 in FIG. 15 as just mentioned in the manner of the transfer of a regular message from the No. 1 terminal control to the main terminal control as previously described until flip-flop 285 of the No. 1 control terminal in FIG. 28 is reset whereby a ground is provided in the output of its 0-side as hereinbefore explained. This ground on lead 285$b$ activates gate 286 in FIG. 30 to produce in its output a negative voltage which is applied via lead 286$b$ to the reset side of flip-flop 409$c$ in FIG. 26 thereby resetting it. Again the No. 1 terminal control simulator in FIG. 26, and the main and No. 1 terminal controls, operate in the manner previously explained for the transfer of a discard message. The simulated regular messages from the No. 1 data terminal to the main data terminal are continued until key 405 or 405$e$ in FIG. 26 or key 400 in FIG. 20 is operated to the idle state. As the termination of the transfer of the simulated message may be instituted while such transfer is in progress, it is necessary to clear the main and No. 1 terminal controls on a manual basis that is hereinafter described.

*Manual data bit test circuit*

It is necessary to establish from time to time, as desired, that the circuits constituting channel A are in an operative condition. This is achieved by the use of equipment at either the main or No. 1 terminal control for transmitting messages therefrom having either an odd or an even number of "1" bits in a given message in a manner that is now explained. To check the operativeness of the odd numbered data circuits transmitting bits from the No. 1 data terminal to the main data terminal, test odd key 414 at the main terminal control in FIG. 17 is operated to supply ground and a source of negative voltage via closed contacts 414*e* and 414*d* and leads 414*f* and 414*g* in FIG. 17 and via closed contact 415*a* of unoperated test odd key 415 in FIG. 24 to the operating winding of relay 415*b* which is thereupon operated.

At the same time, contact 414*a* of operated key 414 in FIG. 17 is opened thereby enabling voltage divider 414*b* to apply a negative voltage to lead 414*c*. This voltage is supplied to the input of test receive gate 407 in FIG. 14 which is also receiving ground on lead 416*g* at this time. This negative voltage is changed in the output of gate 407 to ground which is translated in the output inverter 407*a* to a negative voltage effective on its output lead 407*b*. This voltage is applied to the set side of flip-flop 312 thereby setting it. In the set state this flip-flop supplies ground to complete the operating paths of relay 312*a* in FIG. 14 and relays 313, 313*a*, 313*f*, 313*g* and 313*m* in FIG. 17, all of which operate in sequence to close all 120 associated relay contacts 313*n* through 313*s* (1, 3, 5 . . . 119, 120) in FIG. 16 thereby completing all 120 pairs of receiving leads 161*a* and 161*b* through 161*g* and 161*h* (1, 2, 3 . . . 119, 120), as above mentioned extending from the main data terminal control to the No. 1 data terminal control, in the manner hereinbefore explained.

The operation of relay 415*b* in FIG. 24 as just mentioned opens its associated contact 415*c* in FIG. 28 thereby connecting source 415*i* of negative voltage to lead 415*d*. This negative voltage, together with ground via closed relay contact 417*a*, activates NOT-OR test transmit gate 415*e* to produce in its output ground which is changed in the output of test transmit inverter 415*f* into a negative voltage which is applied to the set side of flip-flop 278 thereby setting it. Now, the output of the 1-side of this flip-flop provides ground which completes the operating path for relays 278*b* in FIG. 28 and relays 279*a*, 279*m*, 280, 280*a*, the intermediate relays and relays 280*n* (1, 2 . . . 39, 40) in FIG. 23 to close eventually all 120 pairs of contacts 280*b* and 280*c* through 280*h* and 280*i* (1, 2 . . . 119, 120) as above described. This completes the 120 pairs of leads 161*a* and 161*b* through 161*g* and 161*h* (1, 2 . . . 119, 120) in the manner previously explained. The negative voltage effective on lead 415*d* in FIG. 28 as just mentioned is also applied to the inputs of the 60 odd numbered DR1 through DR119 data registers (DR1, DRS3 . . . DR119) of the 120 DR1 through DR 120 data registers (DR1, DR2 . . . DR119, DR120) in FIG. 27 thereby setting them. This operates the 60 associated odd numbered data register relays in the group comprising relays 293 through 293*c* (1, 3, 5 . . . 117, 119) of the 120 data register relays (1, 2, 3 . . . 119, 120) whereby their 60 associated contacts 293*d* through 293*g* (1, 3, 5 . . . 119) identified hereinbefore in FIG. 23 are closed, in the manner previously explained. This completes the data circuits to the 60 odd numbered L1 through L119 line relays (1, 3, 5 . . . 119) in the group of 120 line relays in FIGS. 16. All of the 60 odd numbered relays (1, 3, 5 . . . 119) operate to open their 60 associated contacts 313*w* through 319*a* (1, 3, 5 . . . 119) in FIG. 10 thereby effectively applying negative voltage via the 60 odd numbered leads (1, 3, 5 . . . 119) in the range 319*g* through 319*i* to the 60 odd numbered data tubes DS1, DS3, DS5 . . . DS119 of the 120 data tubes DS1 through DS120 associated with the 60 odd numbered lines 313*x* through 319*e* (1, 3, 5 . . . 119). The negative voltage on the 60 odd numbered leads extinguishes the respective tubes.

To check the operativeness of the 60 even numbered data circuits transmitting from the No. 1 data terminal to the main data terminal, test even key 416 in FIG. 17 is operated to supply ground and a source of negative voltage via closed contacts 416*a* and 416*b* and leads 416*c* and 416*d* and via closed contact 418*a* of unoperated key 418 in FIG. 24 to the operating winding of relay 417 which is thereupon operated. At the same time, contact 416*e* of operated key 416 in FIG. 17 is opened thereby permitting voltage divider 416*f* to apply a negative voltage to lead 416*g*. This voltage is supplied to the input of gate 407 in FIG. 14 which is also receiving ground on lead 414*c* at this time. This negative voltage is changed in the output of gate 407 to ground which is translated in the output of inverter 407*a* to a negative voltage effective on its output lead 407*b*. This voltage is applied to the set side of flip-flop 312 thereby setting it. In the set state, this flip-flop supplies ground to complete paths of relay 312*a* in FIG. 14 and relays 313, 313*a*, 313*f*, 313*g* and 313*m* in FIG. 17, all of which operate in sequence to close all 120 associated relay contacts 313*n* through 313*s* (1, 2, 3 . . . 119, 120) in FIG. 16 thereby completing all 120 pairs of receiving lead 161*a* and 161*b* through 161*g* and 161*h* (1, 2, 3 . . . 119, 120) as above mentioned extending from the main data terminal control to the No. 1 data terminal control, in the manner hereinbefore explained.

The operation of relay 417 in FIG. 24 as just mentioned opens its associated contact 417*a* in FIG. 28 thereby connecting source 417*b* of negative voltage to lead 417*c*. This negative voltage, together with ground via closed relay contact 415*c*, activates gate 415*e* to produce in its output ground which is changed in the output of inverter 415*f* into a negative voltage which is applied to the set side of flip-flop 278 thereby setting it. Now, the output of the 1-side of this flip-flop provides ground which completes the operating paths for relay 278*b* in FIG. 28 and relays 279*a*, 279*m*, 280, 280*a*, the intermediate relays and relays 280*n* (1, 2 . . . 39, 40) in FIG. 23 to close eventually all 120 pairs of contacts 280*b* and 280*c* through 280*h* and 280*i* (1, 2 . . . 119, 120), as above described. This completes the 120 pairs of leads 161*a* and 161*b* through 161*g* and 161*h*, in the manner previously explained.

The negative voltage effective on lead 417*c* in FIG. 28 as just mentioned is also applied to the inputs of the 60 even numbered DR2 through DR120 data registers (DR2, DR4 . . . DR120) of the 120 DR1 through DR120 data registers (DR1, DR2 . . . DR119, DR120) in FIG. 27 thereby setting them. This operates the 60 associated even numbered data register relays 293 through 293*c* (2, 4, 6 . . . 120) of the 120 data register relays (1, 2, 3 . . . 119, 120) whereby their 60 associated contacts (2, 4, 6 . . . 120) identified hereinbefore in FIG. 23 are closed, in the manner previously explained. This completes the data circuits to the 60 even numbered L2 through L120 line relays (2, 4, 6 . . . 120) in the group of 120 line relays in FIG. 16. All of the 60 even numbered relays (2, 4, 6 . . . 120) operate to open their 60 associated contacts 319 through 319*c* (2, 4, 6 . . . 120) thereby effectively applying negative voltage via the 60 even numbered leads (2, 4, 6 . . . 120) in the range from lead 319*h* through 319*k* in FIG. 10 to the 60 even numbered data tubes DS2, DS4, DS6 . . . DS120 of the 120 data tubes DS1 through DS120 associated with the 60 even numbered lines 319*d* through 319*f* (2, 4, 6 . . . 120). The negative voltage on the even numbered leads extinguishes the respective tubes in the manner above mentioned regarding the corresponding data tubes in FIG. 28 thereby indicating at the main terminal control that all even numbered circuits are operative. A failure of one or more of such even numbered tubes to extinguish serves to indicate the corresponding data signaling circuit is inoperative. The data signaling circuits are thereafter restored to normal by the activation of the manual clear key 385 in FIG. 17.

To check the operativeness of the odd numbered data circuits transmitting bits from the main data terminal to the No. 1 data terminal, test odd key 415 in FIG. 24 is operated to open its contact 415a and close its associated contacts 415g and 415h. Closure of contacts 415g and 415h supplies ground and a source of negative voltage via leads 414f and 414g and closed contact 414h of unoperated key 414 in FIG. 17 to the operating path of relay 154n which is thereby operated to open its contact 414i in FIG. 10. This enables voltage divider 414k to apply a negative voltage to one input of NOT-OR gate 154k which is also receiving ground via closed relay contact 414m. This gate is thereby activated to provide in its output ground which is changed in the output of inverter 154p to a negative voltage effective on lead 154f. This negative voltage is applied to the set side of flip-flop 154 thereby setting it. Now, the 1-side output of this flip-flop provides ground which completes the operating paths for relay 155 in FIG. 10 and relays 156, 156n, 157, 157c, the intermediate relays, and relays 157n in FIG. 16 to close the 120 pairs of associated relay contacts 158a and 158b through 158g and 158h (1, 2 . . . 119, 120) in FIG. 16 thereby completing all 120 pairs of associated receiving leads 161a and 161b through 161g and 161h (1, 2 . . . 119, 120) as above identified extending from the main data terminal control to the No. 1 data terminal control, in the manner previously described.

The negative voltage on lead 154f in FIG. 10 is also supplied to the set side of flip-flop 170 in FIG. 11 thereby setting it. In the set state, the output of the 1-side of his flip-flop supplies ground to the operating path of relay 171 which is thereby operated to close its associated contact 171a in FIG. 19. This completes an operating path via lead 171b for relay 172 in FIG. 26. This relay operates to close its associated contact 172b in FIG. 31 to supply ground to one input of gate 182 whose other inputs on leads 182a and 381 are ground for reasons previously mentioned. As a consequence of its three ground inputs as just mentioned, gate 182 provides in its output a negative voltage which is applied to the set side of flip-flop 184 thereby setting it. In the set state, this flip-flop supplies ground to complete the operating paths for relay 187 in FIG. 31 and relays 188, 188b, 175, 189 and 188d (1, 2 . . . 20) in FIG. 24, all of which operate. Eventually the 120 contacts 190 through 191c (1, 2 . . . 119, 120) in FIG. 23 as above identified are closed to establish 120 complete operating paths via the 120 pairs of leads 161a and 161b through 161g and 161h (1, 2 . . . 119, 120) of the 120 L1 through L120 line relays 191 through 191c (1, 2 . . . 119, 120) as above identified at the No. 1 terminal control in FIG. 23. Now this completes the 120 pairs of leads 161a and 161b through 161g and 161h (1, 2 . . . 119, 120) in FIG. 23, in the manner hereinbefore explained.

The negative voltage effective on lead 154h in FIG. 10 is also applied to the inputs of 60 odd numbered data registers DR1 through DR119 (DR1, DR3 . . . DR119) of the 120 data registers DR1 through DR120 in FIG. 9 thereby setting them. This operates the 60 associated odd numbered data register relays (1, 3, 5 . . . 119) in the group comprising relays 153 through 153e constituting the 120 data register relays to close their 60 associated contacts 153a through 153h (1, 3, 5 . . . 119) in FIG. 16 as above identified, in the manner previously discussed. This completes the data circuits to the 60 odd numbered L1 through L119 line relays (1, 3, 5 . . . 117, 119) in the group of 120 line relays L1 through L120 (1, 2 . . . 120) in FIG. 16. All of the 60 odd numbered relays (1, 3, 5 . . . 119) in the range L1 through L119 are operated to open their 60 associated contacts 191e through 191h (1, 3, 5 . . . 117, 119) in FIG. 28 thereby effectively applying negative voltage from the associated sources of such voltage via the 60 odd numbered leads 191b through 191k (1, 3, 5 . . . 119) to the grids of the 60 odd numbered data signaling tubes DS1, DS3, DS5 . . . DS117, DS119 associated with the 60 odd numbered pairs (1, 3, 5 . . . 119) included in the 120 pairs comprising 192a and 192b through 192c and 192d. As the grids of these 60 odd numbered tubes were normally supplied with ground via the 60 odd numbered closed contacts in the group comprising contacts 191e through 191h (1, 3, 5 . . . 119) to permit their illumination, the negative voltage substituted for such ground at the respective odd numbered tubes in the manner just mentioned extinguishes them thereby indicating at the No. 1 terminal control that all odd numbered data circuits are operative. A failure of one or more of the odd numbered tubes to extinguish serves to indicate the corresponding data circuit is inoperative. The data circuits are thereafter restored to normal by the actuation of manual clear key 385 in FIG. 17, as previously explained. A failure of one or more of such odd numbered tubes to extinguish serves to indicate the corresponding data circuit is inoperative. The data circuits are thereafter restored to normal by actuation of the manual clear key 385 in FIG. 17.

To check the operativeness of the even numbered data circuits transmitting bits from the main data terminal to the No. 1 data terminal, test even key 418 in FIG. 24 is operated to supply ground and a source of negative voltage via its associated closed contacts 418b and 418c and leads 416c and 416d and via closed contact 416e of unoperated key 416 in FIG. 17 to the operating winding of relay 154m which is thereupon operated to open its contact 414m in FIG. 10. This enables voltage divider 414n to apply a negative voltage to one input of gate 154k which is also receiving ground via closed relay contact 414i. This gate is thereby activated to provide in its output ground which is changed in the output of inverter 154p to a negative voltage effective on lead 154f. This voltage is applied to the set side of flip-flop 154 thereby setting it. Now, the 1-side output of this flip-flop provides ground which completes the operating paths for relay 155 in FIG. 10 and relays 156, 156n, 157, 157c, the intermediate relays, and relays 157n in FIG. 16 to close the 120 pairs of associated relay contacts 158a and 158b through 158g and 158h (1, 2 . . . 119, 120) in FIG. 16 thereby completing all 120 pairs of associated receiving leads 161a and 161b through 161g and 161h (1, 2 . . . 119, 120) as above identified extending from the main data terminal control to the No. 1 data terminal control, in the manner previously described.

The negative voltage on lead 154f in FIG. 10 supplied to the input of flip-flop 170 in FIG. 11 serves to complete the operating paths via the 120 pairs of leads 161a and 161b through 161g and 161h (1, 2 . . . 119, 120) of the 120 L1 through L120 line relays 191 through 191c (1, 2 . . . 119, 120) as above identified at the No. 1 terminal control in FIG. 23. Now, this completes the 120 pairs of leads 161a and 161b through 161g and 161h (1, 2 . . . 119, 120), in the manner hereinbefore explained for using the negative voltage on lead 154f to check the operativeness of the odd numbered data circuits transmitting bits from the main data terminal to the No. 1 data terminal. The negative voltage effective on lead 154i in FIG. 10 is applied to the inputs of 60 even numbered data registers DR2 through DR120 (DR2, DR4 . . . DR118, DR120) of the 120 data registers DR1 through DR120 in FIG. 9 thereby setting them. This operates the 60 associated even numbered data register relays (2, 4, 6 . . . 118, 120) in the group of relays comprising relays 153 through 153e constituting the 120 data register relays to close their associated contacts in the range comprising contacts 153a through 153h (2, 4, 6 . . . 118, 120) as above identified, in the manner previously discussed. This completes the data circuits to the 60 even numbered L2 through L120 line relays (2, 4, 6 . . . 120) in the group of 120 line relays L1 through L120 (1, 2 . . . 120) in FIG. 23. All of the 60 even numbered relays (2, 4, 6 . . . 120) in the range L2 through L120 are operated to open their 60 associated contacts 191g through 191f (2, 4, 6 . . . 120) in FIG. 28 thereby effectively applying negative voltage from the associated sources of such voltage via the even numbered leads 191$i$ through 191$m$ (2, 4, 6 . . . 120) to the grids of the 60 even numbered data signaling tubes DS2, DS4, DS6 . . . DS118, DS120 associated with the 60 even numbered pairs (2, 4, 6 . . . 120) included in the 120 pairs comprising 192$a$ and 192$b$ through 192$c$ and 192$d$. As the grids of these 60 even numbered tubes were normally supplied with ground via the 60 even numbered closed contacts 191$g$ through 191$f$ (2, 4, 6 . . . 120) to permit their illumination, the negative voltage substituted for such ground at the respective even numbered tubes in the manner just mentioned extinguishes them thereby indicating at the No. 1 terminal control that all even numbered data circuits are operative. A failure of one or more even numbered tubes to extinguish serves to indicate the corresponding data circuit is inoperative. The data circuits are thereafter restored to normal by the actuation of the manual clear key 385 in FIG. 17, as previously explained.

While the foregoing descrpition is limited to an explanation of the operation of the system relative to channel A, it is apparent that the system operation regarding channel B would be immediately clear to a person having ordinary skill in the art of data transmission.

It is to be understood that the above-described embodiments are merely illustrative of the application of the invention. Numerous other embodiments may occur to those skilled in the art without departing from the spirit and scope of the invention.

What is claimed is:

1. A system for communicating data messages, each comprising a plurality of digital data components, a main station and a plurality of other stations for processing said components of each of said messages, each of said stations having a plurality of terminal leads, a plurality of channels for communicating said messages between said stations, each of said channels having a plurality of terminal leads at one end connectable to the plurality of terminal leads at one of said other stations, each of said channels also having a plurality of terminal leads at its opposite end, and means for connecting said main station to the opposite end of each of said channels and thereby to the one of the other stations connected thereto, said connecting means including a plurality of input terminal leads connected to the plurality of terminal leads at said main station and two additional pluralities of output terminal leads, each of said last-mentioned two pluralities of terminal leads connectable to the plurality of terminal leads at the opposite end of one of said channels, each lead of each of said pluralities of leads communicating one of said components of each of said messages whereby all components of each message are communicated in parallel at one time, said connecting means activated by a preselected signal received from said main station for connecting the plurality of terminal leads of said main station to the plurality of terminal leads at the opposite end of a predetermined one of said channels and thereby to the one of said other stations, additional means in said connecting means responsive to a clock signal originated at said main station establishing a preference for connecting to a particular one of said plurality of channels, other means in said connecting means transmitting a make-busy signal to the particular preferred one of said channels upon connection thereof to said main station, means in said particular preferred channel responsive to said make-busy signal for simultaneously exchanging idle and busy signal voltages with said connecting means, other means in said preferred channel transmitting to said connecting means a predetermined signal voltage indicating the communication of a discrete message thereover, corresponding means in said connecting means relaying said predetermined signal voltage to said main station, said corresponding means comprising flip-flop means normally activated to manifest two different states at the same time in response to said predetermined signal voltage, switch means in said preferred channel communicating said predetermined signal voltage to said connecting means, said switch when activated tending to provide such an amount of chatter as to constitute an extraneous voltage having the effect of locking said flip-flop means in two identical states at the same time thereby precluding the translation of said predetermined signal voltage reliably to said connecting means, and interlocking means within said flip-flop means overcoming the precluding effect of said extraneous voltage and forcing said flip-flop means to manifest said two different simultaneous states, said connecting means and predetermined channel further activated by said preselected signal for communicating all components of each of said messages in parallel at the same time on said connected pluralities of terminal leads from said main station to said one station connected to said predetermined one channel.

2. A system for communicating data messages, each comprising a plurality of digital data components, a main station and a plurality of other stations for processing said components of each of said messages, each of said stations having a plurality of terminal leads, a plurality of channels for communicating said messages between said stations, each of said channels having a plurality of terminal leads at one end connectable to the plurality of terminal leads at one of said other stations, each of said channels also having a plurality of terminal leads at its opposite end, and means for connecting said main station to the opposite end of each of said channels and thereby to the one of the other stations connected thereto, said connecting means including a plurality of input terminal leads connected to the plurality of terminal leads at said main station and two additional pluralities of output terminal leads, each of said last-mentioned two pluralities of terminal leads connectable to the plurality of terminal leads at the opposite end of one of said channels, each lead of each of said pluralities of leads communicating one of said components of each of said messages whereby all components of each message are communicated in parallel at one time, said connecting means activated by a preselected signal received from said main station for connecting the plurality of terminal leads of said main station to the plurality of terminal leads at the opposite end of a predetermined one of said channels and thereby to the one of said other stations connected thereto, said connecting means and predetermined channel further activated by said preselected signal for communicating all components of each of said messages in parallel at the same time on said connected pluralities of terminal leads from said main station to said one station connected to said predetermined one channel, means in said predetermined channel transmitting a correct parity signal voltage to said connecting means for indicating thereto the correct parity of discrete messages as transmitted to said predetermined channel, means in said connecting means translating said parity signal voltage into a corresponding signal voltage for indicating correct parity to said main station, further means in said predetermined channel transmitting idle and busy signal voltages after transmission of said correct parity signal voltage therefrom for indicating to said connecting means that said predetermined channel is available to accept a message originating at said main station, first control means in said predetermined channel directed to said main station, second control means in said predetermined channel directed to said one other station connected to said predetermined channel, further means in said connecting means transmitting a preselected signal voltage to said first control means to prepare for the transmission of a message from said main station thereto, and means in said second control means activated by said preselected signal voltage to receive the plurality of data components constituting a message in parallel at one time on a plurality of terminal leads.

3. The system according to claim 2 in which said first control means includes means to transmit a have message signal voltage to said second control means for indicating a message is available in said first control means for transfer to said second control means, and means in said second control means activated by said have message signal voltage to receive a message from said first control means, and thereafter to transfer said message to said one other station connected to said predetermined channel.

4. The system according to claim 3 which includes means in said one second control means activated by a message received therein to transmit a have message signal voltage to said one other station for indicating thereto a message is available in said second control means, said last-mentioned station responsive to said have message signal voltage to return an acknowledgment signal voltage to said second control means for restoring said have message means to the idle state.

5. The system according to claim 4 in which said one other station returns a correct parity signal voltage to said second station control means, and said second means together with first control means and connecting means are activated in sequence by said correct parity signal voltage to transmit a preselected signal voltage to said main station for indicating the message transfer is successfully completed.

6. A system for communicating data messages, each comprising a plurality of digital data components, a main station and a plurality of other stations for communicating said messages therebetween, each of said stations having a plurality of terminal leads, a plurality of channels for communicating said messages between said stations, each of said channels having a plurality of terminal leads at each of its two opposite ends, each of said channels having the plurality of terminal leads at one end connected to the plurality of terminal leads of one of said other stations, means for connecting the free end of each of said channels to said main station, said means including a first plurality of terminal leads connected to the plurality of terminal leads of said main station, said connecting means also including two additional pluralities of terminal leads, each of said last-mentioned pluralities of terminal leads connectable to the plurality of terminal leads at the free end of one of said channels, each terminal lead communicating one component of each message whereby all components of each message are transmitted in parallel at the same time, means in a first one of said channels activated by a preselected signal voltage received from a first one of said other stations to connect the plurality of terminal leads at the free end of said first channel to a preselected one of said additional pluralities of terminal leads of said connecting means and thereby to said main station, means in said connecting means activated by said last-mentioned connection thereof to said first channel for returning a predetermined signal voltage to said first other station thereby causing the transmission of a message from said first other station to said main station, further means in said first channel responsive to said predetermined signal voltage transmitting a send message signal to said first other station, said first other station responding to said send message signal voltage by transmitting the plurality of components of said message to said first channel in parallel at one time on the connected pluralities of terminal leads of said first other station and said first channel, means in said first other station transmitting a message sent signal voltage to said main station, additional means in said first channel activated by said message sent signal voltage returning a further signal voltage to inform said first other station that the transmitted message is returned for the checking of its accuracy, and additional means at said first other station transmitting a message ready signal voltage to said first channel, whereupon said first other station transmits a message to said main terminal.

7. A system for communicating data messages, each comprising a plurality of digital data components, a main station and a plurality of other stations for processing said components of each of said messages, each of said stations having a plurality of terminal leads, a plurality of channels for communicating said messages between said stations, each of said channels having a plurality of terminal leads at one end connectable to the plurality of terminal leads at one of said other stations, each of said channels also having a plurality of terminal leads at its opposite end, and means for connecting said main station to the opposite end of each of said channels and thereby to the one of the other stations connected thereto, said connecting means including a plurality of input terminal leads connected to the plurailty of terminal leads at said main station and two additional pluralities of output terminal leads, each of said last-mentioned two pluralities of terminal leads connectable to the plurality of terminal leads at the opposite end of one of said channels, each lead of each of said pluralities of leads communicating one of said components of each of said messages whereby all components of each message are communicated in parallel at one time, said connecting means activated by a preselected signal received from said main station for connecting the plurality of terminal leads of said main station to the plurality of terminal leads at the opposite end of a predetermined one of said channels and thereby to the one of said other stations connected thereto, said connecting means further including means supplying a certain signal voltage to said predetermined channel for restoring said predetermined channel to the idle state, means in said predetermined channel responsive to said certain signal voltage supplying a further signal voltage to said connecting means for restoring said connecting means to the idle state, other means in said connecting means responsive to said further signal voltage supplying another preselected signal voltage to said main terminal for indicating a second one of said channels is available for data communication, and further means in said connecting means activated by said other means therein furnishing a predetermined signal voltage to said main terminal indicating thereto that said connecting means is in the idle condition, said connecting means and predetermined channel further activated by said preselected signal from said main station for communicating all components of each of said messages in parallel at the same time on said connected pluralities of terminal leads from said main station to said one station connected to said predetermined one channel.

8. A system for communication messages, each comprising a plurality of digital data components, a main station and a plurality of other stations for communicating said messages, each of said stations having a plurality of terminal leads, a plurality of channels for communicating said messages between said stations, each of said channels having a plurality of terminal leads at one end connectable to the plurality of terminal leads of one of said other stations, each of said channels also including a plurality of terminal leads at its opposite end, means including a plurality of input terminal leads connecting the plurality of terminal leads at said main station to at least one of two additional pluralities of output terminal leads, each of said last-mentioned two pluralities of terminal leads connectable to the plurality of terminals leads at the opposite end of one of said channels, each terminal lead of each of said pluralities of terminal leads communicating one of said components of each of said messages whereby all components of each message are communicated in parallel at one time, said connecting means activated by a preselected signal voltage applied to one of said input terminal leads by said main station for selecting a predetermined one of said channels and thereafter supplying a test message signal voltage to said predetermined channel, signaling means included in said predetermined channel and responsive to said test message voltage for supplying a predetermined signal on said plurality of terminal leads connecting the opposite end of said predetermined channel to said connecting means and thereby returning said test message signal to said main station for checking as to proper parity, and further means in said predetermined channel signaling means responsive to said test message signal voltage for returning a preselected signal to said connecting means indicating correct parity in the transmitted test message.

9. The system according to claim 8 in which further means included in said predetermined channel is responsive to said test message voltage for returning a preselected signal voltage to said connecting means, and means included in said connecting means and activated by said preselected signal voltage for supplying another signal voltage to said main terminal thereby acknowledging the receipt of said test message in said predetermined channel.

10. The system according to claim 9 in which said main terminal responsive to said other signal voltage directed to said main terminal returns a further signal voltage to said connecting means, and other means included in said connecting means and responsive to said further signal voltage for restoring said connecting means to the idle state and for transmitting an end test message signal voltage to said one channel.

11. The system according to claim 10 in which additional means included in said predetermined channel is activated by said end test message signal voltage for restoring said signaling means to the idle state.

12. In a system for communicating digital data messages, each comprising a plurality of digital data components, a main station and at least one other station, each having a plurality of terminal leads, a channel for communicating said messages between said main and other stations, said channel having two pluralities of terminal leads, one plurality at each of its two opposite ends, one of said last-mentioned pluralities of terminal leads at one end of said channel connected to the plurality of terminal leads at said other station, means for connecting said channel to said main station, said means including a first plurality of terminal leads connected to said plurality of terminal leads at said main station and a second plurality of terminal leads connectable to the plurality of leads at the opposite end of said channel, each terminal lead of each of said pluralities of terminal leads communicating one data component of each of said messages whereby all components of each message are communicated in parallel at the same time, and means in said channel and said connecting means activated by a predetermined signal originating in said other station for communicating messages therefrom to said main station, means in said connecting means activated by a predetermined signal received from said main station to transmit a series of clock timing pulses at preselected time intervals to said channel at the start of each of said messages transmitted from said other station to said main station, means in said channel activated by said clock timing pulses to count each time that each message transmitted from said other station failed to complete itself within a time interval represented by a predetermined number of said clock timing pulses, means in said channel responsive to a predetermined number of successive times of such message communication failures to indicate the occurrence thereof, and means in said channel activated by said predetermined number of successive message failures supplying to said connecting means another signal voltage which causes said connecting means to disconnect itself from said channel.

13. A system for communicating data messages, each comprising a plurality of digital data components, a main station and a plurality of other stations for processing the components of said messages, each station having a plurality of terminal leads, a plurality of channels for communicating said messages, each channel including a plurality of terminal leads at each of two opposite ends, each channel having the plurality of terminal leads at one end connectable to the plurality of terminal leads of one of said other stations, and means for connecting said main station to the opposite end of each of said channels, said connecting including a first plurality of terminal leads connected to the plurality of terminal leads of said main station, said connecting means also including two additional pluralities of terminal leads, each of said last-mentioned pluralities of terminal leads connectable to the plurality of terminal leads at the opposite end of one of said channels, each terminal lead of each of said pluralities of terminal leads communicating one data component of each of said messages whereby all data components of each message are communicated in parallel at the same time, other means included in said connecting means and activated by a preselected signal voltage sent thereto by said main station for connecting one of said two pluralities of terminal leads of said connecting means to the plurality of leads at the opposite end of a predetermined one of said channels, further means included in said connecting means and responsive to said last-mentioned connection to transmit a make busy signal voltage to said predetermined channel for holding said last-mentioned channel for message communication from said main station to said predetermined channel and thereby to the one of said other stations connected to said last-mentioned channel, additional means included in said connecting means and activated by a predetermined signal voltage received from said main station to transmit a series of clock timing pulses at preselected time intervals to said predetermined channel at the start of each of said message communications, means included in said predetermined channel and activated by said clock timing pulses to count each time that each message communication failed to complete itself within a time interval represented by a preselected number of said clock timing pulses, and other means included in said last-mentioned channel and responsive to a predetermined number of successive times of such message communication failures for indicating the occurrence thereof.

14. The system according to claim 13 in which additional means included in said predetermined channel is responsive to said predetermined number of message commuication failures for providing to said first-mentioned connecting means a further signal voltage which activates said last-mentioned means to disconnect itself from said last-mentioned channel.

15. The system according to claim 14 in which further means included in said predetermined channel is responsive to said predetermined number of said message communication failures for providing a plurality of signal voltages to said first-mentioned connecting means for indicating that said last-mentioned channel is busy.

16. The system according to claim 13 in which said predetermined number of message communication failures comprises at least three and in which first means included in said predetermined channel is responsive to a complete message communication within the time interval represented by said preselected number of clock timing pulses during the count of a number of message communication failures less than said predetermined number of three for activating said other means in said predetermined channel to the idle state.

17. The system according to claim 13 in which second means included in said predetermined channel is responsive to said counting means to supply at least one signal voltage to said first-mentioned connecting means for indicating a busy condition in said predetermined channel, and third means included in said predetermined channel is activated by said counting means and cooperates with said other means in said predetermined channel to supply at least one further signal voltage to said first-mentioned connecting means for indicating an idle condition in said predetermined channel.

18. The system according to claim 12 in which further means included in said channel is activated by said predetermined number of successive message communication failures to provide at least one further signal voltage to said connecting means for indicating that said channel is busy.

19. The system according to claim 18 in which said predetermined number of message communication failures comprises at least three and in which additional means included in said channel is responsive to a complete message communication within the time interval represented by said preselected number of timing pulses during the count of a number of message communication failures less than said predetermined number of three for activating said indicating means to the idle state.

20. A system for communicating data messages, each comprising a plurality of digital data components, first and second data processing stations, each having a plurality of terminal leads, a channel for communicating said messages between said stations, said channel having two pluralities of terminal leads, one of said last-mentioned pluralities of terminal leads connected to said plurality of leads at said first station, means for connecting said second station to said channel, said means including a first plurality of terminal leads connected to said plurality of terminal leads at said second station, said means also including a second plurality of terminal leads connected to the other plurality of terminal leads at said channel, each terminal lead of each said pluralities of terminal leads communicating one of said data components of each of said messages whereby all components of each message are communicated in parallel at one time.

means activated by a test message signal voltage originating in said second station to transmit a test digital data message therefrom to said channel, means in said channel activated by said test message voltage to return an incorrect parity signal voltage to said connecting means, means in said connecting means responsive to said incorrect parity voltage to supply a ground voltage to said second station for indicating the incorrect parity of the transmitted test message, means in said channel to return an acknowledgment signal voltage to said connecting means for indicating the receipt of said test message in said channel, and means in said connecting means activated by said last-mentioned acknowledgment voltage to transmit a further acknowledgment signal of negative voltage to said second station, said ground and negative voltage signals supplied to said second station indicating the portion of said channel returning said incorrect parity signal voltage is operational.

21. In a system for communicating data messages, each comprising a plurality of digital data components, first and second data processing stations, each having a plurality of terminal leads, a channel for communicating said messages between said stations, said channel having two pluralities of terminal leads, on of said two pluralities of terminal leads connected to said plurality of terminal leads of said first station, means for connecting said channel to said second station, said means including a first plurality of terminal leads connected to said plurality of terminal leads of said second station and a second plurality of terminal leads connected to the other plurality of terminal leads of said channel, each lead of said pluralities of terminal leads communicating one of said components of each of said messages whereby all components of each of said messages are communicated in parallel at the same time, and means to determine the operativity of preselected terminal leads connecting said channel to the corresponding terminal leads of a predetermined one of said stations, said determining means including further means to connect said preselected terminal leads of said channel for message communication to corresponding terminal leads of said connecting means and thereby of said predetermined station, and means responsive to said last-mentioned connection of said preselected terminal leads for identifying the operative and nonoperative connected terminal leads among said preselected terminal leads.

22. The system according to claim 21 in which said determining means determines the operativity of the preselected terminal leads comprising the odd numbered terminal leads of said one plurality of terminal leads connecting said channel to the corresponding terminal leads connecting said channel to the corresponding terminal leads of said first station, said further connecting means connecting said last-mentioned odd numbered terminal leads of said channel to the corresponding terminal leads of said first station, and said identifying means responsive to said last-mentioned connection of said odd numbered terminal leads for identifying the operative and nonoperative terminal leads among said last-mentioned odd numbered terminal leads.

23. The system according to claim 21 in which said determining means determines the operativity of the preselected terminal leads comprising the even numbered terminal leads of said one plurality of terminal leads connecting said channel to the corresponding terminal leads of said first station, said further connecting means connecting said last-mentioned even numbered terminal leads of said channel to the corresponding terminal leads of said first station, and said identifying means responsive to said last-mentioned connection of said last-mentioned even numbered terminal leads for identifying the opertive and nonoperative terminal leads among said last-mentioned even numbered terminal leads.

24. The system according to claim 21 in which said determining means determines the operativity of the preselected terminal leads comprising the odd-numbered terminal leads of said other plurality of terminal leads connecting said channel to the corresponding terminal leads of said first-mentioned connecting means and thereby to the corresponding terminal leads of said second station, said further connecting means connecting sail last-mentioned odd numbered terminal leads of said first-mentioned connecting means, and said identifying means responsive to said last-mentioned connection of said last-mentioned odd numbered terminal leads for identifying the operative and nonoperative terminal leads among said last-mentioned odd numbered terminal leads.

25. The system according to claim 21 in which said determining means determines the operativity of the preselected terminal leads comprising the even numbered terminal leads of said other plurality of terminal leads connecting said channel to the corresponding terminal leads of said connecting means and thereby to the corresponding terminal leads of said second station, said further connecting means connecting said last-mentioned even numbered channel terminal leads to the corresponding terminal leads of said first-mentioned connecting means, and said identifying means responsive to said last-mentioned connection of said even-numbered terminal leads for identifying the operative and nonoperative terminal leads among said last-mentioned even numbered terminal leads.

References Cited by the Examiner

UNITED STATES PATENTS

| | | | |
|---|---|---|---|
| 2,435,035 | 1/1948 | Dervaux | 178—4 |
| 2,684,745 | 7/1954 | Blodgett | 179—19 |
| 2,859,277 | 11/1958 | Pratt | 178—25 |
| 2,991,330 | 7/1961 | Weber | 178—50 |
| 3,075,175 | 1/1963 | Lourie | 178—23.1 |
| 3,096,508 | 7/1963 | Reitfort | 178—50 |
| 3,117,306 | 1/1964 | Reitfort | 340—172.5 |

NEIL C. READ, *Primary Examiner.*

ROBERT H. ROSE, *Examiner.*

A. J. DUNN, T. A. ROBINSON, *Assistant Examiners.*